US011921995B2

(12) United States Patent
Tao et al.

(10) Patent No.: US 11,921,995 B2
(45) Date of Patent: Mar. 5, 2024

(54) DATA SHARING METHOD, GRAPHICAL USER INTERFACE, RELATED DEVICE, AND SYSTEM

(71) Applicant: Huawei Technologies Co., Ltd., Shenzhen (CN)

(72) Inventors: Qiang Tao, Beijing (CN); Guangyuan Gao, Beijing (CN); Shoujie Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/175,953

(22) Filed: Feb. 28, 2023

(65) Prior Publication Data
US 2023/0205403 A1    Jun. 29, 2023

Related U.S. Application Data

(63) Continuation of application No. PCT/CN2021/112126, filed on Aug. 11, 2021.

(30) Foreign Application Priority Data

Aug. 31, 2020  (CN) .................... 202010901747.X

(51) Int. Cl.
G06F 17/00    (2019.01)
G06F 3/0484   (2022.01)
H04L 51/046   (2022.01)

(52) U.S. Cl.
CPC .......... *G06F 3/0484* (2013.01); *H04L 51/046* (2013.01)

(58) Field of Classification Search
CPC .... G06F 3/0484; G06F 3/1204; G06F 3/1237; G06F 3/1288; G06F 3/12; G06F 9/451; G06F 3/1224; G06F 3/1292; H04L 51/046; H04L 51/48; H04L 51/04
See application file for complete search history.

(56) References Cited

U.S. PATENT DOCUMENTS

| 11,146,514 | B2* | 10/2021 | Brandt ................. H04L 51/10 |
| 2007/0022180 | A1* | 1/2007 | Cocotis ................. H04L 51/10 |
| | | | 709/217 |
| 2012/0084364 | A1* | 4/2012 | Sivavakeesar ......... H04W 4/60 |
| | | | 709/205 |
| 2012/0086652 | A1* | 4/2012 | Kim ..................... G06F 3/1256 |
| | | | 345/173 |
| 2016/0021038 | A1 | 1/2016 | Woo et al. |

(Continued)

FOREIGN PATENT DOCUMENTS

| CN | 1313548 A   | 9/2001  |
| CN | 205827690 U | 12/2016 |

(Continued)

*Primary Examiner* — Laurie A Ries
(74) *Attorney, Agent, or Firm* — Conley Rose, P.C.

(57) ABSTRACT

A data sharing method includes an electronic device that sends data such as a picture, a document, a link, and a chat record to a server contact in an instant messaging application, shares the data to a device bound with a user, such as a printer, a projector, or a display, and triggers the device to perform an operation such as printing, projection, or mirroring such that a process of printing data, projection, mirroring, and the like using the electronic device can be intuitive, simple, and effective for the user.

17 Claims, 82 Drawing Sheets

(56) References Cited

U.S. PATENT DOCUMENTS

| | | | | |
|---|---|---|---|---|
| 2016/0050263 A1* | 2/2016 | Hwang | ............... | H04L 51/04 |
| | | | | 709/204 |
| 2016/0231686 A1* | 8/2016 | Itoh | ................. | G03G 15/502 |
| 2017/0034247 A1 | 2/2017 | Tredoux | | |
| 2018/0032297 A1 | 2/2018 | She et al. | | |
| 2023/0131823 A1* | 4/2023 | Jackson | ............ | G06Q 30/0621 |
| | | | | 705/26.5 |
| 2023/0254361 A1* | 8/2023 | Laukkanen | .......... | H04L 67/025 |
| | | | | 715/740 |

FOREIGN PATENT DOCUMENTS

| | | |
|---|---|---|
| CN | 106576070 A | 4/2017 |
| CN | 109615795 A | 4/2019 |
| CN | 109849529 A | 6/2019 |
| CN | 109871187 A | 6/2019 |
| CN | 109918030 A | 6/2019 |
| WO | WO-2020151573 A1 * | 7/2020 |

\* cited by examiner

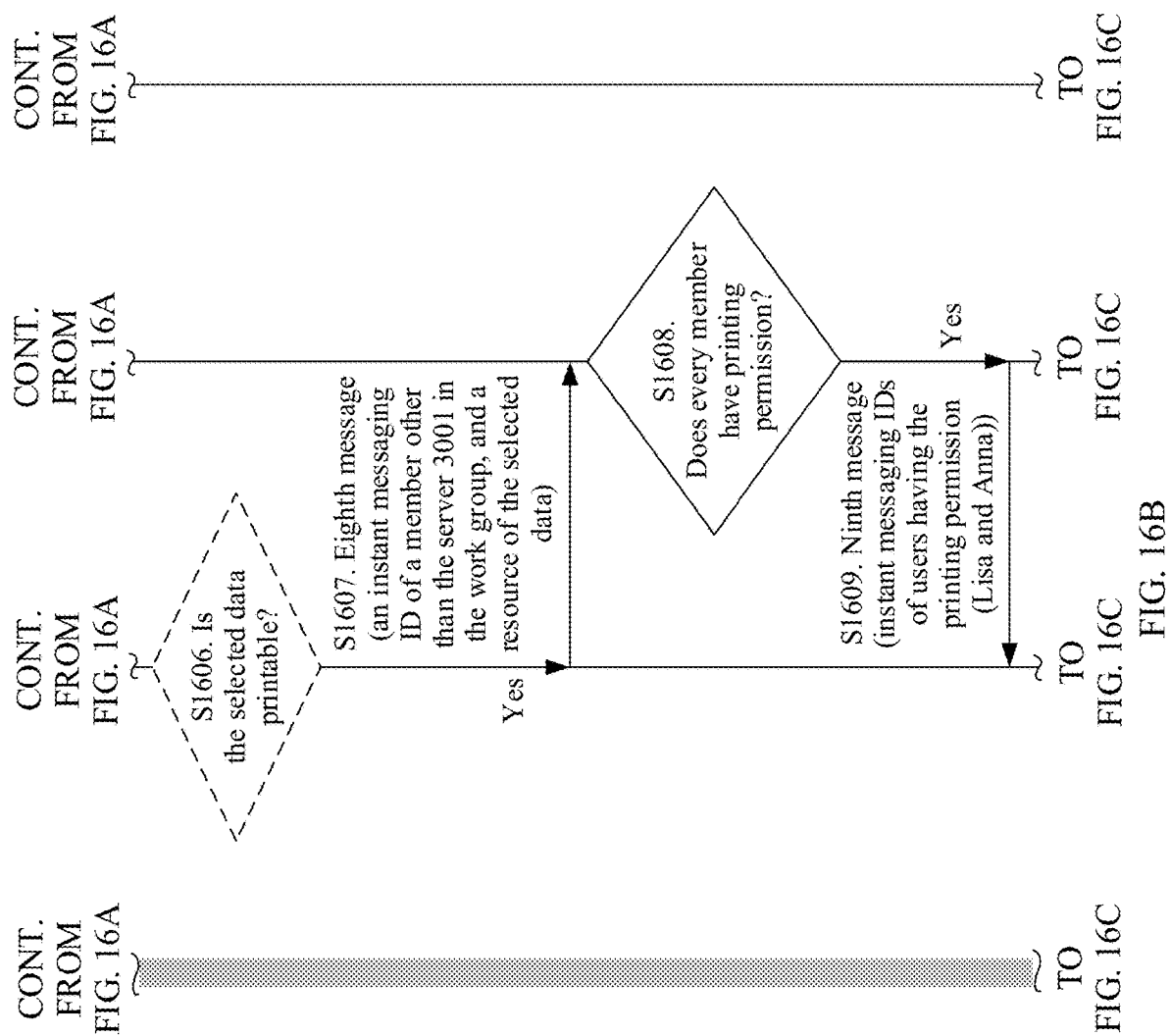

DATA SHARING METHOD, GRAPHICAL USER INTERFACE, RELATED DEVICE, AND SYSTEM

CROSS-REFERENCE TO RELATED APPLICATIONS

This is a continuation of International Patent Application No. PCT/CN2021/112126 filed on Aug. 11, 2021, which claims priority to Chinese Patent Application No. 202010901747.X filed on Aug. 31, 2020. The disclosures of the aforementioned applications are hereby incorporated by reference in their entireties.

TECHNICAL FIELD

This disclosure relates to the field of mobile communication, and in particular, to a data sharing method, a graphical user interface, a related device, and a system.

BACKGROUND

With development of wireless communication technologies, electronic devices such as a smartphone and a tablet can support a user in sharing data such as a picture and a document, thereby improving office efficiency and office experience of the user. For example, the user can print a picture or a document without copying data on a portable electronic device such as a smartphone to a computer. The user can print the picture or the document in the portable electronic device such as a smartphone without using a data cable to connect the portable electronic device such as the smartphone to a printer.

For example, the user can print data such as a picture in a portable electronic device such as a smartphone in the following several manners.

A manner 1: When the mobile phone and the printer are in a same local area network or when a near field connection/BLUETOOTH connection is established, the user may select a picture in the mobile phone for printing. In the manner 1, a printer driver needs to be installed on the mobile phone, and a distance between the mobile phone and the printer cannot be long.

A manner 2: A printer application (APP) corresponding to the printer needs to be installed on the mobile phone, and the printer is bound with the mobile phone in the APP. Then the user opens the APP and selects a picture in the APP to trigger printing. In the manner 2, the APP needs to be installed on the mobile phone, and the user needs to perform a plurality of complex operations. This greatly reduces usage efficiency of the electronic device.

SUMMARY

This disclosure provides a data sharing method, a graphical user interface, a related device, and a system, which make a process of printing data such as a picture, a document, or a web page by using an electronic device, a process of projection by using an electronic device, a process of mirroring by using the electronic device, and the like intuitive, simple, and effective for a user. Consequently, usage efficiency of the electronic device can be improved.

According to a first aspect, this disclosure provides a data sharing method. The method is applied to a communication system including an electronic device, a first server, a second server, and one or more devices. The first server provides an instant messaging service. The second server manages the one or more devices, and the second server stores binding relationships between a first user and the one or more devices. The first user logs in to an instant messaging application in the electronic device by using a first identity (ID). An identity of the second server in the instant messaging application is a server ID.

The method in the first aspect may include that the electronic device displays a first user interface, where the first user interface is used to display a record of communication between the first user and the second server in the instant messaging application, the electronic device displays a second user interface in response to a first operation detected in the first user interface, where the second user interface displays one or more data identifiers, and the one or more data identifiers correspond to one or more pieces of data, the electronic device detects a second operation of sharing selected first data that is in the one or more pieces of data, the electronic device sends a first message to the first server, where the first message carries the first ID, the first data, and the server ID, the first server sends a second message to the second server, where the second message carries the first ID and a first resource, and the first resource is the first data or a download link of the first data, the second server obtains the first data based on the first resource, and sends a processing request to a first device in the one or more devices based on the binding relationships between the first user and the one or more devices, where the processing request carries the first data, and the first device processes the first data in response to the processing request, where the processing includes one or more of the following: printing, projection, and display.

According to a second aspect, this disclosure provides a data sharing method, where the method is applied to a communication system including an electronic device, a first server, a second server, and one or more devices. The first server provides an instant messaging service. The second server manages the one or more devices, and the second server stores binding relationships between a first user and the one or more devices. The first user logs in to an instant messaging application in the electronic device by using a first ID. An identity of the second server in the instant messaging application is a server ID.

The method in the second aspect may include that the electronic device displays a sixth user interface, where the sixth user interface displays one or more data identifiers, where the one or more data identifiers correspond to one or more pieces of data, the electronic device displays a seventh user interface in response to a seventh operation that is detected in the sixth user interface and that is sharing selected first data in the one or more pieces of data, where the seventh user interface displays one or more contact options of the first user in the instant messaging application, the electronic device detects an eighth operation on an option of the second server in the one or more contact options, the electronic device displays a first user interface, where the first user interface is used to display a record of communication between the first user and the second server in the instant messaging application, the electronic device sends a first message to the first server, where the first message carries the first ID, the first data, and the server ID, the first server sends a second message to the second server, where the second message carries the first ID and a first resource, and the first resource is the first data or a download link of the first data, the second server obtains the first data based on the first resource, and sends a processing request to a first device in the one or more devices based on the binding relationships between the first user and the one or more devices, where the processing request carries the first data, and the first device processes the first data, where the processing includes one or more of the following: printing, projection, and display.

Herein, the sixth user interface may be a user interface used to display data. The sixth user interface may be provided by "Gallery", "File Browser", or the like.

By implementing the method in the first aspect or the second aspect, a user may trigger, by sending data such as a picture, a document, a link, or a chat record to a server contact, the first device to process the data. In this way, a process of printing data such as an image, a document, or a web page by using an electronic device, a process of projection by using an electronic device, a process of mirroring by using an electronic device, and the like can be intuitive, simple, and effective for the user, and usage efficiency of the electronic device can be improved.

With reference to the first aspect or the second aspect, in some implementations, the first data may include but is not limited to a picture, a document, a link, a chat record, a video, audio, a web page, a file, and the like.

With reference to the first aspect or the second aspect, in some implementations, if the one or more devices are printers, the first device prints the first data. In this way, a process of printing data by using the electronic device can be intuitive, simple, and effective.

With reference to the first aspect or the second aspect, in some implementations, if the one or more devices are projectors, the first device projects the first data. In this way, a process of projecting data by using the electronic device can be intuitive, simple, and effective.

With reference to the first aspect or the second aspect, in some implementations, if the one or more devices are displays, the first device displays the first data. In this way, a process of displaying data by using the electronic device can be intuitive, simple, and effective.

With reference to the first aspect, in some implementations, the data corresponding to the one or more data identifiers displayed in the second user interface is data that can be processed by the one or more devices. In this way, the first data selected by the user can be data that can be processed by the first device, thereby avoiding a failure in processing the first data selected by the user.

With reference to the first aspect or the second aspect, in some implementations, after that the electronic device sends a first message to the first server, and before that the first server sends a second message to the second server, the method further includes that the first server determines that the first data is data that can be processed by the one or more devices. In this way, a failure in processing the first data selected by the user can be avoided.

With reference to the first aspect or the second aspect, in some implementations, the first message further carries a type of the first data, and the type of the first data is a type of the data that can be processed by the one or more devices. The first server determines, based on the type of the first data, that the first data is data that can be processed by the one or more devices.

With reference to the first aspect or the second aspect, in some implementations, after that the first server sends a second message to the second server, and before that the second server obtains the first data based on the first resource, the method further includes that the second server determines, based on the binding relationships between the first user and the one or more devices, that the first user has usage permission for the one or more devices. In this way, the user that has the usage permission can trigger, by sending data to the second server, the first device to print, project, or display the data, and other users cannot trigger the process, thereby ensuring security of the first device.

With reference to the first aspect or the second aspect, in some implementations, after that the second server determines that the first user has usage permission for the one or more devices, and before that the second server obtains the first data based on the first resource, the method further includes that the second server sends a third message to the first server, where the third message carries the first ID, and the third message indicates that the first user has the usage permission for the one or more devices, the first server sends a fourth message to the electronic device based on the first ID in the third message, where the fourth message indicates that the first user has the usage permission for the one or more devices, the electronic device refreshes the first user interface in response to the fourth message, where a refreshed first user interface displays a first printing control, the electronic device detects a third operation on the first printing control, the electronic device sends a fifth message to the first server, where the fifth message is used for indicating to process the first data, and the first server sends, in response to the fifth message, a sixth message to the second server, where the sixth message is used for indicating to process the first data.

In this way, after the user inputs an operation on the first printing control, the first device may be triggered to process the first data, thereby avoiding a misoperation.

In some implementations, that the electronic device detects a third operation on the first printing control and sends a fifth message to the first server includes the following. If the one or more devices are printers, in response to the third operation, the electronic device displays a user interface used for printing setting, where a confirmation control is displayed in the user interface used for printing setting, and the electronic device sends the fifth message to the first server in response to a user operation on the confirmation control. In this way, after the user inputs an operation on the first printing control, the user may further set a printing parameter. After the printing parameter is set, the first device is triggered to process the first data. As a result, a customized printing requirement of the user can be met.

With reference to the first aspect or the second aspect, in some implementations, the fifth message, the sixth message, and the processing request all carry a printing parameter, where the printing parameter is a parameter set by the first user in the user interface used for printing setting, and the first device prints the first data based on the printing parameter. In this way, the first device can print the first data based on the printing parameter set by the user. As a result, a customized printing requirement of the user can be met.

With reference to the first aspect or the second aspect, in some implementations, if the one or more devices are printers, the first device prints the first data based on a default printing parameter. This manner does not require a user operation, and is simple and convenient for the user.

With reference to the first aspect or the second aspect, in some implementations, the first server sends the second message to the second server corresponding to the server ID carried in the first message.

With reference to the first aspect or the second aspect, in some implementations, the first message and the second message further carry a device ID of the first device, and the second server sends the processing request to the first device in the one or more devices based on the device ID of the first device that is carried in the second message.

In some implementations, the first server sends the second message to the second server based on a stored binding relationship between the second server and the first device and the device ID of the first device carried in the second message.

In some implementations, when the first user is bound with one device, the first device is the device, or the first device is a device that is first bound with the first user in the one or more devices, or the first device is a device that is most recently used in the one or more devices.

With reference to the first aspect or the second aspect, in some implementations, there are a plurality of first printing controls, and the plurality of first printing controls correspond to the one or more devices respectively, and the first device is a device corresponding to the first printing control on which the third operation is performed. In this way, the user can autonomously select the first device configured to print the data.

With reference to the first aspect or the second aspect, in some implementations, the first server may further generate an ID of the first data, and the second message, the third message, the fourth message, the fifth message, and the sixth message all carry the ID of the first data. When the second server interacts with a plurality of electronic devices and provides a printing service, the first data can be sent accurately to a printer based on the ID of the first data, and no disorder occurs.

With reference to the first aspect or the second aspect, in some implementations, after that the first device processes the first data, the method further includes the following. If the first device is a printer, the first device sends a printing status of the first data to the second server, the second server sends the printing status of the first data to the first server, the first server sends the printing status of the first data to the electronic device, and the electronic device refreshes the first user interface, where prompt information is displayed in the refreshed first user interface, and the prompt information is used to indicate the printing status of the first data. In this way, the user can learn of the printing status of the first data in time.

In some implementations, the printing status of the first data may include but is not limited to: a first printing state, which may indicate that a data printing task is in a printing task queue of the printer, and is queuing to be processed by the printer, a second printing state, which may indicate that the printer is printing data, a third printing state, which may indicate that data printing is complete, and a fourth printing state, which may indicate that the printer fails to print data.

According to a third aspect, this disclosure provides a data sharing method, and the method is applied to an electronic device. The method may include that the electronic device displays a first user interface, where the first user interface is used to display a record of communication between a first user and a second server in an instant messaging application, the second server manages one or more devices, and the second server stores binding relationships between the first user and the one or more devices, the electronic device displays a second user interface in response to a first operation detected in the first user interface, where the second user interface displays one or more data identifiers, and the one or more data identifiers correspond to one or more pieces of data, the electronic device detects a second operation of sharing selected first data that is in the one or more pieces of data, and the electronic device triggers a first device in the one or more devices to process the first data, where the processing includes one or more of the following: printing, projection, and display.

For the method provided in the third aspect, refer to the steps performed by the electronic device in the first aspect or any implementation of the first aspect. Details are not described herein again.

According to a fourth aspect, an embodiment of this disclosure provides a data sharing method, where the method is applied to a second server. The second server manages one or more devices, and the second server stores binding relationships between a first user and the one or more devices. The method may include that the second server receives a second message sent by a first server, where the second message carries a first ID and a first resource, and the first resource is the first data or a download link of the first data, and the second server obtains the first data based on the first resource, and sends a processing request to a first device in the one or more devices based on the binding relationships between the first user and the one or more devices, where the processing request carries the first data, the processing request is used to indicate the first device to process the first data, and the processing includes one or more of the following: printing, projection, and display.

For the method provided in the fourth aspect, refer to the steps performed by the second server in the first aspect or any implementation of the first aspect. Details are not described herein again.

According to a fifth aspect, an embodiment of this disclosure provides a data sharing method, where the method is applied to a communication system including a first electronic device, a second electronic device, a first server, a second server, and one or more devices. The first server provides an instant messaging service. The second server manages the one or more devices. A quantity of the one or more devices is one or more than one. The second server stores binding relationships between a first user and the one or more devices. The first user logs in to an instant messaging application in the first electronic device by using a first ID. The second user logs in to an instant messaging application in the second electronic device by using a second ID. An identity of the second server in the instant messaging application is a server ID. The first user, the second user, and the second server join a same group.

The method in the fifth aspect may include that the second electronic device displays a third user interface, where the third user interface is used to display a record of communication between the second user and a member in the group in the instant messaging application, the second electronic device displays a fourth user interface in response to a fourth operation detected in the third user interface, where the fourth user interface displays one or more data identifiers, and the one or more data identifiers correspond to one or more pieces of data, the second electronic device detects a fifth operation of sharing selected second data that is in the one or more pieces of data, the second electronic device sends a seventh message to the first server, where the seventh message carries a group ID and the second data, and the group ID is an identity of the group in the instant messaging application, the first server sends an eighth message to the second server in the group, where the eighth message carries a second resource and instant messaging IDs of the members other than the second server in the group, and the second resource is the second data or a download link of the second data, the instant messaging IDs of the members other than the second server in the group include a first ID and a second ID, the second server obtains the second data based on the second resource, and sends a processing request to a first device in the one or more devices based on the binding relationships between the first user in the group and the one or more devices managed by the server, where the processing request carries the second data, and the first device processes the second data in response to the processing request, where the processing includes one or more of the following: printing, projection, and display.

According to a sixth aspect, an embodiment of this disclosure provides a data sharing method, where the method is applied to a communication system including a first electronic device, a second electronic device, a first server, a second server, and one or more devices. The first server provides an instant messaging service. The second server manages the one or more devices. A quantity of the one or more devices is one or more than one. The second server stores binding relationships between a first user and the one or more devices. The first user logs in to an instant messaging application in the first electronic device by using a first identity ID. The second user logs in to an instant messaging application in the second electronic device by using a second ID. An identity of the second server in the instant messaging application is a server ID. The first user, the second user, and the second server join a same group.

The method in the sixth aspect may include that the second electronic device displays an eighth user interface, where the eighth user interface displays one or more data identifiers, and the one or more data identifiers correspond to one or more pieces of data, the second electronic device displays a ninth user interface in response to a ninth operation that is detected in the eighth user interface and that is sharing selected second data in the one or more pieces of data, where the ninth user interface displays one or more contact options of the second user in the instant messaging application, the second electronic device detects a tenth operation on an option of the group in the one or more contact options, and displays a tenth user interface, where the tenth user interface is used to display a record of communication between the second user and the member in the group in the instant messaging application, the second electronic device sends a seventh message to the first server, where the seventh message carries a group ID and the second data, and the group ID is an identity of the group in the instant messaging application, the first server sends an eighth message to the second server in the group, where the eighth message carries a second resource and instant messaging IDs of the members other than the second server in the group, the second resource is the second data or a download link of the second data, and the instant messaging IDs of the members other than the second server in the group include a first ID and a second ID, the second server obtains the second data based on the second resource, and sends a processing request to a first device in the one or more devices based on the binding relationships between the first user in the group and the one or more devices managed by the server, where the processing request carries the second data, and the first device processes the second data in response to the processing request, where the processing includes one or more of the following: printing, projection, and display.

Herein, the eighth user interface may be a user interface used to display data. The eighth user interface may be provided by "Gallery", "File Browser", or the like.

According to the method in the fifth aspect or the sixth aspect, a user may send data such as a picture, a document, a link, and a chat record to the group that includes the second server and a user who has usage permission for the device managed by the second server, to trigger the first device managed by the second server to process the data. In this manner, the user does not need to add a server contact and bind with the first device, and the first device may be conveniently and quickly triggered, by using a group, to process a file. For the user, a process of printing, projecting, or displaying data by using the electronic device is simple, thereby improving usage efficiency of the electronic device.

With reference to the fifth aspect or the sixth aspect, in some implementations, the second data may include but is not limited to a picture, a document, a link, a chat record, a video, audio, a web page, a file, and the like.

With reference to the fifth aspect or the sixth aspect, in some implementations, if the one or more devices are printers, the first device prints the second data. In this way, a process of printing data by using the electronic device can be intuitive, simple, and effective.

With reference to the fifth aspect or the sixth aspect, in some implementations, if the one or more devices are projectors, the first device projects the second data. In this way, a process of projecting data by using the electronic device can be intuitive, simple, and effective.

With reference to the fifth aspect or the sixth aspect, in some implementations, if the one or more devices are displays, the first device displays the second data. In this way, a process of displaying data by using the electronic device can be intuitive, simple, and effective.

With reference to the fifth aspect or the sixth aspect, in some implementations, after that the second electronic device sends a seventh message to the first server, and before that the first server sends an eighth message to the second server in the group, the method further includes that the first server determines that the second data is data that can be processed by the one or more devices. In this way, a failure in processing the second data selected by the user can be avoided.

With reference to the fifth aspect or the sixth aspect, in some implementations, the seventh message further carries a type of the second data, and the type of the second data is a type of the data that can be processed by the one or more devices. The first server determines, based on the type of the second data, that the second data is data that can be processed by the one or more devices.

With reference to the fifth aspect or the sixth aspect, in some implementations, after that the first server sends an eighth message to the second server in the group, and before that the second server obtains the second data based on the second resource, the method further includes that the second server determines, based on the binding relationships between the first user and the one or more devices, that the first user in the group has usage permission for the one or more devices. In this way, the user that has the usage permission can trigger, by sending data to the second server, the first device to print, project, or display the data, and other users cannot trigger the process, thereby ensuring security of the first device.

With reference to the fifth aspect or the sixth aspect, in some implementations, after that the second server determines that the first user in the group has usage permission for the one or more devices, and before that the second server obtains the second data based on the second resource, the method further includes that the second server sends a ninth message to the first server, where the ninth message carries the first ID, and the ninth message indicates that the first user in the group has the usage permission for the one or more devices, the first server sends a tenth message to the first electronic device based on the first ID in the ninth message, where the tenth message indicates that the first user in the group has the usage permission for the one or more devices, the first electronic device displays a fifth user interface in response to the tenth message, where the fifth user interface is used to display a record of communication between the second user and the member in the group in the instant messaging application, and a second printing control is displayed in the fifth user interface, the first electronic device detects a sixth operation on the second printing control, the first electronic device sends an eleventh message to the first server, where the eleventh message is used for indicating to process the second data, and the first server sends a twelfth message to the second server in response to the eleventh message, where the twelfth message is used for indicating to process the second data.

In this way, a user without the usage permission for the printer may enter a group including a server contact and a contact having the usage permission for the printer, and may send a file to the group. After the contact having the usage permission for the printer in the group grants printing, the printer can be triggered to print the file.

With reference to the fifth aspect or the sixth aspect, in some implementations, that the first electronic device detects a sixth operation on the second printing control, and sends an eleventh message to the first server includes the following. If the one or more devices are printers, in response to the sixth operation, the first electronic device displays a user interface used for printing setting before sending the eleventh message to the first server, where a confirmation control is displayed in the user interface used for printing setting, and the first electronic device sends the eleventh message to the first server in response to a user operation on the confirmation control. In this way, after the user inputs an operation on the second printing control, the user may further set a printing parameter. After the printing parameter is set, the first device is triggered to process the second data. As a result, a customized printing requirement of the user can be met.

With reference to the fifth aspect or the sixth aspect, in some implementations, the eleventh message, the twelfth message, and the processing request all carry a printing parameter, where the printing parameter is a parameter set by the first user in the user interface used for printing setting, and the first device prints the second data based on the printing parameter. In this way, the first device can print the second data based on the printing parameter set by the user. As a result, a customized printing requirement of the user can be met.

With reference to the fifth aspect or the sixth aspect, in some implementations, if the one or more devices are printers, the first device prints the second data based on a default printing parameter. This manner does not require a user operation, and is simple and convenient for the user.

With reference to the fifth aspect or the sixth aspect, in some implementations, the first server finds a second ID of the second server based on the group ID, and sends the eighth message to the second server. The second ID is an identity of the second server in the instant messaging application.

With reference to the fifth aspect or the sixth aspect, in some implementations, when the first user is bound with one device, the first device is the device, or the first device is a device that is first bound with the first user in the one or more devices, or the first device is a device that is most recently used in the one or more devices.

With reference to the fifth aspect or the sixth aspect, in some implementations, there are a plurality of second printing controls, and the plurality of second printing controls correspond to the one or more devices respectively, and the first device is a device corresponding to the second printing control on which the sixth operation is performed. In this way, the user can autonomously select the first device configured to print the data.

In some implementations, the first server may further generate an ID of the second data, and the eighth message, the ninth message, the tenth message, the eleventh message, and the twelfth message all carry the ID of the second data. When the second server interacts with a plurality of groups and provides a printing service, the second data can be sent accurately to a printer based on the ID of the second data, and no disorder occurs.

With reference to the fifth aspect or the sixth aspect, in some implementations, after that the first device processes the second data, the method further includes the following. If the first device is a printer, the first device sends a printing status of the second data to the second server, the second server sends the printing status of the second data to the first server, the first server sends the printing status of the second data to the second electronic device, and the second electronic device refreshes the third user interface, where prompt information is displayed in a refreshed third user interface, and the prompt information is used to indicate the printing status of the second data.

In some implementations, after that the first device processes the second data, the method further includes the following. If the first device is a printer, the first device sends a printing status of the second data to the second server, the first server sends the printing status of the second data to the first electronic device, the first electronic device refreshes the fifth user interface, where a refreshed fifth user interface displays prompt information, and the prompt information is used to indicate the printing status of the second data. In this way, the user can learn of the printing status of the second data in time.

With reference to the fifth aspect or the sixth aspect, in some implementations, the printing status of the second data may include but is not limited to: a first printing state, which may indicate that a data printing task is in a printing task queue of the printer, and is queuing to be processed by the printer, a second printing state, which may indicate that the printer is printing data, a third printing state, which may indicate that data printing is complete, and a fourth printing state, which may indicate that the printer fails to print data.

According to a seventh aspect, this disclosure provides a data sharing method, and the method is applied to a second electronic device. The method may include that the second electronic device displays a third user interface, where the third user interface is used to display a record of communication between a second user and a member in a group in an instant messaging application, the group includes a first user, the second user, and a second server, the second server manages one or more devices, and the second server stores binding relationships between the first user and the one or more devices, the second electronic device displays a fourth user interface in response to a fourth operation detected in the third user interface, where the fourth user interface displays one or more data identifiers, and the one or more data identifiers correspond to one or more pieces of data, the second electronic device detects a fifth operation of sharing selected second data that is in the one or more pieces of data, and the second electronic device triggers the first device in the one or more devices to process the second data, where the processing includes one or more of the following: printing, projection, and display.

For the method provided in the seventh aspect, refer to the steps performed by the second electronic device in the fifth aspect or any implementation of the fifth aspect. Details are not described herein again.

According to an eighth aspect, an embodiment of this disclosure provides a data sharing method, where the method is applied to a second server. The second server manages one or more devices, and the second server stores binding relationships between a first user and the one or more devices. The method may include that the second server receives an eighth message sent by a first server, where the eighth message carries a second resource and an instant messaging ID of a member other than the second server in a group, the group includes the first user, a second user, and the second server, the first server provides an instant messaging service, and the second resource is second data or a download link of the second data, and the second server obtains the second data based on the second resource, and sends a processing request to a first device in the one or more devices based on the binding relationships between the first user in the group and the one or more devices managed by the server, where the processing request carries the second data, the processing request is used to indicate the first device to process the second data, and the processing includes one or more of the following: printing, projection, and display.

For the method provided in the eighth aspect, refer to the steps performed by the second electronic device in the sixth aspect or any implementation of the sixth aspect. Details are not described herein again.

According to a ninth aspect, an embodiment of this disclosure provides a graphical user interface on an electronic device. The electronic device may have a display, a touch sensor, a memory, and one or more processors. The one or more processors are configured to execute one or more computer programs stored in the memory. The graphical user interface may include displaying a first user interface, where the first user interface is used to display a record of communication between a first user and a second server in an instant messaging application, the second server manages one or more devices, and the second server stores binding relationships between the first user and the one or more devices, and displaying a second user interface in response to a first operation detected in the first user interface, where the second user interface displays one or more data identifiers, and the one or more data identifiers correspond to one or more pieces of data, and detecting a second operation of sharing selected first data in the one or more pieces of data, and triggering, by the electronic device, a first device in the one or more devices to process the first data, where the processing includes one or more of the following: printing, projection, and display.

For a specific manner of responding to the second operation included in the graphical user interface in the ninth aspect, refer to the specific manner of responding to the second operation in the second aspect. Details are not described herein again.

With reference to the ninth aspect, the data corresponding to the one or more data identifiers displayed in the second user interface is data that can be processed by the one or more devices.

The graphical user interface in the ninth aspect may further include refreshing the first user interface, where a refreshed first user interface displays a first printing control, detecting a third operation on the first printing control, and in response to the third operation, triggering, by the electronic device, the first device in the one or more devices to process the first data.

The graphical user interface in the ninth aspect may further include the following. In response to the third operation, if the one or more devices are printers, displaying a user interface used for printing setting, where a confirmation control is displayed in the user interface used for printing setting, and triggering, by the electronic device in response to a user operation on the confirmation control, the first device in the one or more devices to process the first data.

The graphical user interface in the ninth aspect may further include the following. If the first device is a printer, refreshing the first user interface, where prompt information is displayed in a refreshed first user interface, and the prompt information is used to indicate a printing status of the first data.

According to a tenth aspect, an embodiment of this disclosure provides a graphical user interface on an electronic device. The electronic device may have a display, a touch sensor, a memory, and one or more processors. The one or more processors are configured to execute one or more computer programs stored in the memory. The graphical user interface may include displaying a third user interface, where the third user interface is used to display a record of communication between a second user and a member in a group in an instant messaging application, the group includes a first user, a second user, and a second server, the second server manages one or more devices, and the second server stores binding relationships between the first user and the one or more devices, displaying a fourth user interface in response to a fourth operation detected in the third user interface, where the fourth user interface displays one or more data identifiers, and the one or more data identifiers correspond to one or more pieces of data, detecting a fifth operation of sharing selected second data that is in the one or more pieces of data, and triggering, by the second electronic device, the first device in the one or more devices to process the second data, where the processing includes one or more of the following: printing, projection, and display.

For a specific manner of responding to the fifth operation included in the graphical user interface in the tenth aspect, refer to the specific manner of responding to the fifth operation in the fifth aspect. Details are not described herein again.

The graphical user interface in the tenth aspect may further include refreshing the third user interface, where prompt information is displayed in a refreshed third user interface, and the prompt information is used to indicate a printing status of the second data.

According to an eleventh aspect, an embodiment of this disclosure provides an electronic device, where the electronic device includes a display, a memory, and one or more processors, where the display, the memory, and the one or more processors are coupled, the memory is configured to store computer program code, the computer program code includes computer instructions, and the one or more processors invoke the computer instructions to enable the electronic device to perform the method according to any one of the third aspect or the implementations of the third aspect.

According to a twelfth aspect, a server is provided, where the server includes a memory and one or more processors, where the memory and the one or more processors are coupled, the memory is configured to store computer program code, the computer program code includes computer instructions, and the one or more processors invoke the computer instructions to enable the server to perform the method according to any one of the fourth aspect or the implementations of the fourth aspect.

According to a thirteenth aspect, a computer program product including instructions is provided. When the computer program product runs on an electronic device, the electronic device is enabled to perform the method according to any one of the third aspect or the implementations of the third aspect.

According to a fourteenth aspect, a computer-readable storage medium is provided, including instructions. When the instructions are run on an electronic device, the electronic device is enabled to perform the method according to any one of the third aspect or the implementations of the third aspect.

According to a fifteenth aspect, a communication system is provided. The communication system includes an electronic device, a first server, a second server, and one or more devices. The first server provides an instant messaging service. The second server is the server according to the twelfth aspect. The electronic device is the electronic device according to the eleventh aspect.

According to a sixteenth aspect, an embodiment of this disclosure provides an electronic device, where the electronic device includes a display, a memory, and one or more processors. The display, the memory, and the one or more processors are coupled. The memory is configured to store computer program code. The computer program code includes computer instructions. The one or more processors invoke the computer instructions to enable the electronic device to perform the method according to any one of the seventh aspect or the implementations of the seventh aspect.

According to a seventeenth aspect, a server is provided, where the server includes a memory and one or more processors, where the memory and the one or more processors are coupled, the memory is configured to store computer program code, the computer program code includes computer instructions, and the one or more processors invoke the computer instructions to enable the server to perform the method according to any one of the eighth aspect or the implementations of the eighth aspect.

According to an eighteenth aspect, a computer program product including instructions is provided. When the computer program product runs on an electronic device, the electronic device is enabled to perform the method according to any one of the seventh aspect or the implementations of the seventh aspect.

According to a nineteenth aspect, a computer-readable storage medium including instructions is provided. When the instructions are run on an electronic device, the electronic device is enabled to perform the method according to any one of the seventh aspect or the implementations of the seventh aspect.

According to a twentieth aspect, a communication system is provided. The communication system includes a first electronic device, a second electronic device, a first server, a second server, and one or more devices. The first server provides an instant messaging service. The second server is the server according to the seventeenth aspect. The second electronic device is the electronic device according to the sixteenth aspect.

By implementing the technical solutions provided in this disclosure, a user may trigger, by sending data such as a picture, a document, a link, or a chat record to a server contact, the first device to process the data. In this way, a process of printing data such as an image, a document, or a web page by using an electronic device, a process of projection by using an electronic device, a process of mirroring by using an electronic device, and the like can be intuitive, simple, and effective for the user, and usage efficiency of the electronic device can be improved.

BRIEF DESCRIPTION OF DRAWINGS

FIG. 16A, FIG. 16B, FIG. 16C, and FIG. 16D are a flowchart of another data sharing method according to an embodiment of this disclosure.

DESCRIPTION OF EMBODIMENTS

Figure 1:
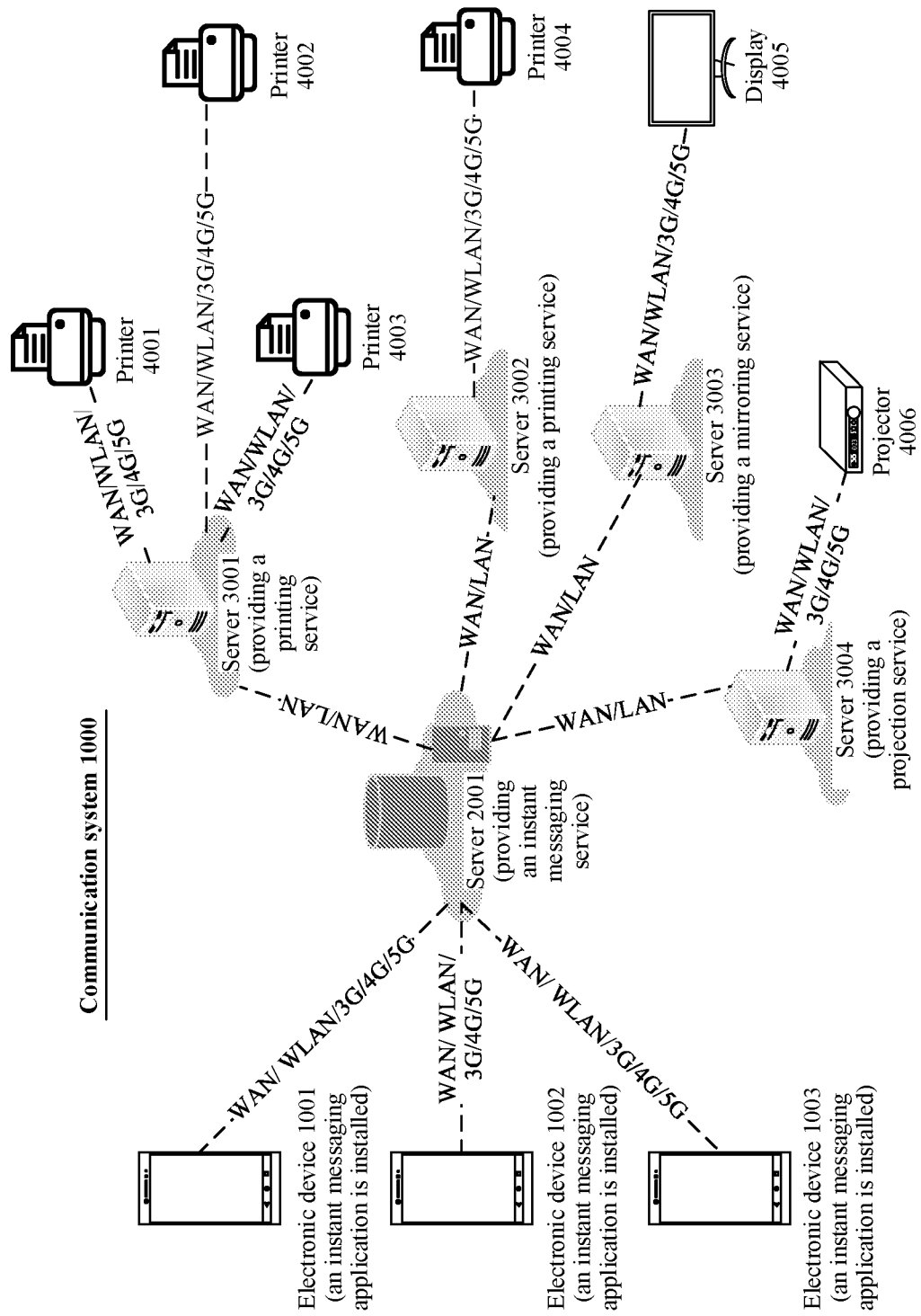
FIG. 1 is a schematic diagram of a structure of a communication system according to an embodiment of this disclosure.

The technical solutions according to embodiments of this disclosure are clearly and completely described in the following with reference to accompanying drawings. In descriptions of embodiments of this disclosure, unless otherwise specified, "I" indicates "or". For example, A/B may indicate A or B. The term "and/or" in this specification merely describes an association relationship for describing associated objects, and indicates that three relationships may exist. For example, A and/or B may indicate the following three cases: only A exists, both A and B exist, and only B exists. In addition, in the descriptions of embodiments of this disclosure, "a plurality of" means two or more.

The following terms "first" and "second" are merely used for description, and shall not be understood as an indication or implication of relative importance or implicit indication of a quantity of indicated technical features. Therefore, a feature limited by "first" or "second" may explicitly or implicitly include one or more features. In the descriptions of embodiments of this disclosure, unless otherwise specified, "a plurality of" means two or more.

A term "user interface (UI)" in the following embodiments of this disclosure is a medium interface used for interaction and information exchange between an application or an operating system and a user, and implements conversion between an internal form of information and a form that can be accepted by a user. The user interface is source code written in a specific computer language such as Java or an Extensible Markup Language (XML). Interface source code is parsed and rendered on an electronic device, and is finally presented as content that can be identified by the user. The user interface is usually in a form of a graphical user interface (GUI), and is a user interface that is related to a computer operation and that is in a form of a graphic. The user interface may be a visual interface element such as a text, an icon, a button, a menu, a tab page, a text box, a dialog box, a status bar, a navigation bar, or a widget that is displayed on a display of an electronic device.

The following embodiments of this disclosure provide a data sharing method, a graphical user interface, a related device, and a system. According to the data sharing method, in response to a user operation, an electronic device may add a server providing a printing/mirroring/projection service as a contact in an instant messaging application, and bind a specific device such as a printer, a projector, or a display. Then the electronic device can send data such as a picture, a document, a link, a chat record, a video, audio, and a text to the contact, share the data to a bound device such as a printer, a projector, or a display, and trigger the device to perform an operation such as printing, projection, or mirroring. In embodiments of this disclosure, binding a specific device such as a printer, a projector, or a display means obtaining permission for the device.

If a user wants to print data, the user may add a server providing a printing service as a contact, bind with a printer, and then send printable data such as a picture, a document, a link, and a chat record to the server contact, to trigger the bound printer to perform printing.

When projection is required, the user may add a server providing a projection service as a contact, bind a projector, and then send data for projection such as a picture and a document to the server contact, to trigger the bound projector to perform projection.

When mirroring is required, the user may add a server providing a mirroring service as a contact, bind a display, and then send data for mirroring such as a video and audio to the server contact, to trigger the bound display to perform mirroring.

In the following embodiments of this disclosure, the data shared by an electronic device with a server contact providing a printing/mirroring/projection service may include, but is not limited to, a picture, a document, a link, a chat record, a video, audio, a web page, a file, and the like. The data may be collected by the electronic device, for example, a picture captured by using a camera, a document generated when a text entered by a user is collected by using a display, or the data may be a video or the like obtained by the electronic device from another device such as a server through a network.

According to the data sharing method provided in embodiments of this disclosure, an electronic device adds a server providing a printing/mirroring/projection service as a contact in an instant messaging application, so that a user can share data by chatting with the contact. In this way, a process of printing data such as a picture, a document, or a web page by using the electronic device, a process of projection by using the electronic device, a process of mirroring by using the electronic device, and the like can be intuitive, simple, and effective for the user, and usage efficiency of the electronic device can be improved. In addition, the user can manage printing/projection/mirroring permission by managing the contact, which is simple and convenient. In addition, according to the method, remote printing/cloud printing, remote mirroring/cloud mirroring, or remote projection/cloud projection can be implemented while an electronic device and a device such as a printer, a display, or a projector do not need to join one same local area network or locate in one same area.

First, a communication system 1000 provided in an embodiment of this disclosure is described.

FIG. 1 shows an example of an architecture of a communication system 1000.

As shown in FIG. 1, the communication system 1000 may include one or more electronic devices, for example, electronic devices 1001 to 1003, a server 2001 providing an instant messaging service, one or more servers providing a printing/projection/mirroring service, such as, servers 3001 to 3002 providing the printing service, a server 3003 providing a mirroring service, and a server 3004 providing a projection service, one or more printers such as printers 4001 to 4004, one or more displays such as a display 4005, and one or more projectors such as a projector 4006.

The electronic device may be a portable terminal device carrying IOS, ANDROID, MICROSOFT, or another operating system, for example, a mobile phone, a tablet, or a wearable device, or may be a non-portable terminal device such as a laptop having a touch-sensitive surface or a touch panel, or a desktop computer having a touch-sensitive surface or a touch panel.

A same instant messaging application is installed in all electronic devices such as the electronic devices 1001 to 1003. For example, the instant messaging application may be "MeeTime" provided by HUAWEI. The user may log in to the instant messaging application in the electronic device by using a user identity. For example, the identity may be an account (for example, a name, a HUAWEI identity (ID), or a phone number) and a password, a face image, a voiceprint, or a fingerprint. After login, the user and the electronic device are associated with each other. The identity used to log in to the instant messaging application can be referred to as user's instant messaging ID.

For example, associated users of the electronic devices 1001 to 1003 may be Lisa, Anna, and Kate respectively. Lisa, Anna, and Kate may separately log in to one same instant messaging application, for example, "MeeTime", on the electronic devices 1001 to 1003. Each of Lisa, Anna, and Kate may be a contact of every other user. Instant messaging IDs of Lisa, Anna, and Kate can be "Lisa", "Anna", and "Kate" respectively.

Each electronic device may access the server 2001. The electronic device can communicate with the server 2001 by using a third generation (3G), fourth generation (4G), or fifth generation (5G) cellular mobile communication technology, a wide area network (WAN) technology, a local area network (LAN) technology, a wireless LAN (WLAN) technology, or the like.

The server 2001 is configured to provide various services for the instant messaging application, for example, a communication service, a communication record backup service, a computing service, and a connection service. The server 2001 may be a cloud server.

After logging in to the instant messaging application on the electronic device, the user may communicate with a contact of the user in the instant messaging application by using the server 2001, for example, make a text chat, a voice call, or a video call.

In this embodiment of this disclosure, after logging in to the instant messaging application the user may add a server providing a printing/mirroring/projection service as a contact in the instant messaging application, and bind a specific device such as a printer, a projector, or a display. Then the user can send data such as a picture, a document, a link, a chat record, audio, and a video to the contact. In response to a user operation, the electronic device transmits the data selected by the user to the server 2001, and the server 2001 shares the data to the server that provides the printing/projection/mirroring service. The server providing the printing/projection/mirroring service shares the data to the bound device such as a printer, projector, or display. For specific implementation of adding a server contact and binding a device by the user, refer to subsequent descriptions. Details are not described herein.

An instant messaging ID of a registered user and a device ID of a device associated with the user may be stored and associated with each other by the server 2001. That is, the server 2001 stores a mapping relationship between the user and a device associated with the user. The associated device of the user refers to an electronic device used when the user logs in to an instant messaging application. An associated device of one user can change. A device ID of the electronic device may include an ID indicating a unique device, such as a media access control (MAC) address, an Internet Protocol (IP) address, and the like. For example, device IDs of the electronic devices 1001 to 1003 may be MAC 1001, MAC 1002, and MAC 1003 respectively.

An instant messaging ID of a registered user and an instant messaging ID of a contact of the user may be stored and associated with each other by the server 2001. The contact of the user may be one single contact or a group including a plurality of contacts. The one single contact may include a server that is added by the user and that provides a printing/projection/mirroring service.

Refer to Table 1. Table 1 shows an example of an instant messaging ID of a registered user, a device ID of an associated device, and an instant messaging ID of a contact that are stored and associated with each other by the server 2001.

TABLE 1

| User | User's instant messaging ID | Device ID of an associated device | Contact list |
| --- | --- | --- | --- |
| Lisa | Lisa | MAC 1001 | HUAWEI Cloud Printing<br>Anna<br>Kate<br>William<br>Work Group (Lisa, Anna, Kate)<br>HUAWEI Cloud Projection<br>HUAWEI Cloud Mirroring |
| Anna | Anna | MAC 1002 | HUAWEI Cloud Printing<br>Lisa<br>Kate<br>Work Group (Lisa, Anna, Kate)<br>HUAWEI Cloud Projection<br>HUAWEI Cloud Mirroring |
| Kate | Kate | MAC 1003 | Lisa<br>Anna<br>Work Group (Lisa, Anna, Kate)<br>HUAWEI Cloud Projection<br>HUAWEI Cloud Mirroring |

In Table 1, the contact list includes the instant messaging ID of a contact of the user in the instant messaging application. For example, contacts of user Lisa in the instant messaging application may include a server 3001, user Anna, user Kate, user William, a work group, a server 3002, and a server 3003. Instant messaging IDs of these contacts may be respectively: HUAWEI Cloud Printing, Anna, Kate, William, Work Group (Lisa, Anna, Kate), HUAWEI Cloud Projection, and HUAWEI Cloud Mirroring.

In addition, the server 2001 may store an instant messaging ID corresponding to each server providing a printing/projection/mirroring service. The instant messaging ID of the server is different from the instant messaging ID of the registered user, and is not an identity for the user to log in to the instant messaging application. The instant messaging ID of the server is only a unique identity of the server applicable in the instant messaging application. The instant messaging ID of the server may include a brand name, a vendor name, a provided service, and the like.

In addition, the server 2001 may store a device ID corresponding to each server providing a printing/projection/mirroring service. For example, the device ID of the server may be a MAC address or an IP address. In this way, subsequently, when receiving data shared by the user with a server contact, the server 2001 can send the data to a server corresponding to the server contact.

Further, the server 2001 may store a binding relationship between each server providing a printing/projection/mirroring service and a device managed by the server providing the service.

Refer to Table 2. Table 2 shows an example of an instant messaging ID and a device ID that are of each server providing a printing/projection/mirroring service and that are stored in the server 2001, and an ID of a device managed by each server. For example, device IDs of the servers 3001 to 3004 may be IP 3001 to IP 3004 respectively. For example, IDs of the devices 4001 to 4006 may be IP 4001 to IP 4006 respectively.

TABLE 2

| Server | Instant messaging ID of the server | Device ID of a server | Managed device Device | Device ID |
|---|---|---|---|---|
| Server 3001 | HUAWEI Cloud Printing | IP 3001 | Printer 4001 to 4003 | IP 4001 to IP 4003 |
| Server 3002 | White Cloud Printing | IP 3002 | Printer 4004 | IP 4004 |
| Server 3003 | HUAWEI Cloud Mirroring | IP 3003 | Display 4005 | IP 4005 |
| Server 3004 | HUAWEI Cloud Mirroring | IP 3004 | Projector 4006 | IP 4006 |

The server 2001 may communicate, by using a WAN technology, a LAN technology, or the like, with a server that provides a printing/projection/mirroring service.

There may be one or more servers that provide the printing service. For example, the server 3001 and the server 3002 may provide the printing service. For example, a printer manufacturer or printer vendor may maintain a server that provides the printing service, and the server is configured to manage all printers of the printer manufacturer or printer vendor. For example, the server 3001 may be configured to manage a printer produced by HUAWEI, and the server 3002 may be configured to manage a printer produced by another manufacturer. In this way, for the user, all printers of one printer manufacturer or one printer vendor share one server contact in an instant messaging application. In another case, a same printer manufacturer or printer vendor may also maintain a plurality of servers providing the printing service to separately manage different printers, for example, printers in different areas. Because one server provides the printing service manages a plurality of printers, the server 2001 providing an instant messaging service only needs to manage server contacts added by users, and does not separately manage printers. This is simple and convenient.

The server providing the printing service, for example, the server 3001 or the server 3002, is configured to manage user permission of subordinate printers. Further, a device ID of each printer subordinate to the server providing the printing service and an instant messaging ID of a user having the usage permission may be stored and associated with each other by the server. For example, the device ID of the printer may be a MAC address, an IP address, or an email address. That is, the server providing the printing service stores a binding relationship between each printer and a user.

In some embodiments, the usage permission for the printer may include normal permission and management permission. A user with the normal permission (that is, a normal user) can use the printer for printing. A user with the management permission (that is, an administrator) can use the printer for printing, and manage the usage permission of the normal user. For example, the administrator can revoke the usage permission of the normal user, grant the usage permission to another user, and the like. For how the administrator manages the normal user, refer to detailed descriptions in subsequent embodiments. The details are not described herein. One printer may correspond to a plurality of administrators and normal users. This is not limited in embodiments of this disclosure.

Refer to Table 3. Table 3 shows an example of a device ID of each printer subordinate to the server 3001 and an instant messaging ID of a user having the usage permission, which are stored in the server 3001. For example, device IDs of the printers 4001 to 4003 may be IP 4001 to IP 4003 respectively.

TABLE 3

| | Device ID | Usage permission | |
|---|---|---|---|
| Printer | of the printer | Instant messaging ID of an administrator | Instant messaging ID of a normal user |
| Printer 4001 | IP 4001 | Lisa | Anna |
| Printer 4002 | IP 4002 | Anna | Lisa, Kate |
| Printer 4003 | IP 4003 | Kate | None |

As shown in Table 3, the printer 4001 is bound with users Lisa and Anna. Lisa has the management permission, and Anna has the normal permission. The printer 4002 is bound with users Lisa, Anna, and Kate. Anna has the management permission, and Lisa and Kate have the normal permission. The rest can be deduced by analogy.

After receiving the printable data sent by the electronic device through the server 2001, the server providing the printing service may determine whether an associated user of the electronic device has the usage permission for the printer subordinate to the server, and if yes, send the data to the corresponding printer for printing.

Communication between the server providing the printing service and the printer managed by the server, for example, communication between the server 3001 and the printers 4001 to 4003, and communication between the server 3002 and the printer 4004, may be performed by using a 3G, 4G, or 5G cellular mobile communication technology such as a WAN technology, a LAN technology, or a WLAN technology.

The printer is configured to perform printing when triggered by the server providing the printing service.

In some embodiments, the printer may further store an instant messaging ID of a user who has usage permission for the printer.

Refer to Table 4. Table 4 shows an example of an instant messaging ID that is of a user having the usage permission for the printer 4001 and that is stored in the printer 4001.

TABLE 4

| | Device ID | Usage permission | |
|---|---|---|---|
| Printer | of the printer | Instant messaging ID of an administrator | Instant messaging ID of a normal user |
| Printer 4001 | IP 4001 | Lisa | Anna |

In addition to printing, the printer may be used for faxing, copying, and the like.

The server 3003 providing the mirroring service is configured to manage mirroring permission for a mirroring device (for example, a display) subordinate to the server 3003, and a detailed management process of the server 3003 is similar to the management process of the server providing the printing service. For details, refer to related descriptions. The display 4005 is configured to perform mirroring when triggered by the server 3003.

The server 3004 providing the projection service is configured to manage projection permission for a projection device (for example, a projector) subordinate to the server 3004, and a detailed management process of the server 3004 is similar to the management process of the server providing the printing service. For details, refer to related descriptions. The projector 4006 is configured to perform projection when triggered by the server 3004.

It may be understood that the structure shown in this embodiment does not constitute a specific limitation on the communication system 1000. In some other embodiments of this disclosure, the communication system 1000 may include more or fewer devices than those shown in the figure. For example, the communication system 1000 may further include a sound box, a tablet, a personal computer, and the like. In some other embodiments, the communication system 1000 may further include only the electronic device 1001, the server 2001, the server 3001, and the printer 4001, and does not include other devices in the figure.

Figure 2A:
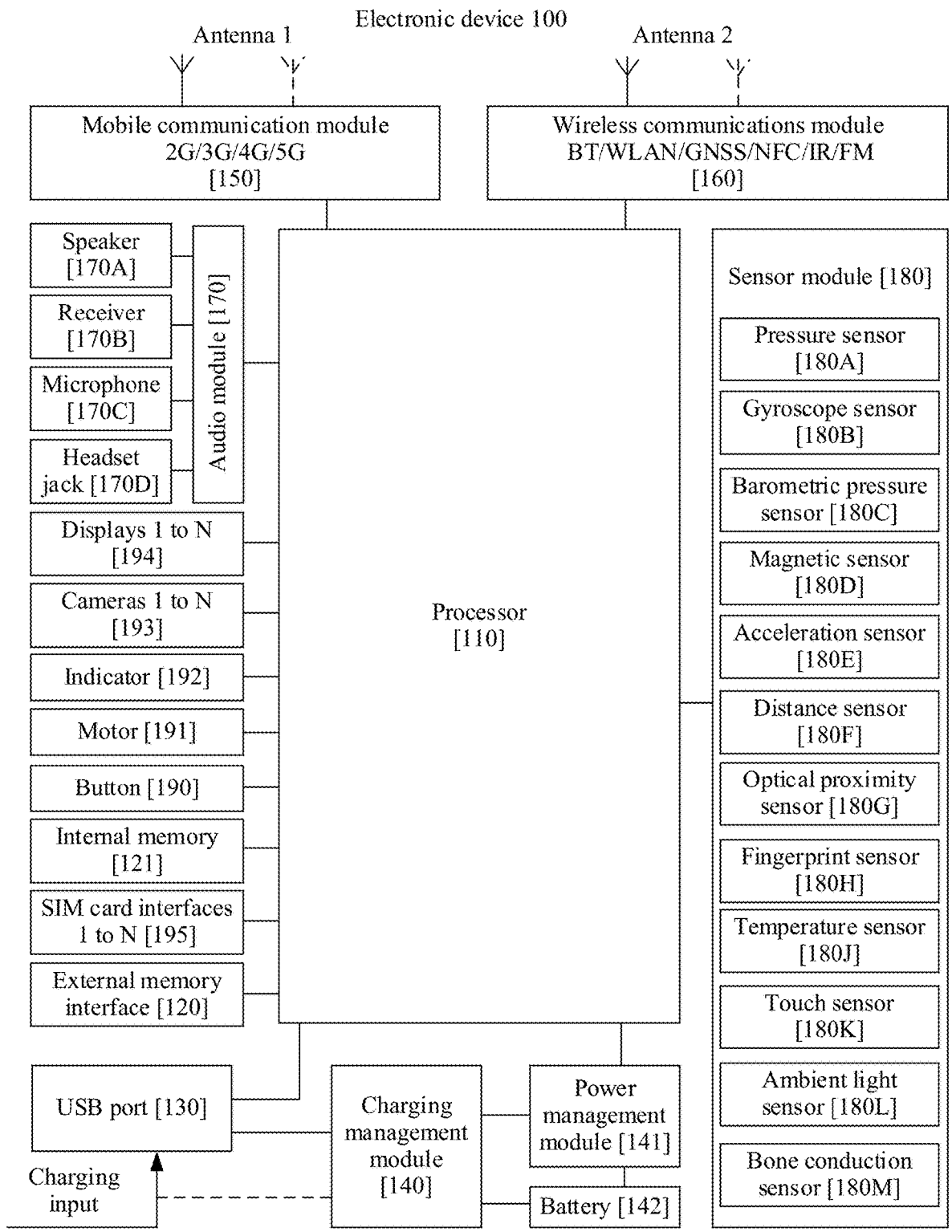
FIG. 2A is a schematic diagram of a hardware structure of an electronic device according to an embodiment of this disclosure.

FIG. 2A is a schematic diagram of a structure of an electronic device 100.

The electronic device 100 may be any electronic device in the communication system 1000 shown in FIG. 1, for example, the electronic device 1001, the electronic device 1002, or the electronic device 1003.

As shown in FIG. 2A, the electronic device 100 may include a processor 110, an external memory interface 120, an internal memory 121, a Universal Serial Bus (USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this disclosure constitutes no specific limitation on the electronic device 100. In some other embodiments of this disclosure, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store an instruction or data that has been used or that is cyclically used by the processor 110. If the processor 110 needs to use the instruction or the data again, the processor may directly invoke the instruction or the data from the memory. This avoids repeated access and reduces waiting time of the processor 110. Therefore, system efficiency is improved.

A wireless communication function of the electronic device 100 may be implemented through the antenna 1, the antenna 2, the mobile communication module 150, the wireless communication module 160, the modem processor, the baseband processor, and the like.

In this embodiment of this disclosure, the electronic device 100 may communicate, through wireless communication, with the server 2001 providing the instant messaging service. For example, the electronic device 100 may send, to the server 2001 through wireless communication, data that is shared by the user in the instant messaging application with a server contact.

The antenna 1 and the antenna 2 are configured to transmit and receive an electromagnetic wave signal. Each antenna in the electronic device 100 may be configured to cover one or more communication bands. Different antennas may be reused to improve antenna utilization. For example, the antenna 1 may be reused as a diversity antenna of a wireless local area network. In some other embodiments, the antenna may be used in combination with a tuning switch.

The mobile communication module 150 may provide a solution that is for wireless communication including second generation (2G), 3G, 4G, 5G, or the like and that is applied to the electronic device 100. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 and at least some modules of the processor 110 may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and the modem processor and the mobile communication module 150 or another functional module may be disposed in a same device.

The wireless communication module 160 may provide a wireless communication solution that is applied to the electronic device 100 and that includes a WLAN (for example, a WI-FI network), BLUETOOTH (BT), a global navigation satellite system (GNSS), frequency modulation (FM), a near-field communication (NFC) technology, an infrared (IR) technology, or the like. The wireless communication module 160 may be one or more components that integrate at least one communication processor module. The wireless communication module 160 receives an electromagnetic wave through the antenna 2, performs processing such as frequency modulation and filtering on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 and the mobile communication module 150 are coupled, and the antenna 2 and the wireless communication module 160 are coupled, so that the electronic device 100 can communicate with another device, such as the server 2001, through a wireless network by using a wireless communication technology. The wireless communication technology may include a Global System for Mobile Communications (GSM), a General Packet Radio Service (GPRS), code-division multiple access (CDMA), wideband CDMA (WCDMA), time-division CDMA (TD-CDMA), Long-Term Evolution (LTE), BT, a GNSS, a WLAN, NFC, FM, an IR technology, and/or the like. The GNSS may include a Global Positioning System (GPS), a global navigation satellite system (GLONASS), a BEIDOU navigation satellite system (BDS), a quasi-zenith satellite system (QZSS), and/or satellite based augmentation systems (SBAS).

The electronic device 100 may implement a display function through the GPU, the display 194, the application processor, and the like. The GPU is a microprocessor for image processing, and is connected to the display 194 and the application processor. The GPU is used for mathematical and geometric computation, and image rendering. The processor 110 may include one or more GPUs, which execute program instructions to generate or change display information.

The display 194 is configured to display an image, a video, and the like. The display 194 includes a display panel. The display panel may be a liquid-crystal display (LCD), an organic light-emitting diode (LED) (OLED), an active-matrix OLED (AMOLED), a flexible LED (FLED), a mini-LED, a micro-LED, a micro-OLED, a quantum dot LED (QLED), or the like. In some embodiments, the electronic device 100 may include one or N displays 194, where N is a positive integer greater than 1.

In this embodiment of this disclosure, the display 194 may be configured to display a user interface that is implemented on the electronic device and that is provided in a subsequent embodiment. For specific implementation of the user interface, refer to the following descriptions. Details are not described herein.

The electronic device 100 may implement a photographing function by using the ISP, the camera 193, the video codec, the GPU, the display 194, the application processor, and the like.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a sound playing function or an image playing function), and the like. The data storage area may store data (such as audio data and contacts) created during use of the electronic device 100, and the like. In addition, the internal memory 121 may include a high-speed random-access memory (RAM), and may further include a nonvolatile memory, for example, at least one magnetic disk storage device, a flash storage device, or a Universal Flash Storage (UFS).

The pressure sensor 180A is configured to sense a pressure signal, and can convert the pressure signal into an electrical signal. In some embodiments, the pressure sensor 180A may be disposed on the display 194. There is a plurality of types of pressure sensors 180A, such as a resistive pressure sensor, an inductive pressure sensor, and a capacitive pressure sensor. The capacitive pressure sensor may include at least two parallel plates including conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, touch operations that are performed at a same touch location but have different touch intensity may correspond to different operation instructions. For example, when a touch operation whose touch operation intensity is less than a first pressure threshold is performed on a Short Message/Messaging Service (SMS) message application icon, an instruction for viewing an SMS message is performed. When a touch operation whose touch operation intensity is greater than or equal to the first pressure threshold is performed on the SMS message application icon, an instruction for creating an SMS message is performed.

The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of a touch event. A visual output related to the touch operation may be provided through the display 194. In some other embodiments, the touch sensor 180K may also be disposed on a surface of the electronic device 100 at a location different from that of the display 194.

A software system of the electronic device 100 may use a layered architecture, an event-driven architecture, a micro-kernel architecture, a micro service architecture, or a cloud architecture. In embodiments of this disclosure, an ANDROID system with a layered architecture is used as an example to describe a software structure of the electronic device 100.

Figure 2B:
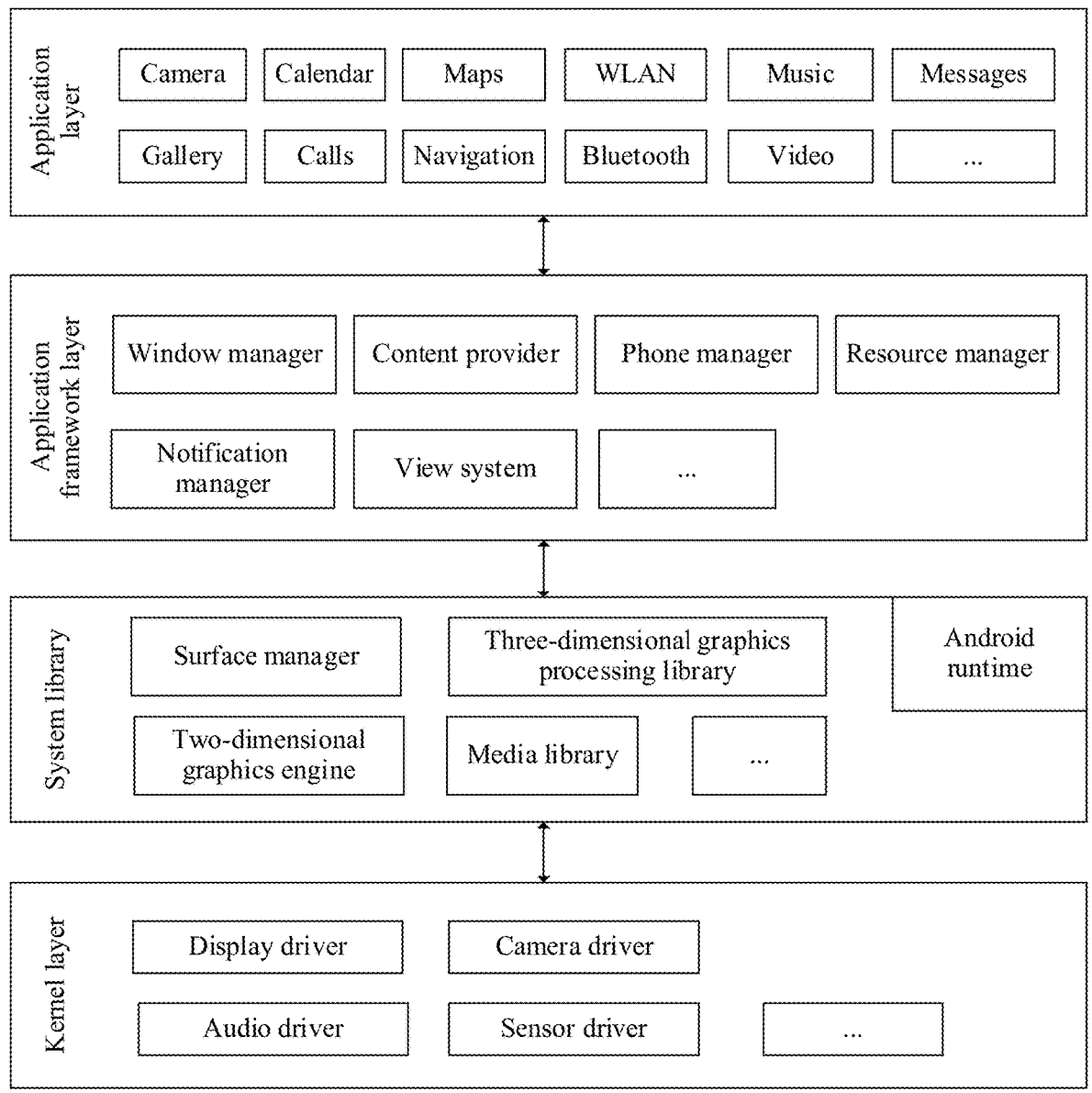
FIG. 2B is a schematic diagram of a software structure of an electronic device according to an embodiment of this disclosure.

FIG. 2B is a block diagram of a software structure of an electronic device 100 according to an embodiment of this disclosure.

Software is divided into several layers by using the layered architecture, and the layers implements functions respectively. The layers communicate with each other through a software interface. In some embodiments, the ANDROID system is divided into four layers: an application layer, an application framework layer, an ANDROID runtime and system library, and a kernel layer from top to bottom.

The application layer may include various application packages.

As shown in FIG. 2B, the application packages may include applications such as Instant Messaging Application (for example, MeeTime), Camera, Gallery, Calendar, Phone, Map, Navigation, WLAN, BLUETOOTH, Music, Videos, and Messages.

The application framework layer provides an application programming interface (API) and a programming framework for an application at the application layer. The application framework layer includes some predefined functions.

As shown in FIG. 2B, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to store and obtain data, and make the data accessible to an application. The data may include a video, an image, audio, calls that are made and answered, a browsing history and bookmarks, contacts, and the like.

The view system includes visual controls such as a control for displaying a text and a control for displaying an image. The view system may be configured to construct an application. A display interface may include one or more views. For example, a display interface including an SMS message notification icon may include a view displaying a text and a view displaying an image.

The phone manager is configured to provide a communication function of the electronic device 100, for example, management of a call status (including answering, declining, or the like).

The resource manager provides various resources such as a localized character string, an icon, an image, a layout file, and a video file for an application.

The notification manager enables an application to display notification information in a status bar, and may be used to convey a message of a notification type. The message may automatically disappear after a short stay without user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on a screen in a form of a dialog window. For example, text information is displayed in the status bar, an alert sound is played, the electronic device vibrates, or an indicator light blinks.

The ANDROID runtime includes a kernel library and a virtual machine. The ANDROID runtime is responsible for scheduling and management of the ANDROID system.

The kernel library includes two parts: a function that needs to be called in Java language and a kernel library of ANDROID.

The application layer and the application framework layer run in the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional (3D) graphics processing library (for example, OpenGL Embedded System (ES)), and a second-dimensional (2D) graphics engine (for example, SGL).

The surface manager is configured to manage a display subsystem and provide fusion of 2D and 3D layers for a plurality of applications.

The media library supports playing and recording in a plurality of commonly used audio and video formats, and static image files. The media library may support a plurality of audio and video coding formats, for example, Moving Picture Experts Group (MPEG)4, H.264, MPEG-1 Audio Layer III or MPEG-2 Audio Layer III (MP3), Advanced Audio Coding (AAC), Adaptive Multi-Rate (AMR), Joint Photographic Experts Group (JPEG), and Portable Network Graphics (PNG).

The 3D graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The software system shown in FIG. 2B relates to presentation of various applications (such as an instant messaging application, a gallery application, and a file browser), and provides an instant messaging service in this embodiment of this disclosure. The application framework layer provides a cellular mobile communication service, a WLAN service, a LAN service, and the like. The kernel layer and a bottom layer provide a cellular mobile communication capability, a WLAN capability, a LAN capability, a basic communication protocol, and the like.

Figure 2C:
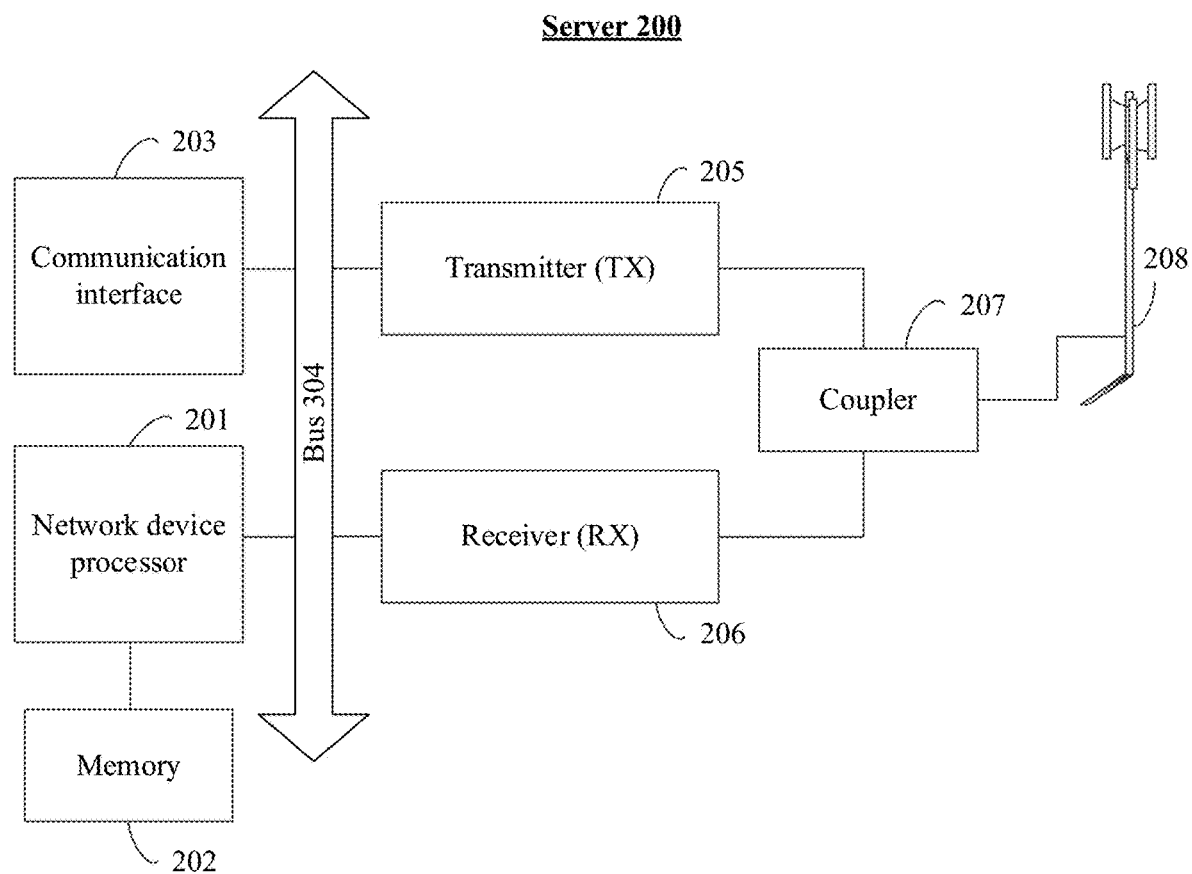
FIG. 2C is a schematic diagram of a structure of a server providing an instant messaging service according to an embodiment of this disclosure.

FIG. 2C shows a structure of a server 200 providing an instant messaging service according to an embodiment of this disclosure.

The server 200 may be the server 2001 in the communication system 1000 shown in FIG. 1.

As shown in FIG. 2C, the server 200 may include one or more processors 201, a memory 202, a communication interface 203, a transmitter 205, a receiver 206, a coupler 207, and an antenna 208. These components may be connected through a bus 204 or in another manner. FIG. 2C shows an example in which the components are connected through the bus.

The communication interface 203 may be used by the server 200 to communicate with other communication devices, for example, the electronic devices 1001 to 1003, and the servers 3001 to 3004 providing printing/mirroring/projection services. Further, the communication interface 203 may be a 3G communication interface, an LTE (4G) communication interface, a 5G communication interface, a WLAN communication interface, a WAN communication interface, or the like. In addition to the wireless communication interface, the network device 300 may be further configured with a wired communication interface 203 to support wired communication. For example, a backhaul link between the server 200 and another server may be a wired communication connection.

In some embodiments of this disclosure, the transmitter 205 and the receiver 206 may be considered as a wireless modem. The transmitter 205 may be configured to perform transmission processing on a signal output by the processor 201. The receiver 206 is configured to receive a signal. In the server 200, there may be one or more transmitters 205 and one or more receivers 206. The antenna 208 may be configured to convert electromagnetic energy in a transmission line into an electromagnetic wave in free space, or convert an electromagnetic wave in free space into electromagnetic energy in a transmission line. The coupler 207 may be configured to split a mobile communication signal into a plurality of signals, and distribute the plurality of signals to the plurality of receivers 206. It may be understood that the antenna 208 of the network device may be implemented as a large-scale antenna array.

The memory 202 is coupled to the processor 201, and is configured to store various software programs and/or a plurality of groups of instructions. Further, the memory 202 may include a high-speed RAM, or a non-volatile memory, for example, one or more disk storage devices, a flash memory device, or another non-volatile solid-state storage device.

The memory 202 may store an operating system (or system), for example, an embedded operating system such as μCOS, VxWorks, or RTLinux. The memory 202 may further store a network communication program. The network communication program may be used for communication with one or more electronic devices and one or more servers providing a printing/mirroring/projection service.

In this embodiment of this disclosure, an instant messaging ID of a registered user, a device ID of an associated device, and an instant messaging ID of a contact may be stored and associated with each other by the memory 202, and the memory 202 may further store a device ID of each server providing the printing/mirroring/projection service. For content stored in the memory 202, refer to the foregoing Table 1, Table 2, and related descriptions.

In this embodiment of this disclosure, the processor 201 may be configured to read and execute computer-readable instructions. Further, the processor 201 may be configured to invoke a program stored in the memory 202, for example, a program for implementing, by the server 200, the data sharing method provided in one or more embodiments of this disclosure, and execute instructions included in the program.

It should be noted that the server 200 shown in FIG. 2C is merely an implementation according to this embodiment of this disclosure. In actual application, the server 200 may include more or fewer components. This is not limited herein.

Figure 2D:
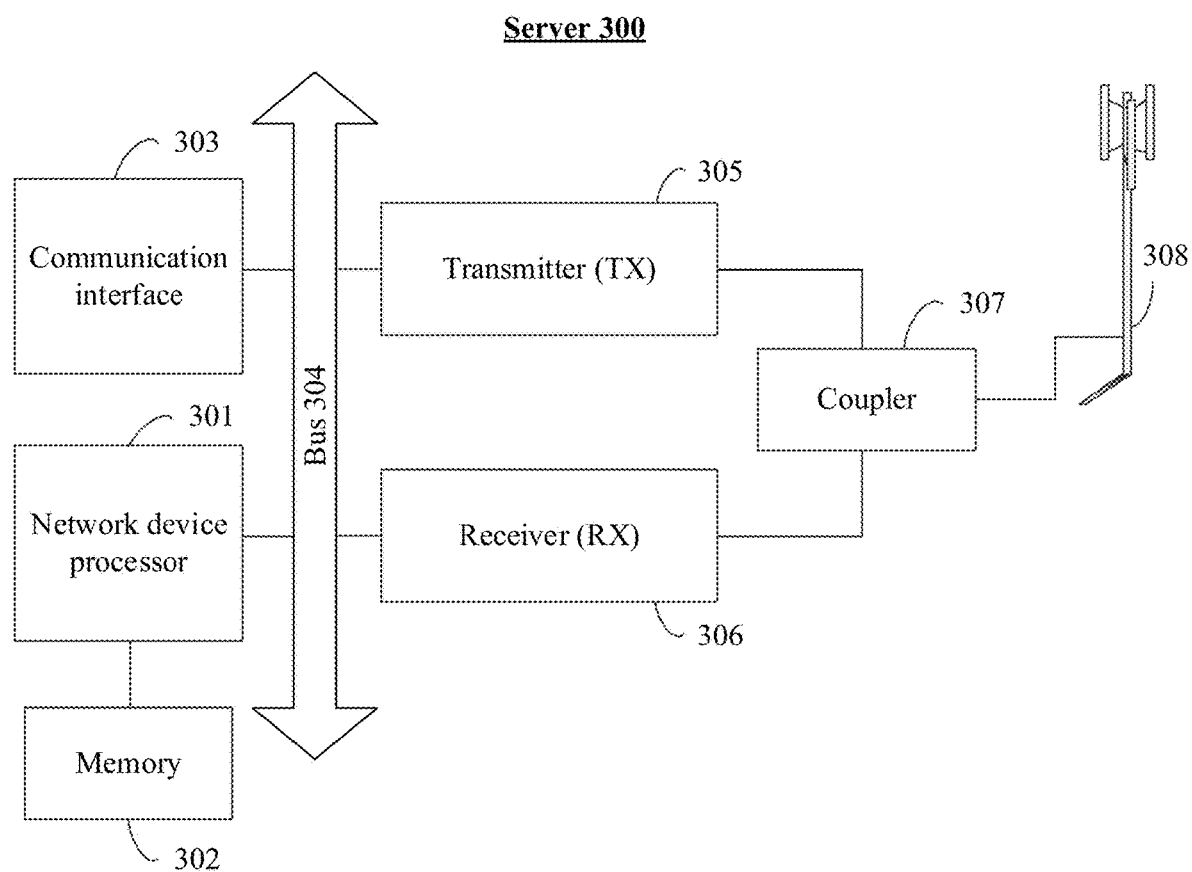
FIG. 2D is a schematic diagram of a structure of a server providing a printing/mirroring/projection service according to an embodiment of this disclosure.

FIG. 2D shows a structure of a server 300 providing a printing/mirroring/projection service according to an embodiment of this disclosure.

The server 300 may be the server 3001 to 3004 in the communication system 1000 shown in FIG. 1.

As shown in FIG. 2D, the server 300 may include one or more processors 301, a memory 302, a communication interface 303, a transmitter 305, a receiver 306, a coupler 307, and an antenna 308. These components may be connected through a bus 304 or in another manner. FIG. 2D shows an example in which the components are connected through the bus.

The communication interface 303 may be used by the server 300 to communicate with other communication devices, for example, the electronic devices 1001 to 1003, and the server 2001. Further, the communication interface 303 may be a 3G communication interface, an LTE (4G) communication interface, a 5G communication interface, a WLAN communication interface, a WAN communication interface, or the like. In addition to the wireless communication interface, the server 300 may be further configured with a wired communication interface 303 to support wired communication. For example, a backhaul connection between the server 300 and the server 2001 may be a wired communication connection.

In some embodiments of this disclosure, the transmitter 305 and the receiver 306 may be considered as a wireless modem. The transmitter 305 may be configured to perform transmission processing on a signal output by the processor 301. The receiver 306 is configured to receive a signal. In the server 300, there may be one or more transmitters 305 and one or more receivers 306. The antenna 308 may be configured to convert electromagnetic energy in a transmission line into an electromagnetic wave in free space, or convert an electromagnetic wave in free space into electromagnetic energy in a transmission line. The coupler 307 may be configured to split a mobile communication signal into a plurality of signals, and distribute the plurality of signals to the plurality of receivers 306. It may be understood that the antenna 308 of the network device may be implemented as a large-scale antenna array.

The memory 302 is coupled to the processor 301, and is configured to store various software programs and/or a plurality of groups of instructions. Further, the memory 302 may include a high-speed RAM, and may also include a non-volatile memory, for example, one or more disk storage devices, a flash memory device, or another non-volatile solid-state storage device.

The memory 302 may store an operating system (or system), for example, an embedded operating system such as μCOS, VxWorks, or RTLinux. The memory 302 may further store a network communication program. The network communication program may be used for communication with the server 2001 and one or more printers, projectors, and displays.

In this embodiment of this disclosure, a device ID of each printer/display/projector subordinate to the memory 302 and an instant messaging ID of a user having permission for the printer/display/projector may be stored and associated with each other by the memory 302. For content stored in the memory 302, refer to the foregoing Table 3 and related descriptions.

In this embodiment of this disclosure, the processor 301 may be configured to read and execute computer-readable instructions. Further, the processor 301 may be configured to invoke a program stored in the memory 302, for example, a program for implementing, by the server 300, the data sharing method provided in one or more embodiments of this disclosure, and execute instructions included in the program.

It should be noted that the server 300 shown in FIG. 2D is merely an implementation according to this embodiment of this disclosure. In actual application, the server 300 may include more or fewer components. This is not limited herein.

Figure 2E:
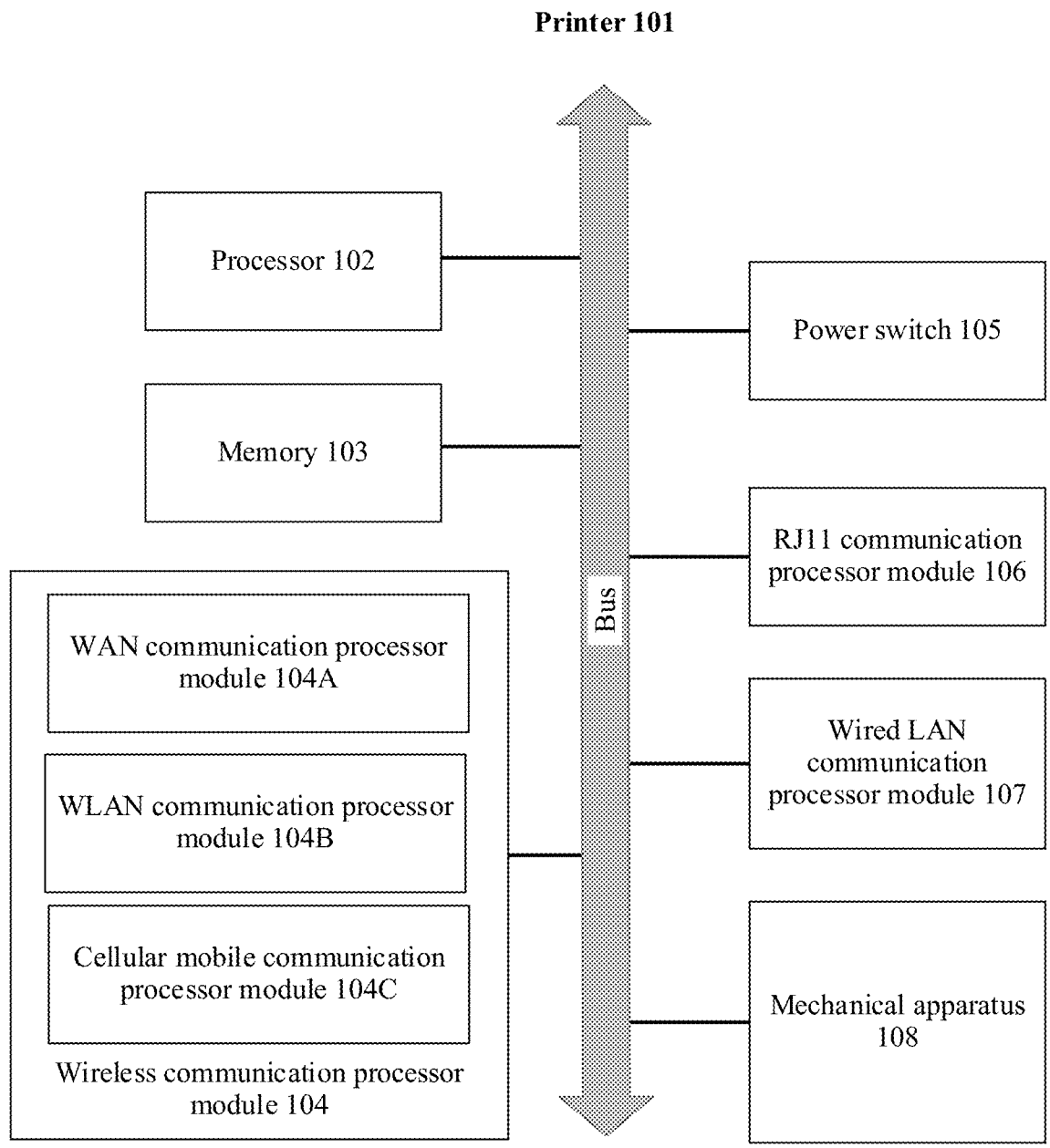
FIG. 2E is a schematic diagram of a structure of a printer according to an embodiment of this disclosure.

FIG. 2E shows a structure of a printer 101 according to an embodiment of this disclosure.

The printer 101 may be any one of the printers 1011 to 4004 in the communication system 1000 shown in FIG. 1.

As shown in FIG. 2E, the printer 101 may include a processor 102, a memory 103, a wireless communication processor module 104, a power switch 105, an RJ11 communication processor module 106, a wired LAN communication processor module 116, and a mechanical apparatus 108. These components may be connected through a bus.

The processor 102 may be configured to read and execute computer-readable instructions. In specific implementation, the processor 102 may mainly include a controller, an arithmetic unit, and a register. The controller is mainly responsible for decoding instructions, and sends a control signal for an operation corresponding to an instruction. The arithmetic unit is mainly responsible for performing a fixed-point or floating-point arithmetic operation, a shift operation, a logic operation, and the like, and may also perform an address operation and address translation. The register is mainly responsible for saving register operands, intermediate operation results, and the like that are temporarily stored during instruction execution. In specific implementation, a hardware architecture of the processor 102 may be an application-specific integrated circuit (ASIC) architecture, a Microprocessor without Interlocked Pipelined Stages (MIPS) architecture, an Advanced reduced instruction set computer (RISC) Machines (ARM) architecture, an NP architecture, or the like.

In some embodiments, the processor 102 may be configured to parse signals received by the wireless communication processor module 104 and/or the wired LAN communication processor module 116, for example, a printing instruction or a printing request sent by the server 3001 or 3002 providing the printing service. The processor 102 may be configured to perform a corresponding processing operation based on a parsing result, for example, drive, according to the printing request or the printing instruction, a mechanical apparatus 108 to perform printing.

In some embodiments, the processor 102 may be configured to generate signals sent by the wireless communication processor module 104 and/or the wired LAN communication processor module 116, for example, a printing status (for example, printing succeeds, printing fails, or the like) feedback signal sent to the server 3001 or 3002 providing the printing service.

The memory 103 is coupled to the processor 102, and is configured to store various software programs and/or a plurality of sets of instructions. In specific implementation, the memory 103 may include a high-speed RAM, and may also include a non-volatile memory, for example, one or more magnetic disk storage devices, a flash memory device, or another non-volatile solid-state storage device. The memory 103 may store an operating system, for example, an embedded operating system such as μCOS, VxWorks, or RTLinux. The memory 103 may further store a communication program. The communication program may be used for communication with the server 3001 or 3002 providing the printing service.

In some embodiments, the memory 103 may be further configured to store an instant messaging ID of a user who has usage permission for the memory 103. For content stored in the memory 103, refer to the foregoing Table 4 and related descriptions.

The wireless communication processor module 104 may include one or more of a WAN communication processor module 104A, a WLAN communication processor module 104B, a cellular mobile communication processor module 104C. The wireless communication processor module 104 is configured to establish a wireless communication connection with the server 3001 or 3002 providing the printing service, and perform communication by using a cellular mobile communication technology such as 3G, 4G, or 5G, a WAN technology, a LAN technology, or a WLAN technology.

The power switch 105 may be configured to control a power supply to supply power to the printer 101.

The RJ11 communication processor module 106 may be configured to process data received or sent through an RJ11 interface. The RJ11 interface is used to connect to a modem.

The wired LAN communication processor module 107 may be configured to communicate with another device in a same LAN by using a wired LAN. The wired LAN communication processor module 107 may be further configured to connect to a WAN by using the wired LAN, and may communicate with a device in the WAN.

The mechanical apparatus 108 may include a printing head, a carriage mechanism, a paper feeding mechanism, a ribbon transmission mechanism, an ink (toner) supply mechanism, a toner cartridge transmission mechanism, and the like. The mechanisms are all execution mechanisms of a printer system, and are uniformly coordinated and controlled by the processor 102.

It may be understood that the structure shown in FIG. 2E does not constitute a specific limitation on the printer 101. In some other embodiments of this disclosure, the printer 101 may include more or fewer components than those shown in the figure, or some components are combined, or some components are split, or there may be different component arrangements. The components shown in the figure may be implemented by using hardware, software, or a combination of software and hardware.

Figure 2F:
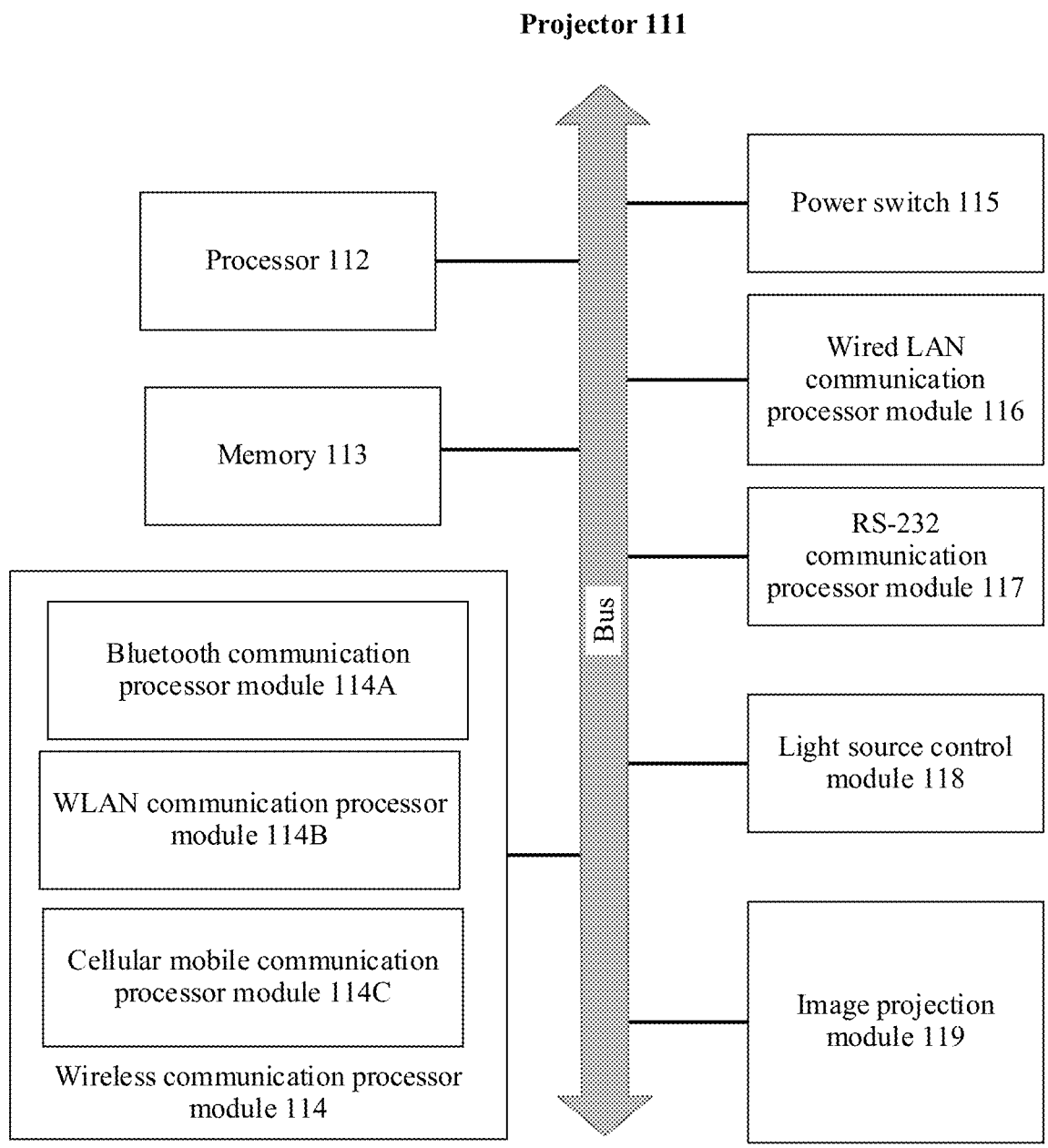
FIG. 2F is a schematic diagram of a structure of a projector according to an embodiment of this disclosure.

FIG. 2F shows a structure of a projector 111 according to an embodiment of this disclosure.

The projector 111 may be the projector 4006 in the communication system 1000 shown in FIG. 1.

As shown in FIG. 2F, the projector 111 may include a processor 112, a memory 113, a wireless communication processor module 114, a power switch 115, a wired LAN communication processor module 116, an RS-232 communication processor module 117, a light source control module 118, and an image projection module 119.

The processor 112 may be configured to read and execute computer-readable instructions. In specific implementation, the processor 112 may mainly include a controller, an arithmetic unit, and a register. The controller is mainly responsible for decoding instructions, and sends a control signal for an operation corresponding to an instruction. The arithmetic unit is mainly responsible for performing a fixed-point or floating-point arithmetic operation, a shift operation, a logic operation, and the like, and may also perform an address operation and address translation. The register is mainly responsible for saving register operands, intermediate operation results, and the like that are temporarily stored during instruction execution. In specific implementation, a hardware architecture of the processor 112 may be an ASIC architecture, an MIPS architecture, an ARM architecture, an NP architecture, or the like.

In some embodiments, the processor 112 may be configured to parse signals received by the wireless communication processor module 114 and/or the wired LAN communication processor module 116, for example, a projection request or a projection instruction sent by the server 3004 providing the projection service. The processor 112 may be configured to perform a corresponding processing operation based on a parsing result, for example, drive, according to the projection request or the projection instruction, the light source control module 118 and the image projection module to perform projection.

In some embodiments, the processor 112 may be further configured to generate signals sent by the wireless communication processor module 114 and/or the wired LAN communication processor module 116, for example, a projection status (for example, projection succeeds, projection fails, or the like) feedback signal sent to the server 3004 providing the projection service.

The memory 113 is coupled to the processor 112, and is configured to store various software programs and/or a plurality of sets of instructions. In specific implementation, the memory 113 may include a high-speed RAM, and may also include a non-volatile memory, for example, one or more magnetic disk storage devices, a flash memory device, or another non-volatile solid-state storage device. The memory 113 may store an operating system, for example, an embedded operating system such as μCOS, VxWorks, or RTLinux. The memory 113 may further store a communication program, and the communication program may be used to communicate with the electronic device 100, one or more servers, or an additional device.

The wireless communication processor module 114 may include one or more of a BLUETOOTH (BT) communication processor module 114A, a WLAN communication processor module 114B, and a cellular mobile communication processor module 114C, and is configured to establish a wireless communication connection to the server 3004 providing the projection service, and communicate by using a cellular mobile communication technology such as 3G, 4G, or 5G, a WAN technology, a LAN technology, a WLAN technology, or the like.

The power switch 115 may be configured to control a power supply to supply power to the projector 111.

The wired LAN communication processor module 116 may be configured to communicate with another device in a same LAN by using a wired LAN. The wired LAN communication processor module 116 may be further configured to connect to a WAN by using the wired LAN and communicate with a device in the WAN.

The RS-232 communication processor module 117 may be configured to communicate with another device through an RS-232 interface (not shown).

The image projection module 119 may have a light source (not shown), and may modulate, based on image data, light emitted from the light source and project an image on a screen.

The light source control module 118 may be configured to control lighting of the light source of the image projection module 119.

It may be understood that the structure shown in FIG. 2F does not constitute a specific limitation on the projector 111. In some other embodiments of this disclosure, the projector 111 may include more or fewer components than those shown in the figure, or some components are combined, or some components are split, or there may be different component arrangements. The components shown in the figure may be implemented by using hardware, software, or a combination of software and hardware.

Figure 2G:
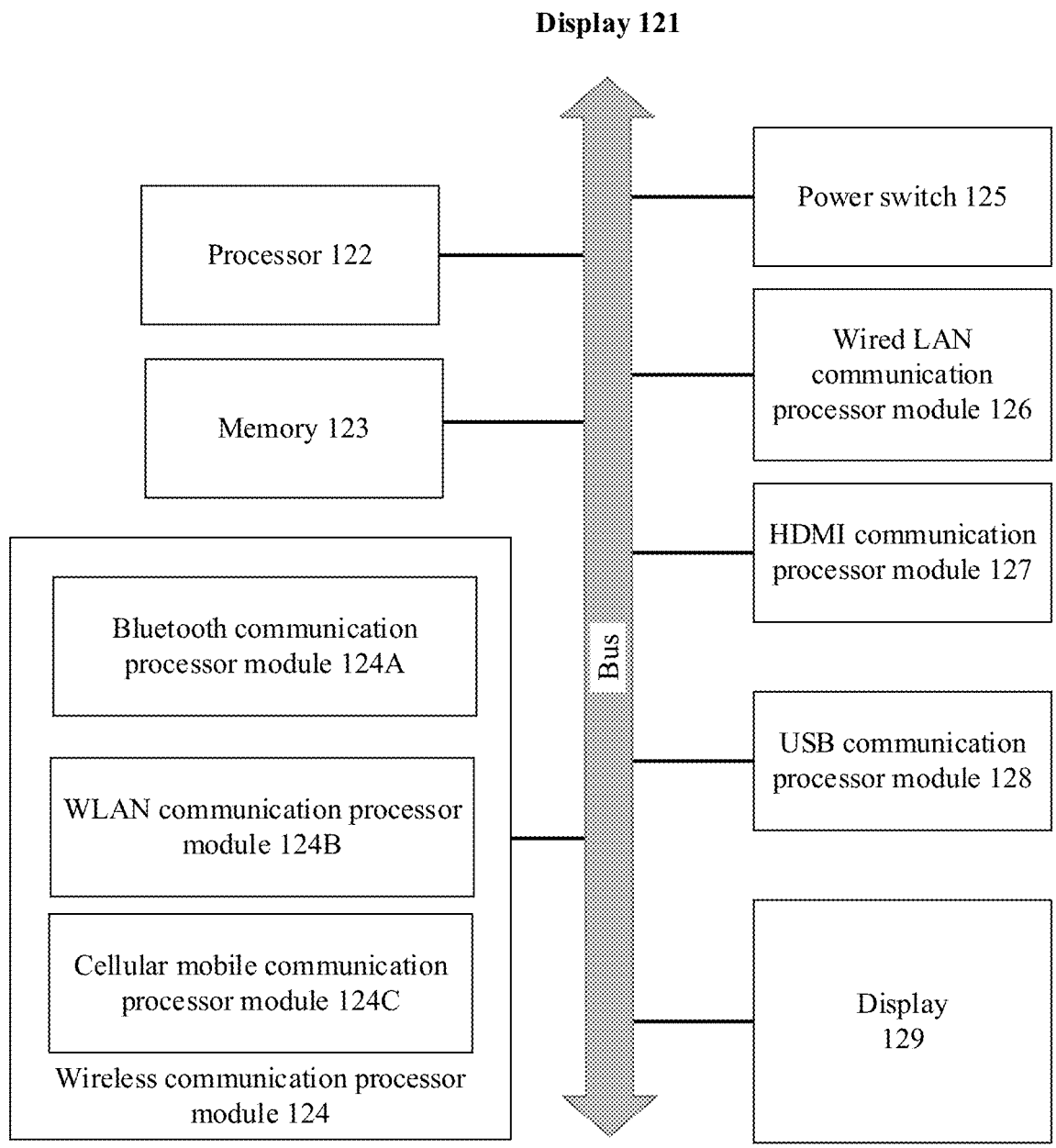
FIG. 2G is a schematic diagram of a structure of a display according to an embodiment of this disclosure.

FIG. 2G shows a structure of a display 121 according to an embodiment of this disclosure.

The display 121 may be the display 4005 in the communication system 1000 shown in FIG. 1.

As shown in FIG. 2G, the display 121 may include a processor 122, a memory 123, a wireless communication processor module 124, a power switch 125, a wired LAN communication processor module 126, a High-Definition Multimedia Interface (HDMI) communication processor module 127, a USB communication processor module 128, and a display 129.

The processor 122 may be configured to read and execute computer-readable instructions. In specific implementation, the processor 122 may mainly include a controller, an arithmetic unit, and a register. The controller is mainly responsible for decoding instructions, and sends a control signal for an operation corresponding to an instruction. The arithmetic unit is mainly responsible for performing a fixed-point or floating-point arithmetic operation, a shift operation, a logic operation, and the like, and may also perform an address operation and address translation. The register is mainly responsible for saving register operands, intermediate operation results, and the like that are temporarily stored during instruction execution. In specific implementation, a hardware architecture of the processor 122 may be an ASIC architecture, an MIPS architecture, an ARM architecture, an NP architecture, or the like.

In some embodiments, the processor 122 may be configured to parse signals received by the wireless communication processor module 124 and/or the wired LAN communication processor module 126, for example, a mirroring instruction or a mirroring request sent by the server 3003 providing the mirroring service. The processor 102 may be configured to perform a corresponding processing operation based on a parsing result, for example, drive, according to the mirroring request or the mirroring instruction, a display 129 to perform display.

In some embodiments, the processor 122 may be further configured to generate signals sent by the wireless communication processor module 124 and/or the wired LAN communication processor module 126, for example, a mirroring status (for example, mirroring succeeds, mirroring fails, or the like) feedback signal sent to the server 3003 providing the mirroring service.

The memory 123 is coupled to the processor 122, and is configured to store various software programs and/or a plurality of sets of instructions. In specific implementation, the memory 123 may include a high-speed RAM, and may also include a non-volatile memory, for example, one or more magnetic disk storage devices, a flash memory device, or another non-volatile solid-state storage device. The memory 123 may store an operating system, for example, an embedded operating system such as μCOS, VxWorks, or RTLinux. The memory 123 may further store a communication program, and the communication program may be used to communicate with the electronic device 100, one or more servers, or an additional device.

The wireless communication processor module 124 may include one or more of a BLUETOOTH (BT) communication processor module 124A, a WLAN communication processor module 124B, a cellular mobile communication processor module 124C. The wireless communication processor module 124 is configured to establish a wireless communication connection with the server 3003 providing the mirroring service, and perform communication by using a cellular mobile communication technology such as 3G, 4G, or 5G, a WAN technology, a LAN technology, or a WLAN technology.

The power switch 125 may be configured to control a power supply to supply power to the display 121.

The wired LAN communication processor module 126 may be configured to communicate with another device in a same LAN by using a wired LAN. The wired LAN communication processor module 126 may be further configured to connect to a WAN by using the wired LAN, and may communicate with a device in the WAN.

The HDMI communication processor module 127 may be configured to communicate with another device through an HDMI interface (not shown).

The USB communication processor module 128 may be configured to communicate with another device through a USB port (not shown).

The display 129 may be configured to display an image, a video, and the like. The display 129 may be an LCD display, an OLED display, an AMOLED display, an FLED display, a QLED display, or the like.

In some embodiments, the display 121 may further include an audio module (not shown). The audio module may be configured to output an audio signal through an audio output interface, so that the display 121 can support audio playing. The audio module may be configured to receive audio data through an audio input interface. The display 121 may be a media playing device such as a television.

In some embodiments, the display 121 may further include a serial interface such as an RS-232 interface. The serial interface may be connected to another device, for example, an audio speaker device such as a sound box, so that the display collaborates with the audio speaker device to play audio and videos.

It may be understood that the structure shown in FIG. 2G does not constitute a specific limitation on the display 121. In some other embodiments of this disclosure, the display 121 may include more or fewer components than those shown in the figure, or some components are combined, or some components are split, or there may be different component arrangements. The components shown in the figure may be implemented by using hardware, software, or a combination of software and hardware.

With reference to user interfaces provided in embodiments of this disclosure, the following describes a data sharing method provided in embodiments of this disclosure. The following embodiments are described by using an example in which an electronic device is used for printing.

First, a user interface used for adding a server contact and binding a printer is described.

FIG. 3A to FIG. 3H show user interfaces used when an associated user of the electronic device 1001 (that is, "Lisa") adds the server 3001 as a contact and is bound the printer 4001.

Figure 3A:
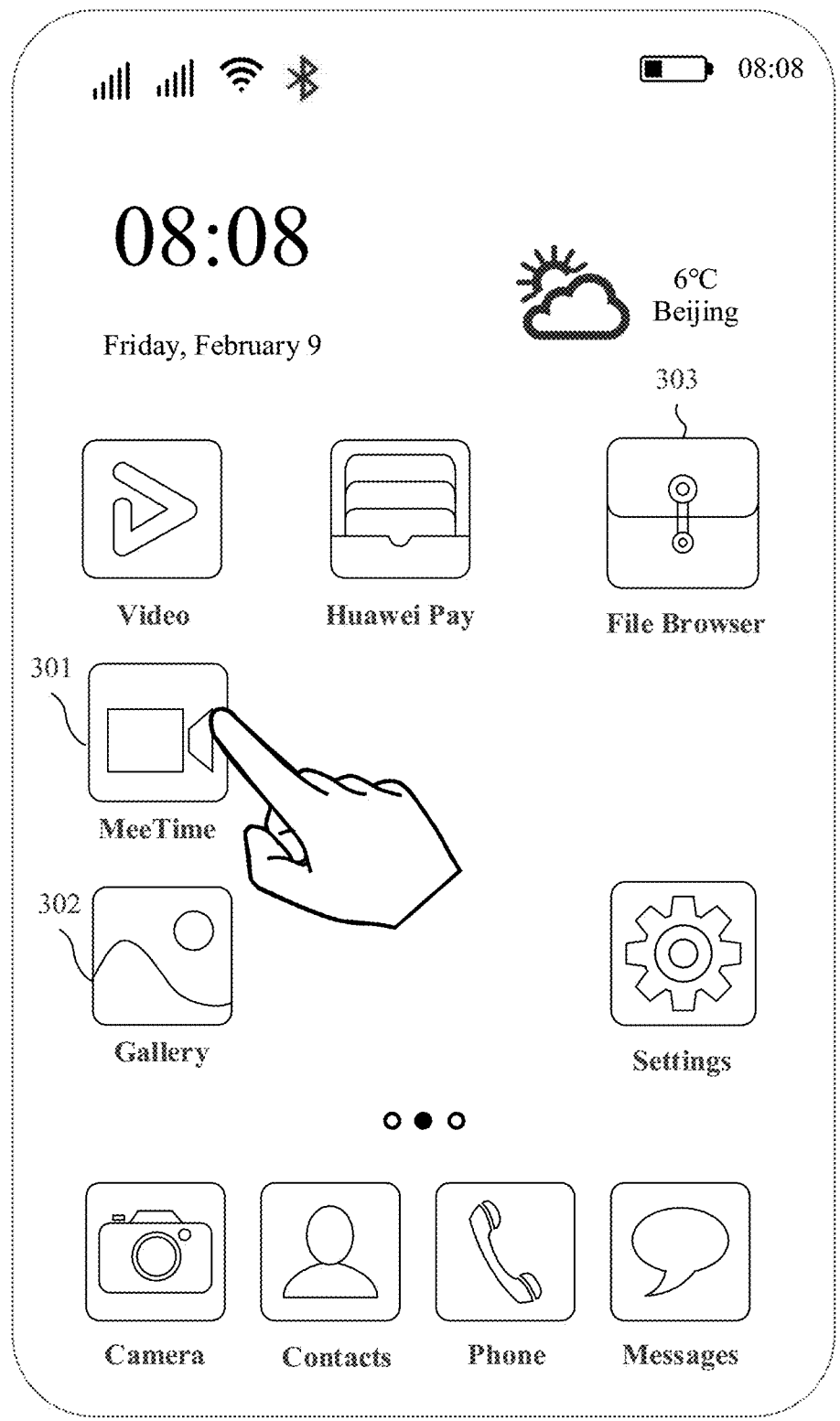
FIG. 3A, FIG. 3B, FIG. 3C, FIG. 3D, FIG. 3E, FIG. 3F, FIG. 3G, FIG. 3H, FIG. 4A, FIG. 4B, FIG. 4C, FIG. 4D, FIG. 4E, FIG. 5A, FIG. 5B, FIG. 5C, FIG. 5D, FIG. 5E, FIG. 5F, FIG. 5G, FIG. 5H, and FIG. 5I are a group of user interfaces for binding a user with a printer according to an embodiment of this disclosure.
Figure 3B:
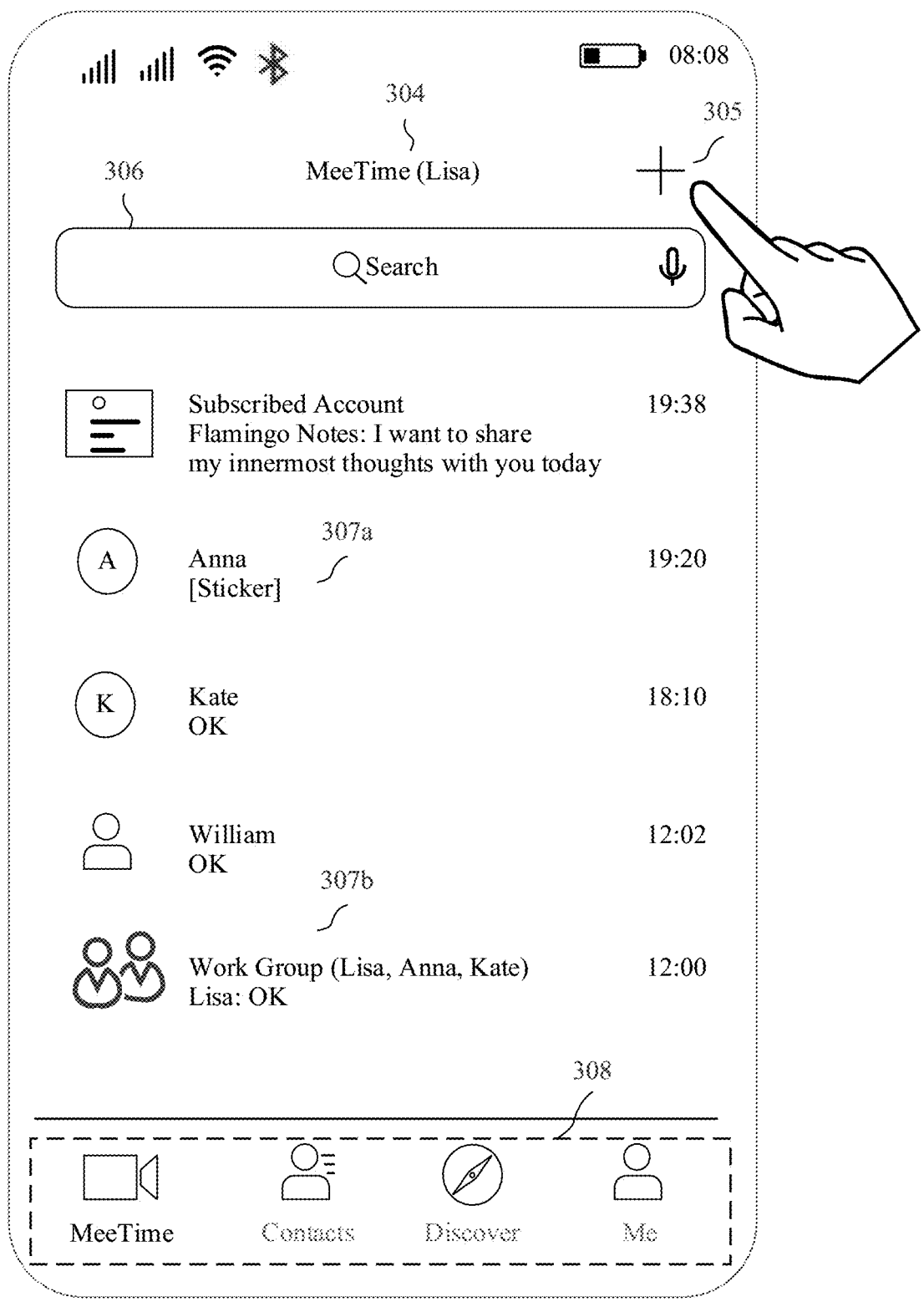
Figure 3C:
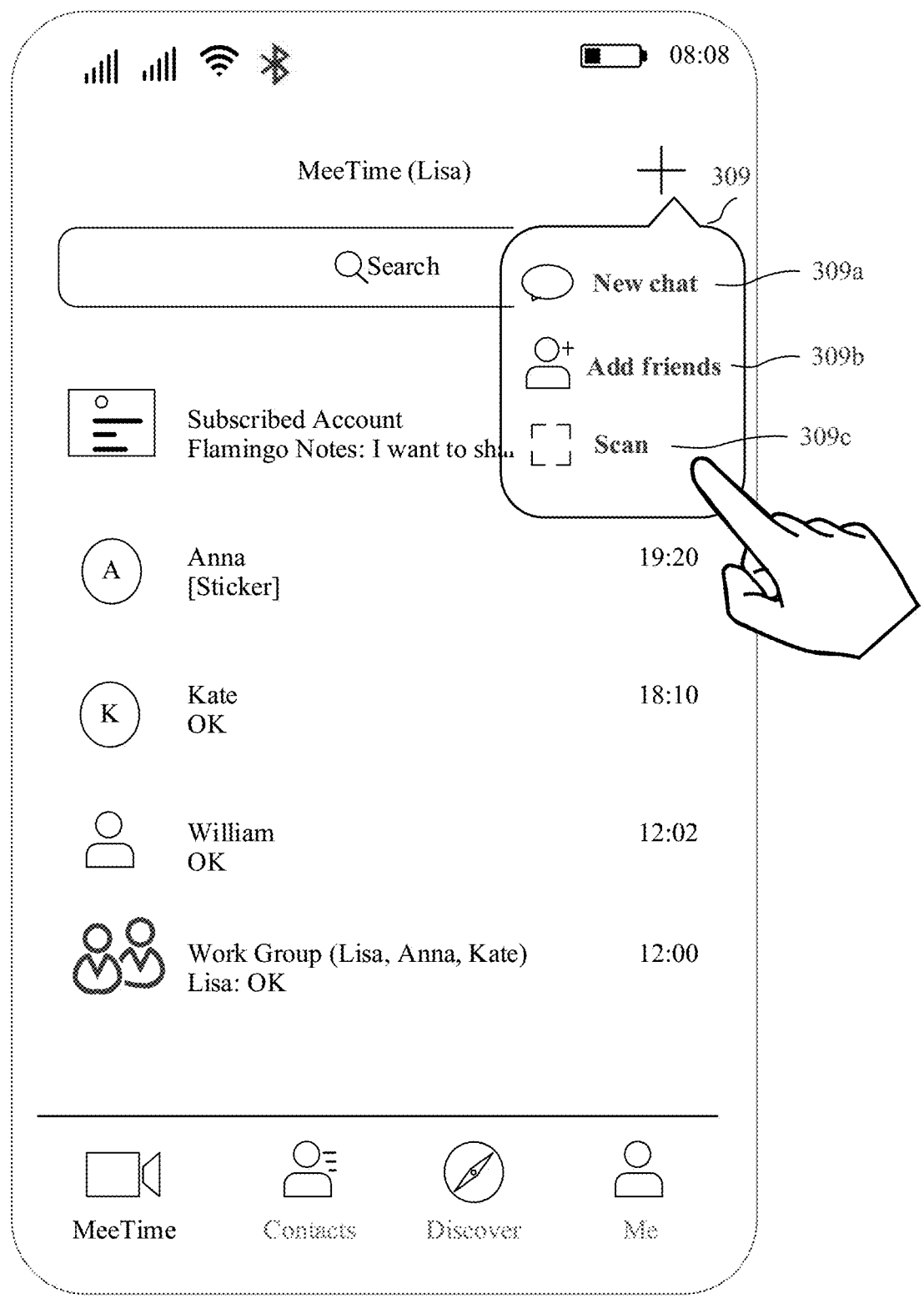
Figure 3D:
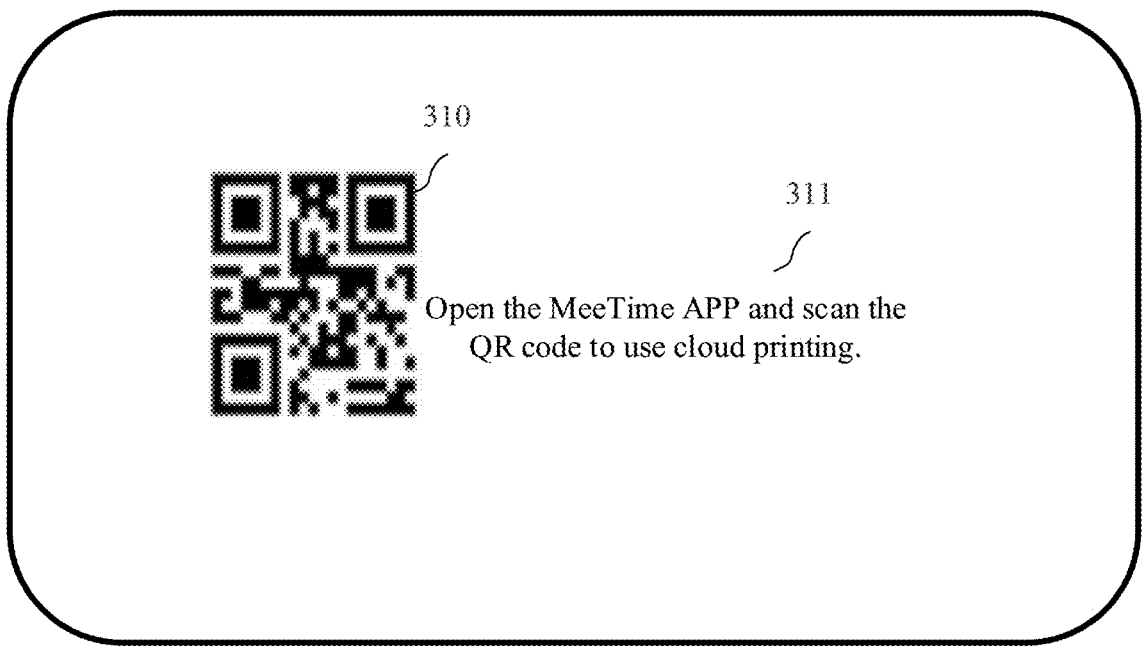
Figure 3E:
Figure 3F:
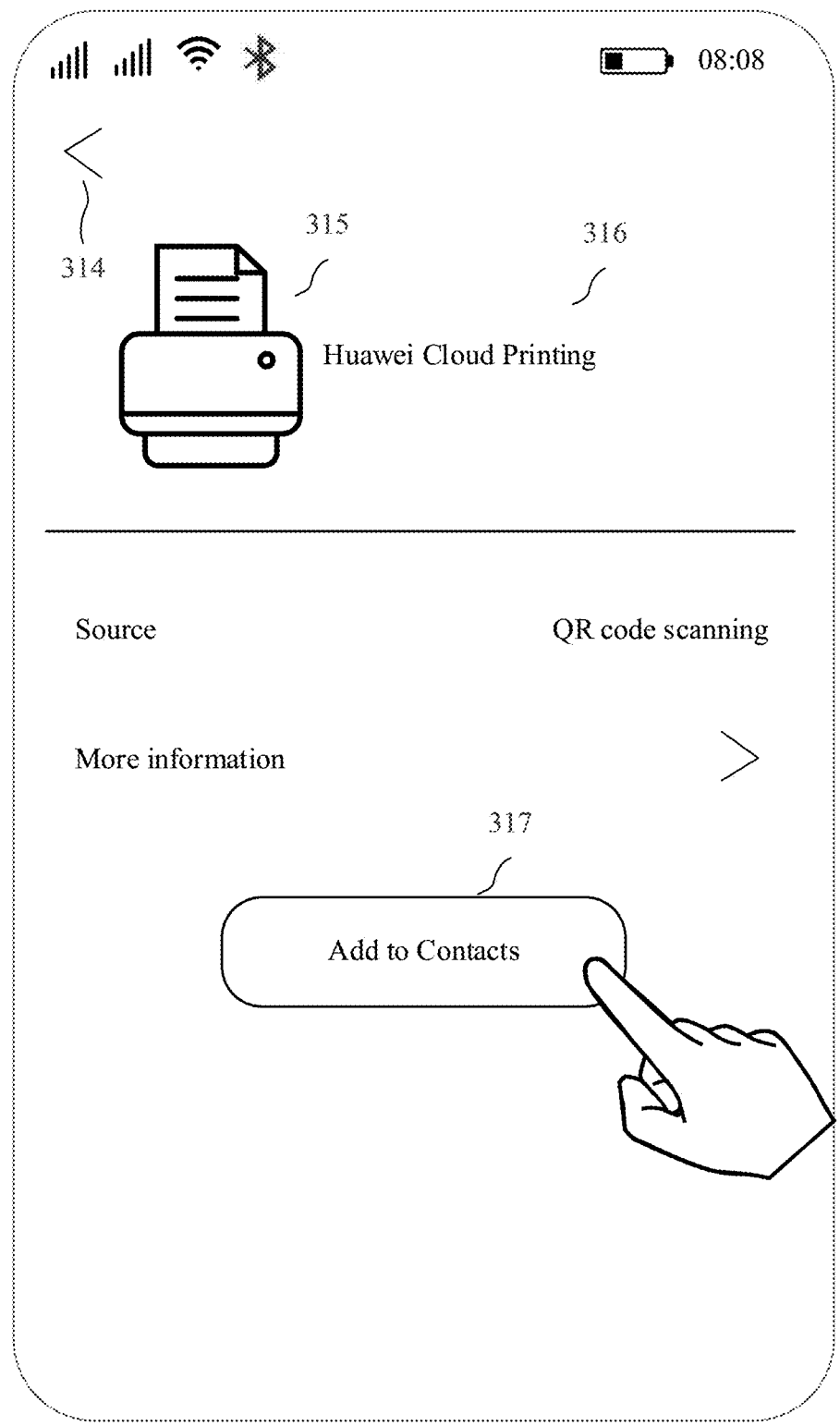
Figure 3G:
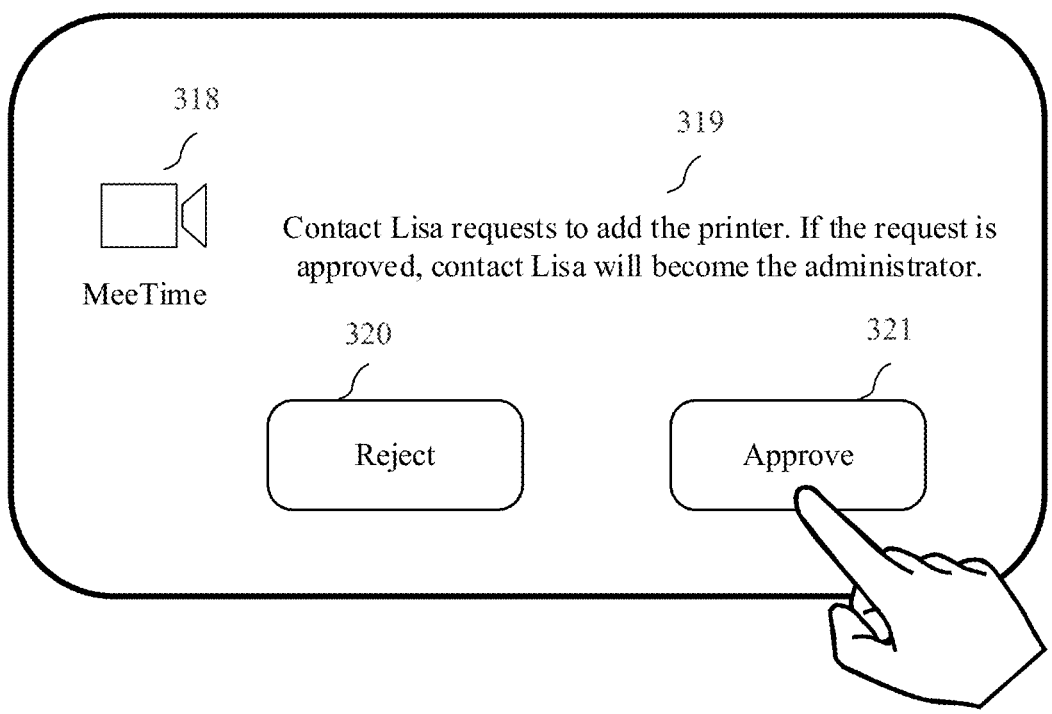

FIG. 3A to FIG. 3C, FIG. 3E, FIG. 3F, and FIG. 3H show user interfaces implemented on the electronic device 1001, and FIG. 3D and FIG. 3G show user interfaces implemented on the printer 4001.

FIG. 3A shows an example of a user interface 31 that is on the electronic device 1001 and that is used to display an installed application. The user interface 31 displays a status bar, a calendar indicator, a weather indicator, a tray including icons of frequently used applications, and other application icons such as an instant messaging application (for example, MeeTime) icon 301, a gallery icon 302, a file browser icon 303, and the like. The status bar may include one or more signal strength indicators of a mobile communication signal (or a cellular signal), a BLUETOOTH indicator, one or more signal strength indicators of a WI-FI signal, a battery status indicator, a time indicator, and the like. This is not limited thereto. The user interface shown in FIG. 3A may further include a navigation bar, a sidebar, and the like. In some embodiments, the user interface 31 shown in FIG. 3A as an example may be a home screen.

As shown in FIG. 3A, the electronic device 1001 may detect a user operation (for example, a tap operation or a touch operation) performed on the icon 301 of an instant messaging application, start the instant messaging application in response to the user operation, and display a user interface 32 provided by the instant messaging application.

The user interface 32 is configured to display one or more contact options of the associated user of the electronic device 1001 in the instant messaging application.

As shown in FIG. 3B, the user interface 32 displays a status bar, a title bar 304, a control 305, a search box 306, one or more recent contact options, and a menu bar 308.

For the status bar, refer to the status bar in FIG. 3A.

The title bar 304 may include a current page indicator used to indicate a current page. For example, text information "MeeTime (Lisa)" indicates that the current page is a user interface provided by an instant messaging application "MeeTime", and that a user currently logging in to the application is Lisa.

The search box 306 may be used to detect a touch operation, a tap operation, or the like. In response to the operation, the electronic device 1001 may display a text box, so that the user can enter, in the text box, a contact option or a chat record (for example, text information, a picture, a link, or another file) that the user wants to search for.

The recent contact option may include contact options corresponding to one or more contacts that contact the user in the instant messaging application recently. The contact option may include an official account option, a user option, a group option, and the like. For example, the recent contact option includes an option 307a of a user "Kate" and an option 307b of a group "Work Group". An implementation of the contact option may include but is not limited to an icon or a text. The icon or the text may be an identity of the contact in the instant messaging application, for example, an account, a profile picture, a nickname, or a name of the contact in the instant messaging application.

The menu bar 308 may include a plurality of controls, for example, "MeeTime", "Contacts", "Discover", and "Me" shown in FIG. 3B. Content displayed outside the menu bar 308 and the status bar in the user interface 32 relates to a control currently selected in the menu bar 305. A currently selected control in the menu bar 308 in FIG. 3B is "Mee-Time".

The control 305 may be configured to detect a user operation (for example, a tap operation or a touch operation), and the electronic device 1001 may display a window 309 in the user interface 32 in response to the user operation.

As shown in FIG. 3C, the window 309 includes a control 309a, a control 309b, and a control 309c. The control 309a may detect a user operation, and the electronic device 1001 may add a plurality of contacts into one group in response to the user operation. The control 309b may detect a user operation, and the electronic device 1001 may search for and add a new contact in response to the user operation. The control 309c may detect a user operation, and the electronic device 1001 may turn on a camera and scan a quick response (QR) code, a bar code, or other graphic information in response to the user operation.

FIG. 3D shows an example of a user interface 33 displayed by the printer 4001. The user interface 33 may be displayed after the printer 4001 is powered on, or may be displayed in response to a user operation. The user interface 33 displays a QR code 310 and prompt information 311.

The QR code 310 carries the following information: a device ID of the printer 4001, and an instant messaging ID of the server 3001 configured to manage the printer 4001. This is not limited thereto. The QR code 310 may carry more information, for example, a picture of the printer 4001.

The prompt information 311 may be used to instruct the user to scan the QR code in the instant messaging application to use a cloud printing service provided in embodiments of this disclosure. For example, the prompt information 311 may be a text "open the MeeTime APP and scan the QR code to use cloud printing". This is not limited thereto. The prompt information 311 may also be implemented in another form, for example, may also be a picture or an animation.

FIG. 3E shows an example of a user interface 34 displayed by the electronic device 1001 after the electronic device 1001 enables the camera to capture the QR code 310 in FIG. 3D in response to a user operation (for example, a tap operation or a touch operation) detected on the control 309C shown in FIG. 3D. A back button 312 and a QR code 313 are displayed in the user interface 34. The back button 312 may monitor a user operation, and the electronic device 1001 may return to a previous interface (that is, the user interface 32 shown in FIG. 3B or FIG. 3C) in response to the user operation. The QR code 313 is a QR code captured by the electronic device 1001.

After capturing the QR code 311, the electronic device 1001 may obtain, from the QR code, information carried in the QR code, that is, the device ID of the printer 4001, and the instant messaging ID of the server 3001 configured to manage the printer 4001.

After obtaining the information carried in the QR code, the electronic device 1001 may display a user interface 35 shown in FIG. 3F. As shown in FIG. 3F, in the user interface 35, a back button 314, a picture 315 of a printer 315, an instant messaging ID 316 of the server 3001, and a control 317 are displayed. This is not limited thereto. The user interface 35 may further include more information, for example, a manner in which the electronic device 1001 obtains the instant messaging ID of the server 3001 (for example, scanning the QR code).

As shown in FIG. 3F, the electronic device 1001 may detect a user operation (for example, a tap operation or a touch operation) performed on the control 317, and in response to the user operation, send a request for adding a contact and binding a printer to the server 2001 providing the instant messaging service. In some other embodiments, after obtaining the device ID of the printer 4001 and the instant messaging ID of the server 3001 configured to manage the printer 4001, the electronic device 1001 may directly send, to the server 2001, the request for adding a contact and binding the printer. A user operation is not needed, in other words, the user interface 35 shown in FIG. 3F does not need to be displayed.

The request for adding a contact and binding a printer carries the instant messaging ID of the associated user of the electronic device 1001 (namely, Lisa), the instant messaging ID of the server 3001, and the device ID of the printer 4001. The request is used to request the server 2001 to add the server 3001 as a contact of Lisa, and bind user Lisa to the printer 4001.

After receiving the contact adding request, the server 2001 may send a usage permission request to the printer 4001 through the server 3001. The usage permission request may include the instant messaging ID of user Lisa, which is used to request the usage permission for the printer 4001 for user Lisa. If the printer 4001 is not bound with any user, the usage permission request may be a management permission request. If the printer 4001 is bound with a user, the usage permission request may be a normal permission request.

After receiving the usage permission request, the printer 4001 may display a user interface 36 shown in FIG. 3G. In the user interface 36, an identifier 318 of the instant messaging application, prompt information 319, a control 320, and a control 321 are displayed.

An implementation of the identifier 318 may be a picture or a text. This is not limited herein.

The prompt information 319 may be used to indicate that Lisa will obtain the usage permission (the management permission or normal permission) after the user grants the request of Lisa. It may be understood that, if binding of the printer 4001 is first binding, a user to whom the printer is bound for the first time (namely, Lisa) directly becomes an administrator of the printer 4001. If binding of the printer 4001 is non-first binding, a user bound with the printer 4001 becomes a common user of the printer 4001 after granting. The prompt information 319 depends on whether binding of the printer 4001 is first binding or not. FIG. 3G shows prompt information displayed when binding of the printer 4001 is first binding. The following embodiment is described by using an example in which a user to whom the printer 4001 is bound for the first time is Lisa.

The control 320 may monitor a user operation, and the printer 4001 may reject, in response to the user operation, user Lisa to obtain the usage permission for the printer 4001. The control 321 may monitor a user operation, and the printer 4001 may approve, in response to the user operation, user Lisa to obtain the usage permission for the printer 4001.

As shown in FIG. 3G, the printer 4001 may detect a user operation (for example, a tap operation or a touch operation) performed on the control 321. The printer 4001 may grant, in response to the user operation, the usage permission for the printer 4001 to user Lisa. This is not limited thereto. In some embodiments, the printer 4001 may grant user Lisa the usage permission for the printer 4001 by default, and no user operation is required. Further, the printer 4001 may return a granting success message to the server 3001. In some embodiments, the printer 4001 may locally store the usage permission of user Lisa, as shown in Table 4 above. It can be understood that user Lisa becomes the administrator of the printer 4001.

After receiving the granting success message returned by the printer 4001, the server 3001 may locally store a binding relationship between user Lisa and the printer 4001, that is, bind user Lisa and the printer 4001, as shown in Table 3 above.

The server 3001 further returns a granting success message to the server 2001, and then the server 2001 sends, to the electronic device 1001, a contact addition success message. The server 2001 may add the server 3001 as the contact of user Lisa in response to the granting success message, that is, the instant messaging ID of user Lisa and the instant messaging ID of the server 3001 are stored and associated with each other by the server, as shown in Table 1 above.

Figure 3H:
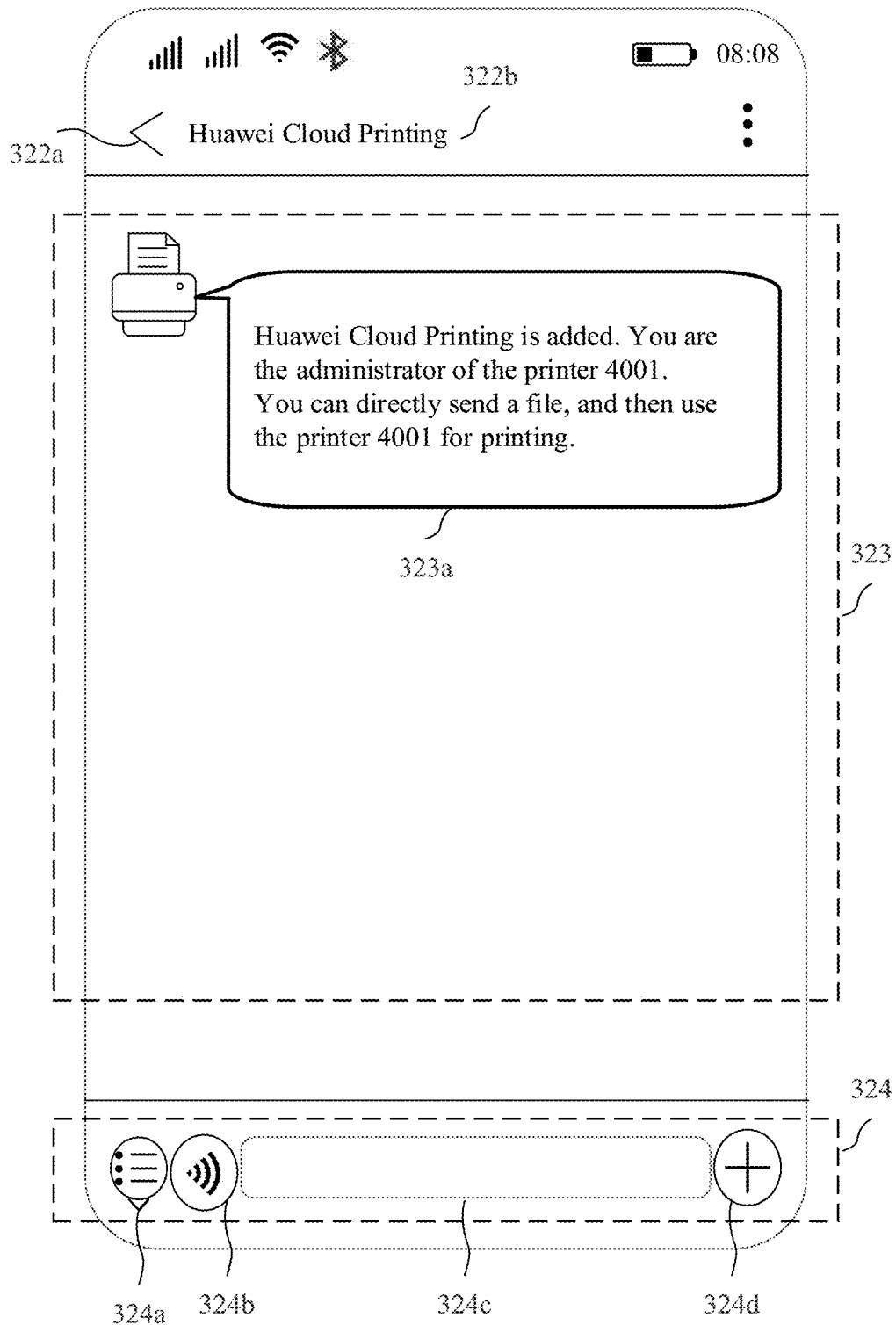

After receiving the message indicating that the contact is added, the electronic device 1001 may display a user interface 37 shown in FIG. 3H. The user interface 37 may be used to indicate that user Lisa adds the server 3001 as the contact and is bound with the printer 4001. In a subsequent process, the user interface 37 may be further configured to display a record of communication between the associated user Lisa of the electronic device 1001 and the server 3001 (namely, HUAWEI Cloud Printing).

As shown in FIG. 3H, the user interface 37 displays a status bar, a title bar, a record 323 of communication between the associated user Lisa of the electronic device 1001 and a server 3001, and a menu 324.

For the status bar, refer to the status bar in FIG. 3A.

The title bar may include a current page indicator 322b used to indicate a current page. For example, the text information "HUAWEI Cloud Printing" is used to indicate that the current page is a page for communication between Lisa and the server 3001 (that is, HUAWEI Cloud Printing). The title bar may further include a back button 322a. The back button 322*a* is configured to monitor a user operation. In response to the user operation, the electronic device 1001 may display the user interface 32 shown in FIG. 3B.

The communication record 323 includes a piece of communication information 323*a*. The communication information is the prompt information sent by the server 3001 (that is, HUAWEI Cloud Printing), and is used to indicate that user Lisa adds the server 3001 as the contact and is bound with the printer 4001.

The menu 324 may include a switch control 324*a*, a voice control 324*b*, a text box 324*c*, and a control 324*d*. The switch control 324*a* may be configured to monitor a user operation, and the electronic device 1001 may switch, in response to the user operation, a control included in the menu bar. The voice control 324*b* may be configured to monitor a user operation. In response to the user operation, the electronic device 1001 may enable a microphone and collect sound. The text box 324*c* may be configured to monitor a user operation. In response to the user operation, the electronic device 1001 may display a virtual keyboard for the user to enter a text. The control 324*d* may be configured to monitor a user operation. In response to the user operation, the electronic device 1001 may display more function service options, for example, a photographing option or a picture sharing option.

In this case, according to the UI embodiment shown in FIG. 3A to FIG. 3H, the electronic device 1001 may obtain the instant messaging ID of the server 3001 and the device ID of the printer 4001, and the associated user Lisa of the electronic device 1001 can add the server 3001 as the contact and become bound with printer 4001.

The following describes several extension manners in which the electronic device 1001 obtains the instant messaging ID of the server 3001 and the device ID of the printer 4001 in the UI embodiment shown in FIG. 3A to FIG. 3H.

In addition to scanning the QR code displayed by the printer 4001 in FIG. 3A to FIG. 3F, the electronic device 1001 may obtain the instant messaging ID of the server 3001 and the device ID of the printer 4001 in another manner.

1. A paper displaying a QR code may be posted on the printer 4001, and the electronic device 1001 may obtain the instant messaging ID of the server 3001 and the device ID of the printer 4001 by scanning the QR code on the paper.

2. The electronic device 1001 may obtain the instant messaging ID of the server 3001 and the device ID of the printer 4001 from the printer 4001 by using an NFC communication technology, a BLUETOOTH communication technology, or the like.

3. The printer 4001 may directly display the instant messaging ID of the server 3001 and the device ID of the printer 4001, or a specification delivered with the printer 4001 may include the instant messaging ID of the server 3001 and the device ID of the printer 4001. The user may directly enter the foregoing information, so that the electronic device 1001 obtains the instant messaging ID of the server 3001 and the device ID of the printer 4001.

For example, FIG. 4A to FIG. 4E are a schematic diagram showing how the user manually enters information, so that the electronic device 1001 obtains the instant messaging ID of the server 3001 and the device ID of the printer 4001.

FIG. 4A to FIG. 4E are user interfaces implemented on the electronic device 1001.

Figure 4A:
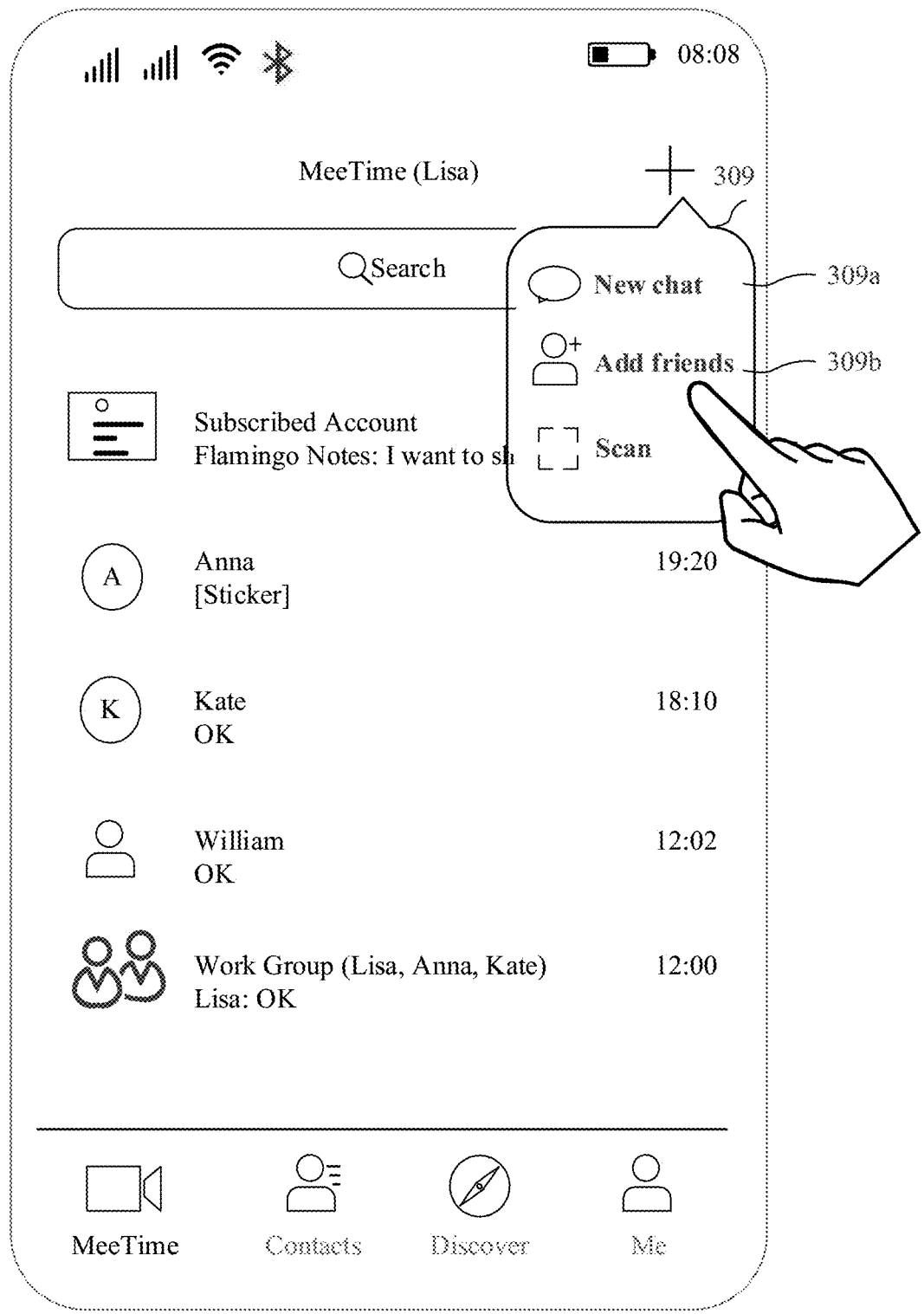

For the user interface 32 shown in FIG. 4A, refer to related descriptions of FIG. 3B and FIG. 3C.

As shown in FIG. 4A, the electronic device 1001 may detect a user operation (for example, a tap operation or a touch operation) performed on the control 309*b*. In response to the user operation, the electronic device 1001 may display a user interface 38 shown in FIG. 4B.

Figure 4B:
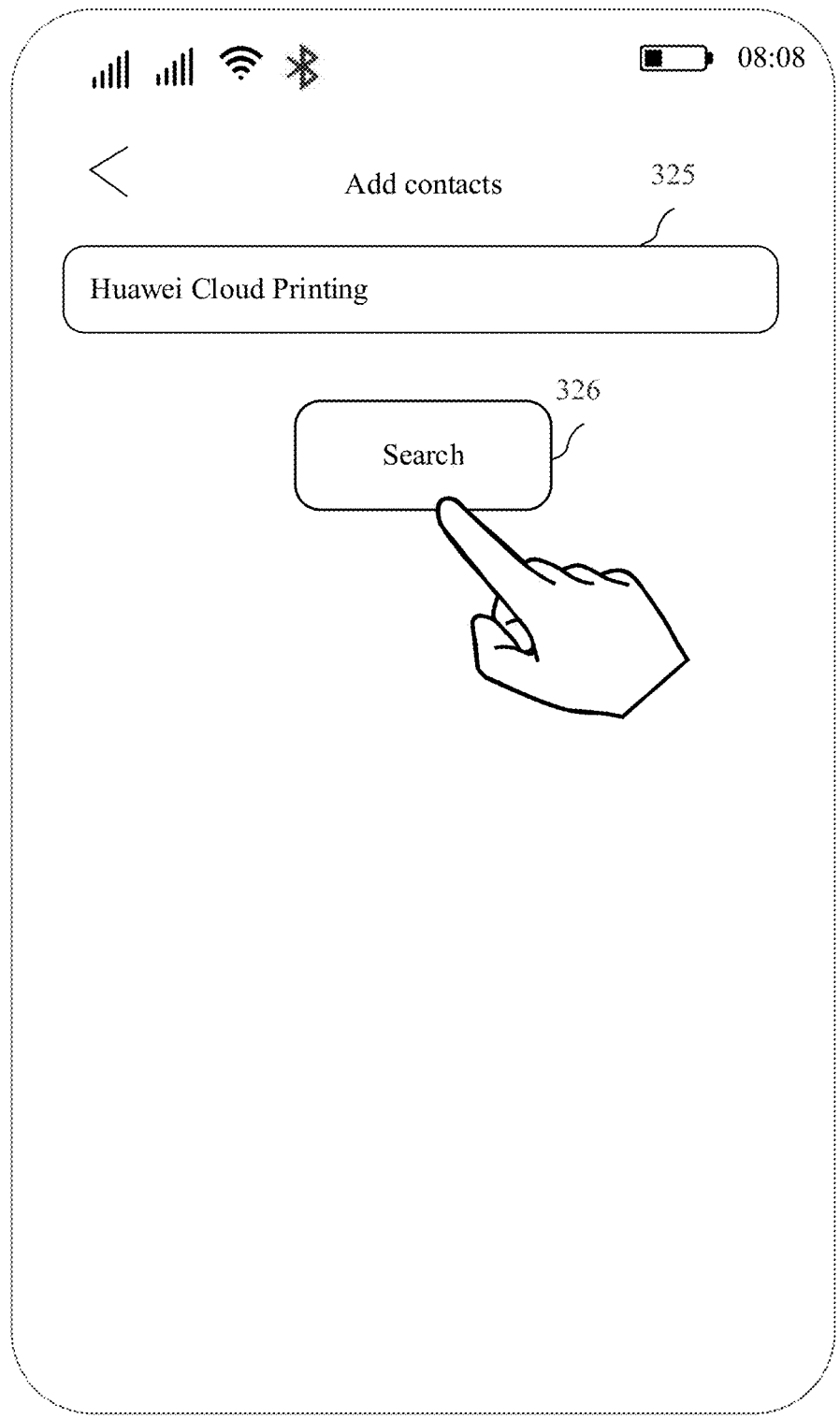

As shown in FIG. 4B, a search box 325 and a control 326 are displayed in the user interface 38. The search box 325 may be used by the user to enter an instant messaging ID of a user that the user wants to search for. For example, user Lisa may enter the instant messaging ID of the server 3001, namely, "HUAWEI Cloud Printing", in the search box 325. The control 326 may monitor a user operation, and the electronic device 1001 may respond to the user operation, and send, to the server 2001, a query request that carries the instant messaging ID of the server 3001. After finding that the server 2001 stores the instant messaging ID of the server 3001, the server 2001 notifies the electronic device 1001. After receiving a notification, the electronic device 1001 may display a user interface 35 shown in FIG. 4C.

Figure 4C:
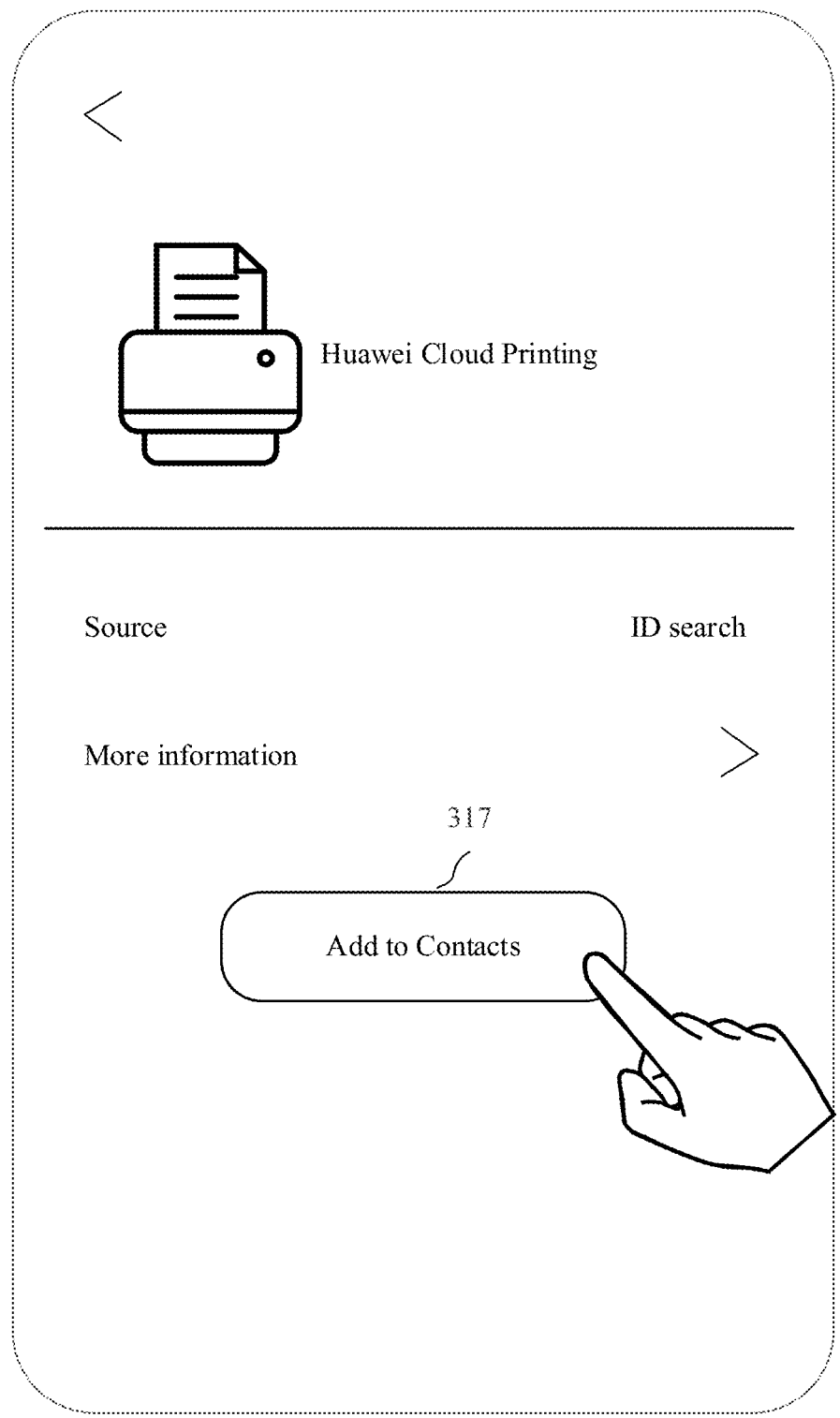

A user interface 35 shown in FIG. 4C is similar to the user interface 35 shown in FIG. 3F. For details, refer to related descriptions.

As shown in FIG. 4C, the electronic device 1001 may detect a user operation performed on the control 317, and in response to the user operation, send a request for adding a contact to the server 2001 providing the instant messaging service. The request for adding a contact carries the instant messaging ID of the associated user of the electronic device 1001 (namely, Lisa), the instant messaging ID of the server 3001, and the device ID of the printer 4001. The request is used to request the server 2001 to add the server 3001 as a contact of Lisa.

The server 2001 may add the server 3001 as the contact of user Lisa after receiving the request for adding a contact, that is, the instant messaging ID of user Lisa and the instant messaging ID of the server 3001 are stored and associated with each other by the server 2001, as shown in Table 1 above. The server 2001 may further return, to the electronic device 1001, a message indicating that the contact is added.

Figure 4D:
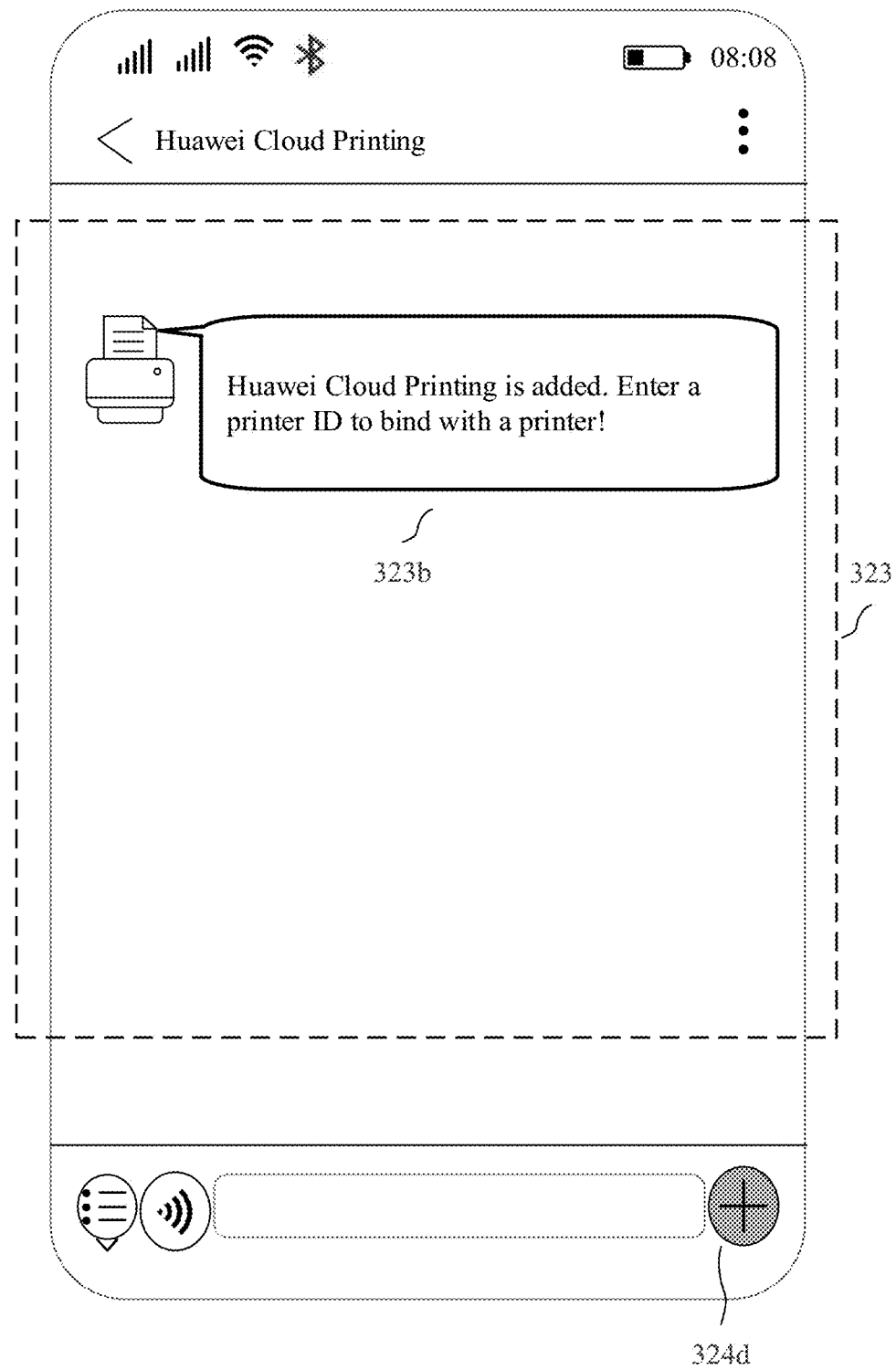

After receiving the message indicating that the contact is added, the electronic device 1001 may display a user interface 37 shown in FIG. 4D.

The user interface 37 shown in FIG. 4D is similar to the user interface 37 shown in FIG. 3H. For details, refer to related descriptions.

As shown in FIG. 4D, the communication record 323 may include communication information 323*b* used to instruct the user to bind the printer. In some embodiments, the control 324*d* is not usable before the user is bound with the printer, to avoid a scenario in which the user sends a file to the contact server 3001 (namely, HUAWEI Cloud Printing) but cannot trigger printing. It may be understood that, only after the user is bound with the printer managed by the server 3001, the user can trigger, by sending a file to the contact server 3001 (that is, HUAWEI Cloud Printing), the printer to perform printing.

Figure 4E:
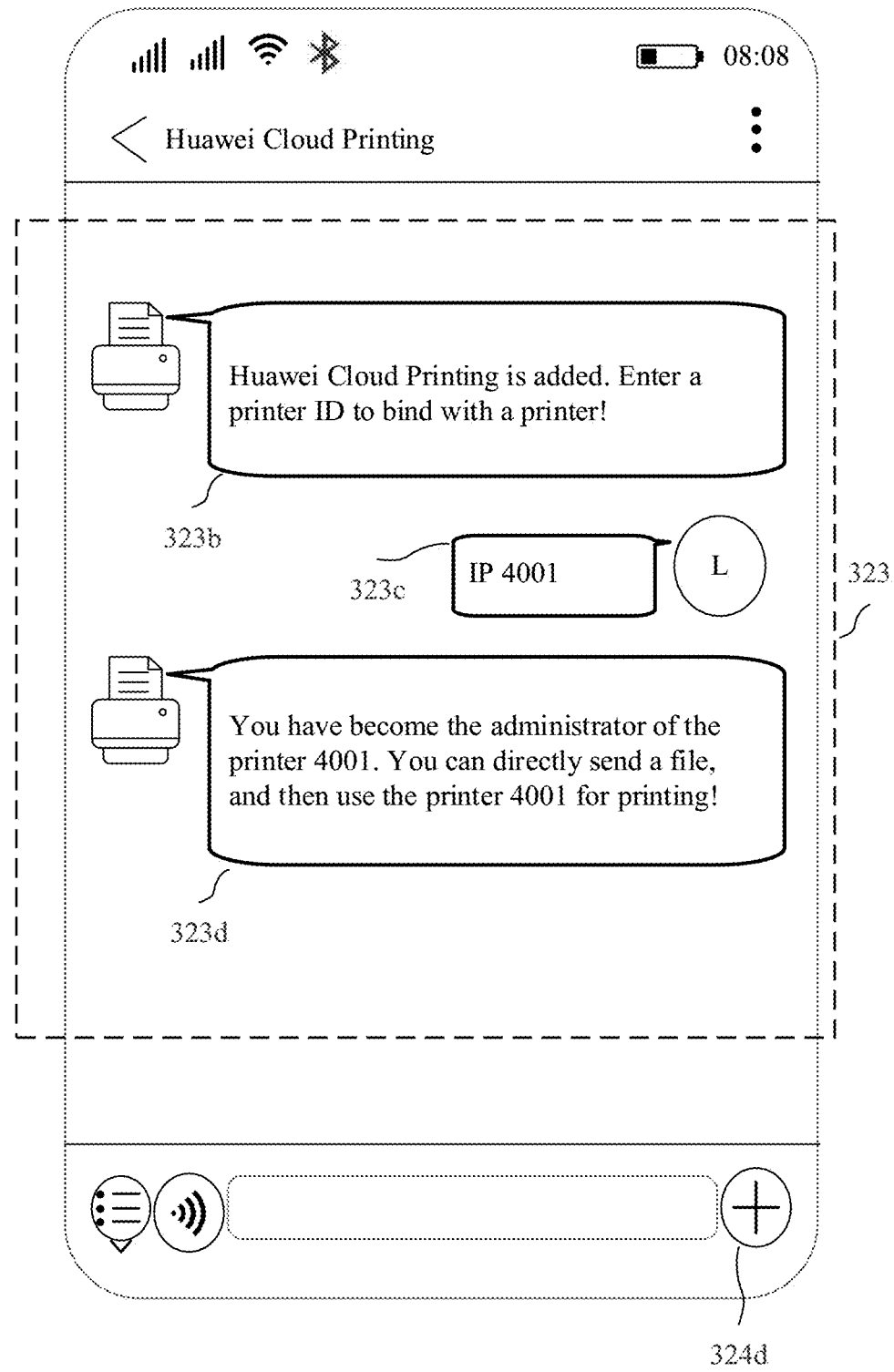

As shown in FIG. 4E, the user may bind user Lisa to the printer 4001 by sending the device ID (for example, "IP 4001") of the printer 4001 to the contact server 3001 (namely, HUAWEI Cloud Printing). Herein, the user may learn the device ID of the printer 4001 based on the device ID of the printer 4001 directly displayed by the printer 4001, or from the specification delivered with the printer 4001. For interaction performed between the server 2001, the server 3001, and the printer 4001 when user Lisa is bound with the printer, refer to related descriptions in FIG. 3A to FIG. 3H. Details are not described again.

FIG. 5A to FIG. 5I show user interfaces displayed when another user Anna adds the server 3001 as a contact and is bound with the printer 4001 after user Lisa becomes the administrator of the printer 4001.

Figure 5A:
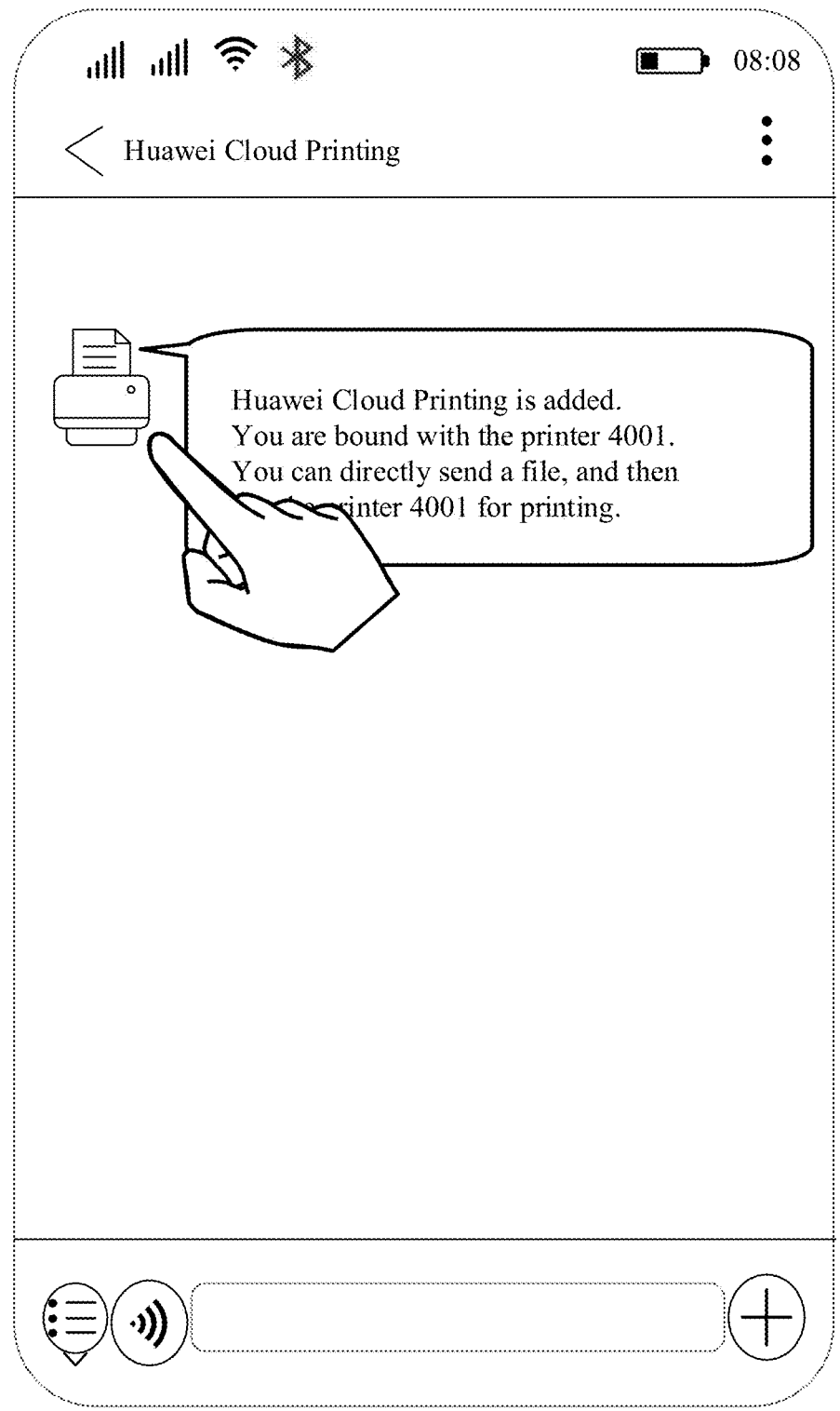
Figure 5B:
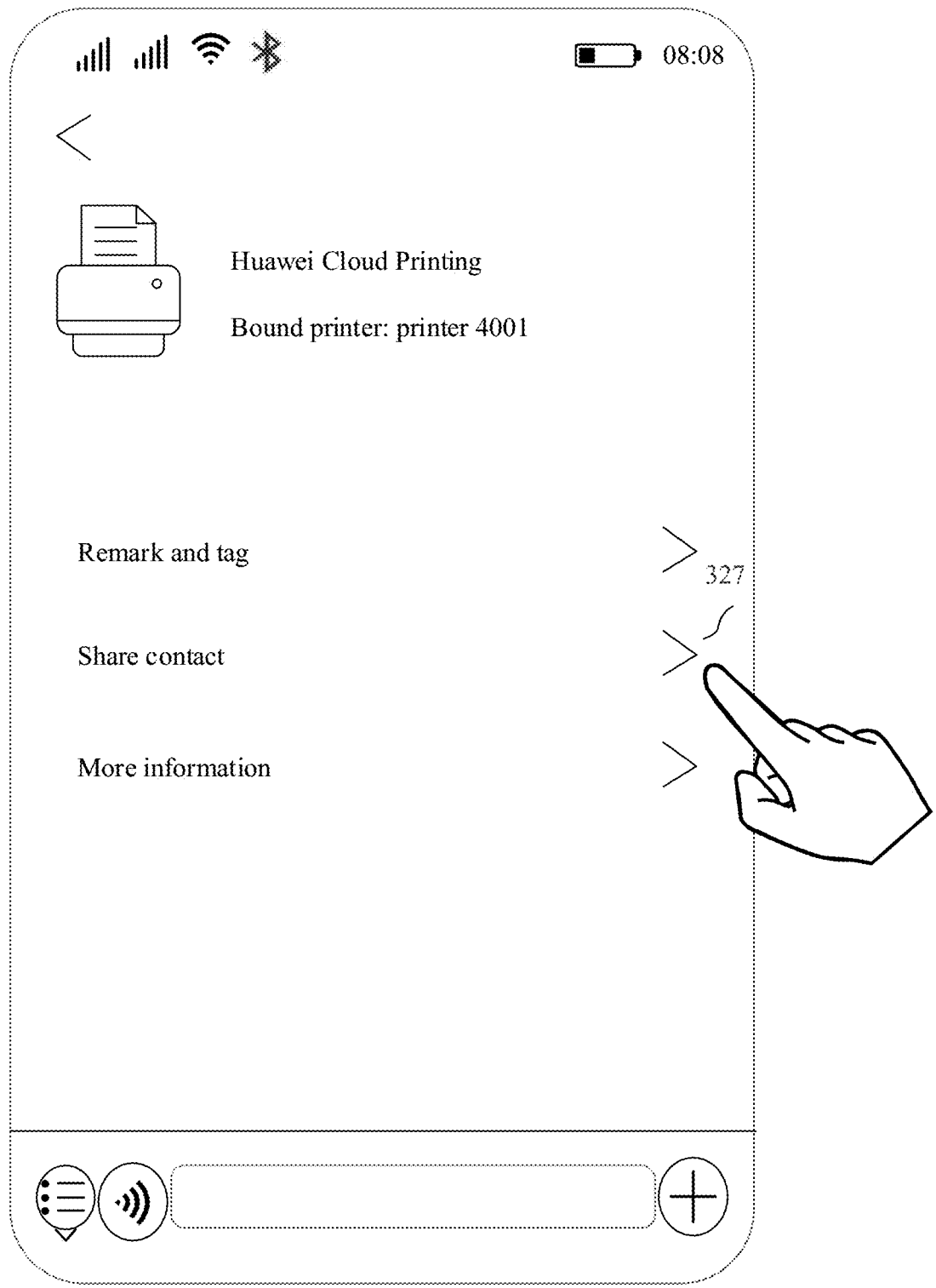
Figure 5C:
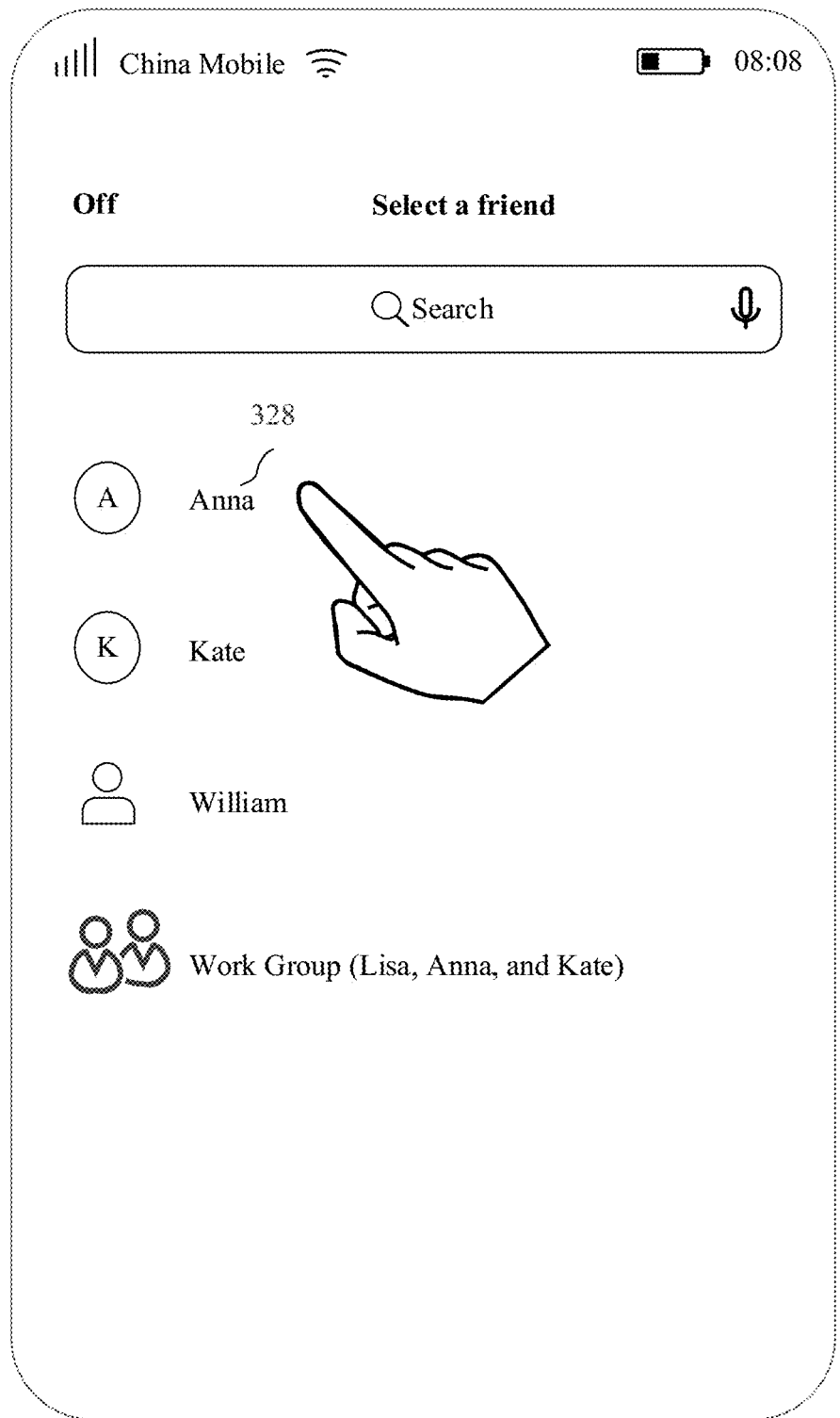
Figure 5D:
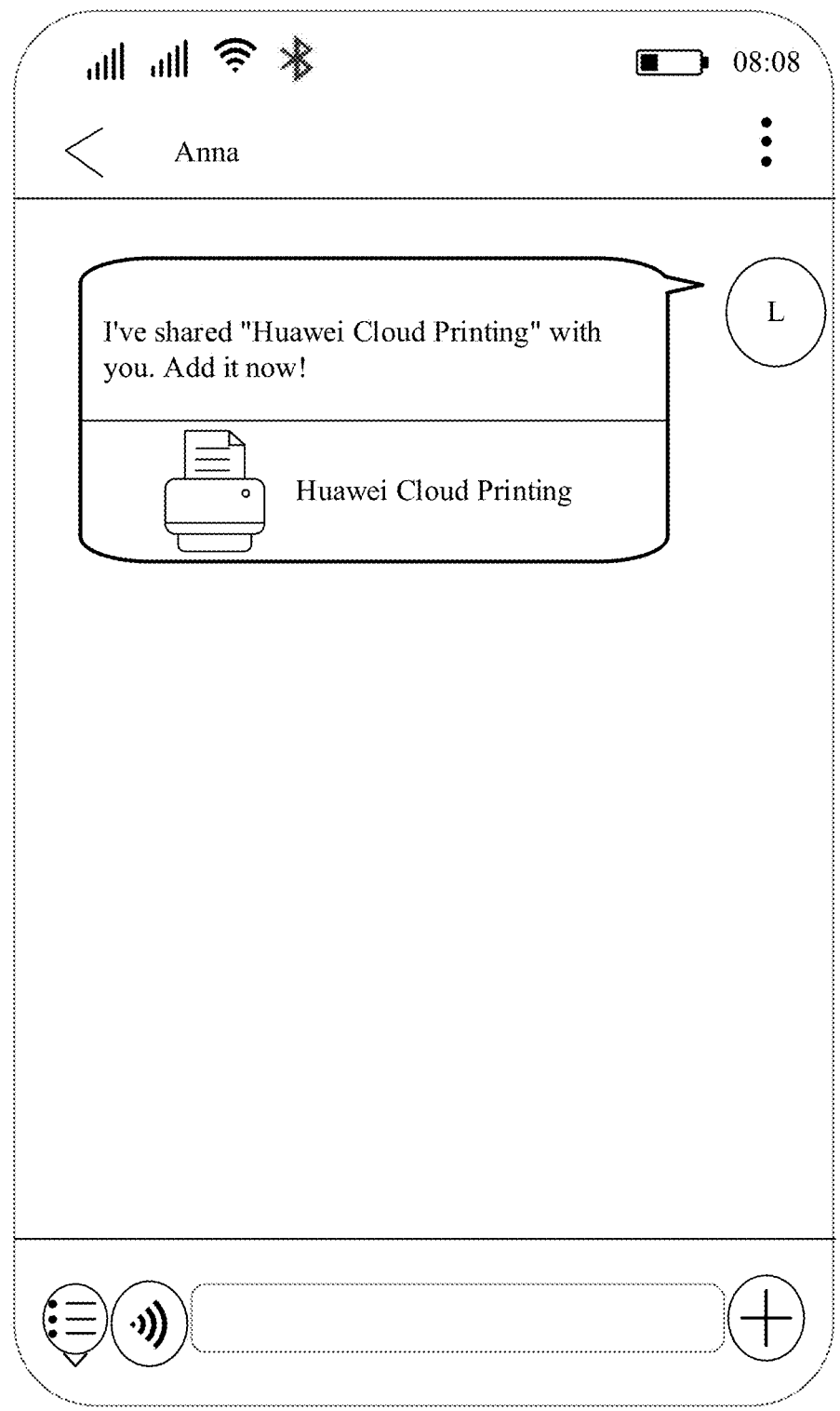
Figure 5E:
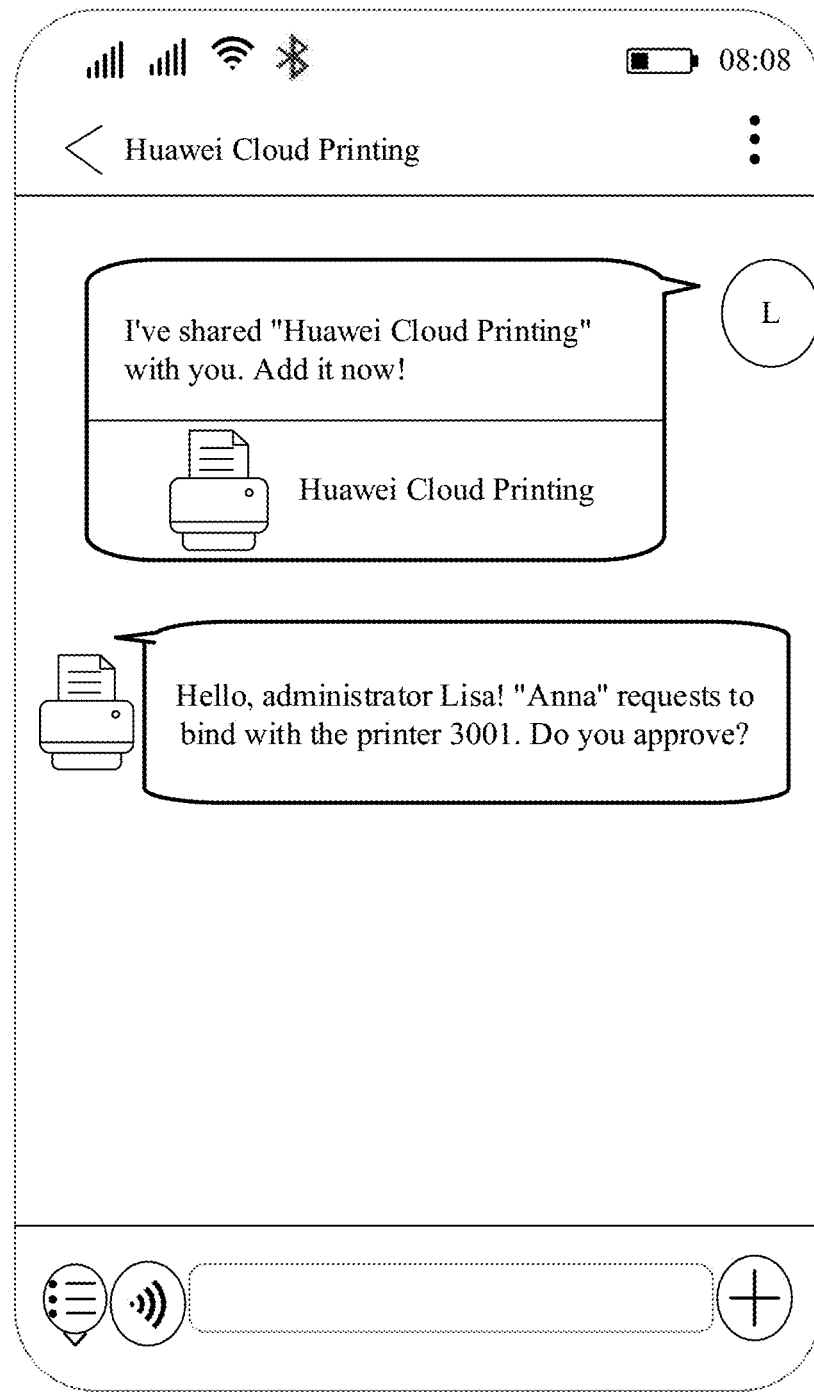
Figure 5F:
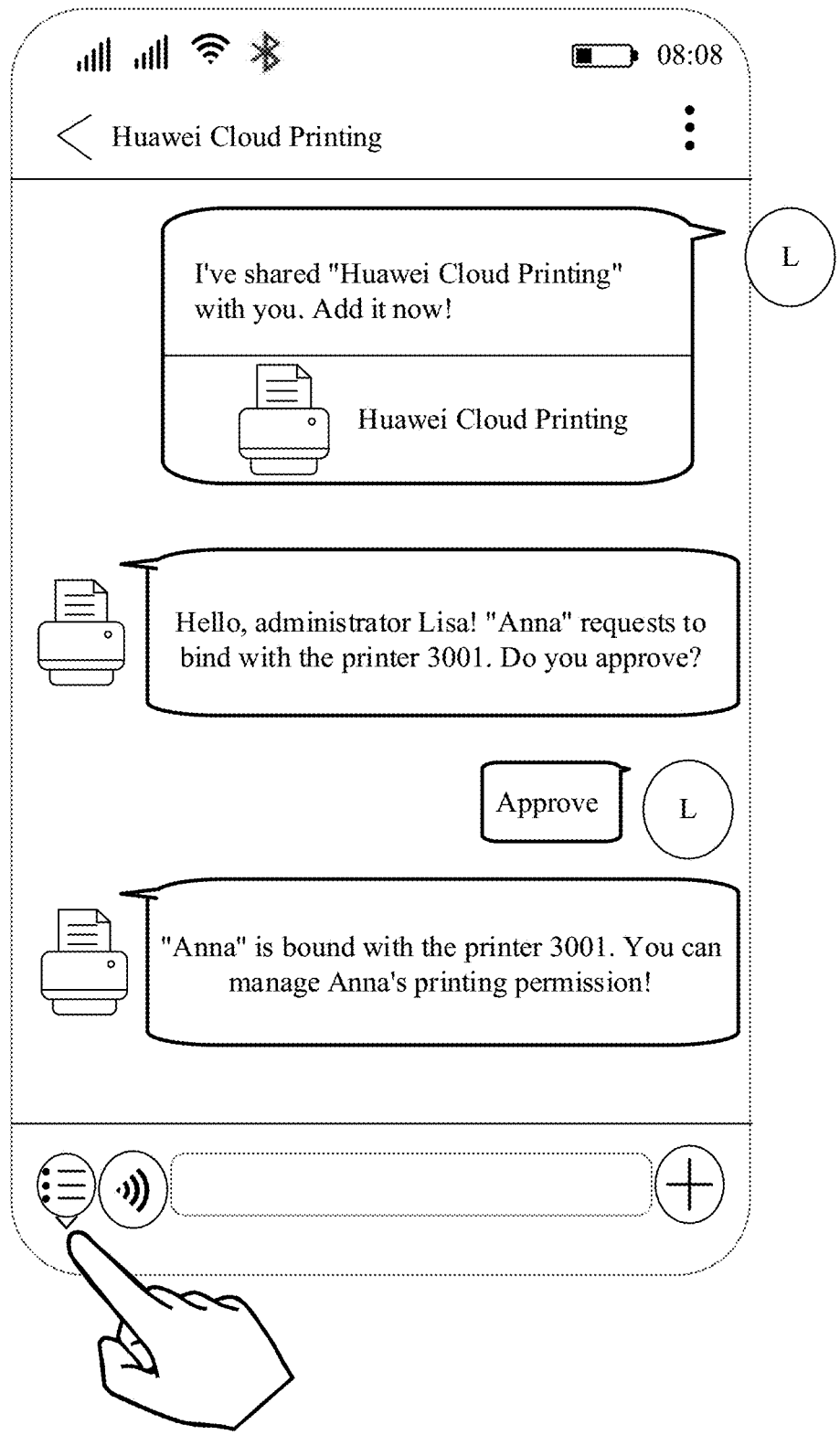
Figure 5G:
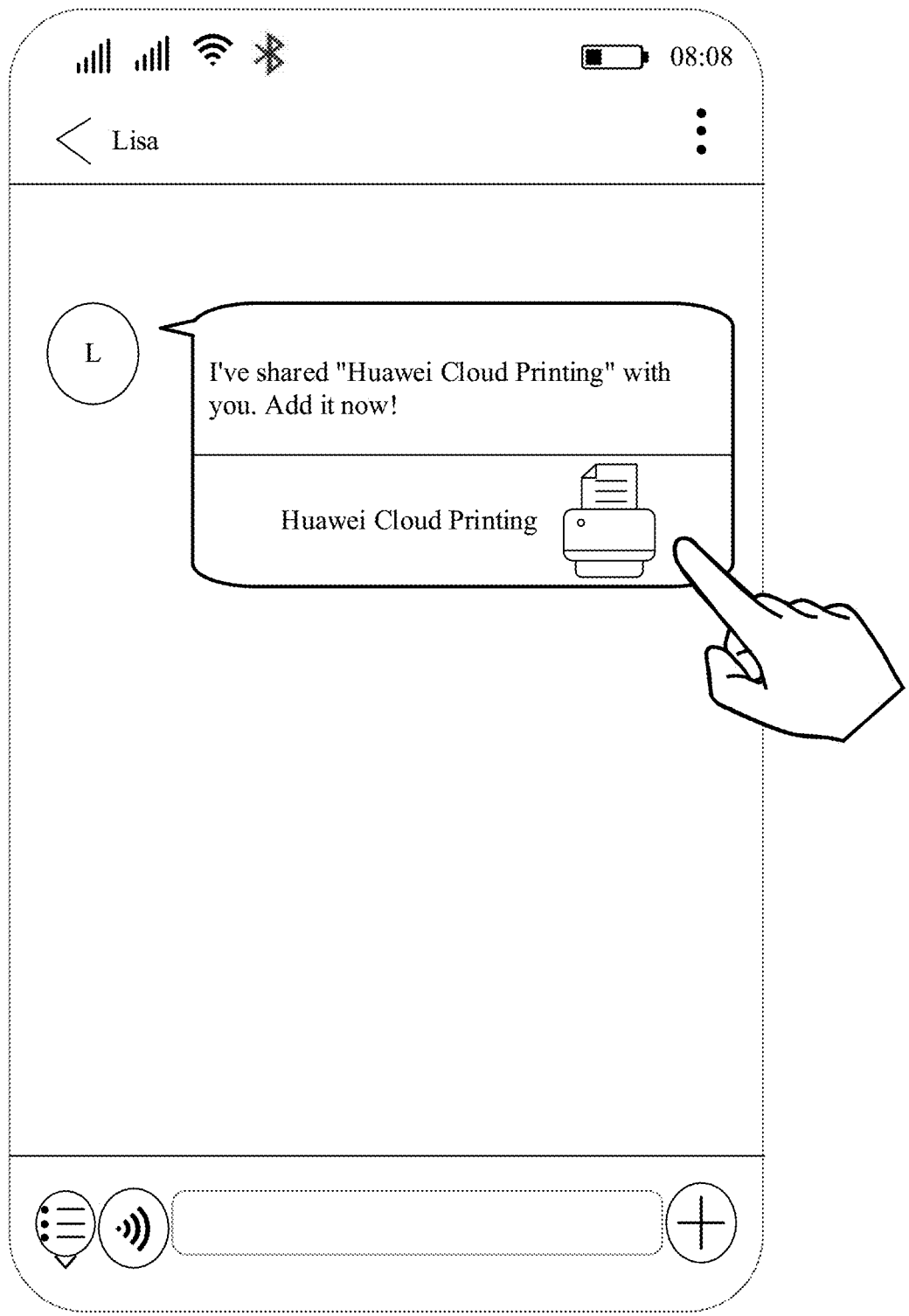
Figure 5H:
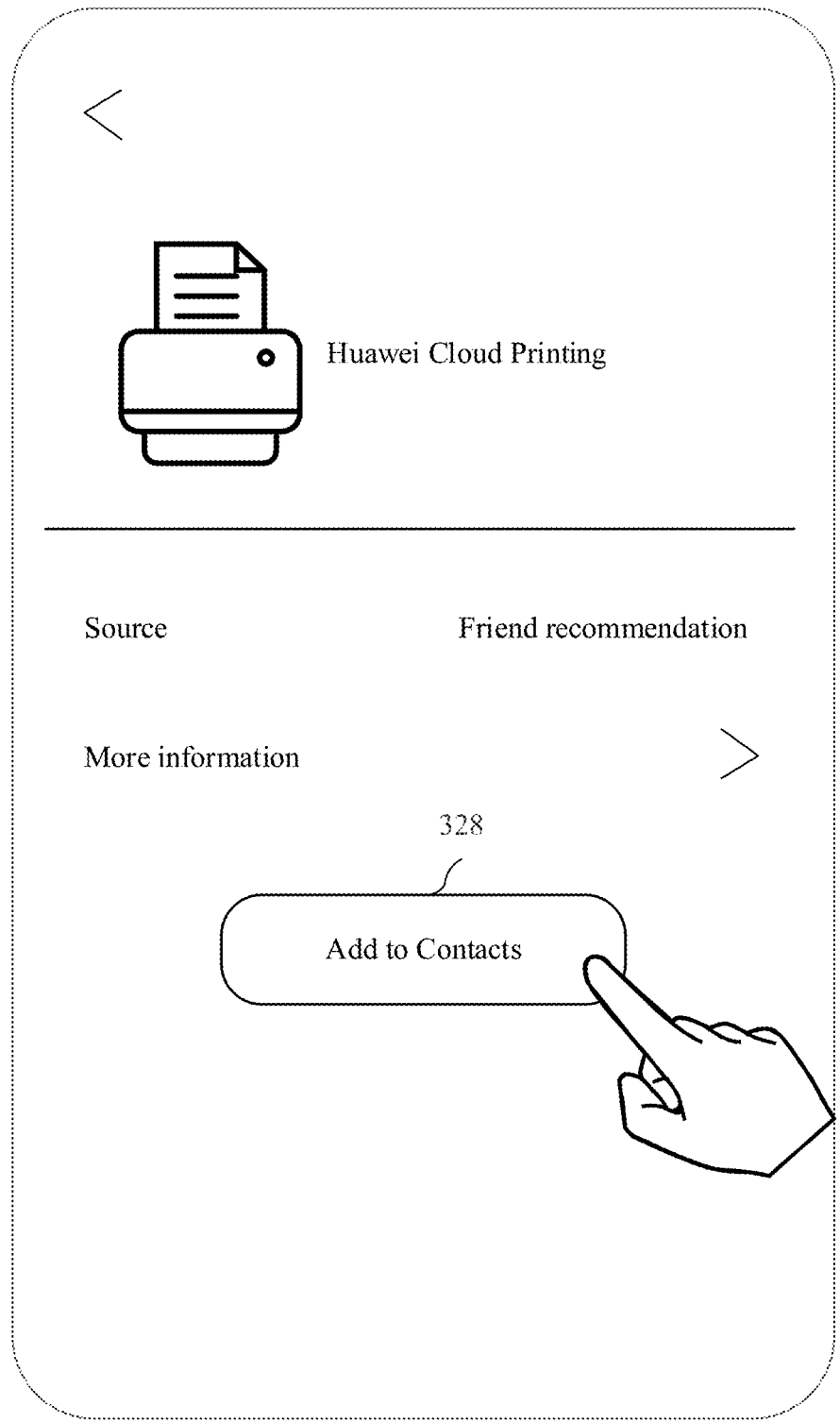
Figure 5I:
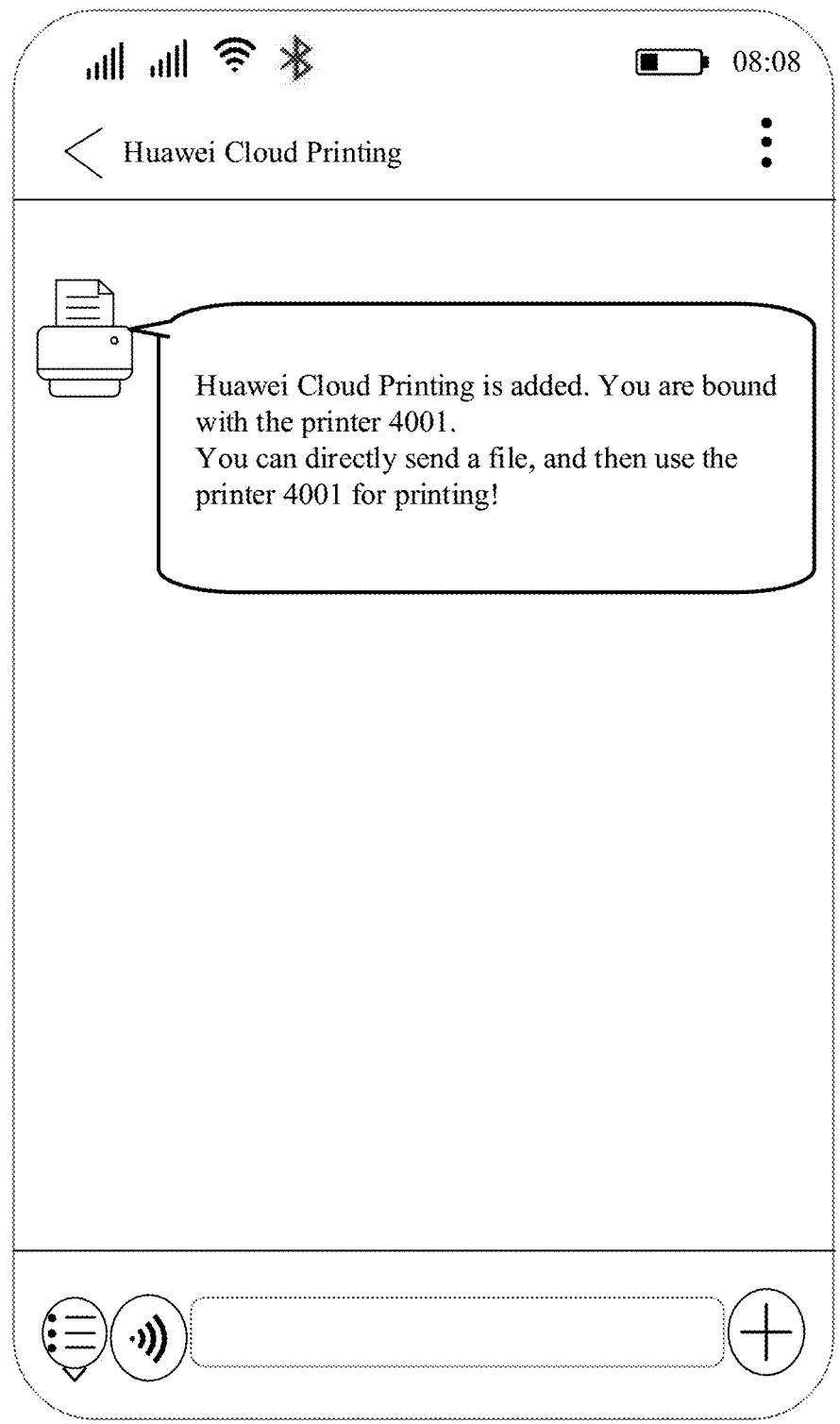

FIG. 5A to FIG. 5F are user interfaces implemented on the electronic device 1001, and FIG. 5G to FIG. 5I show user interfaces implemented on the electronic device 1002.

For a user interface 37 shown in FIG. 5A, refer to related descriptions of FIG. 3H.

As shown in FIG. 5A, the electronic device 1001 may detect a user operation performed on a printer icon, and display, in response to the user operation, a user interface 39 shown in FIG. 5B.

As shown in FIG. 5B, the user interface 39 displays related information of the server 3001 (that is, HUAWEI Cloud Printing), for example, a binding relationship between user Lisa and the printer 4001. The electronic device 100 may detect a user operation performed on a control 327, and display a user interface 40 shown in FIG. 5C in response to the user operation.

One or more contact options of user Lisa are displayed in the user interface 40. The electronic device 1001 may detect a user operation performed on the contact Anna, and in response to the user operation, send a sharing message to a device associated with the contact Anna (that is, the electronic device 1002) by using the server 2001, where the sharing message carries the instant messaging ID of the server 3001 and the device ID of the printer 4001.

FIG. 5D shows the user interface 37 displayed after the electronic device 1001 sends the sharing message. The user interface 37 is similar to the user interface shown in FIG. 3H.

FIG. 5G shows a user interface 41 displayed after the electronic device 1002 receives the sharing message. The user interface 41 is configured to display a record of communication between user Anna and contact Lisa.

As shown in FIG. 5G, the electronic device 1002 may detect a user operation performed on the sharing message in the communication record, and display, in response to the user operation, a user interface 42 shown in FIG. 5H. The user interface 42 is similar to the user interface 35 shown in FIG. 3F.

As shown in FIG. 5H, the electronic device 1002 may detect a user operation performed on the control 328, and in response to the user operation, send a request for adding a contact and binding a printer to the server 2001.

After receiving the request for adding a contact and binding a printer, the server 2001 may send a request message to the electronic device 1001.

After receiving the request, the electronic device 1001 may display a user interface 37 shown in FIG. 5E, to query whether the administrator Lisa of the printer 4001 approves to grant the usage permission for the printer 4001 to contact Anna. After user Lisa enters an approval operation (for example, enter a text "approve") on the electronic device 1001, the electronic device 1001 may display a user interface 37 shown in FIG. 5F, to indicate that currently Anna obtains normal permission for the printer 4001. The electronic device 1001 may further send, to the server 2001, a message indicating that user Lisa approves of binding Anna with the printer 4001. After receiving the message, the server 2001 may forward the message to the electronic device 1002.

FIG. 5I shows a user interface 43 displayed after the electronic device 1002 receives the message forwarded by the server 2001. The user interface 43 is similar to the user interface 37 shown in FIG. 3H. For details, refer to related descriptions.

In a process in which user Anna adds the server 3001 and becomes bound with the printer 4001, for operations performed by the server 3001 and the printer, refer to related descriptions in the UI embodiment shown in FIG. 3A to FIG. 3H. Details are not described again.

The following introduces user interfaces for managing a binding relationship between a user and the printer.

After a registered user of the instant messaging application adds a server contact and is bound with the printer, the user can manage the printer.

When a user is the administrator of the printer, the user may have permission for viewing a list of users who have usage permission for the printer, handing over the administrator identity to another user, unbinding the user from the printer, triggering the printer to perform a printing operation, and the like.

When a user is a normal user of the printer, the user may have permission for applying to become the administrator of the printer, unbinding the user from the printer, triggering the printer to perform printing, and the like.

For description, the following embodiments use an example in which user Lisa shown in Table 3 has the management permission for the printer 4001 and normal permission for the printer 4002.

FIG. 6A to FIG. 6F show user interfaces displayed when the associated user of the electronic device 1001 (namely, "Lisa") manages the printer bound with the associated user.

Figure 6A:
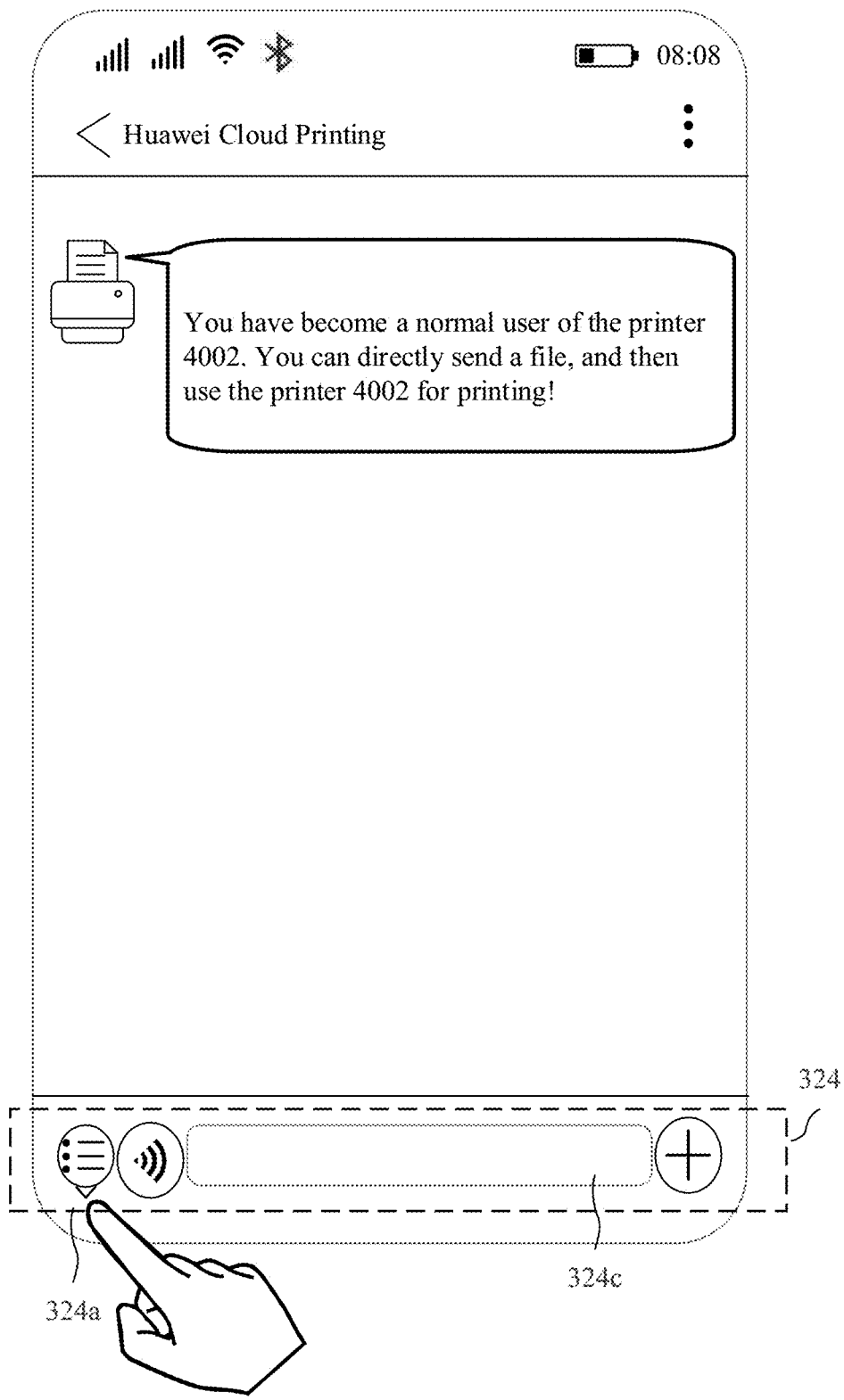
FIG. 6A, FIG. 6B, FIG. 6C, FIG. 6D, FIG. 6E, FIG. 6F, FIG. 7A, FIG. 7B, FIG. 7C, FIG. 8A, and FIG. 8B are a group of user interfaces for managing a binding relationship between a user and a printer according to an embodiment of this disclosure.
Figure 6B:
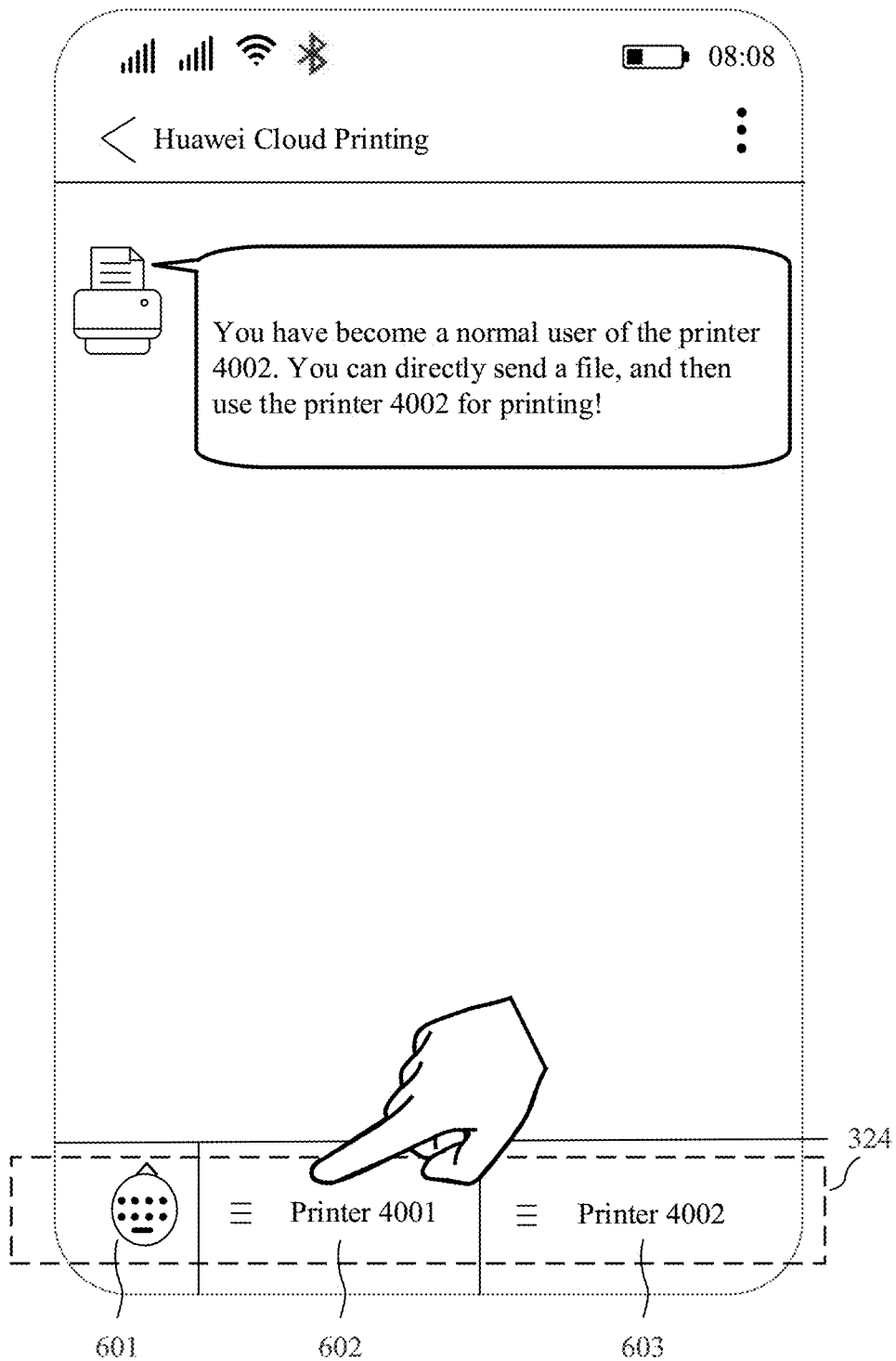
Figure 6C:
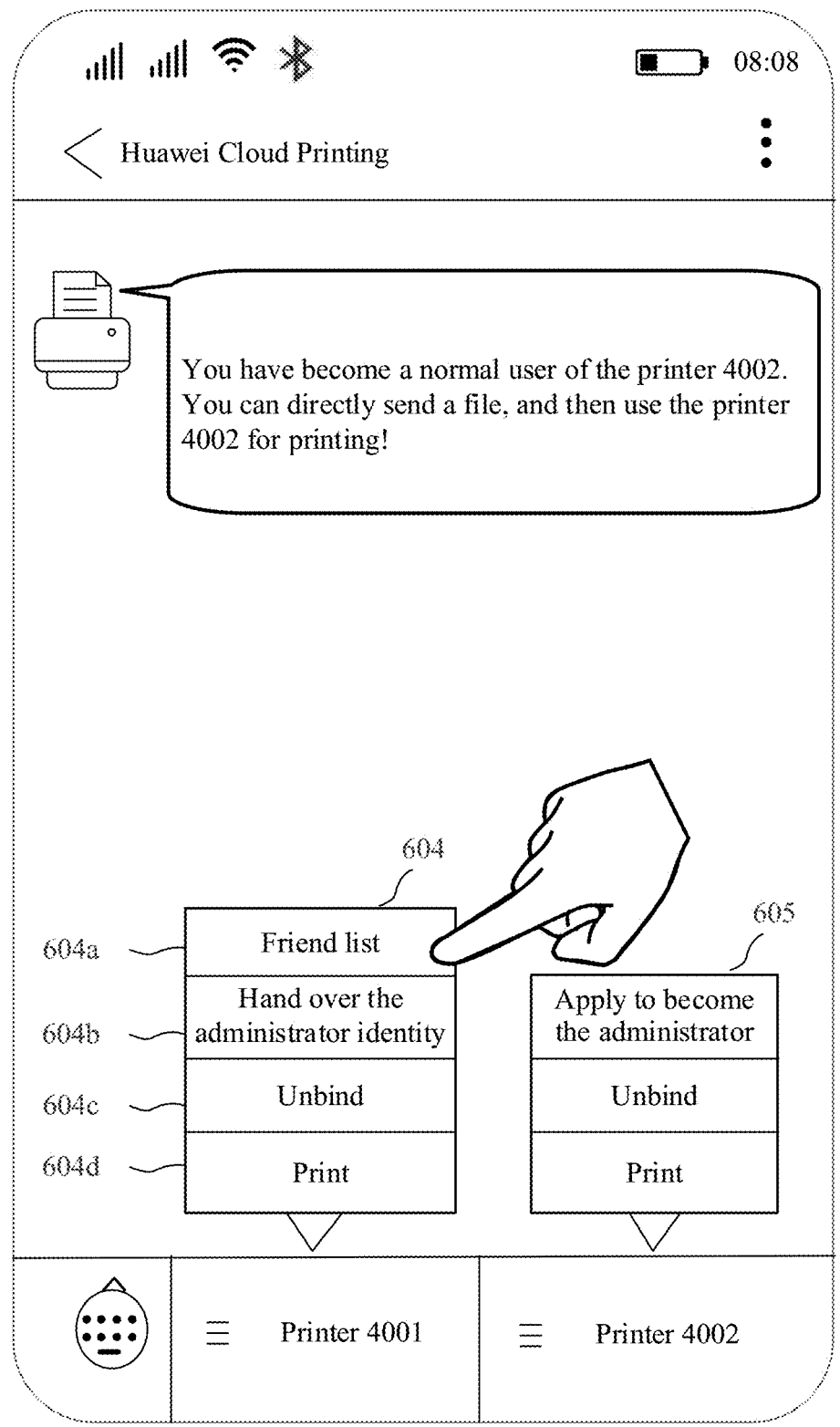
Figure 6D:
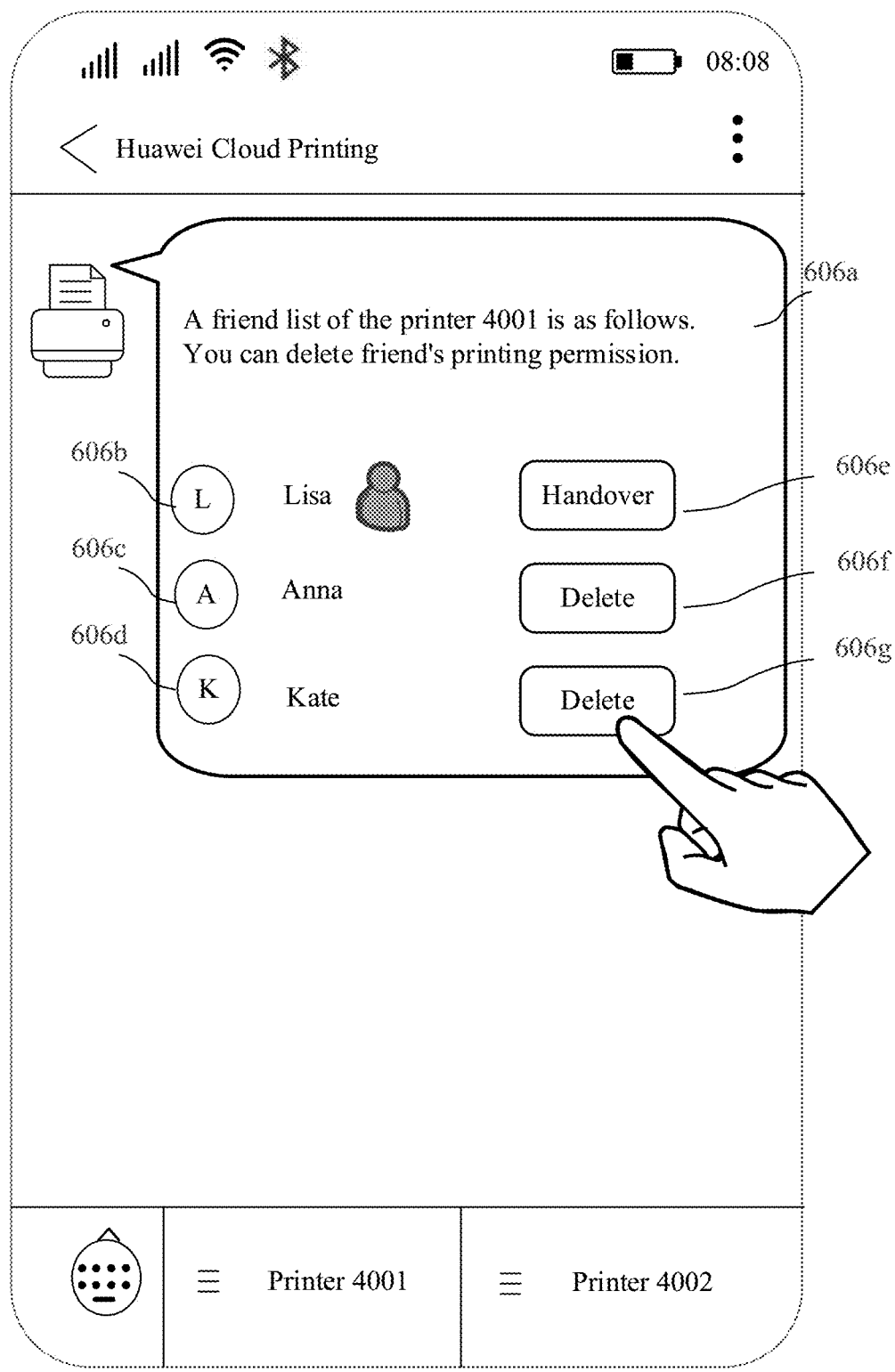
Figure 6E:
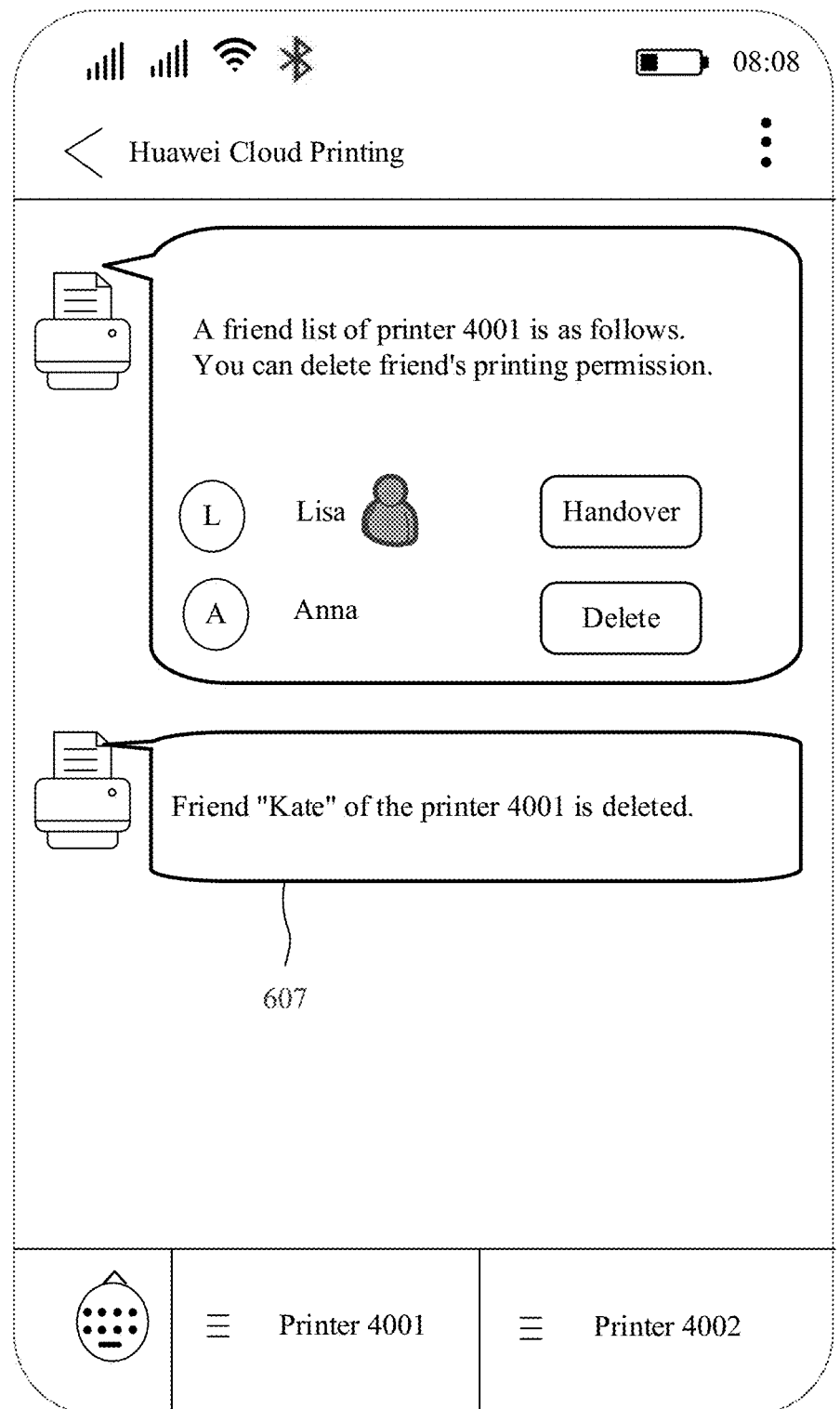
Figure 6F:
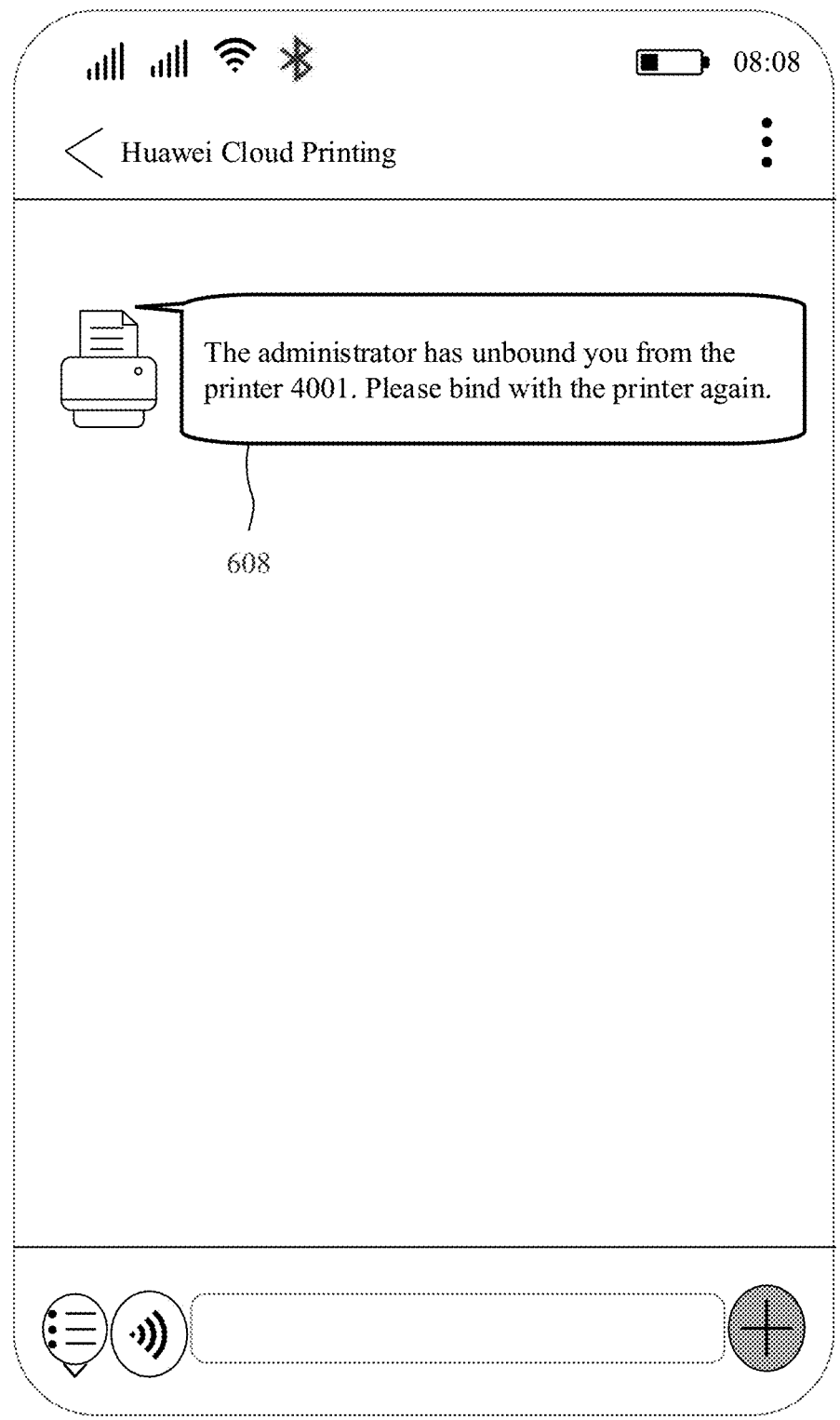

FIG. 6A to FIG. 6E are user interfaces implemented on the electronic device 1001, and FIG. 6F shows a user interface implemented on the electronic device 1003.

FIG. 6A shows a user interface 37 displayed by the electronic device 1001. For the user interface 37, refer to the user interface 37 shown in FIG. 3H. Details are not described herein again.

As shown in FIG. 6B, the electronic device 1001 may detect a user operation performed on the switch control 324a in FIG. 6A, and display, on the menu bar 324 in response to the user operation, a switch control 601 and management controls corresponding to printers managed by the server 3001 (namely, HUAWEI Cloud Printing) bound with user Lisa, for example, a management control 602 of the printer 4001 and a management control 603 of the printer 4002.

The switch control 601 is configured to monitor a user operation, and the electronic device 1001 may switch, in response to the user operation, the menu bar 324 into that shown in FIG. 6A.

The control 602 may monitor a user operation, and the electronic device 1001 may display, in response to the user operation, a window used to manage the printer 4001. The control 603 may monitor a user operation, and the electronic device 1001 may display, in response to the user operation, a window used to manage the printer 4002.

FIG. 6C shows a window 604 that is used to manage the printer 4001 and that is displayed after the electronic device 1001 detects a user operation performed on the control 602 in FIG. 6B. FIG. 6C further shows a window 605 that is used to manage the printer 4002 and that is displayed after the electronic device 1001 detects a user operation performed on the control 603 in FIG. 6B. It may be understood that FIG. 6C is merely an example, and the window 604 and the window 605 usually do not appear simultaneously.

When user Lisa is the normal user of the printer 4002, the window 605 may be used by the user to apply to become the administrator of the printer 4002, unbind user Lisa from the printer 4002, select the printer 4002 to perform printing, and the like.

When user Lisa is the administrator of the printer 4001, the window 604 can be used for the user to view a list of users who have the usage permission for the printer 4001, hand over the administrator identity to another user, unbind user Lisa from the printer 4001, select the printer 4001 to perform printing, and the like.

As shown in FIG. 6C, the window 604 may include controls 604a to 604d. The control 604a is configured to view the list of users who have usage permission for the printer 4001. The control 604b is configured to hand over the administrator identity of user Lisa to another user. The control 604c is configured to unbind user Lisa from the printer 4001. The control 604d is configured to select the printer 4001 to perform printing.

For example, as shown in FIG. 6C, the electronic device 1001 may detect a user operation performed on the control element 604a. In response to the user operation, the electronic device 1001 obtains a list of instant messaging IDs of the users who have the usage permission for the printer 4001. The list is obtained by the electronic device 1001 from the server 3001 by using the server 2001.

FIG. 6D shows a user interface 37 displayed after the electronic device 1001 obtains the list of instant messaging IDs of the users having the usage permission for the printer 4001.

As shown in FIG. 6D, the user interface 37 displays prompt information 606a, instant messaging IDs, for example, 606b to 606d, of the users having the usage permission for the printer 4001, and controls 606e to 606g. The prompt information 606a may be a prompt for the user about a manner of managing the printer 4001. It can be learned from 606b to 606d that the users who have the usage permission for the printer 4001 include Lisa, Anna, and Kate. In some embodiments, a prompt icon (for example, an administrator icon in FIG. 6D) may be displayed next to an instant messaging ID of the administrator, to prompt which user is the administrator of the printer 4001. The control 606e may be used to hand over the administrator identity of user Lisa for the printer 4001. The control 606f may be configured to unbind user Anna from the printer 4001, that is, revoke the usage permission of user Anna for the printer 4001. The control 606g may be configured to unbind user Kate from the printer 4001, that is, revoke the usage permission of user Kate for the printer 4001.

FIG. 6E shows a user interface displayed after the electronic device 1001 detects a user operation performed on the control 606g shown in FIG. 6D. Further, after detecting a user operation performed on the control 606g shown in FIG. 6D, the electronic device 1001 sends, to the server 3001 by using the server 2001, a request for unbinding user Kate from the printer 4001. After receiving the request, the server 3001 may unbind user Kate from the printer 4001. That is, the instant messaging ID of user Kate and the device ID of the printer 4001 are no longer stored and associated with each other by the server. The printer 4001, the electronic device 1001, and the electronic device 1003 that is associated with user Kate are notified of a processing result.

After the printer 4001 receives the processing result, the device ID of the printer 4001 and the instant messaging ID of user Kate are no longer stored and associated with each other by the printer 4001.

After receiving the processing result, the electronic device 1001 may display a user interface shown in FIG. 6E. The prompt information 607 in FIG. 6E may be used to prompt user Lisa that a binding relationship between the current user Kate and the printer 4001 is canceled.

FIG. 6F shows a user interface 61 displayed after the electronic device 1003 receives the processing result. The user interface 61 is configured to display a record of communication between the associated user Kate of the electronic device 1003 and the server 3001 (namely, HUAWEI Cloud Printing). As shown in FIG. 6F, the user interface 61 displays prompt information 608. The prompt information 608 is used to prompt user Kate that the binding relationship with the printer 4001 is canceled currently.

Figure 7A:
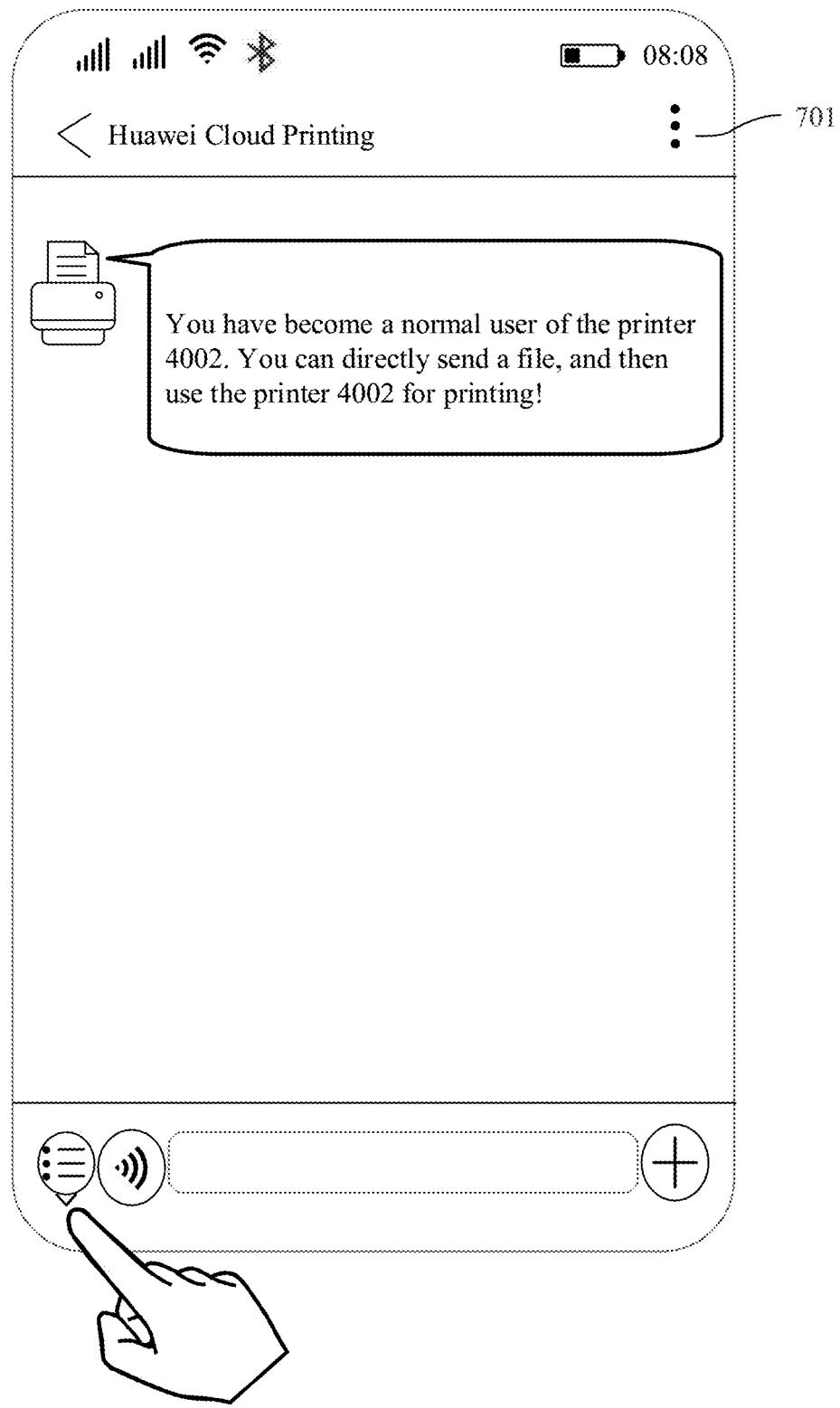
Figure 7B:
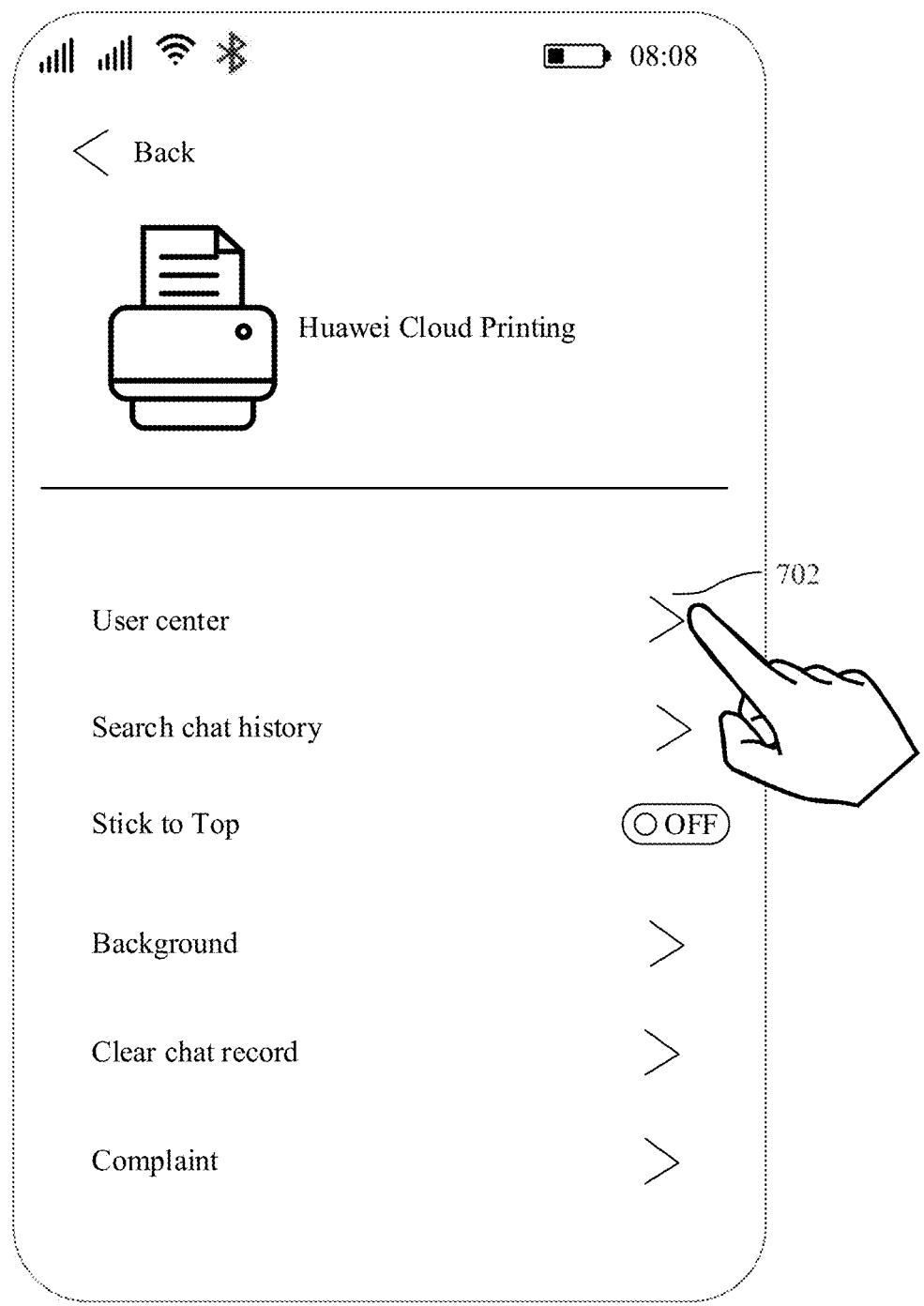
Figure 7C:
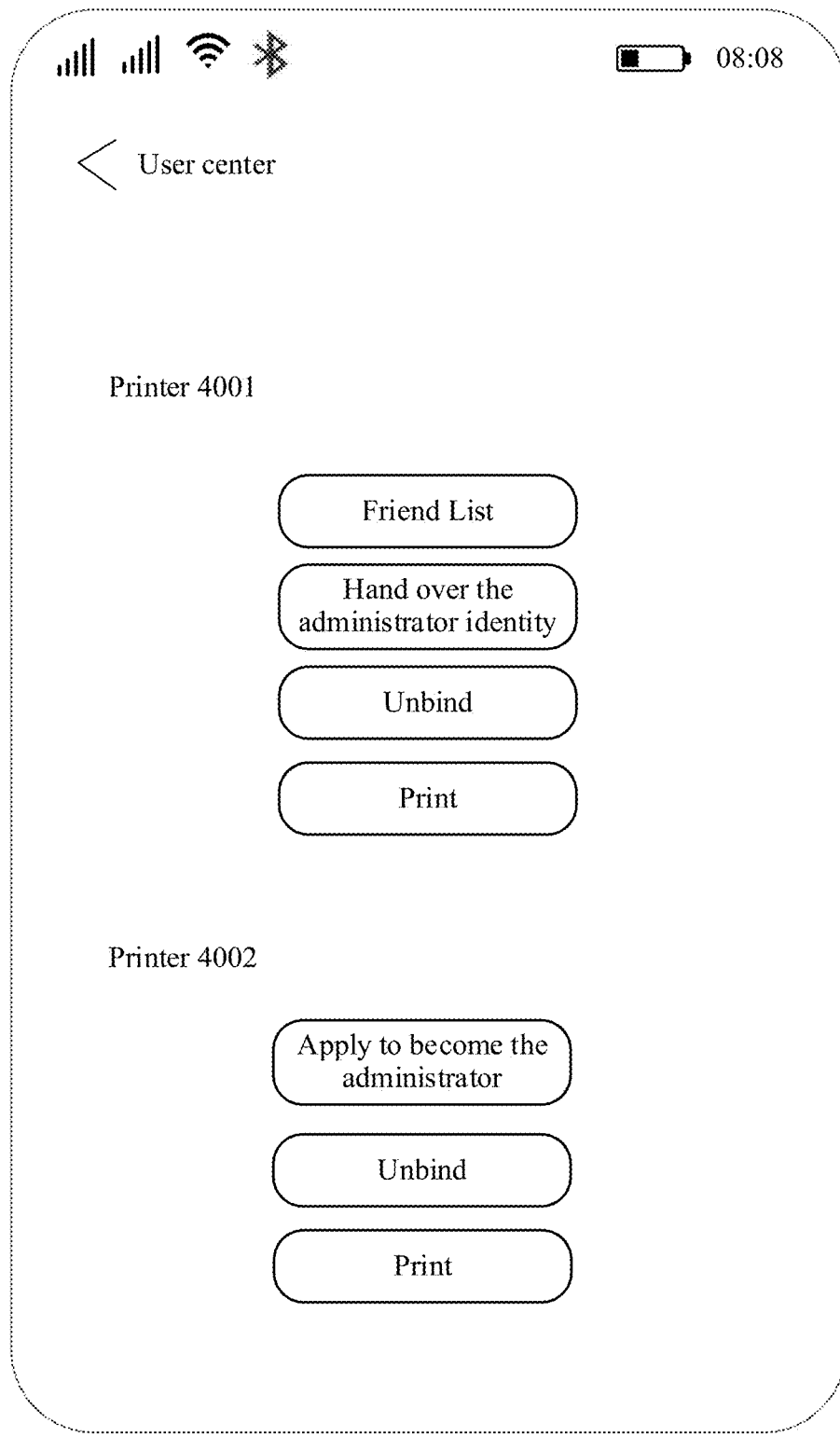

FIG. 7A to FIG. 7C show user interfaces displayed when the associated user of the electronic device 1001 (namely, "Lisa") manages the printer bound with the associated user.

FIG. 7A to FIG. 7C are user interfaces implemented on the electronic device 1001.

FIG. 7A shows a user interface 37 displayed by the electronic device 1001. For the user interface 37, refer to the user interface 37 shown in FIG. 3H. Details are not described herein again.

As shown in FIG. 7A, the user interface 37 displays a control 701. The control 701 may be configured to monitor a user operation. In response to the user operation, the electronic device 1001 may display a user interface 71 shown in FIG. 7B.

As shown in FIG. 7B, the user interface 71 displays a control 702. The control 702 may be configured to monitor a user operation. In response to the user operation, the electronic device 1001 may display a user interface 72 shown in FIG. 7C.

The user interface 72 may be used by user Lisa to manage the printer bound with user Lisa. As shown in FIG. 7C, the user interface 72 includes only a plurality of controls used to manage the printer 4001, and a plurality of controls used to manage the printer 4002. A function of each control in the user interface 72 is the same as a function of each control in the window 604 and the window 605 in FIG. 6C, and details are not described herein again.

Figure 8A:
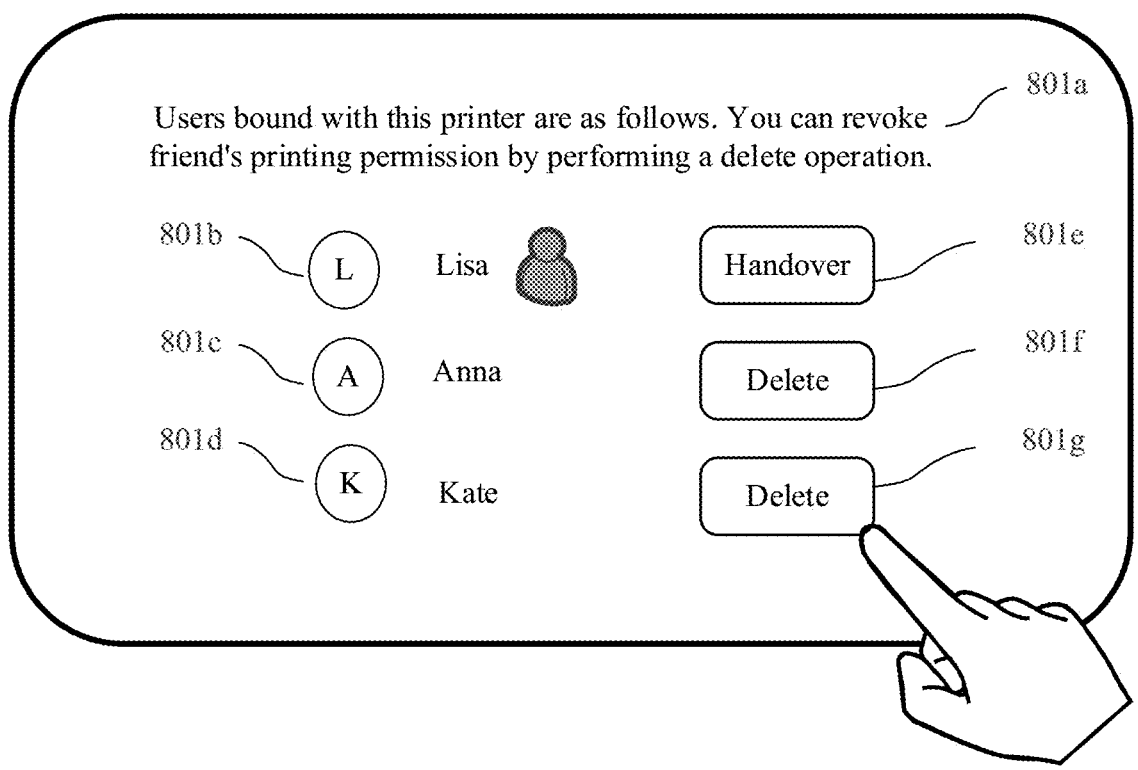
Figure 8B:
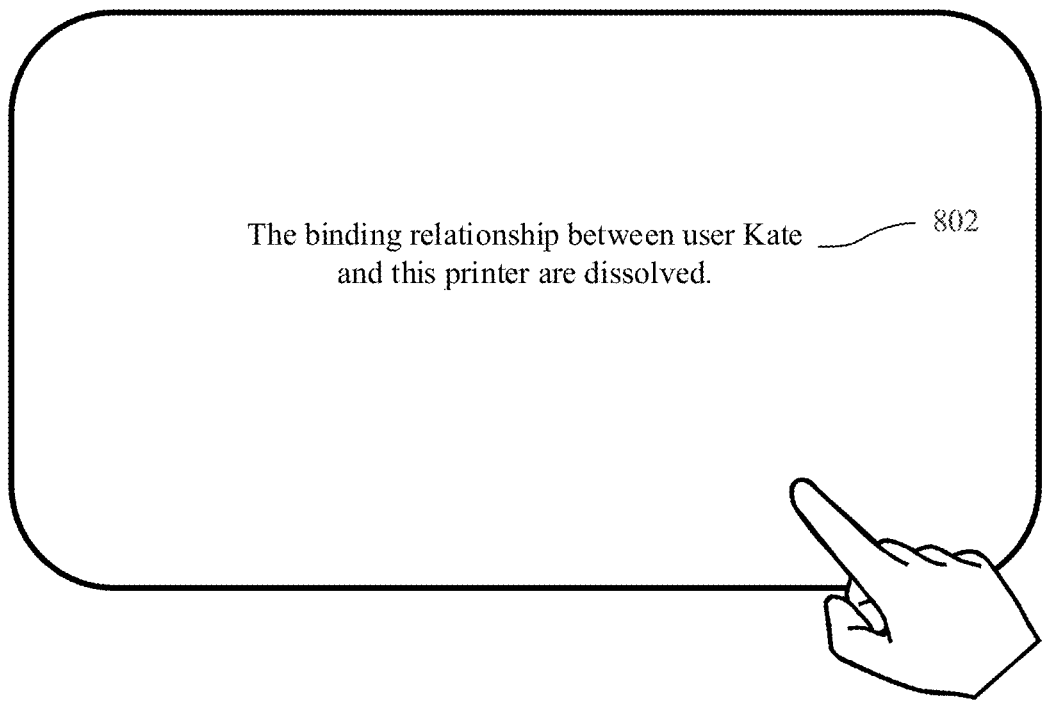

FIGS. 8A and 8B show user interfaces for managing a user bound with a printer on the printer.

FIGS. 8A and 8B are both user interfaces implemented on the printer 4001.

FIG. 8A shows a user interface 81 displayed by the printer 4001. The user interface 81 displays prompt information 801a, instant messaging IDs, for example, 801b to 801d, of users having usage permission for the printer 4001, and controls 801e to 801g. For the prompt information 801a, the IDs 801b to 801d, and the controls 801e to 801g, refer to the prompt information 606a, the IDs 606b to 606d, and the controls 606e to 606g in FIG. 6D. Details are not described herein again.

FIG. 8B shows a user interface 82 displayed after the printer 4001 detects an operation on the control 801g in FIG. 8A. The user interface 82 displays prompt information 802. The prompt information 802 may be used to notify a user that the binding relationship between the current user Kate and the printer 4001 is canceled.

It can be learned from the embodiments in FIG. 6A to FIG. 6F, FIG. 7A to FIG. 7C, and FIG. 8A and FIG. 8B that a user may manage a binding relationship between each instant messaging user and a printer on an electronic device or the printer. When a user is bound with the printer, a binding relationship is stored in a server providing the printing service and the printer, and the user has usage permission for the printer. When a user is unbound from the printer or is not bound with the printer, a binding relationship between the user and the printer is not stored in the server providing the printing service and the printer, and the user does not have usage permission for the printer.

The manners shown in FIG. 6A to FIG. 6F, FIG. 7A to FIG. 7C, and FIG. 8A and FIG. 8B are merely examples. During specific implementation, the binding relationship between the user and the printer may be managed in another manner. This is not limited in this embodiment of this disclosure. For example, the user may directly enter a text "friend list of the printer 4001" in the text box in FIG. 6A, to trigger the electronic device 1001 to obtain the list of the users having the usage permission for the printer 4001.

Finally, user interfaces for sharing a file to a printer for printing are introduced.

In this embodiment of this disclosure, a user may share a file to the printer for printing in the following several manners, which are described below.

1. A user can send a file to a server contact to directly trigger a printer bound with the user to print the file.

FIG. 9A to FIG. 9L show user interfaces in which the user first selects a server contact and then selects a file for sharing.

Figure 9A:
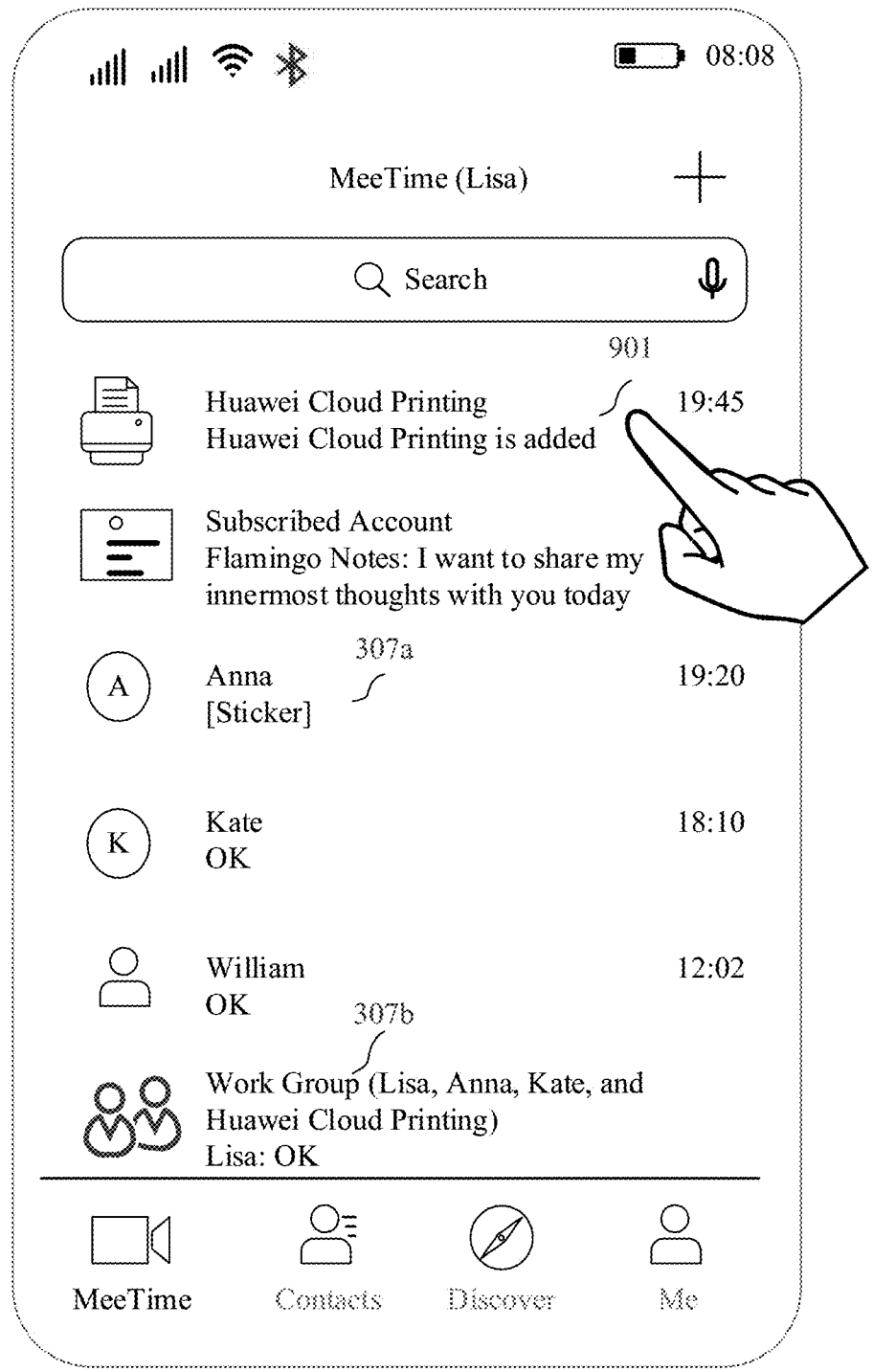
FIG. 9A, FIG. 9B, FIG. 9C, FIG. 9D, FIG. 9E, FIG. 9F, FIG. 9G, FIG. 9H, FIG. 9I, FIG. 9J, FIG. 9K, FIG. 9L, FIG. 10A, FIG. 10B, FIG. 10C, FIG. 11A, FIG. 11B, FIG. 11C, FIG. 11D, FIG. 11E, FIG. 12A, FIG. 12B, FIG. 12C, FIG. 12D, FIG. 12E, FIG. 12F, and FIG. 12G are a group of user interfaces used for sharing data according to an embodiment of this disclosure.

FIG. 9A shows a user interface 32 displayed by the electronic device 1001. The user interface 32 is configured to display one or more contact options of user Lisa in an instant messaging application (for example, "MeeTime"). For, details, refer to related descriptions in FIG. 3B above.

As shown in FIG. 9A, after the server 3001 (namely, HUAWEI Cloud Printing) is added as a contact of user Lisa, a server option 901 is added to recent contact options. The user may further add the server 3001 (namely, HUAWEI Cloud Printing) into a group "Work Group", as shown by a group option 307b in FIG. 9A.

Figure 9B:
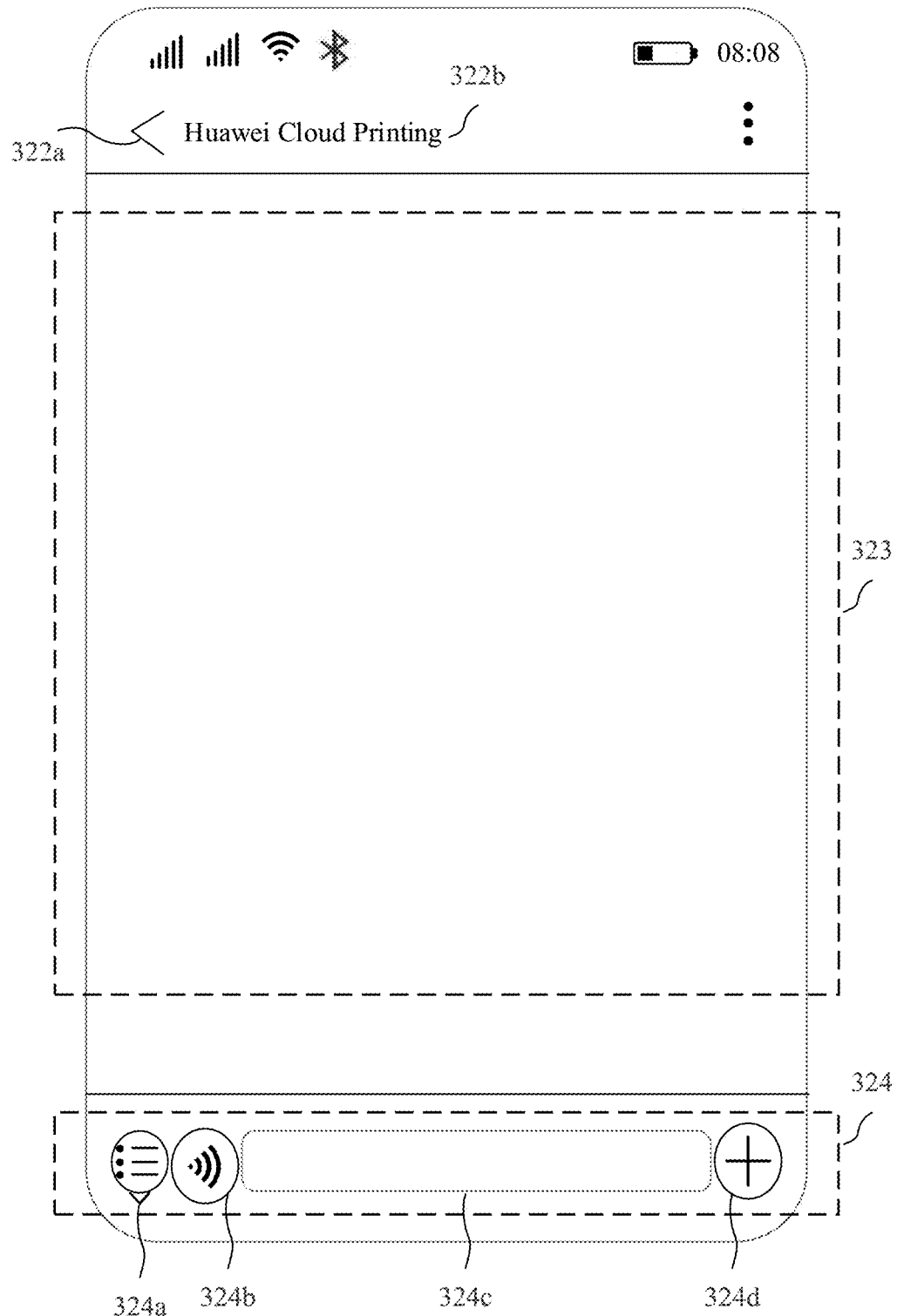

FIG. 9B shows a user interface 37 displayed by the electronic device 1001 in response to a user operation detected on the server option 901 shown in FIG. 9A. The user interface 37 is configured to display a record of communication between the associated user Lisa of the electronic device 1001 and the server 3001 (namely, HUAWEI Cloud Printing) corresponding to the server option 901. For the user interface 37, refer to related descriptions of FIG. 3H. Details are not described herein again.

Figure 9C:
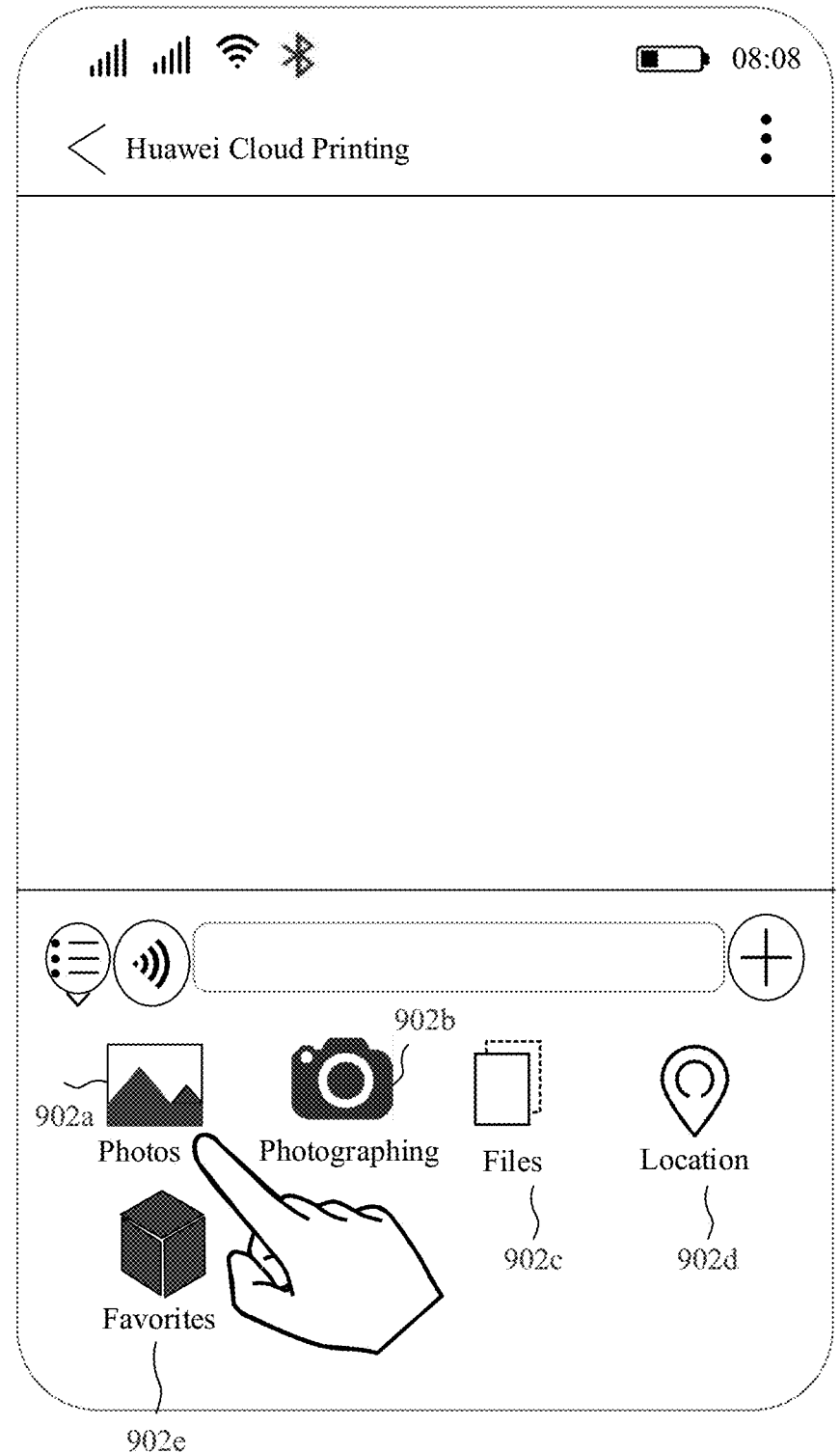

As shown in FIG. 9C, the electronic device 1001 may display more function service options in response to a user operation detected on a control 324d in FIG. 9B, for example, an option 902a used for picture sharing, an option 902b used for photographing, an option 902c used for file sharing, an option 902d used for location sharing, and an option 902e used for opening content in Favorites.

Figure 9D:
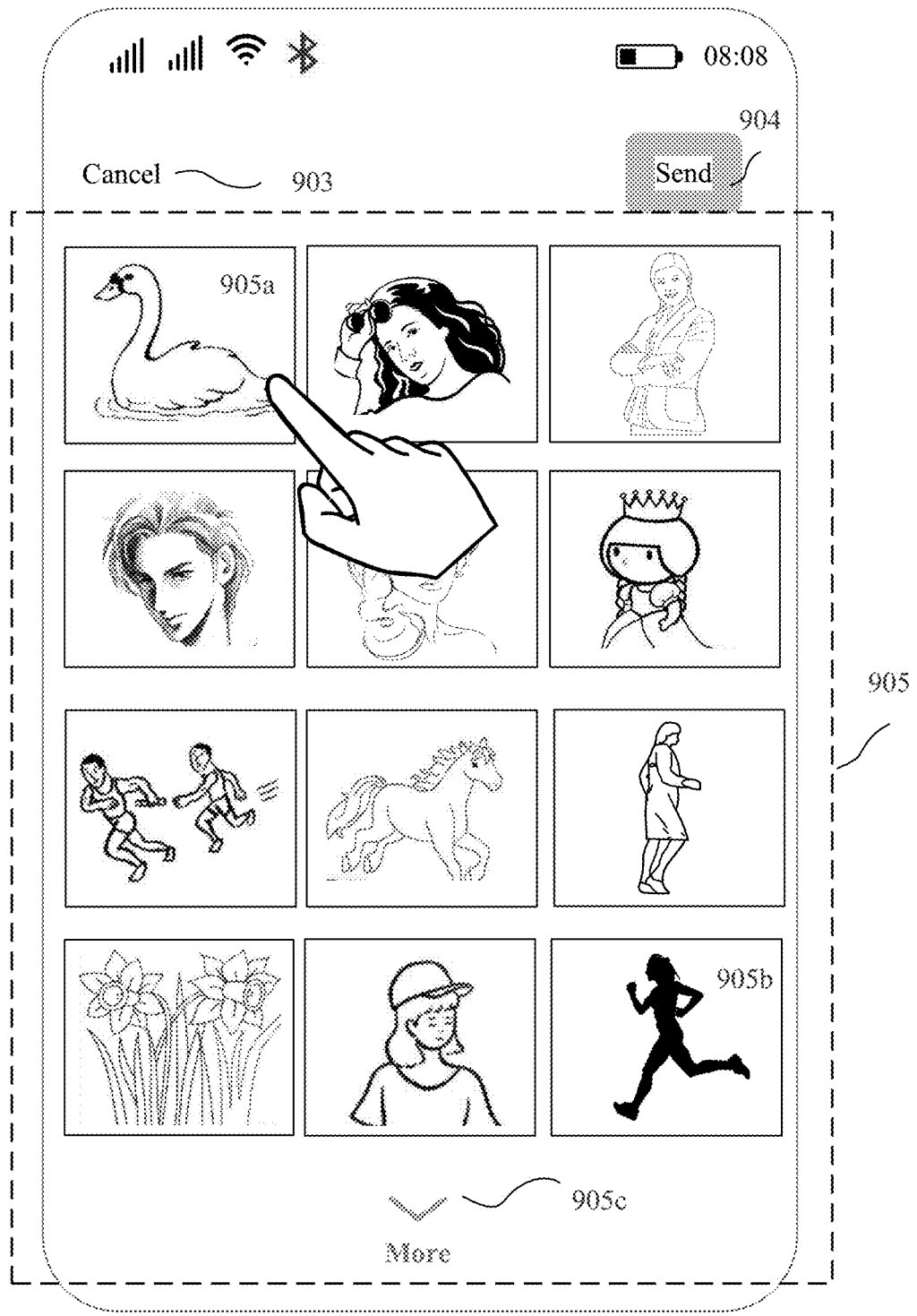

FIG. 9D shows a user interface 91 displayed by the electronic device 1001 in response to a user operation detected on the option 902a. The user interface 91 is configured to display one or more pictures stored in the electronic device 1001. As shown in FIG. 9D, a user interface 33 may include a status bar, a control 903, a control 904, and a picture area 905.

For the status bar, refer to the status bar in the user interface 31 in FIG. 3A.

The control 903 may be configured to monitor a user operation. In response to the user operation, the electronic device 1001 may display a user interface 37 shown in FIG. 9C.

The control 904 may be configured to monitor a user operation, and the electronic device 1001 may share, to the server 3001 in response to the user operation, a picture selected by the user in the picture area 905. In some embodiments, the control 904 can receive a user operation only after the user selects a picture in the picture area 905. Optionally, as shown in FIG. 9D, before the user selects a file in the picture area 905, the electronic device 1001 may add a shadow to the control 904, to notify the user that the control 904 cannot receive a user operation currently.

One or more picture thumbnails or names may be displayed in the picture area 905, for example, a picture thumbnail 905a or a picture thumbnail 905b. An original picture corresponding to a thumbnail of a picture may be stored in the electronic device 1001, or may be stored in a cloud server. When the electronic device 1001 detects an upward/downward/leftward/rightward slide operation in the picture area 905, the electronic device 1001 may update content displayed in the picture area 905, so that the user browses more picture thumbnails. This is not limited to a slide operation. The user may further tap a control 905c in the picture area 905, to browse more picture thumbnails.

As shown in FIG. 9D, the user may input a user operation in the picture area 905 to select a picture for sharing. The user operation may be a tap operation, a touch operation, a touch and hold operation, or the like performed on a picture thumbnail. For example, the user may tap a picture thumbnail 905a and a picture thumbnail 905b in the picture area 905, and select a corresponding picture as a picture to be shared to a printer for printing.

Figure 9E:
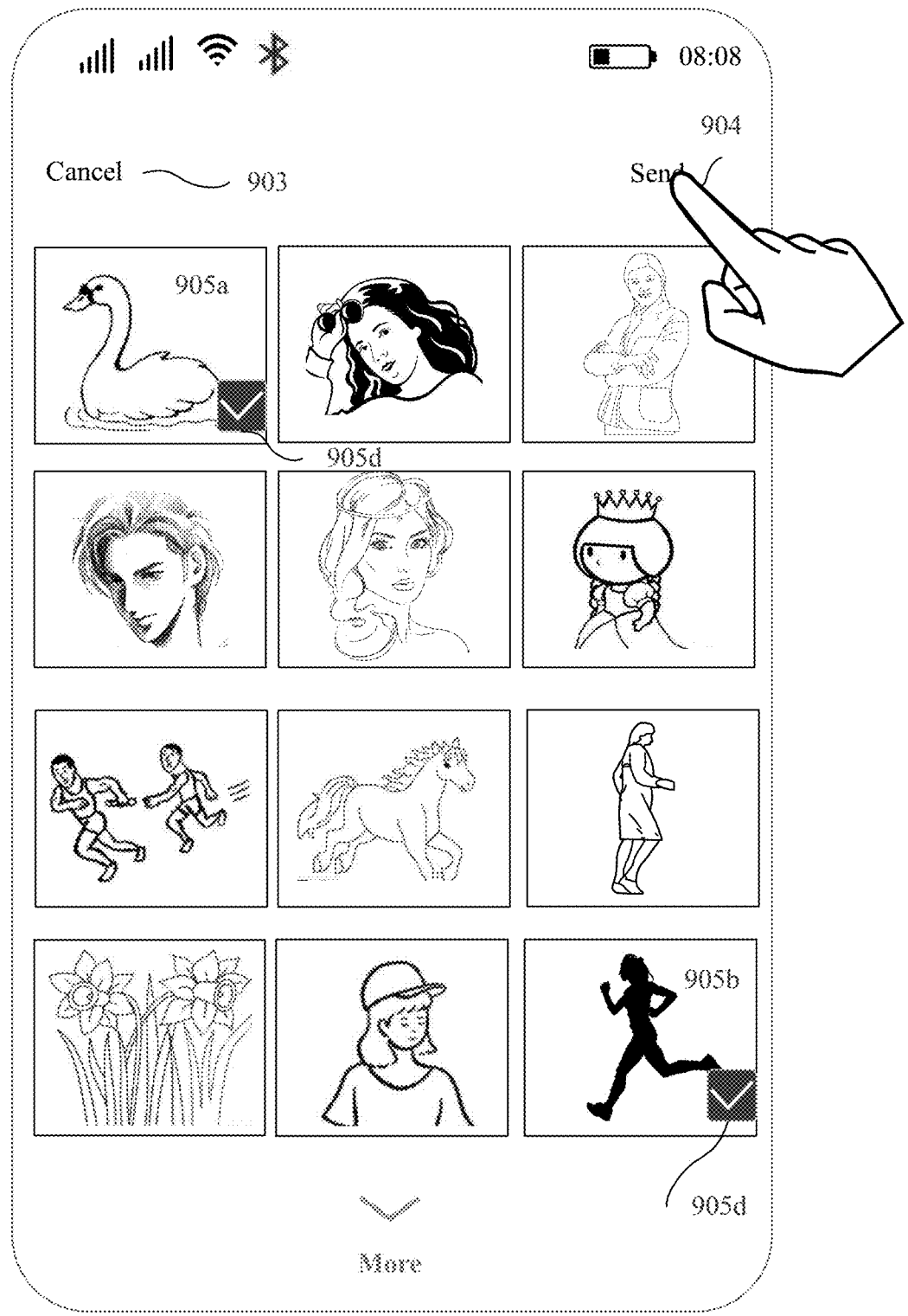

In some embodiments, as shown in FIG. 9E, the electronic device 1001 may further display a mark 905d on a thumbnail selected by the user in the picture area 905, where the mark 905d may indicate that a picture corresponding to the thumbnail is selected by the user.

As shown in FIG. 9E, after selecting a picture, the user may input a user operation (for example, a tap operation or a touch operation) on the control 904. After detecting the user operation performed on the control 904, the electronic device 1001 may share, in response to the user operation, the picture selected by the user to the server 3001. In addition to an operation of first selecting a picture and then tapping the control 904, the electronic device 1001 may share, in response to an operation in another form, the picture selected by the user to the server 3001, for example, in response to an operation of shaking the electronic device 1001 after the user selects the picture, or a speech control instruction.

Figure 9F:
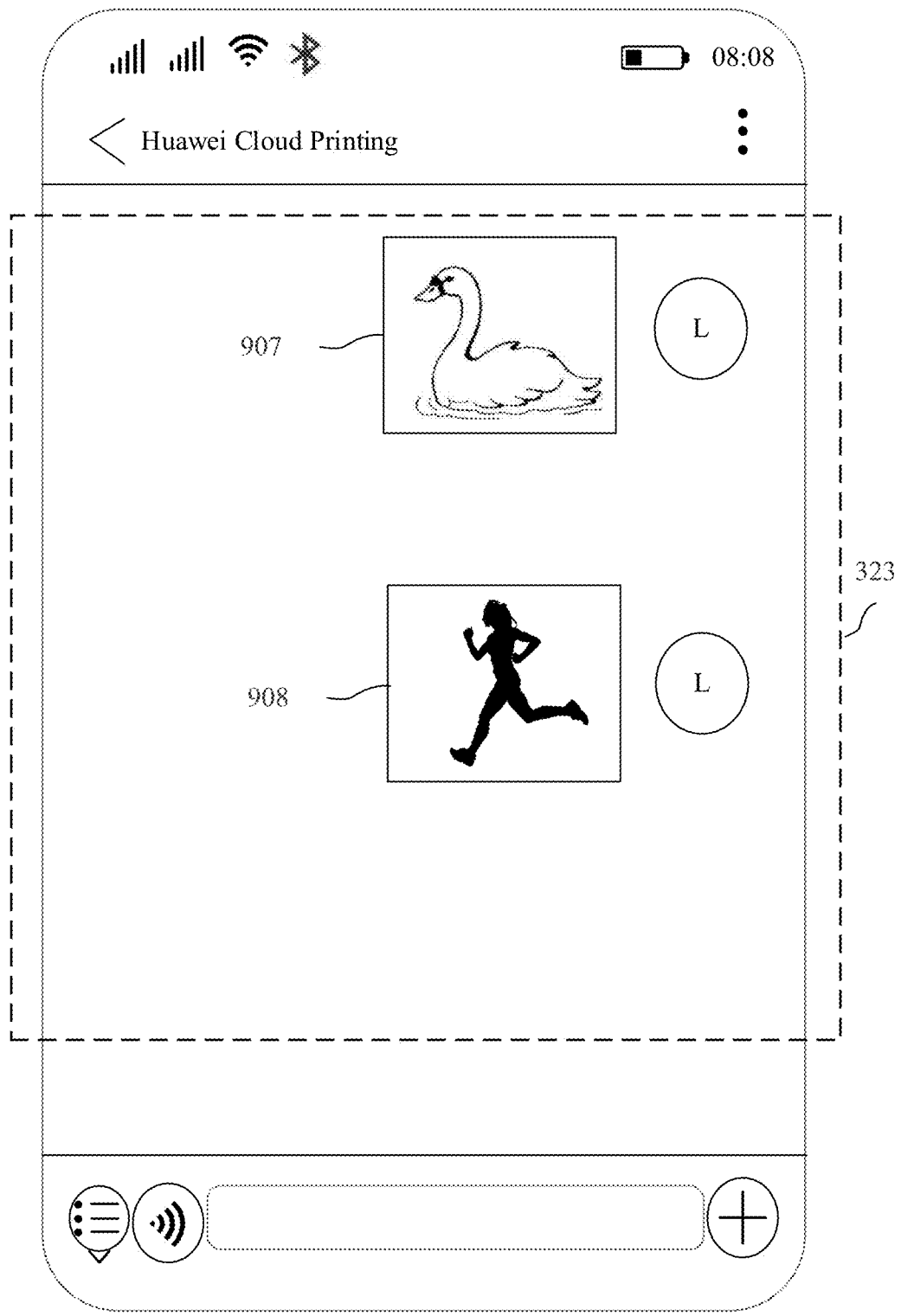

Refer to FIG. 9F. After sharing the picture selected by the user to the server 3001, the electronic device 1001 jumps to and displays the user interface 37 again. As shown in FIG. 9F, a communication record 323 in the user interface 37 includes a profile picture of the associated user of the electronic device 1001, and one or more pictures selected by the user, for example, a picture 907 and a picture 908. The picture 907 and the picture 908 may be thumbnails, or may be original pictures.

After receiving the picture that is selected by the user and that is sent by the electronic device 1001, the server 2001 may determine whether the associated user of the electronic device 1001 has usage permission for the printer managed by the server 3001 (namely, HUAWEI Cloud Printing) corresponding to the server contact 901, and if yes, return a confirmation result to the electronic device 1001.

Figure 9G:
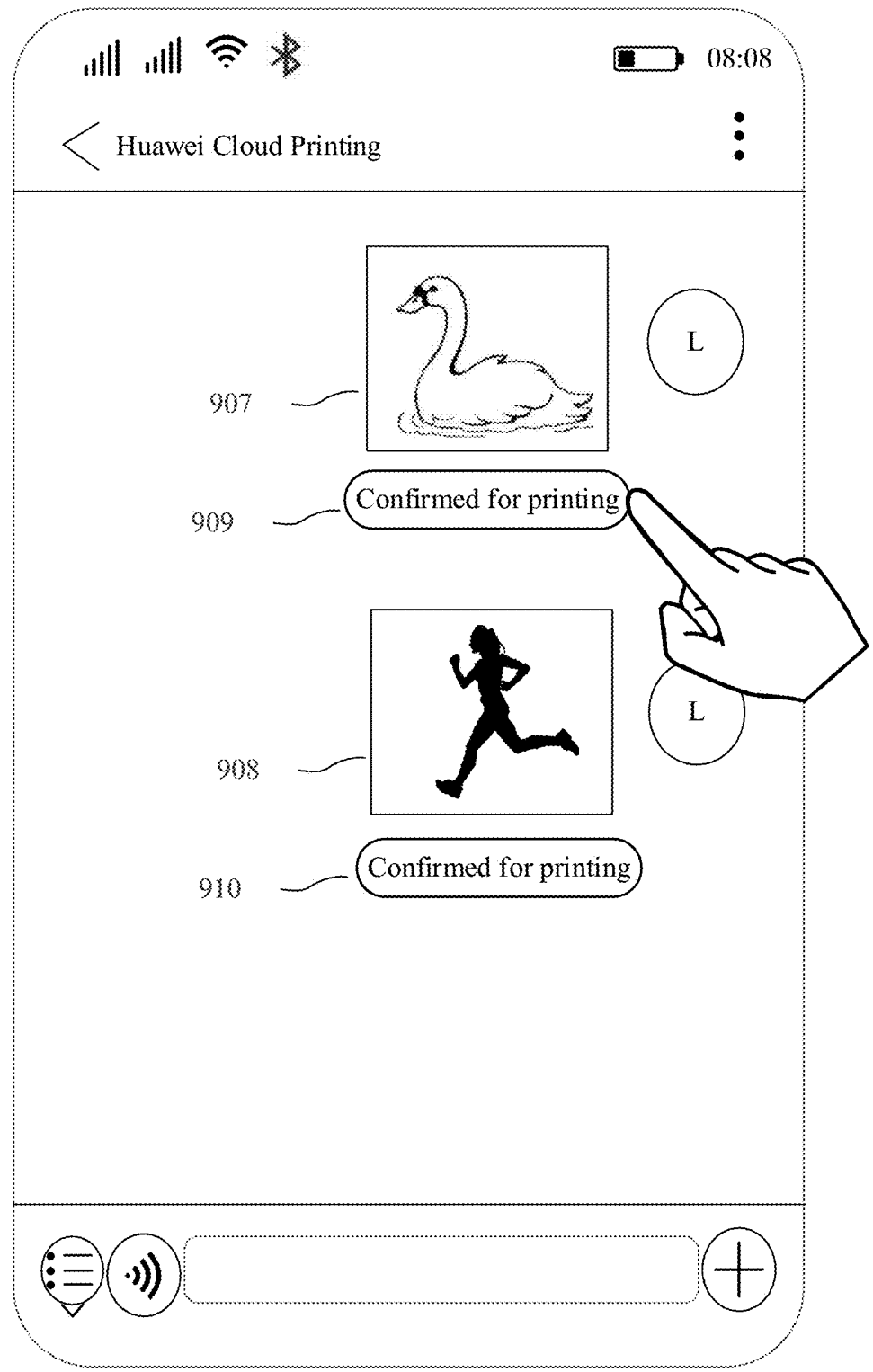

Refer to FIG. 9G. After receiving the confirmation result, the electronic device 1001 may display a control used to trigger printing in the user interface 37, for example, a control 909 used to trigger the printer to print the picture 907, and a control 910 used to trigger the printer to print the picture 908. Herein, for the printer used when picture printing is triggered, there may be two cases. (1) If there is only one printer managed by the server 3001 bound with the associated user of the electronic device 1001 (namely, user "Lisa"), for example, the printer 4001, the printer triggered to perform printing is the printer 4001. (2) If there are a plurality of printers managed by the server 3001 bound with the associated user of the electronic device 1001 (namely, user "Lisa"), for example, the printer 4001 and the printer 4002, the printer used when printing is triggered is a default printer, where the default printer may be a printer bound with user Lisa earlier, or may be a most recently used printer, or may be a printer 4001 selected by the user by default by tapping the control 604*d* in the user interface shown in FIG. 6C, or the like.

Figure 9H:
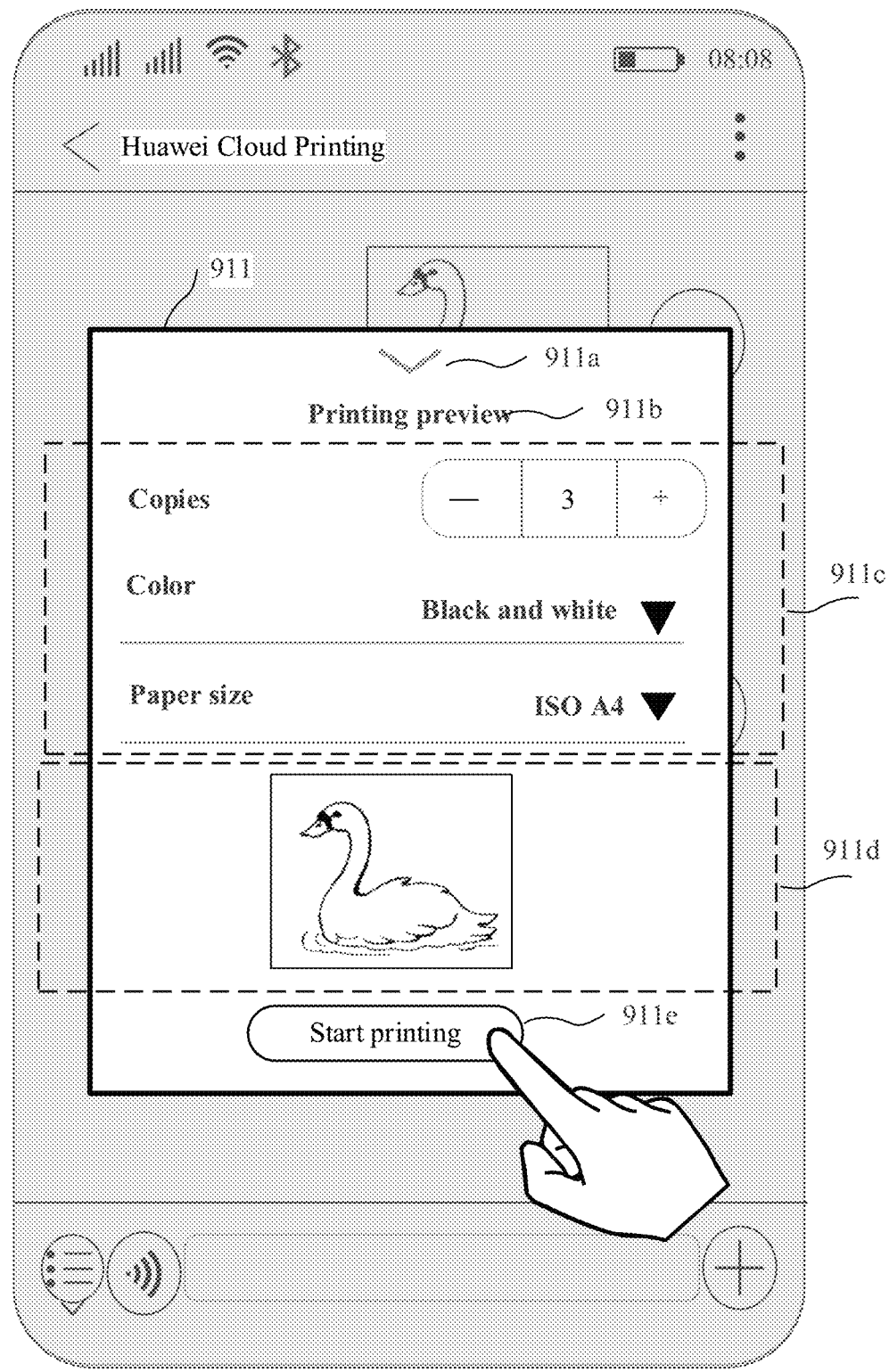

In some embodiments, in response to a detected user operation (such as a tap operation or a touch operation) performed on the control 909 or 910, the electronic device 1001 may display a window 911 shown in FIG. 9H. The window 911 may be used by the user to perform printing setting.

As shown in FIG. 9H, the window 911 may include but is not limited to a control 911*a*, a page indicator 911*b*, an area 911*c*, an area 911*d*, and a control 911*e*.

The control 911*a* may be configured to monitor a user operation. In response to the user operation, the electronic device 1001 may stop displaying the window 911.

The page indicator 911*b* is used to indicate that the current window 911 is used for printing preview by the user.

The area 911*c* may be used by the user to perform printing setting, such as setting a quantity of copies to be printed, a paper size, and a printing color. The area 911*d* may display a picture to be printed (for example, the picture 907). It should be understood that a picture in the area 911*d* may be a thumbnail. In some embodiments, a display status (such as a color or a paper size) of the picture in the area 911*d* may be selected based on a printing setting selected by the user in the area 911*c*. In this way, the user can preview a printing effect, thereby improving user experience.

The control 911*e* may be configured to monitor an operation that triggers the printer to perform printing based on a selected printing setting. Text information "Start printing" may be displayed on the control 911*e*. This is not limited thereto. Prompt information in another form, for example, text information "setting completed", may be displayed on the control 911*e* to instruct the user to trigger the printer to perform printing based on the selected printing setting. In response to an operation detected on the control 911*e*, the electronic device 1001 may trigger the printer to print the picture 907 based on the selected printing setting. For specific implementation of the printer that is triggered to perform printing, refer to the foregoing related descriptions.

It may be understood that a value of a printing parameter that is in the window 911 and that can be selected by the user may be transmitted by the printer to the electronic device 1001. For example, when a quantity of remaining papers in the printer is 10, the maximum quantity of to-be-printed copies can be set to 10 by the user. For another example, when there is only black ink in the printer, the picture color that can be set by the user is black and white. The rest can be deduced by analogy. In this way, it can be ensured that all printing settings selected by the user can be executed by the printer, thereby improving user experience.

It can be learned from the above descriptions that, in the foregoing embodiment, the window 911 used by the user to perform printing setting may be provided when the user triggers printing, to facilitate the user to perform printing setting, for example, setting the quantity of copies to be printed, the paper size, and the printing color. In this way, the electronic device 1001 can provide customized selections that meet different user requirements for the printing service, thereby improving user experience.

In some other embodiments, in response to a detected user operation (such as a tap operation or a touch operation) performed on the control 909 or 910, the electronic device 1001 may trigger the printer to print a corresponding picture based on a default printing setting. For example, the default printing setting may include the following. A quantity of to-be-printed copies is 1, a default paper size is A4, a default printing color is black and white, and the like. It can be learned that in the foregoing embodiment, the printing service based on the default printing setting is provided when the user triggers printing, and the window 911 shown in FIG. 9H does not need to be displayed. In this way, steps of file printing on the electronic device 1001 are simplified, and printing efficiency of the electronic device 1001 is improved.

In some embodiments, after triggering the printer to print a picture, the electronic device 1001 may further display prompt information 912 in the communication record 323 shown in the user interface 37. The prompt information 912 is used to notify the user of a picture printing status, so that the user can intuitively learn the printing status of a selected picture, thereby improving user experience. For example, the printing status of the picture may be "queuing . . . ", "printing . . . ", "printing is completed", "printing failed", or the like.

In some other embodiments, the prompt information 912 may not be a visual interface element displayed on the display, but audio played by using the speaker 170A.

FIG. 9I to FIG. 9L show user interfaces that are on the electronic device 1001 and that are used to feed back a picture printing status.

As shown in FIG. 9I to FIG. 9L, after the electronic device 1001 triggers the printer to perform picture printing, the electronic device 1001 may display the prompt information 912 in the communication record 323 in the user interface 37. The prompt information 912 is used to indicate a printing status of a picture selected by the user.

Figure 9I:
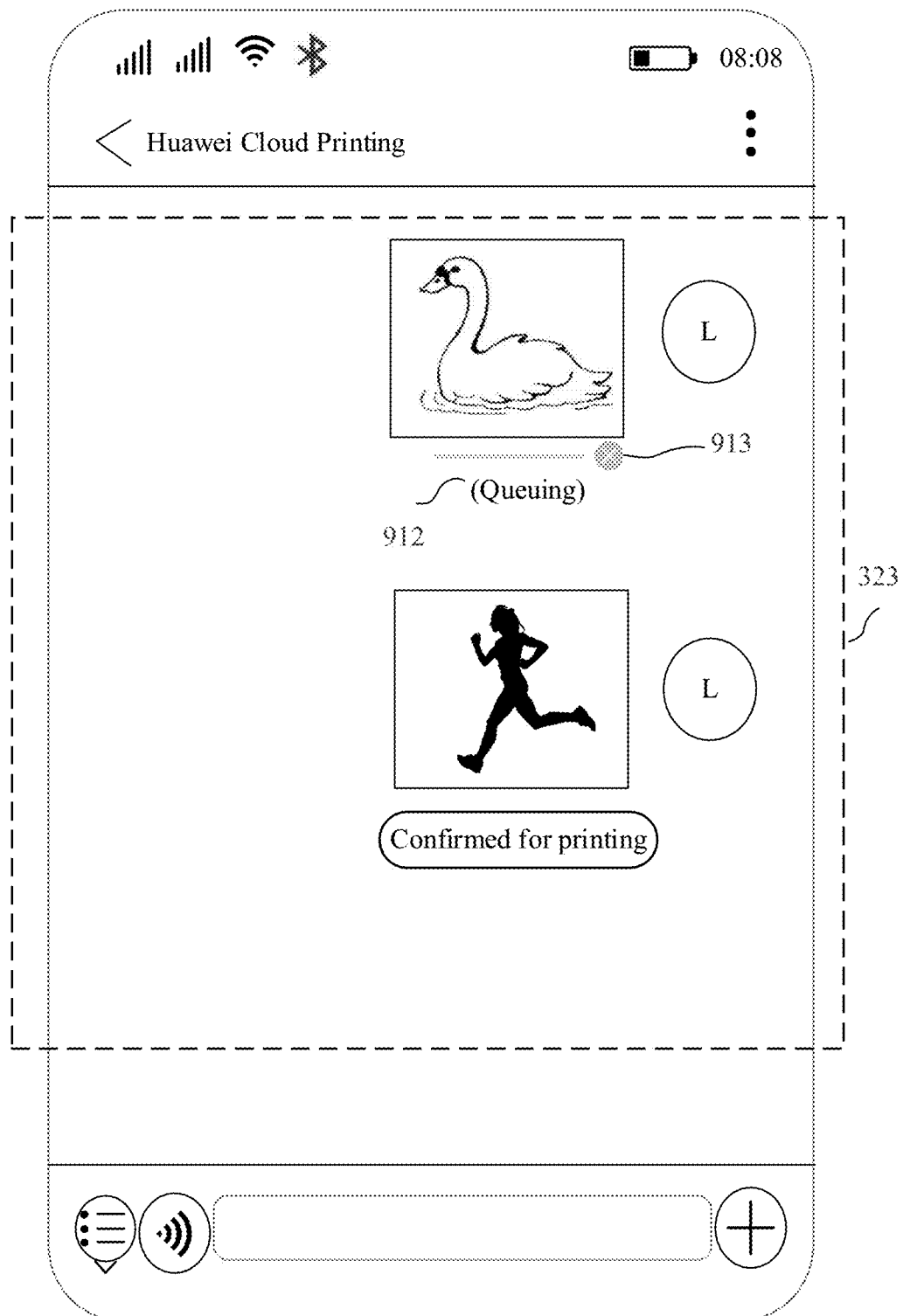

As shown in FIG. 9I, the electronic device 1001 may display the prompt information 912 in the communication record 323, which may be used to notify the user that a printing status of a selected picture is a first printing state. The first printing state may indicate that a printing task of a selected picture is in a printing task queue of the printer, and is queuing to be processed by the printer. The prompt information 912 may be text information "the printing task is queuing . . . ", which is not limited thereto. The prompt information 912 may alternatively be information in another form, for example, a picture or an animation.

In some embodiments, as shown in FIG. 9I, when a printer status indicated by the prompt information 912 is the first printing state, the electronic device 1001 may display a control 913 in the user interface 37. When the electronic device 1001 detects a user operation performed on the control 913, in response to the user operation, the electronic device 1001 may cancel printing of the selected picture. Herein, canceling printing is canceling the printing task. To be specific, the printing task of the selected picture is deleted from the printing task queue of the printer, and therefore the printer does not print the selected picture.

Figure 9J:
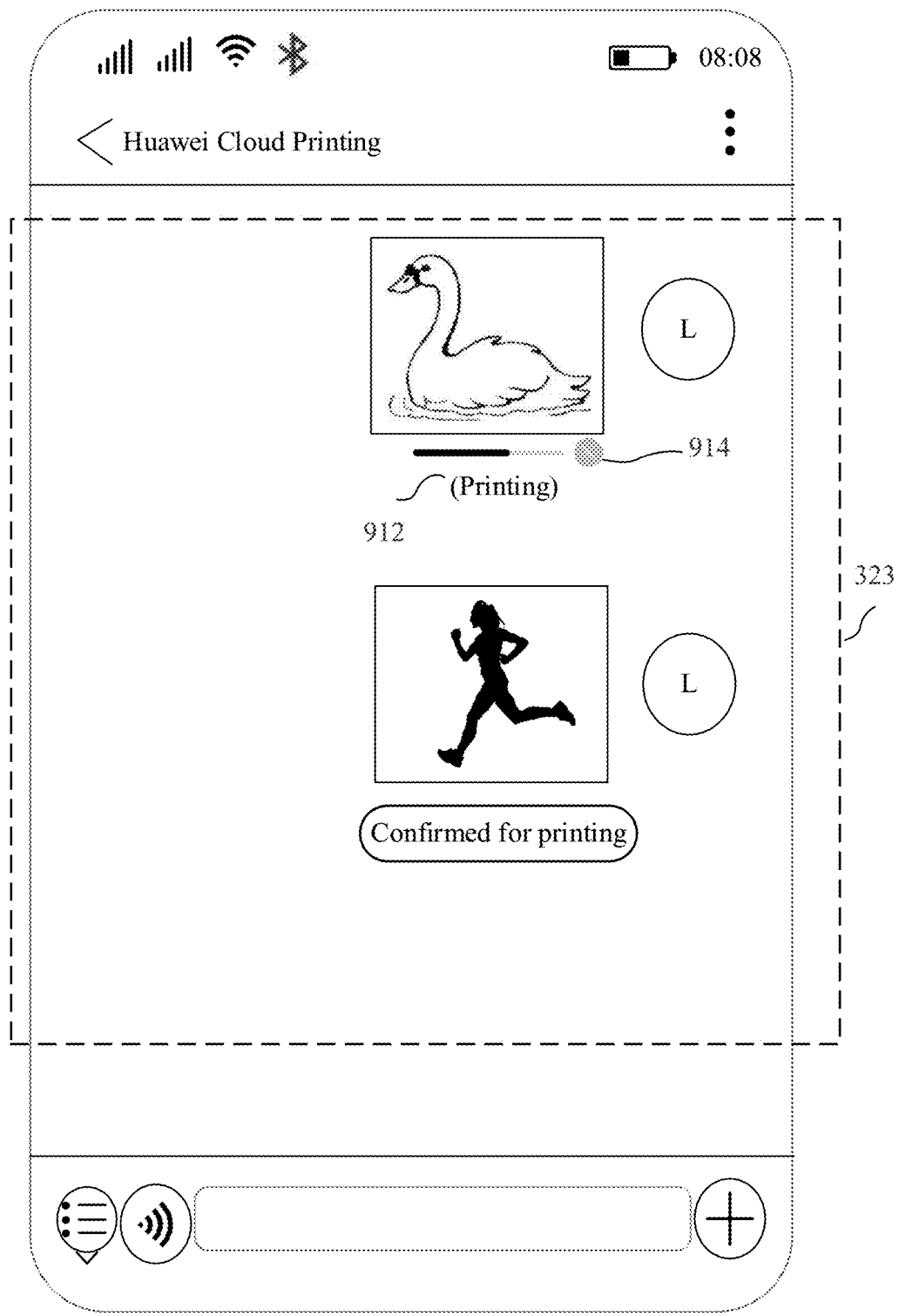

As shown in FIG. 9J, the electronic device 1001 may display the prompt information 912 in the communication record 323, where the prompt information 912 may be used to notify the user that the printing status of the selected picture is a second printing state. The second printing state may indicate that the printer is printing the selected picture. The prompt information 912 may be text information "printing . . . ", which is not limited thereto. The prompt information 912 may alternatively be information in another form, for example, a picture or an animation.

In some embodiments, as shown in FIG. 9J, when the printing status indicated by the prompt information 912 is the second printing state, the electronic device 1001 may display a control 914. For the control 914, refer to the control 913 in FIG. 9I. Details are not described herein again.

Figure 9K:
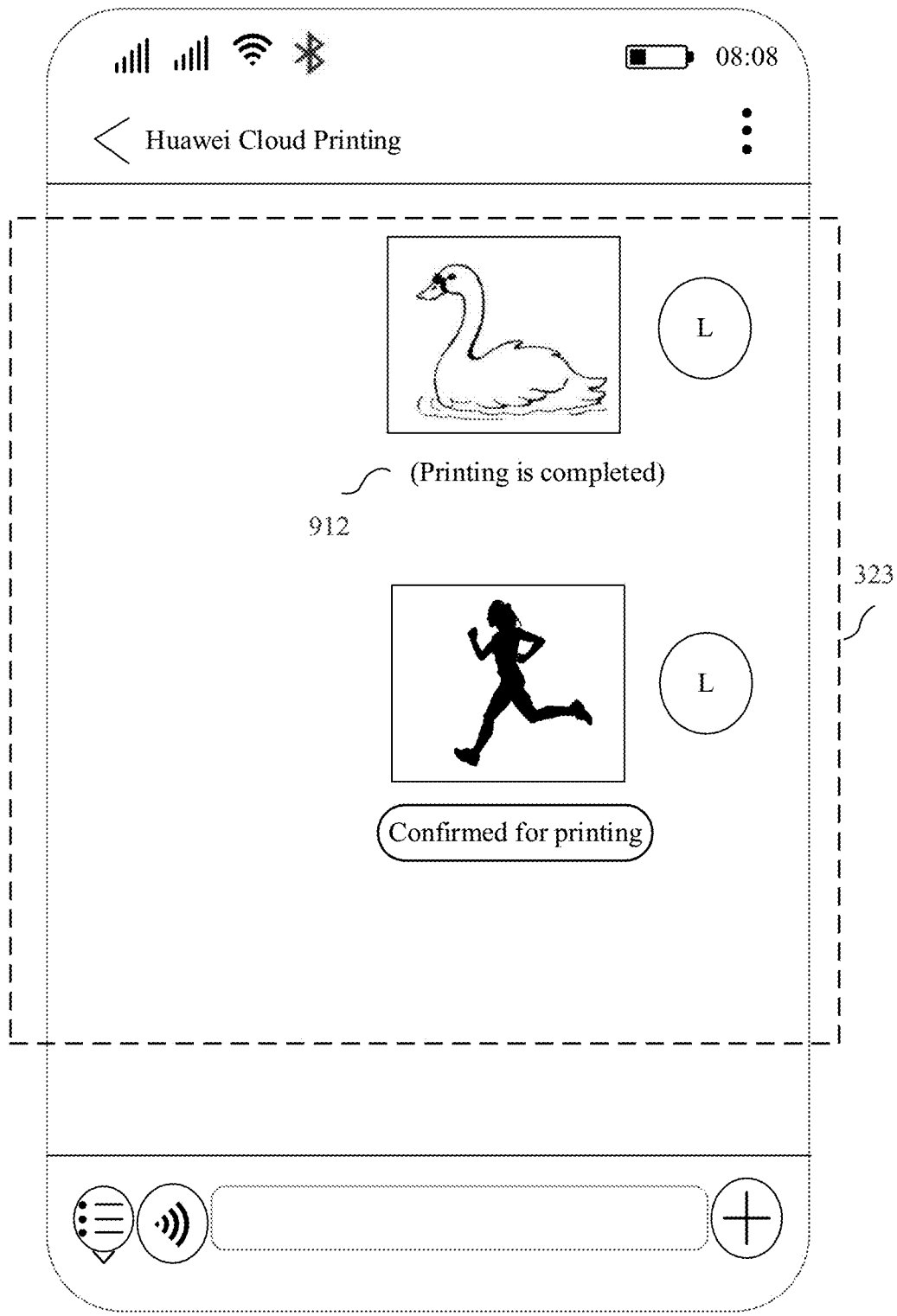

As shown in FIG. 9K, the electronic device 1001 may display the prompt information 912 in the communication record 323, where the prompt information 912 may be used to indicate that the printing status of the selected picture is a third printing state. The third printing state may indicate that printing of the selected picture is complete. The prompt information 912 may be text information "printing is completed", which is not limited thereto. The prompt information 912 may alternatively be information in another form, for example, a picture or an animation.

Figure 9L:
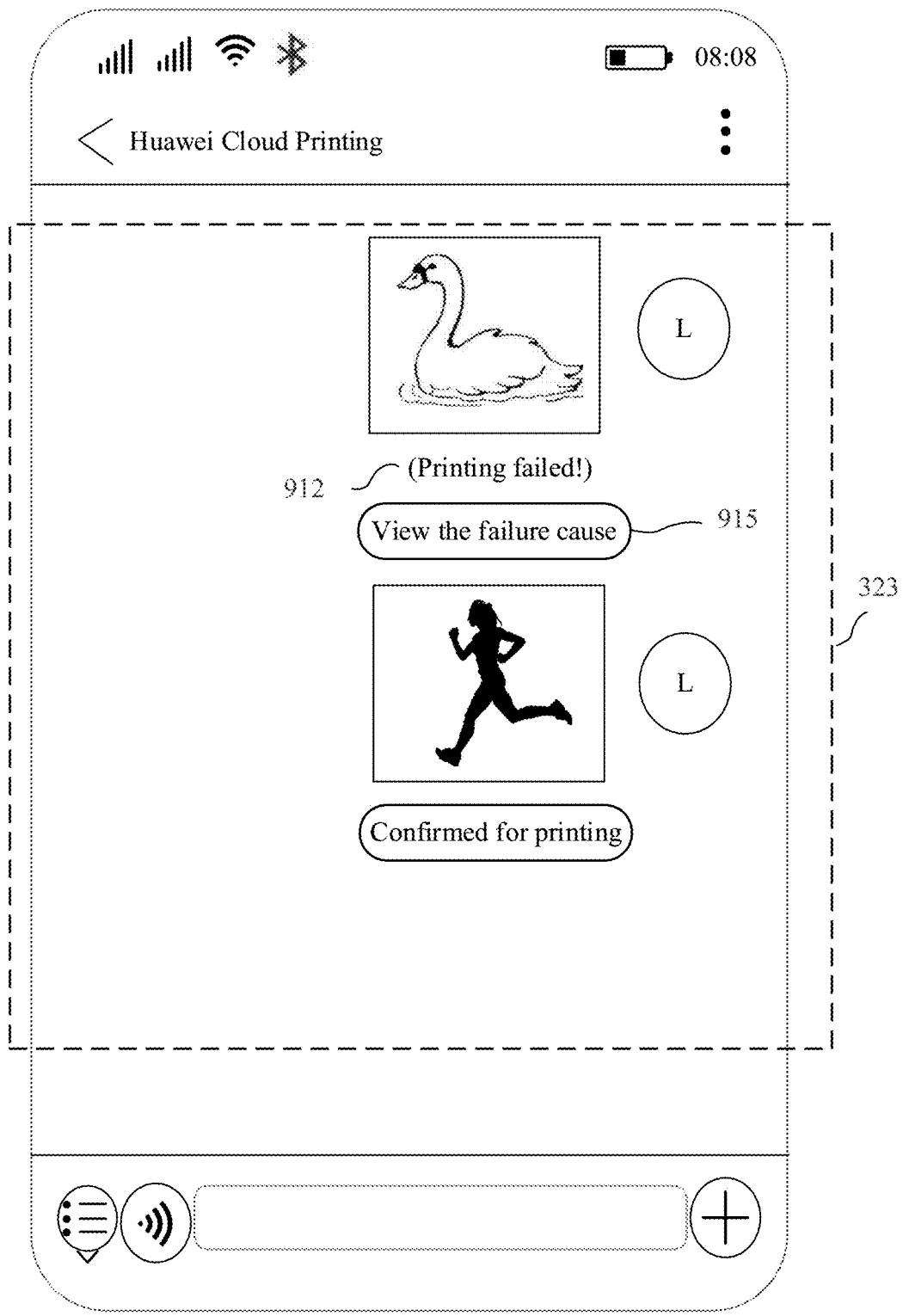

As shown in FIG. 9L, the electronic device 1001 may display the prompt information 912 in a notification window 471, where the prompt information 912 may be used to indicate that the printing status of the selected picture is a fourth printing state. The fourth printing state may indicate that the printer fails to print the selected picture. The prompt information 912 may be text information "printing failed", which is not limited thereto. The prompt information 912 may alternatively be information in another form, for example, a picture or an animation.

In some embodiments, as shown in FIG. 9L, when the printer status indicated by the prompt information 912 is the fourth printing state, the electronic device 1001 may display a control 915. Text information "view the failure cause" may be displayed on the control 915. When the electronic device 1001 detects a user operation on the control 915, the electronic device 1001 may display a detailed printing failure cause in response to the user operation, for example, a failure cause such as paper jam, exhaustion of consumables, an incorrect picture format, a low battery level, or overheating. In this way, the electronic device 1001 can accurately notify the user of a specific cause of the printing failure, so that the user can address the problem in time for future printing.

According to the example UI embodiment shown in FIG. 9A to FIG. 9L, the electronic device 1001 may share, to the printer bound with the user, a picture shared by the user to a server contact, so that the user can share data by chatting with the server contact. In addition, the user may select a picture to be printed according to a requirement. User experience is intuitive and simple, and efficiency of printing by using the electronic device is greatly improved.

The following describes several extensions of the UI embodiment shown in FIG. 9A to FIG. 9L.

(1) The printing manner is not limited to separately printing pictures selected by the user as shown in FIG. 9G to FIG. 9H. In some embodiments, a plurality of pictures may be printed at the same time when the plurality of pictures is selected by the user.

Figure 10A:
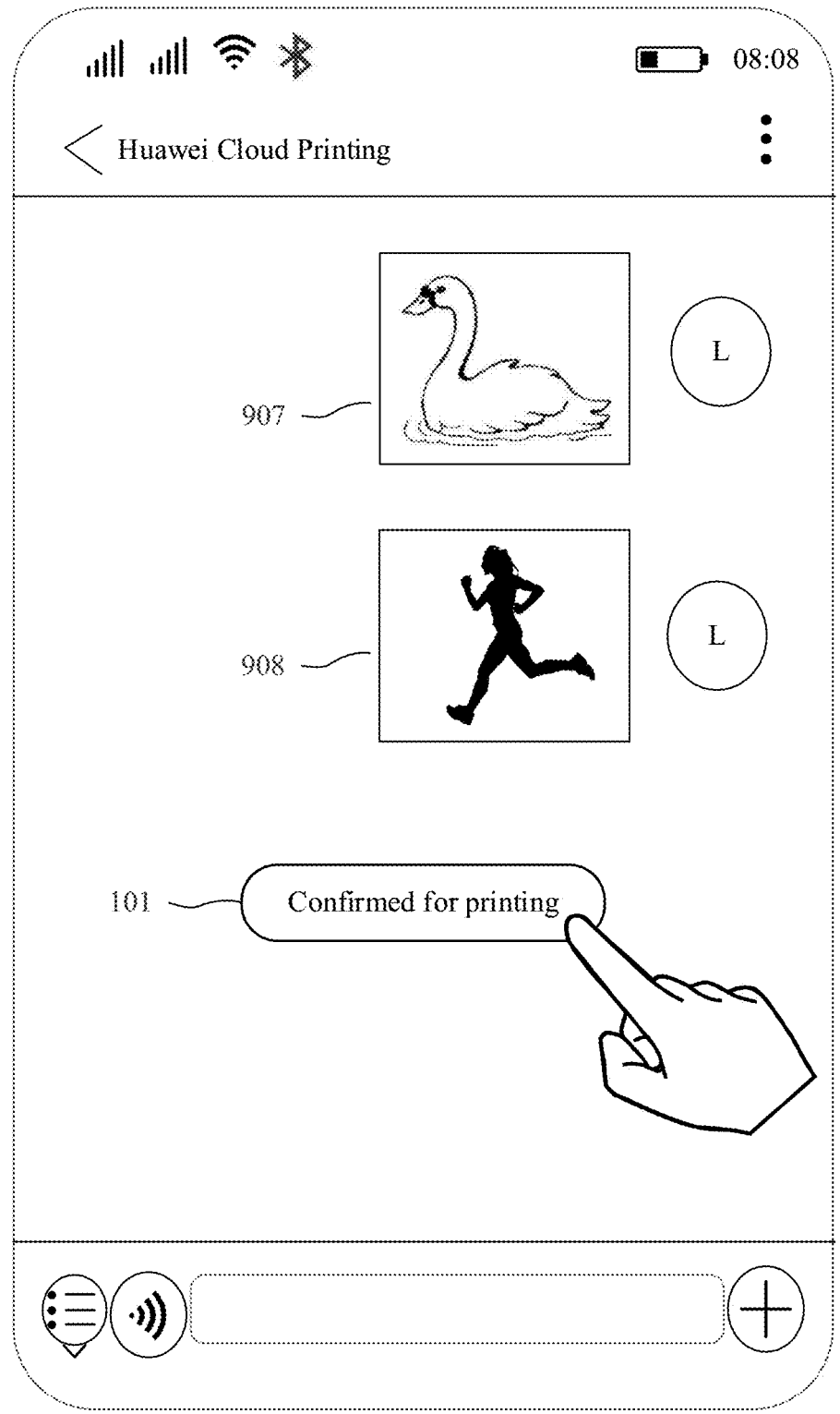
Figure 10B:
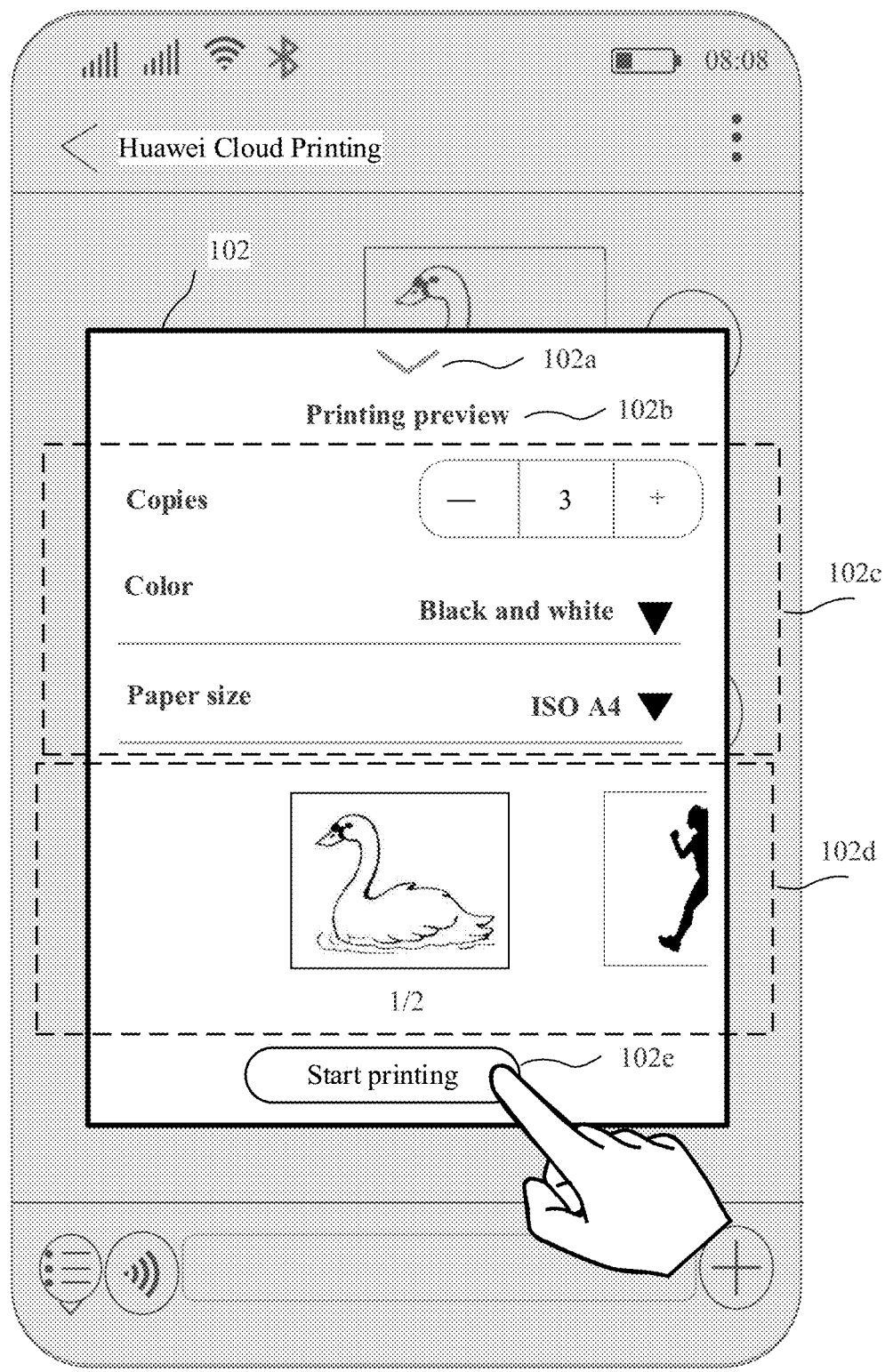

FIG. 10A and FIG. 10B show user interfaces displayed when the user selects a plurality of pictures and the electronic device 1001 triggers simultaneous printing of the plurality of pictures.

As shown in FIG. 10A, after receiving a confirmation result indicating that the associated user of the electronic device 1001 has usage permission for the printer managed by the server 3001 (that is, HUAWEI Cloud Printing), the electronic device 1001 may display a control 101 used to trigger printing in the user interface 37. The control 101 is configured to trigger the printer to print all pictures selected by the user, for example, the picture 907 and the picture 908.

In some embodiments, in response to a detected user operation (such as a tap operation or a touch operation) performed on the control 101, the electronic device 1001 may display a window 102 shown in FIG. 10B. The window 102 may be used by the user to perform printing setting.

As shown in FIG. 10B, the window 102 may include but is not limited to a control 102a, a page indicator 102b, an area 102c, an area 102d, and a control 102e.

The window 102 is similar to the window 911 in FIG. 9H. For details, refer to related descriptions.

The area 102d may display a picture to be printed (for example, the picture 907 and the picture 908), and may support the user in selecting a picture for which printing setting needs to be performed (for example, selecting by sliding leftward or rightward). In this way, the user may separately perform printing setting for each picture.

In response to an operation detected on the control 102e, the electronic device 1001 may trigger the printer to print all pictures selected by the user, for example the picture 907 and the picture 908, based on a selected printing setting. For specific implementation of the printer that is triggered to perform printing, refer to the foregoing related descriptions.

In some other embodiments, in response to a detected user operation (such as a tap operation or a touch operation) performed on the control 101, the electronic device 1001 may trigger the printer to print a corresponding picture based on a default printing setting.

By using the extension solution (1), the user may trigger, by performing one operation, the printer to print all pictures selected by the user, which is simple and convenient for the user.

(2) The printing manner is not limited to the manner of triggering the printer uniquely bound with the user or the default printer to print the picture as described in FIG. 9G and the foregoing descriptions. In some embodiments, when there is a plurality of printers bound with the associated user of the electronic device 1001, the user may further autonomously select a printer for picture printing.

Figure 10C:
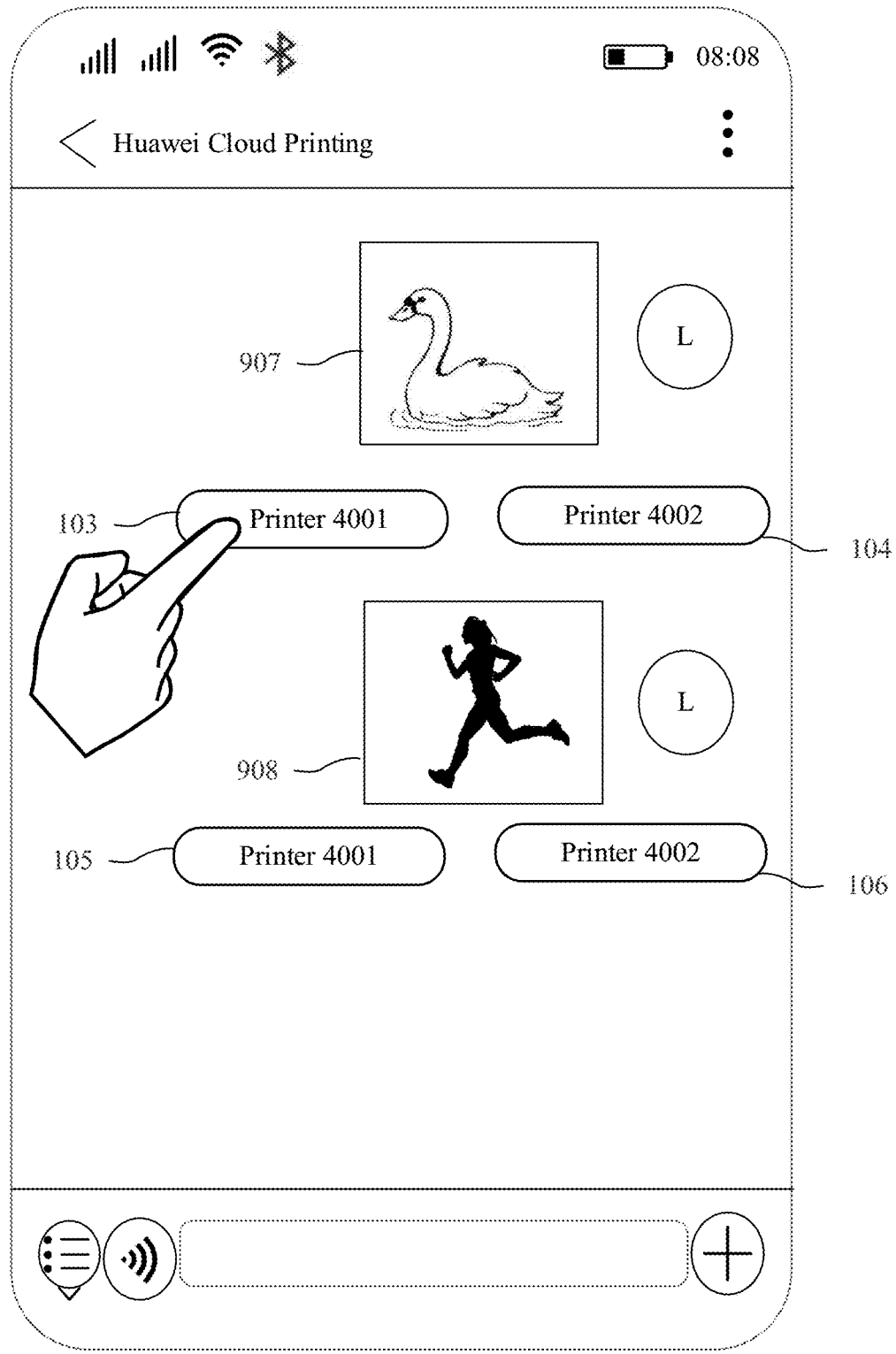

FIG. 10C shows a user interface displayed when the user autonomously selects a printer to print a picture.

As shown in FIG. 10C, after receiving a confirmation result indicating that the associated user of the electronic device 1001 has usage permission for the printer managed by the server 3001 (that is, HUAWEI Cloud Printing), the electronic device 1001 may display, in the user interface 37, a control used to trigger the printer for which the user has the usage permission to print a picture. For example, it is assumed that the associated user Lisa of the electronic device 1001 has the usage permission for the printer 4001 and the printer 4002. In this case, the user interface 27 may display a control 103 used to trigger the printer 4001 to print the picture 907, a control 104 used to trigger the printer 4002 to print the picture 907, a control 105 used to trigger the printer 4001 to print the picture 908, and a control 106 used to trigger the printer 4002 to print the picture 908.

In some embodiments, in response to a detected user operation (such as a tap operation or a touch operation) performed on the control 103/104/105/106, the electronic device 1001 may display a window used for printing setting. Herein, for the window used for printing setting, refer to the window 911 in FIG. 9H. Details are not described herein again.

In some other embodiments, in response to a detected user operation (such as a tap operation or a touch operation) performed on the control 103/104/105/106, the electronic device 1001 may trigger a corresponding printer to print a corresponding picture based on a default printing setting.

By using the extension solution (2) shown in FIG. 10C, the user may autonomously select, according to a requirement, a printer used to print a picture. This printing manner is flexible.

It may be understood that the printing manner is not limited to separately printing each picture as shown in FIG. 10C. In some embodiments, when the user selects a plurality of pictures, the user may select a printer to print the plurality of pictures at the same time.

(3) Triggering the printer to perform printing is not limited to triggering by using the control after the user sends a picture. In some other embodiments, printing may be directly triggered after the user sends a picture.

In this manner, the printing process is simpler and more convenient for the user.

FIG. 11A to FIG. 11E show user interfaces in which the user first selects a file, and then selects a server contact for sharing.

Figure 11A:
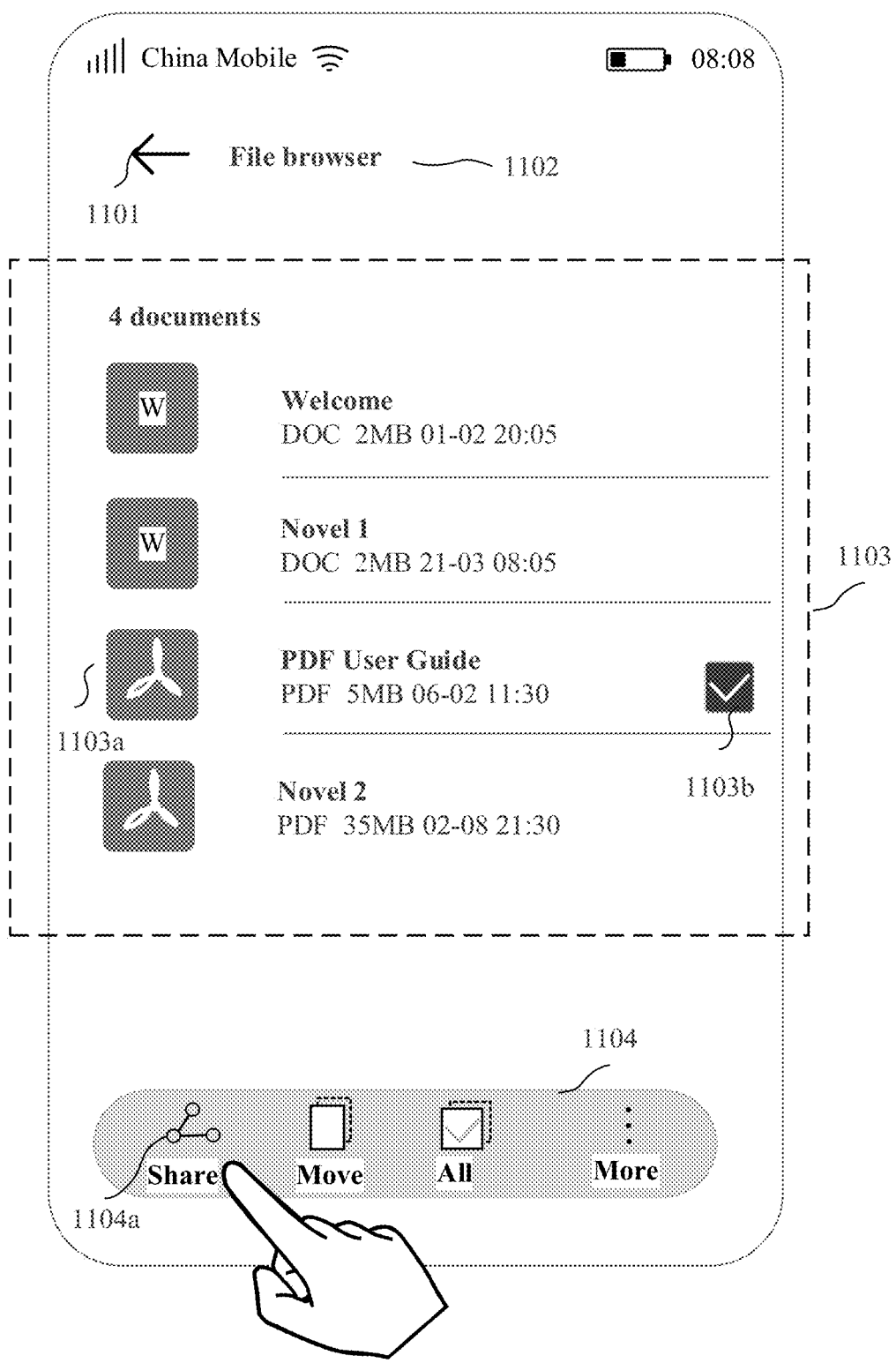

FIG. 11A shows a user interface 111 provided by a file browser displayed by the electronic device 1001.

The file browser is a file management application installed on an electronic device such as a smartphone or a tablet computer, and can support the user in performing various operations, such as browsing, editing, deletion, and selection, on a file (for example, a document or a table) stored in the electronic device 1001 or the cloud server. The file browser may also be referred to as file manager or the like.

The user interface 111 is configured to display one or more files stored in the electronic device 1001. The user interface 111 may be displayed by the electronic device 1001 in response to an operation detected on the file browser icon 303 shown in FIG. 3A.

As shown in FIG. 11A, the user interface 111 may include a status bar, a title bar, and a file area 1103.

For the status bar, refer to the status bar in the user interface 31 in FIG. 3A.

The title bar may include a current page indicator 1102, for example, text information "File Browser". This is not limited to text information, and the current page indicator may alternatively be an icon. The title bar may further include a back button 1101, and the back button 1101 is used to enable the electronic device 1001 to return to a previous interface, that is, the user interface 31 shown in FIG. 3A.

The file area 1103 may display identifiers (for example, a name and an icon) of one or more files (for example, a file in a Word format, a file in a Portable Document Format (PDF) format, or a file in a PPT format), and the like. An original file indicated by a file name may be stored in the electronic device 1001, or may be stored in the cloud server. When the electronic device 1001 detects an upward/downward/leftward/rightward slide operation in the file area 1103, the electronic device 1001 may update content displayed in the file area 1103, so that the user can browse more files.

The user may enter a user operation in the file area 1103 to select a file. The user operation may be a tap operation, a touch operation, or the like performed on a file identifier. For example, the user may tap an identifier 1103a in the file area 1103, and determine that an original file (for example, a document "PDF User Guide" in a PDF format) corresponding to the identifier 1103a is a file to be shared with a contact. In some embodiments, as shown in FIG. 11A, the electronic device 1001 may further display a mark 1103b on a file identifier selected by the user in the file area 1103, where the mark 1103b may indicate that an original file corresponding to the file identifier is selected by the user.

As shown in FIG. 11A, after entering a user operation in the file area 1103 to select a file, the user may further tap a sharing control 1104a in a menu 1104. In some embodiments, when detecting a user operation of selecting a file in the user interface 111, the electronic device 1001 may display a menu 1104 in the user interface 111. In some other embodiments, the electronic device 1001 may initially display the menu 1104 in the user interface 111, in other words, display the menu 1104 without detecting file selection by the user. The menu 1104 may include a sharing control and some other controls, for example, a "Move" control, a "Select All" control, and a "More" control.

Figure 11B:
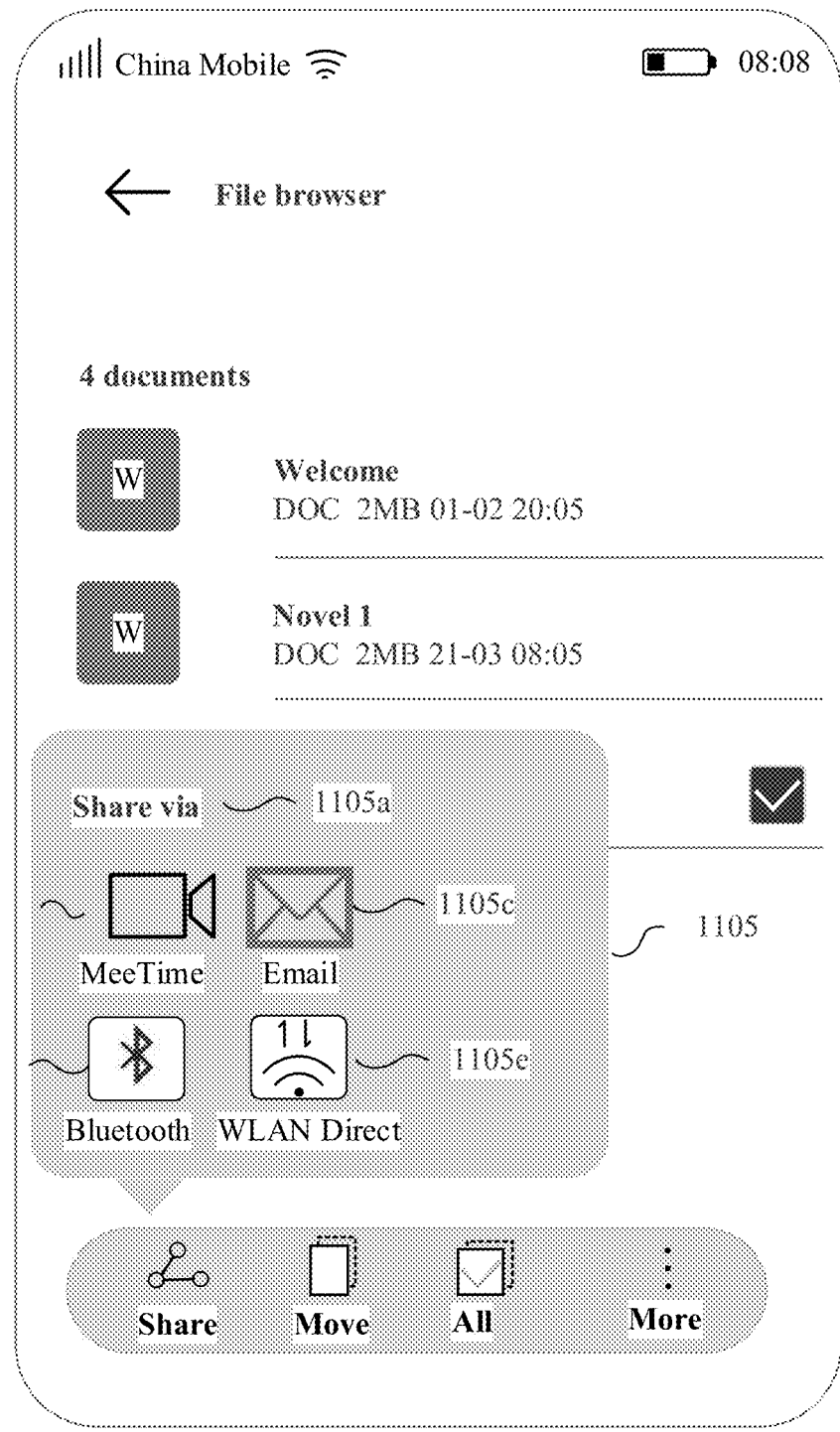

Refer to FIG. 11B. After detecting that the user enters the user operation in the file area 1103 to select a file and taps the sharing control 1104a, the electronic device 1001 displays a window 1105 in the user interface 111. The sharing manner is not limited to the manner in which a file is first selected and the control 1104 is tapped. The electronic device 1001 may display the window 1105 in response to a user operation in another form, for example, an operation of selecting a file within fixed duration (for example, 1 second or 2 seconds) after the electronic device 1001 is shaken, a speech control instruction, or the like.

As shown in FIG. 11B, the window 1105 may block part of content originally displayed in the user interface 111. The window 1105 may include prompt information 1105a, one or more options of applications used for file sharing, for example, a "MeeTime" option 1105b, a mailbox option 1105c, and one or more function service options, for example, a BLUETOOTH option 1105d and a WLAN option 1105e.

The prompt information 1105a is used to indicate the user to select a manner of sharing a selected file.

The application option can be used for sharing the selected file to an application corresponding to the option. An implementation of the application option may be a text, an icon, or the like.

The function service option may be used by the electronic device 1001 to share a selected file to an ambient device by using a communication technology corresponding to the option.

An application option in the window 1105 may be used to monitor a user operation (for example, a tap operation or a touch operation). The electronic device 1001 may display, in response to the user operation, a user interface provided for the user to select a contact in a corresponding application to share a file.

Figure 11C:
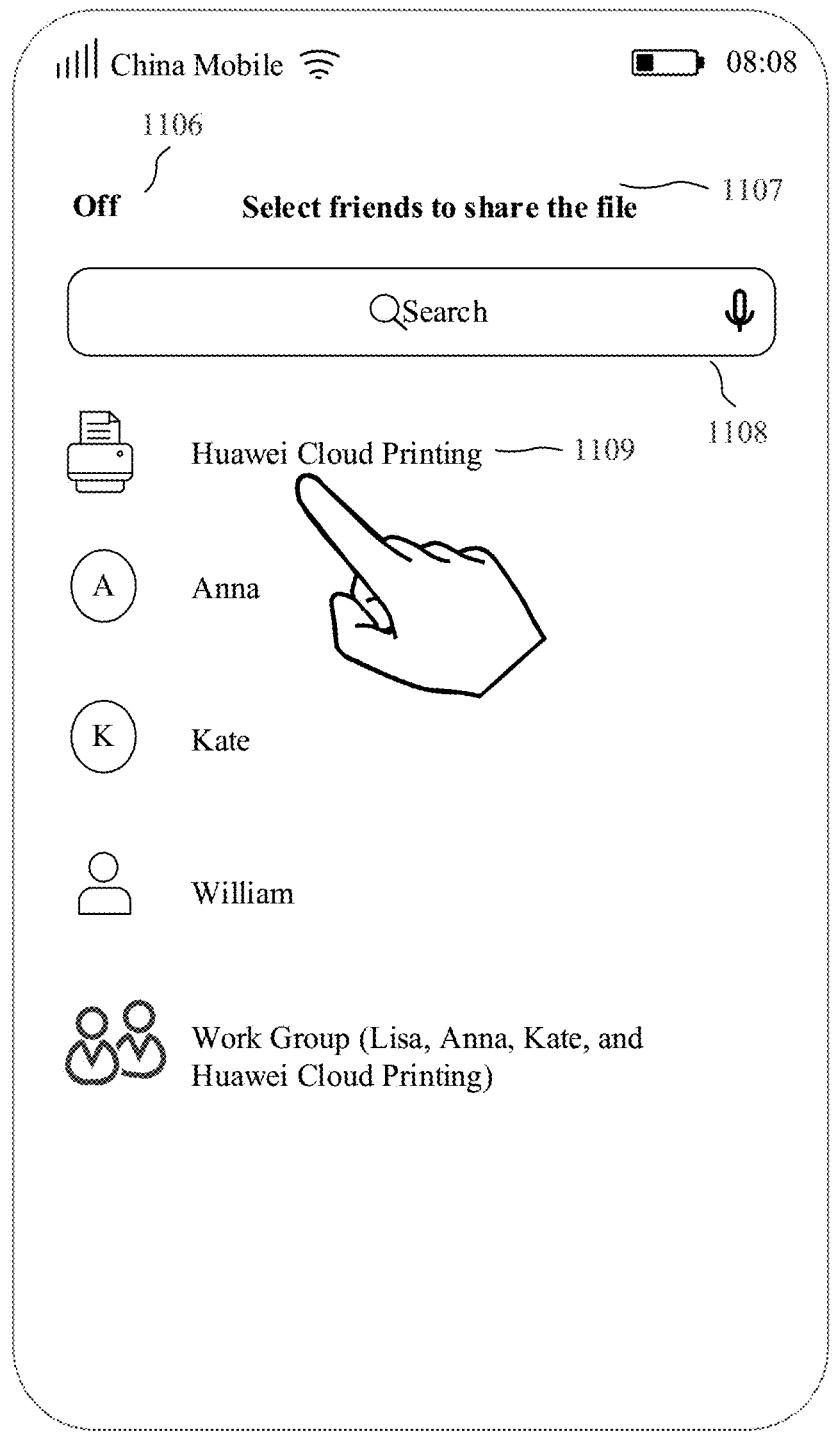

FIG. 11C shows a user interface 112 used for selecting a contact to share the selected file. The user interface 112 may be displayed by the electronic device 1001 in response to a user operation detected on the control 1105b shown in FIG. 11B. The user interface 112 may be provided by an instant messaging application (for example, "MeeTime").

As shown in FIG. 11C, the user interface 112 may include a status bar, a control 1106, prompt information 1107, a search box 1108, and one or more contact options.

For the status bar, refer to the status bar in the user interface 31 in FIG. 3A.

The control 1106 may monitor a user operation. In response to the user operation, the electronic device 1001 may jump to the user interface 111 shown in FIG. 11A or FIG. 11B.

The prompt information 1107 may be used to indicate the user to select a contact to share the file.

One or more of contact options may include an official account option, a user option, a group option, and the like. For example, FIG. 11C shows a server option 1109, an option of contact Anna, an option of contact Kate, an option of contact William, a group option "Work Group", and the like.

The contact option may be used to monitor an operation of selecting a contact and triggering file sharing. In response to an operation detected on the contact option, the electronic device 1001 may send the file selected by the user, through the instant messaging application (for example, "MeeTime"), to a device associated with a contact corresponding to the contact option.

As shown in FIG. 11C, the electronic device 1001 may detect a user operation on the server option 1109, and in response to the user operation, share the file selected by the user to the server 3001 corresponding to the server option 1109.

Figure 11D:
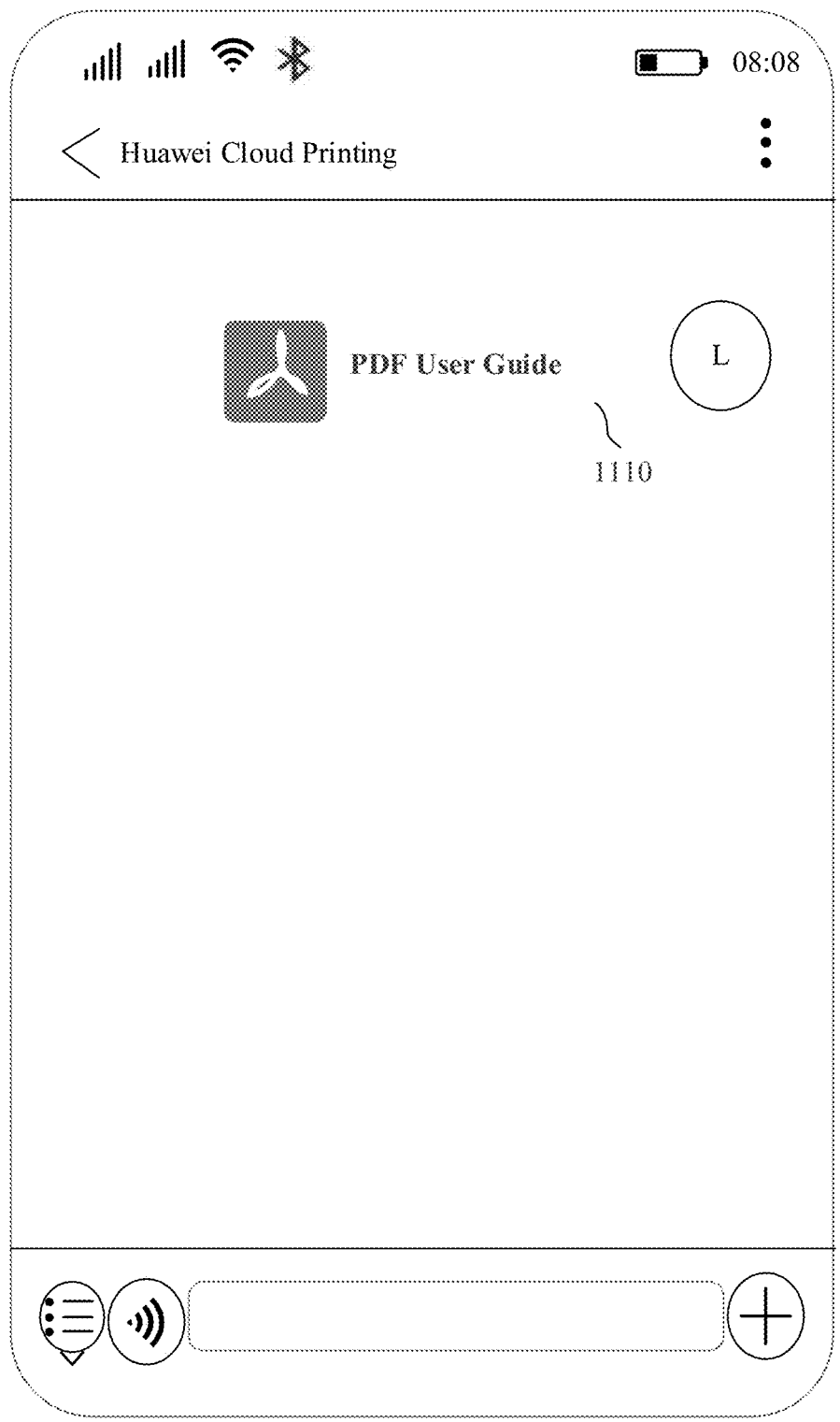

FIG. 11D shows a user interface 37 displayed after the electronic device 1001 shares the file selected by the user to the server 3001. The user interface 37 is configured to display a record of communication between the associated user of the electronic device 1001 (namely, Lisa) and the server 3001.

As shown in FIG. 11D, the communication record in the user interface 37 includes a profile picture of the associated user of the electronic device 1001, and one or more identifiers of files selected by the user, for example, an identifier 1110.

Figure 11E:
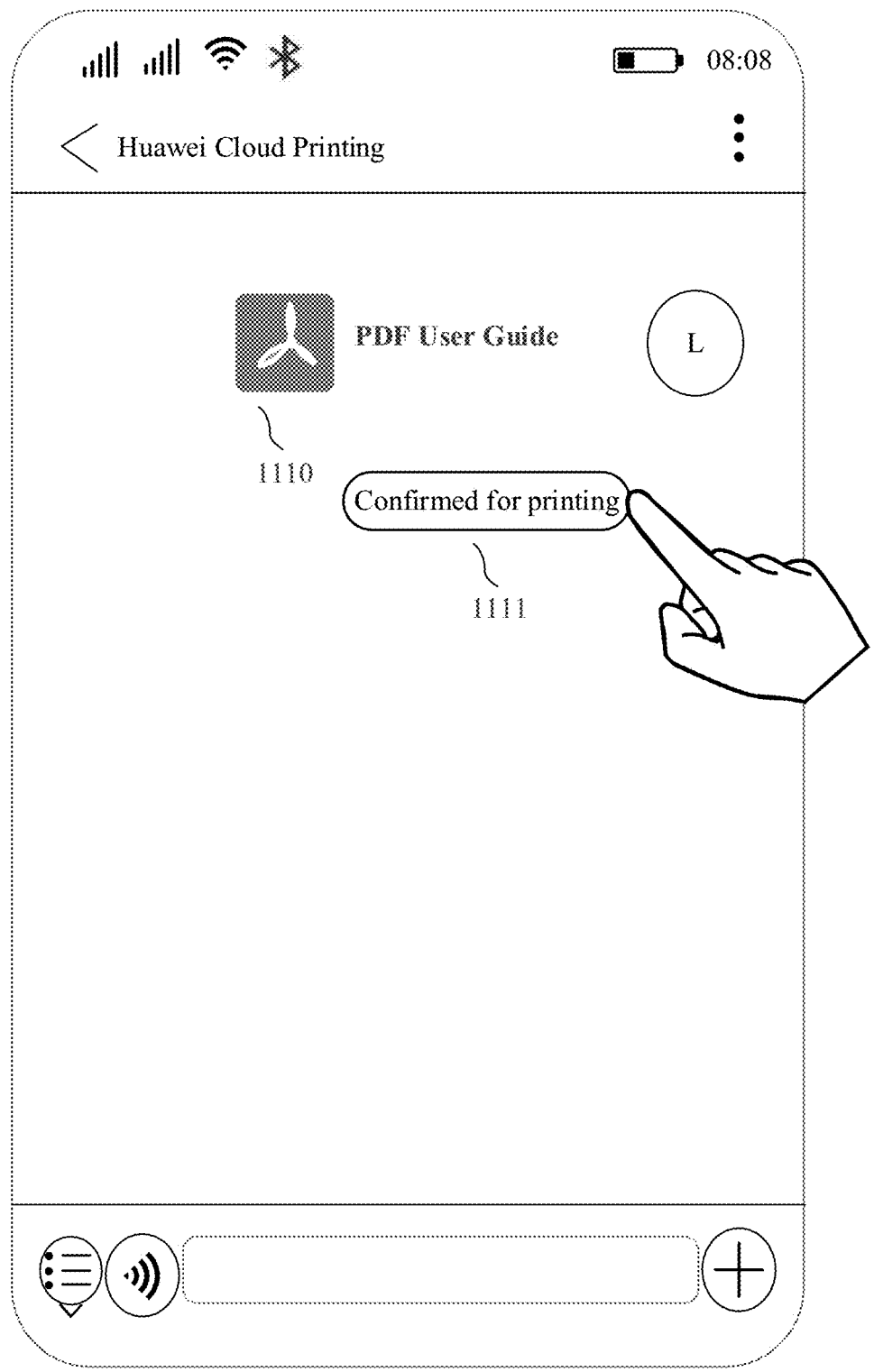

Refer to FIG. 11E. After sharing the file selected by the user to the server 3001, the electronic device 1001 may directly display a control 1111 in the user interface 37 if receiving the confirmation result indicating that the associated user of the electronic device 1001 (namely, Lisa) has the usage permission for the printer managed by the server 3001 (namely, HUAWEI Cloud Printing). The control 1111 may be configured to trigger the printer to print the file selected by the user.

It may be understood that in subsequent steps of the UI embodiment shown in FIG. 11A to FIG. 11E, the electronic device 1001 may further display a user interface used for printing setting, a user interface used for feeding back a file printing status, and the like. In addition, the user may further trigger printing of a plurality of files at the same time, and the user may autonomously select a printer to print a file. Herein, for details, refer to FIG. 9A to FIG. 9L, FIG. 10A to FIG. 10C, and related descriptions. The details are not described again.

2. The user can send a file to a group containing server contacts. After a user in the group who has usage permission for a printer managed by the server grants printing, the printer can be triggered to print the file.

FIG. 12A to FIG. 12G show user interfaces in which the user shares a file in a group.

Figure 12A:
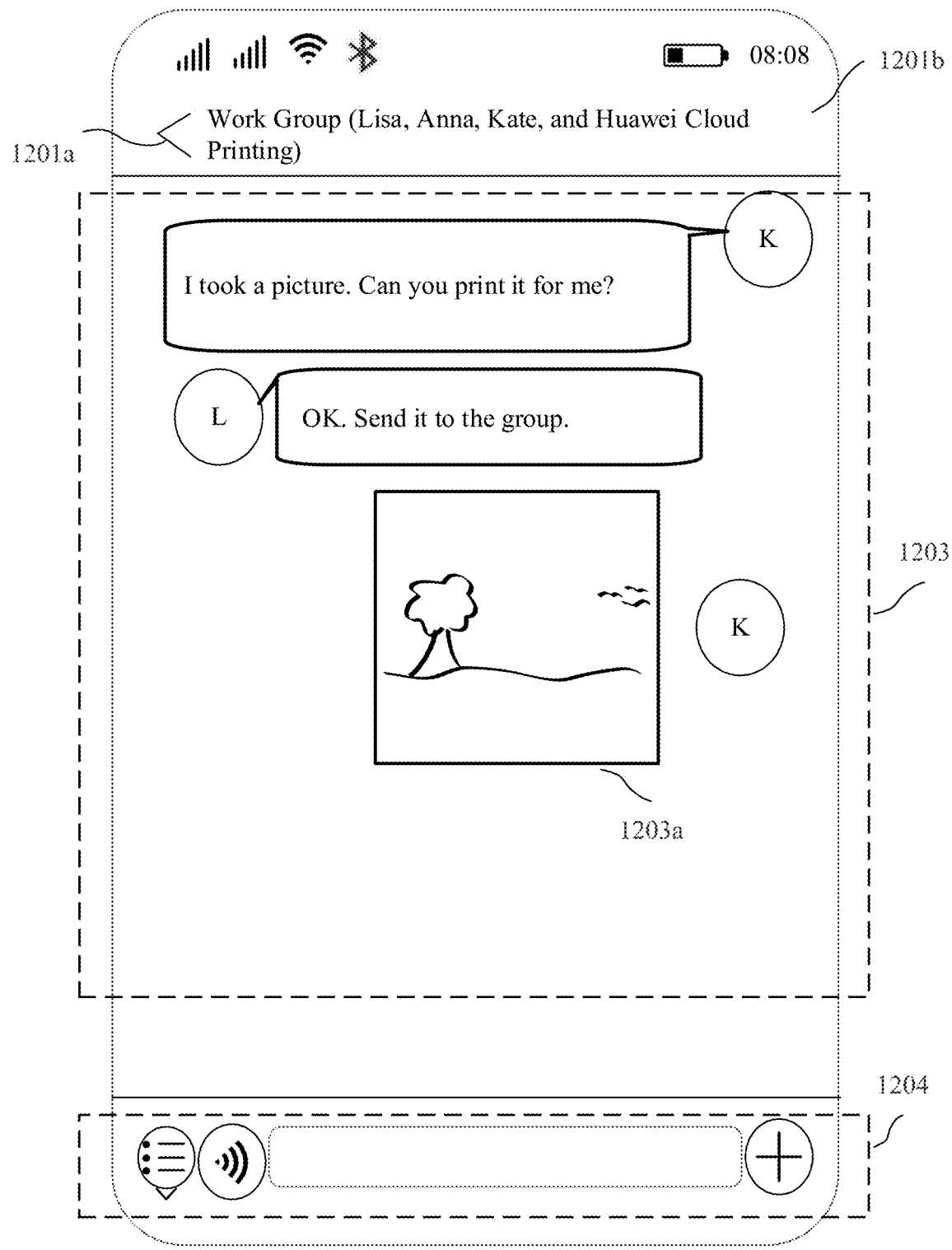
Figure 12B:
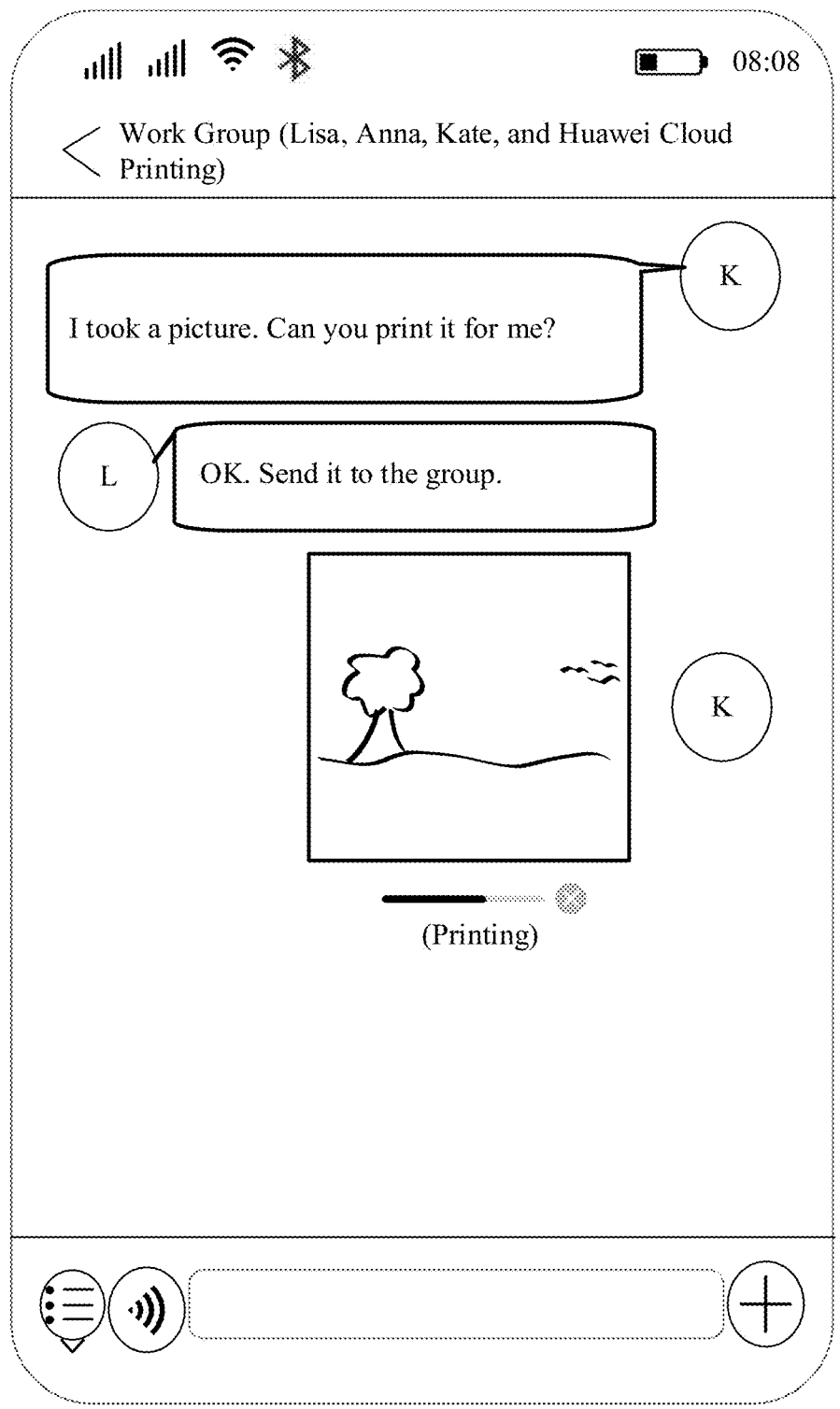
Figure 12C:
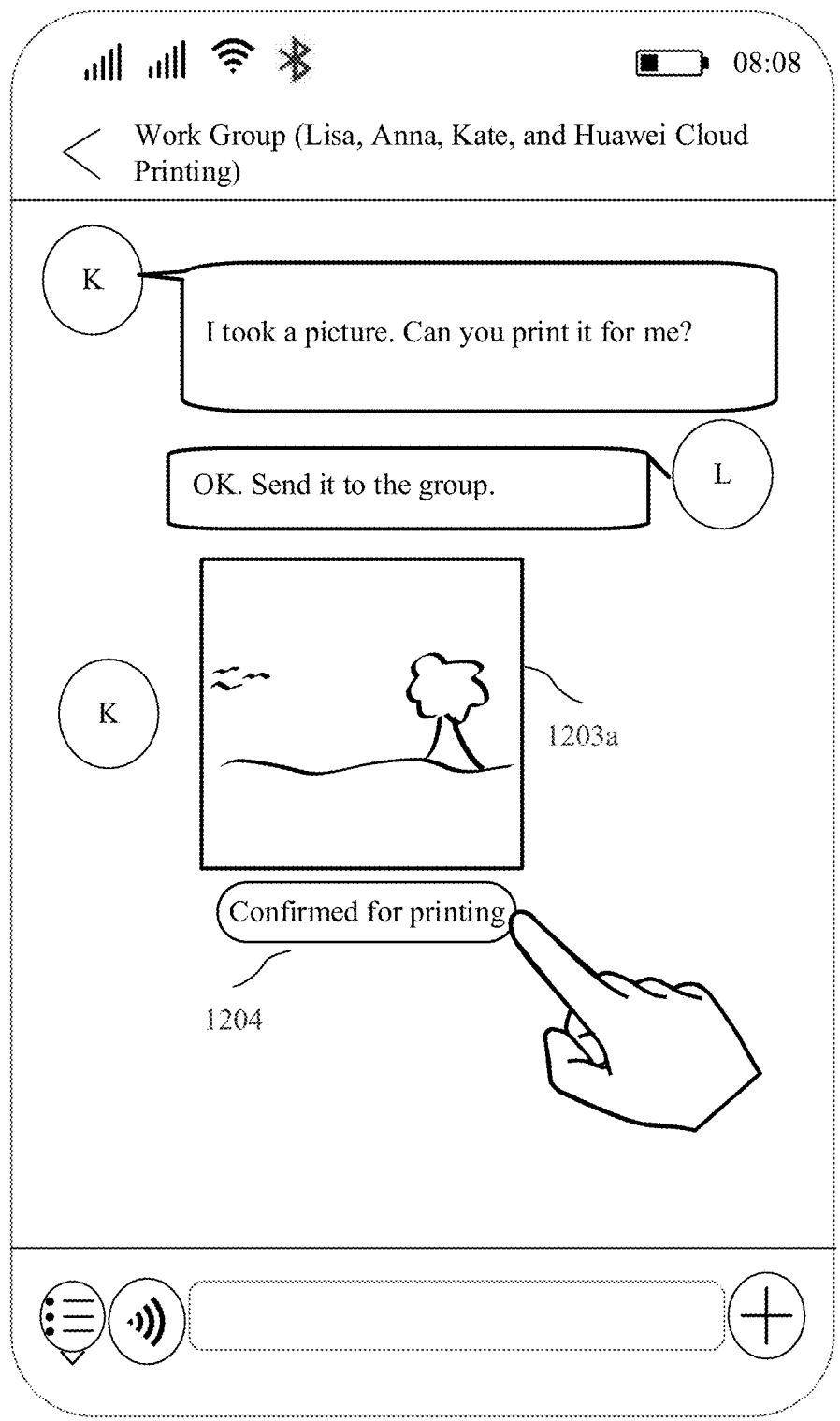

FIG. 12A and FIG. 12B are user interfaces implemented on the electronic device 1003. FIG. 12C and FIG. 12E are user interfaces implemented on the electronic device 1001. FIG. 12F to FIG. 12G are user interfaces implemented on the electronic device 1002.

The following uses the information in Table 1 to Table 3 as an example for descriptions of FIG. 12A to FIG. 12G. To be specific, associated users of the electronic devices 1001 to 1003 are respectively Lisa, Anna, and Kate. Lisa and Anna have the usage permission for the printer 4001, and Kate does not have the printing permission for the printer 4001. In the following embodiment of FIG. 12A to FIG. 12G, users Lisa, Anna, Kate, and the server 3001 (namely, HUAWEI Cloud Printing) all join a same group, that is, the "Work Group".

FIG. 12A shows a user interface 121 provided when the electronic device 1003 runs an instant messaging application (for example, "MeeTime"). The user interface 121 is configured to display a record of communication between the associated user Kate of the electronic device 1003 and a member of the group "Work Group".

As shown in FIG. 12A, the user interface 121 displays a status bar, a title bar, the record 1203 of communication between the associated user Kate of the electronic device 1003 and the member of the "Work Group", and a menu 1204.

For the status bar, refer to the status bar in FIG. 3A.

The title bar may include a current page indicator 1202*b* used to indicate a current page. For example, text information "Work Group (Lisa, Anna, Kate, and HUAWEI Cloud Printing)" is used to indicate that the current page is a page for communication between Kate and the member of the "Work Group" (namely, Lisa, Anna, Kate, and HUAWEI Cloud Printing). The title bar may further include a back button 1201*a*. The back button 1201*a* is configured to monitor a user operation. In response to the user operation, the electronic device 1001 may return to a logical previous interface.

For the menu 1204, refer to the menu 324 in FIG. 4D.

The communication record 1203 includes one or more pieces of communication information. The communication information may be information sent by any member in the "Work Group". The communication information may be a text, a picture, a video, or information of other types.

As shown in FIG. 12A, the communication record 1203 includes a picture 1203*a*. The picture 1203*a* may be a thumbnail, or may be an original picture. User Kate may send the picture 1203*a* by using a "More" control in the menu bar 1204 (reference can be made to the UI embodiment shown in FIG. 9B to FIG. 9F), or by first selecting the picture and then selecting the Work Group (reference can be made to the UI embodiment shown in FIG. 11A to FIG. 11D). This is not limited herein.

The electronic device 1003 sends the picture 1203*a* to the server 2001. After receiving the picture 1203*a*, the server 2001 determines whether the member in the "Work Group" has the usage permission for the printer managed by the server 3001 (namely, HUAWEI Cloud Printing), and if yes, returns a confirmation result to the electronic device associated with the member. Herein, because user Lisa and user Anna have the usage permission for the printer 4001, the server 2001 returns the confirmation result to the electronic devices 1001 and 1002.

FIG. 12C shows a user interface 122 displayed after the electronic device 1001 receives the confirmation result. The user interface 122 is configured to display a record of communication between the associated user Lisa of the electronic device 1001 and the member of the group "Work Group". As shown in FIG. 12C, a control 1204 used to trigger the printer to print the picture 1203*a* is displayed in the user interface 122.

FIG. 12F shows a user interface 123 displayed after the electronic device 1002 receives the confirmation result. The user interface 123 is configured to display a record of communication between the associated user Anna of the electronic device 1002 and the member of the group "Work Group". As shown in FIG. 12F, a control 1205 used to trigger the printer to print the picture 1203*a* is displayed in the user interface 123.

Both the control 1204 and the control 1205 may monitor a user operation, and the electronic device 1001 or the electronic device 1002 may trigger, in response to the user operation, the printer to print the picture 1203*a*.

Figure 12D:
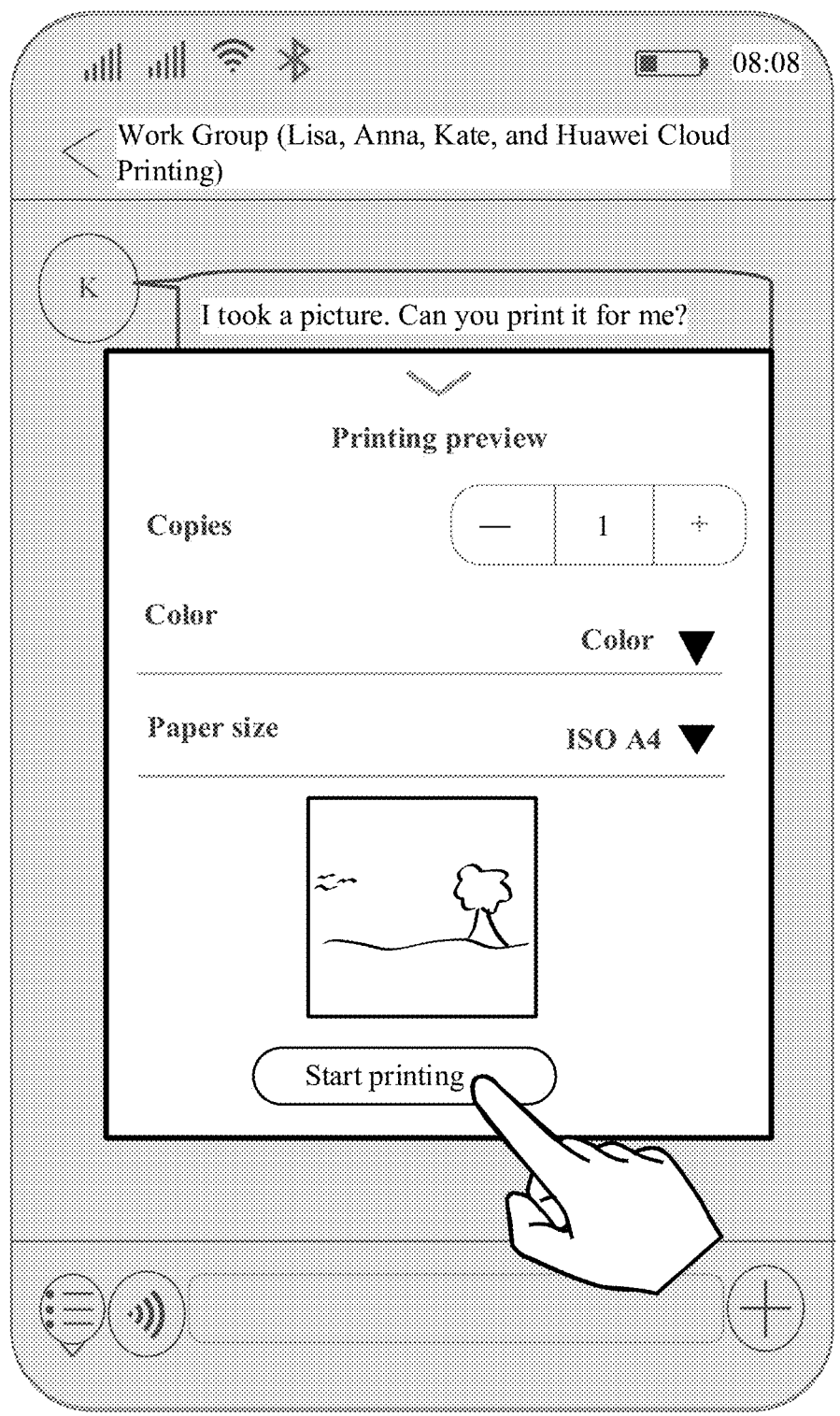
Figure 12E:
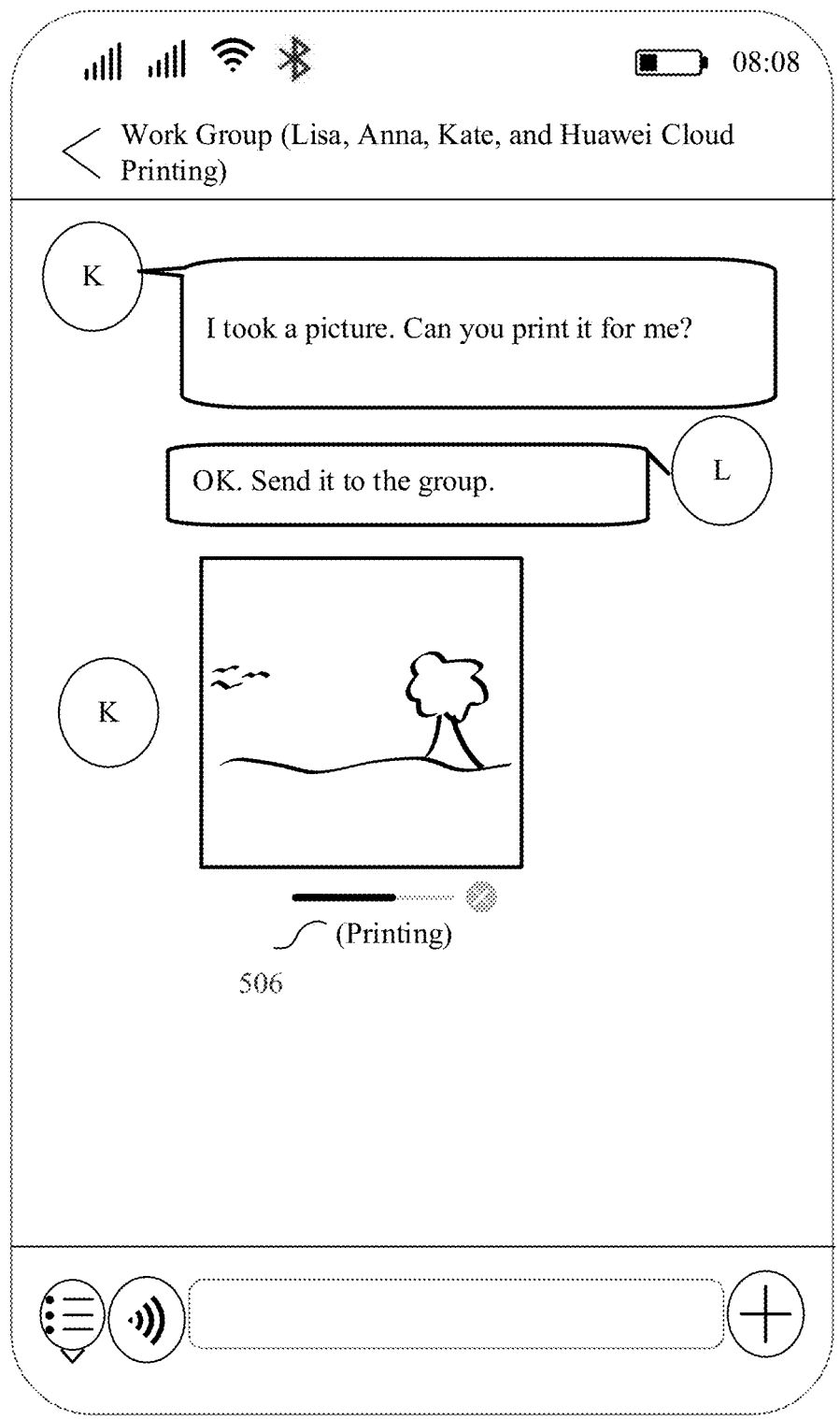
Figure 12F:
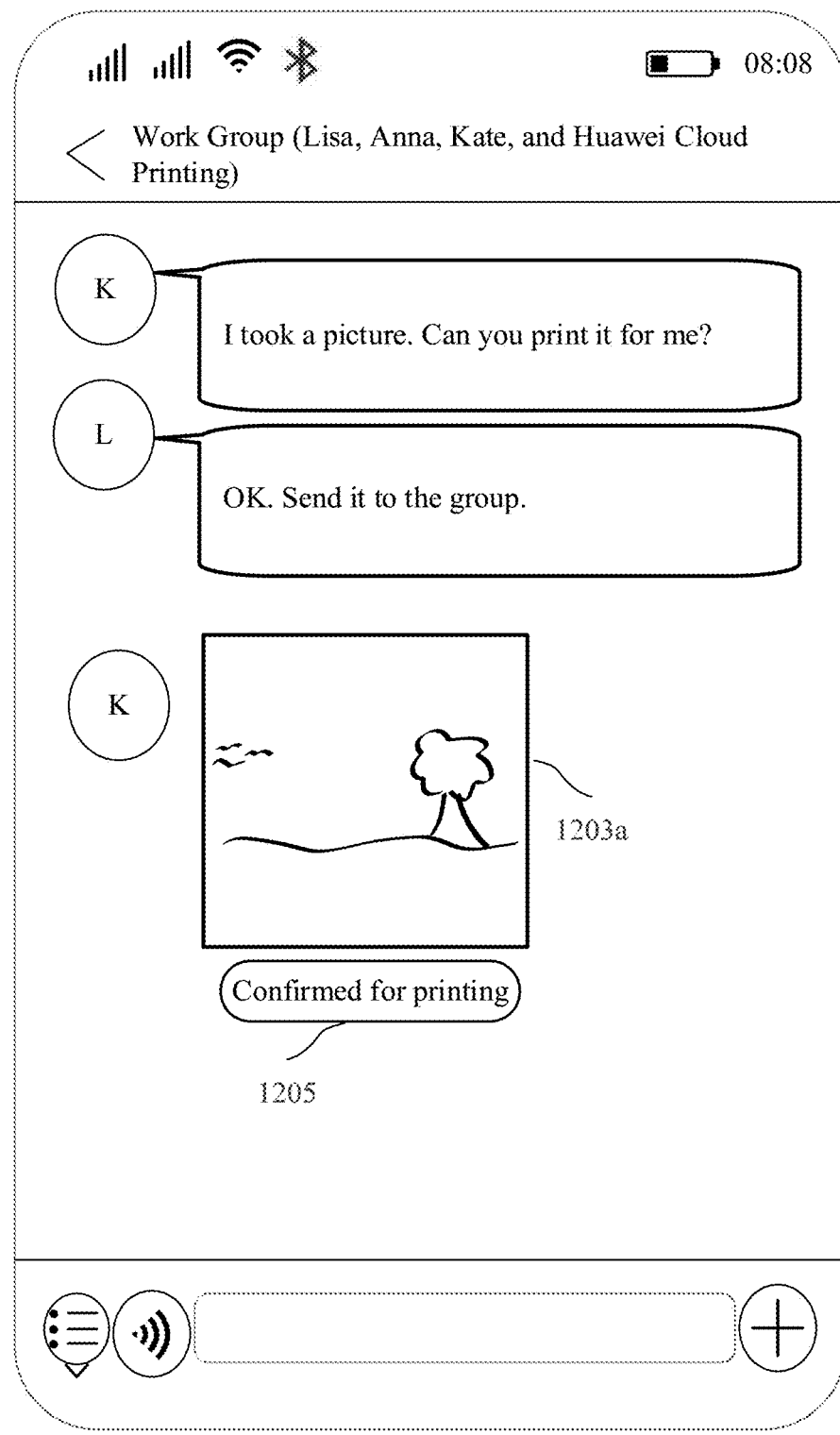
Figure 12G:
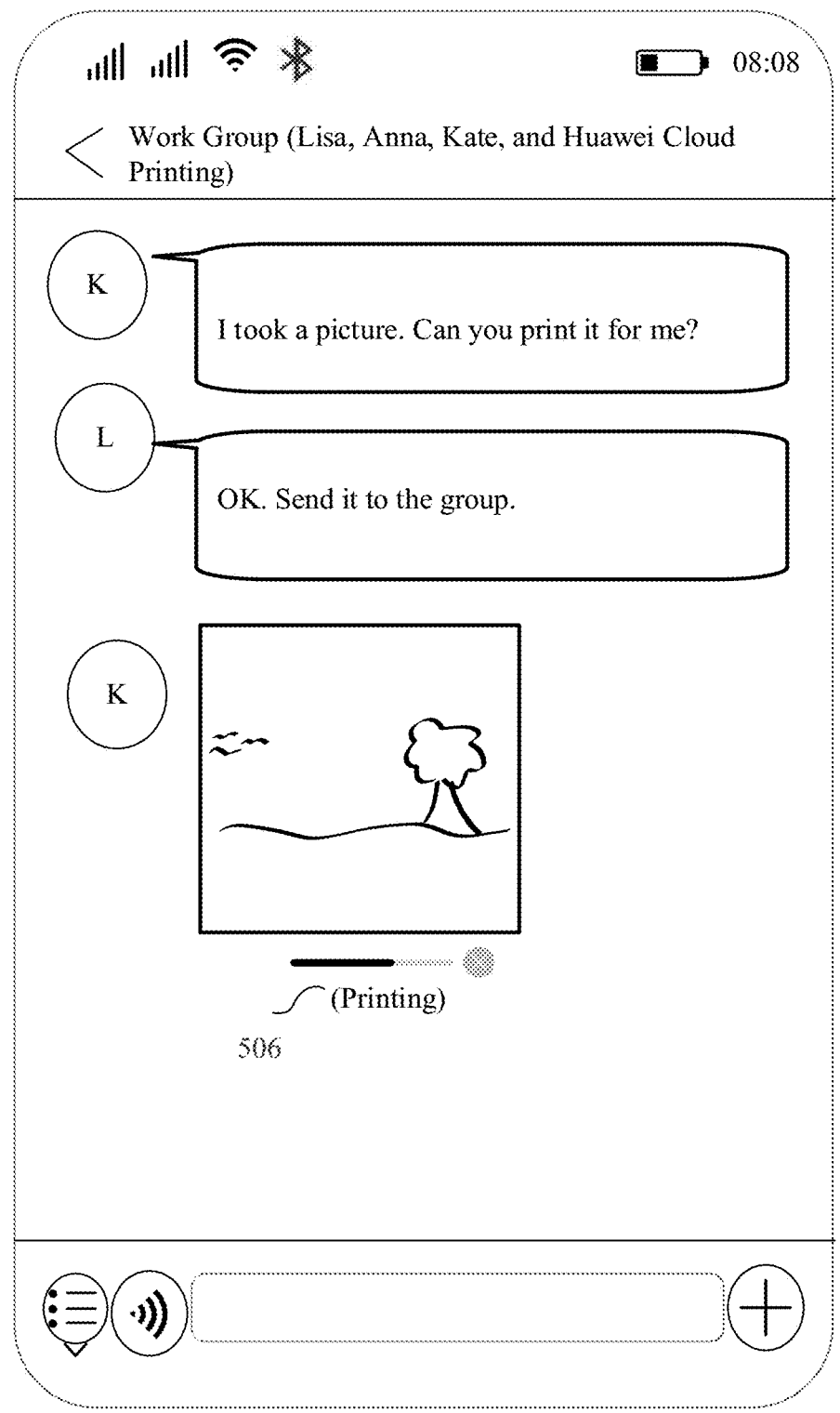

In some embodiments, in response to a detected user operation (such as a tap operation or a touch operation) performed on the control 1204 or the control 1205, the electronic device 1001 and the electronic device 1002 may display a window in FIG. 12D, where the window is used by the user for printing setting.

In some other embodiments, in response to a detected user operation (such as a tap operation or a touch operation) performed on the control 1204 or the control 1205, the electronic device 1001 or the electronic device 1002 may trigger the printer to print a corresponding picture based on a default printing setting.

It may be understood that, after the printer is triggered to print the picture 1203*a*, the electronic devices 1001 to 1003 may further display a user interface used for feeding back a file printing status and the like, for example, interfaces shown in FIG. 12B, FIG. 12E, and FIG. 12G. For several possible printing states of the file, refer to the foregoing related descriptions in FIG. 9I to FIG. 9L. In addition, when the user is bound with a plurality of printers, the user may autonomously select a printer for file printing. Herein, for details, refer to FIG. 9A to FIG. 9L, FIG. 10A to FIG. 10C, and related descriptions. The details are not described again.

According to the UI embodiment shown in FIG. 12A to FIG. 12G, a user without the usage permission for the printer may enter a group including a server contact and a contact having the usage permission for the printer, and may send a file to the group. After the contact having the usage permission for the printer in the group grants printing, the printer can be triggered to print the file. In this manner, the user does not need to add the server contact and become bound with the printer, and file printing can be convenient and fast by using a group. For the user, the process of file printing is simple.

The data shared by the electronic device to the printer is not limited to the file and picture in the foregoing UI embodiment, and may be a link, a web page, a chat record in an instant messaging application of a user, a text, or the like. UIs related to sharing a link, a web page, a chat record in an instant messaging application of a user, a text, and the like are not listed in this embodiment of this disclosure. A sharing process of the data is similar to that in the foregoing UI embodiment. For details, refer to the foregoing related descriptions.

In addition to the remote printing/cloud printing scenario provided above, embodiments of this disclosure further provide UI embodiments of remote projection/cloud projection and remote mirroring/cloud mirroring.

Figure 13A:
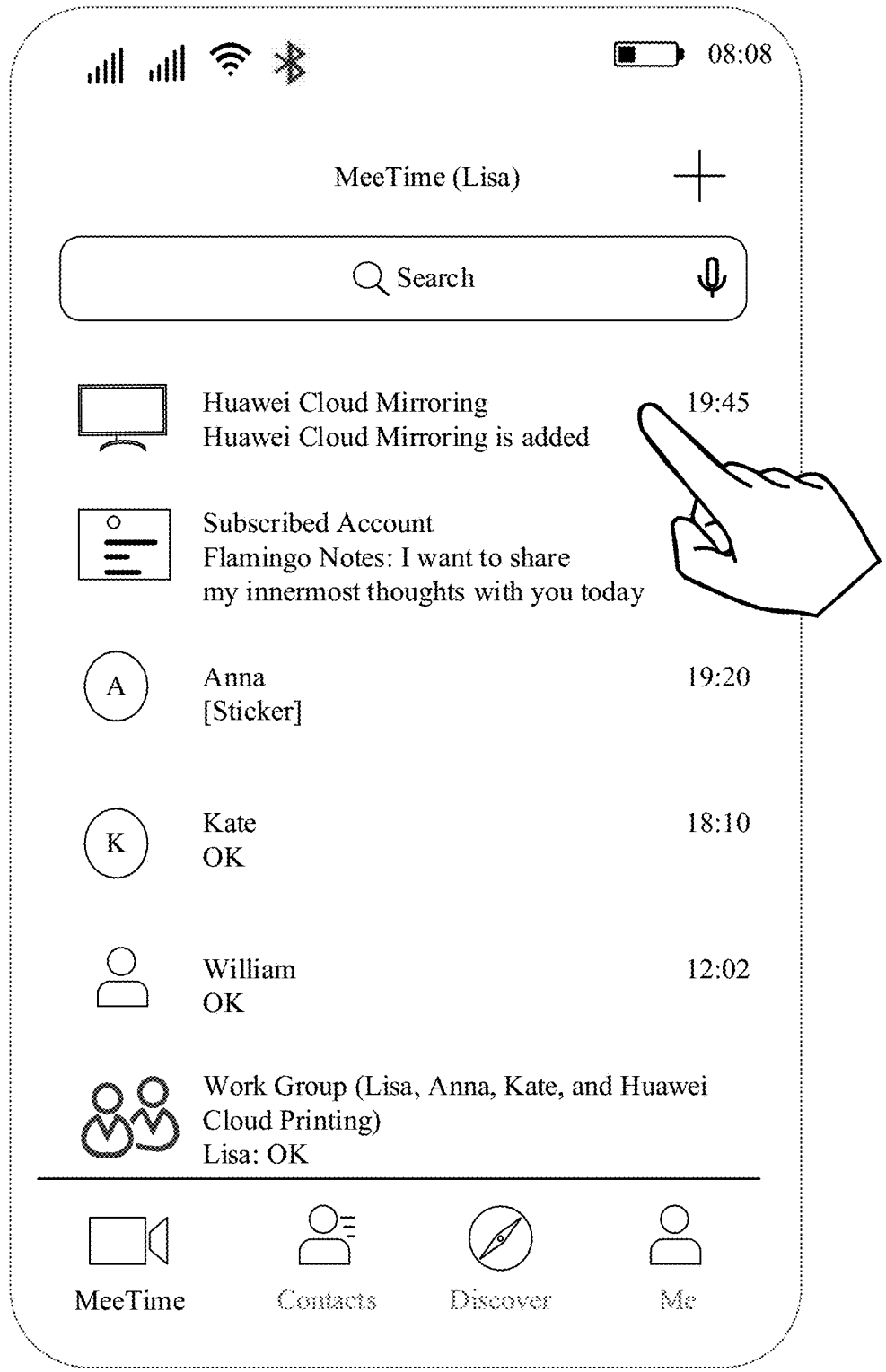
FIG. 13A, FIG. 13B, and FIG. 13C are a group of user interfaces for remote mirroring according to an embodiment of this disclosure.

As shown in FIG. 13A, for example, the user may add the server providing the cloud mirroring service and bind with a display, and a user interface 32 may display an option of a server contact.

Figure 13B:
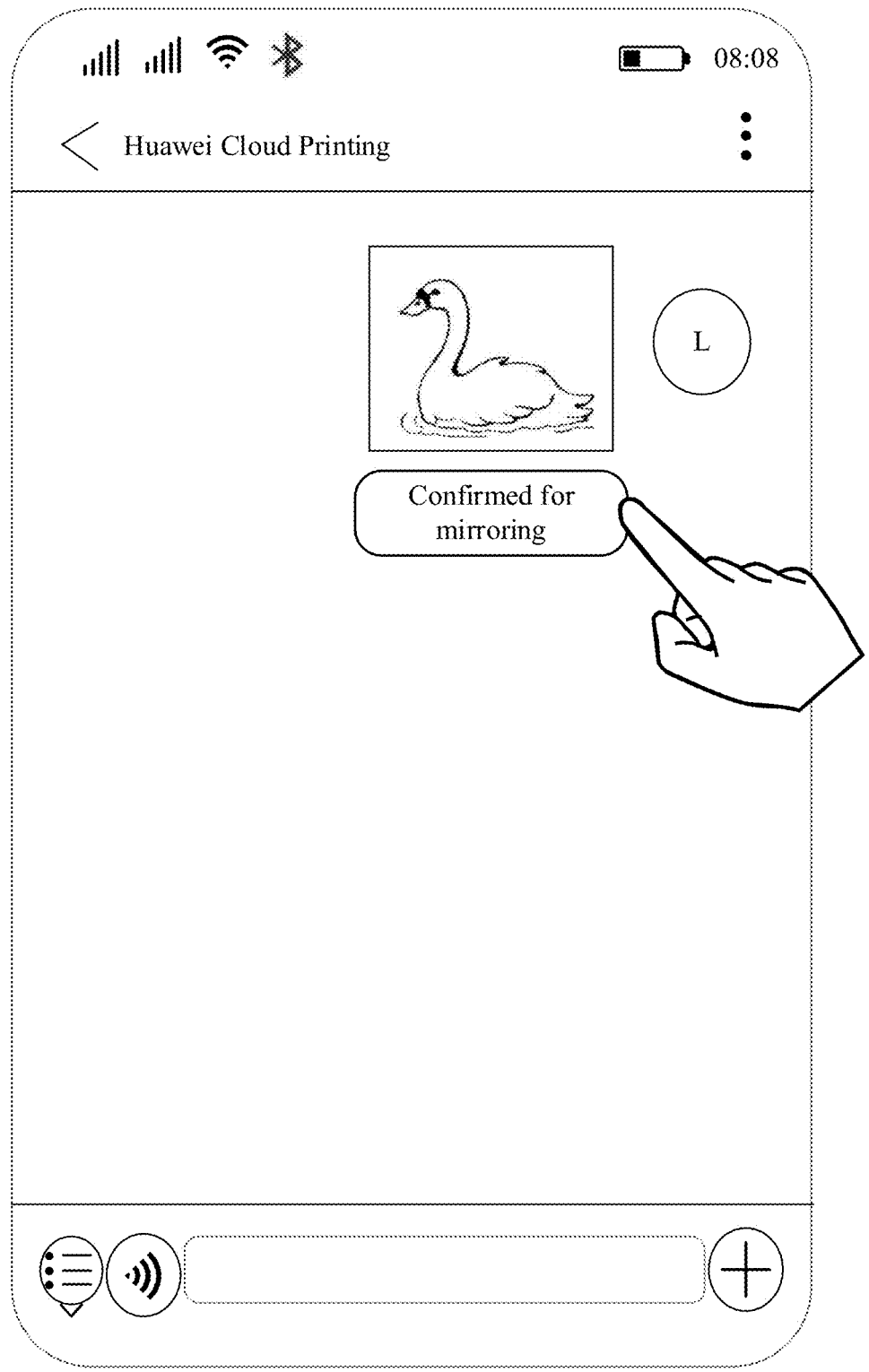

In some embodiments, in the example user interface shown in FIG. 13A, in response to a detected user operation performed on the option of the server contact providing the cloud mirroring service, the electronic device displays a user interface 131 shown in FIG. 13B.

As shown in FIG. 13B, after sending a picture to the server contact, the user may tap a control used for mirroring to trigger mirroring. The electronic device may trigger the display bound with the user to display a picture selected by the user, and may further display a small window shown in FIG. 13C as an example. The small window may be used by the user to perform mirroring control, for example, start, pause, stop, play the previous page, play the next page, increase the volume, or decrease the volume.

Figure 13C:
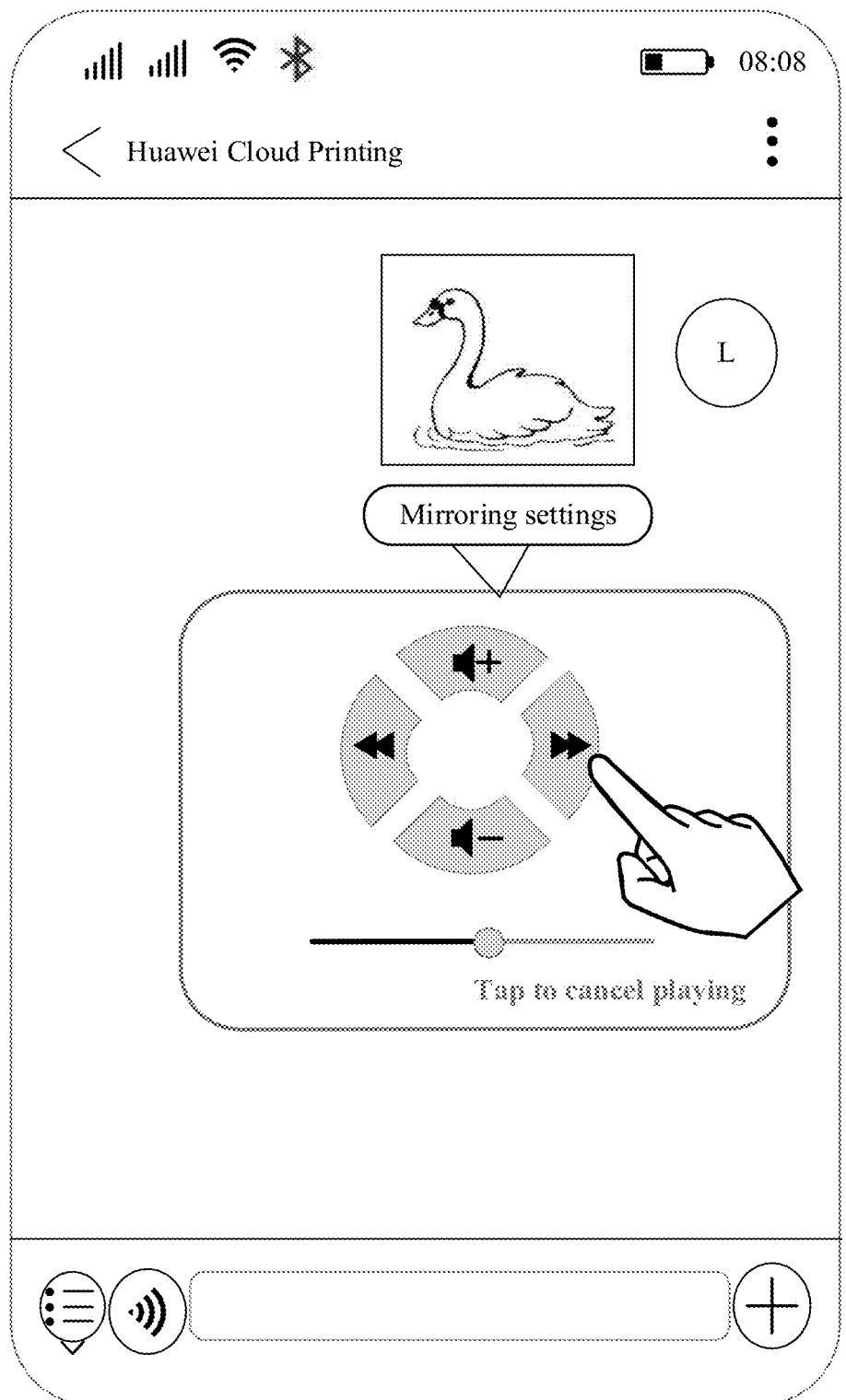

Similarly, the user interface 131 shown in FIG. 13C may also be configured to feed back a mirroring status of the picture selected by the user, for example, a mirroring task is queuing, displaying . . . , mirroring completes, or mirroring fails.

It may be understood that for content that is not mentioned in the UI embodiments in which projection or mirroring is performed by using the electronic device, refer to the foregoing UI embodiments in which printing is performed by using the electronic device. Details are not described herein again.

It can be learned that implementation of the user using the electronic device to perform projection or mirroring is similar to the specific implementation of the user using the electronic device to perform printing, so that a projection or mirroring process is simple and intuitive.

First, the following describes a method for adding a server contact and binding a printer.

Figure 14:
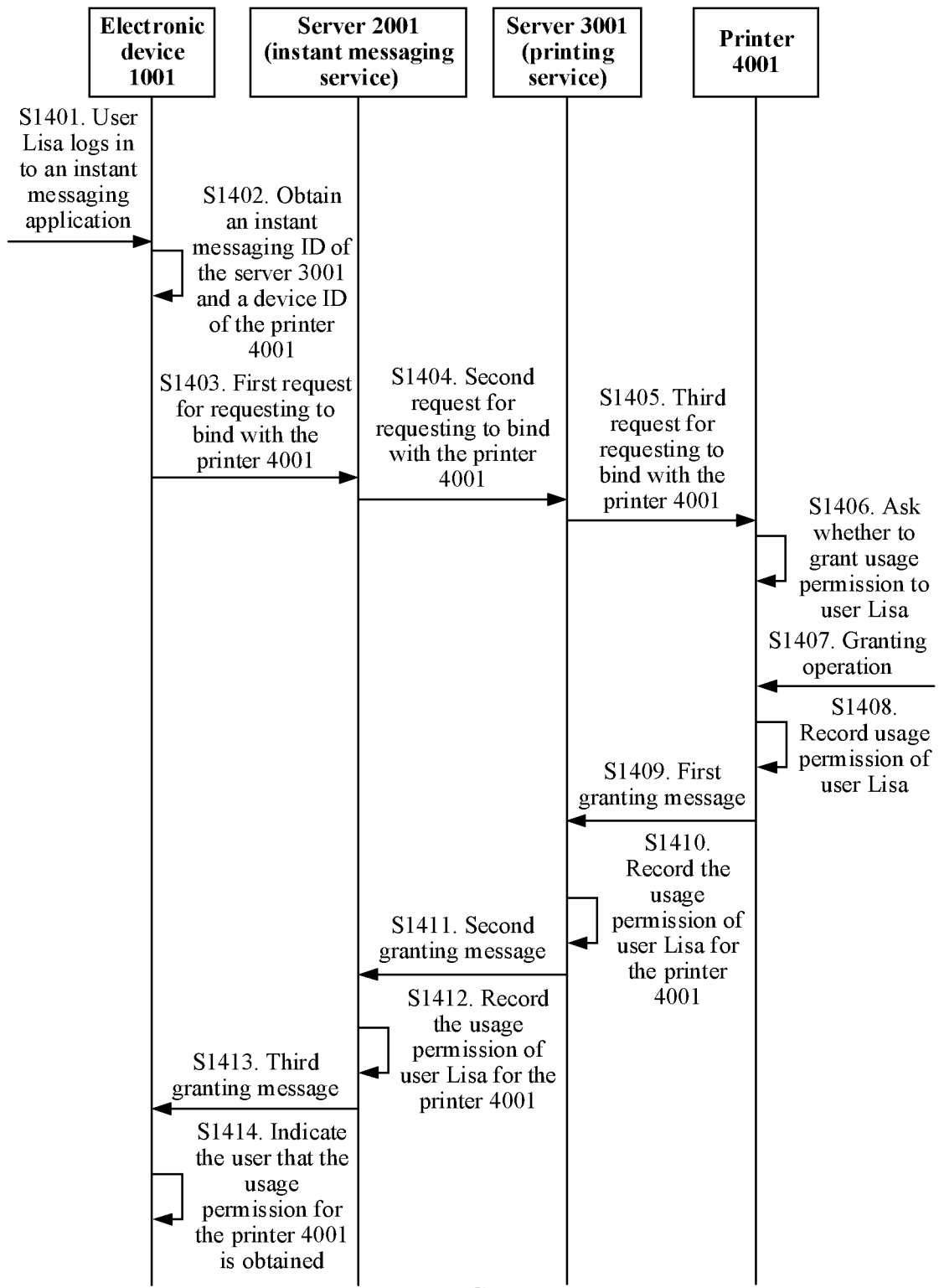
FIG. 14 is a flowchart of a method for adding a server contact and binding a printer according to an embodiment of this disclosure.

FIG. 14 is a flowchart of the method for adding a server contact and binding a printer according to an embodiment of this disclosure.

FIG. 14 is described by using an example in which the associated user of the electronic device 1001 (namely, "Lisa") adds the server 3001 as a contact and becomes bound with the printer 4001.

As shown in FIG. 14, the method may include the following steps.

S1401. User Lisa logs, by using an identity, in to an instant messaging application installed in the electronic device 1001.

Further, user Lisa may enter the identity of user Lisa to the electronic device 1001, for example, an account (for example, a name, a HUAWEI identity (ID), or a mobile phone number) and a password, a face image, a voiceprint, or a fingerprint, to log in to the instant messaging application, for example, "MeeTime".

After user Lisa logs in to the instant messaging application on the electronic device 1001, user Lisa and the electronic device 1001 are associated with each other.

S1402. The electronic device 1001 obtains the instant messaging ID of the server 3001 and the device ID of the printer 4001.

The server 3001 provides the printing service, and manages the printer 4001. For the structures and functions of the server 3001 and the printer 4001, refer to the foregoing related descriptions.

The electronic device 1001 may simultaneously obtain the instant messaging ID of the server 3001 and the device ID of the printer 4001, or may separately obtain the foregoing two pieces of information. This is not limited in this embodiment of this disclosure.

For example, refer to FIG. 3A to FIG. 3E. The electronic device 1001 may simultaneously obtain the instant messaging ID of the server 3001 and the device ID of the printer 4001 through code scanning.

For another example, refer to FIG. 4A to FIG. 4E. The electronic device 1001 may receive the instant messaging ID of the server 3001 and the device ID of the printer 4001 that are separately entered by the user.

For still another example, refer to FIG. 5A to FIG. 5I. The electronic device 1001 may receive the instant messaging ID of the server 3001 and the device ID of the printer 4001 that are shared by the contact of user Lisa in the instant messaging application.

S1403. The electronic device 1001 sends a first request to the server 2001. The first request carries an instant messaging ID of user Lisa, the instant messaging ID of the server 3001, and the device ID of the printer 4001. The first request is used to request to add the server 3001 as a contact of user Lisa in the instant messaging application, and bind user Lisa with the printer 4001.

The server 2001 provides the instant messaging service. For the structure and function of the server 2001, refer to the foregoing related descriptions.

In some embodiments, after obtaining the instant messaging ID of the server 3001 and the device ID of the printer 4001, the electronic device 1001 may send the first request to the server 2001 in response to a received user operation. For example, the user operation may be a user operation detected on the control 317 shown in FIG. 3F, or may be a user operation detected on the control 328 shown in FIG. 5H.

In some other embodiments, after obtaining the instant messaging ID of the server 3001 and the device ID of the printer 4001, the electronic device 1001 may directly send the first request to the server 2001 while the user operation is not performed. For example, refer to FIG. 4E. The electronic device 1001 may directly send the first request after receiving the device ID of the printer 4001 (for example, IP 4001) entered by user Lisa.

S1404. The server 2001 receives the first request, and sends a second request to the server 3001 based on the instant messaging ID of the server 3001. The second request carries the instant messaging ID of user Lisa and the device ID of the printer 4001. The second request is used to request to add the server 3001 as a contact of user Lisa in the instant messaging application, and bind user Lisa with the printer 4001.

Further, refer to Table 2. The server 2001 may store an instant messaging ID and a device ID of each server providing a printing/projection/mirroring service. Therefore, after receiving the first request, the server 2001 may find the device ID of the server 3001 based on the instant messaging ID of the server 3001, to send the second request to the server 3001.

S1405. The server 3001 receives the second request, and sends a third request to the printer 4001 based on the device ID of the printer 4001. The third request carries the instant messaging ID of user Lisa. The third request is used to request to bind user Lisa with the printer 4001.

S1406. The printer 4001 receives the third request, and asks the user whether to grant the usage permission for the printer 4001 to user Lisa.

The printer 4001 may display the user interface 36 shown in FIG. 3G, and ask the user whether to approve to bind user Lisa with the printer 4001, in other words, ask the user whether to grant the usage permission for the printer 4001 to user Lisa.

The asking manner is not limited to displaying the user interface. The printer 4001 may ask the user in another manner, for example, may output a speech instruction. This is not limited herein.

S1407. The printer 4001 receives a granting operation, where the granting operation is used to grant the usage permission for the printer 4001 to user Lisa.

For example, the granting operation may be a user operation, a speech instruction, or the like detected on the control 321 of the user interface 36 shown in FIG. 3G. This is not limited herein.

S1408. The printer 4001 records the usage permission of user Lisa for the printer 4001.

In some embodiments, if the usage permission for the printer 4001 is granted for the first time, the management permission for the printer 4001 may be granted to user Lisa. If it is not the first time that the usage permission for the printer 4001 is granted, the normal permission for the printer 4001 may be granted to user Lisa.

Further, refer to Table 4. The printer 4001 may locally store the instant messaging ID of user Lisa, to indicate that user Lisa has the usage permission for the printer 4001. In some embodiments, the printer 4001 may further clearly record that whether the usage permission is the management permission or the normal permission.

S1409. The printer 4001 sends a first granting message to the server 3001, where the first granting message indicates that the usage permission for the printer 4001 is granted to user Lisa.

S1410. The server 3001 receives the first granting message, and records the usage permission of user Lisa for the printer 4001.

Further, refer to Table 3. The device ID of the printer 4001 and the instant messaging ID of user Lisa are locally stored and associated with each other by the server 3001, to indicate that user Lisa has the usage permission for the printer 4001. In some embodiments, the server 3001 may further clearly record that whether the usage permission is the management permission or the normal permission.

S1411. The server 3001 sends a second granting message to the server 2001, where the second granting message indicates that the usage permission for the printer 4001 is granted to user Lisa.

S1412. The server 2001 receives the second granting message, and records the server 3001 as the contact of user Lisa in the instant messaging application.

Further, refer to Table 1. The instant messaging ID of user Lisa and the instant messaging ID of the server 3001 are locally stored and associated with each other by the server 2001, to indicate that the server 3001 is the contact of user Lisa in an instant messaging application.

S1413. The server 2001 sends a third granting message to the electronic device 1001, where the third granting message indicates that the server 3001 is added as the contact of user Lisa in the instant messaging application, and that user Lisa is bound with the printer 4001.

S1414. The electronic device 1001 receives the third granting message, and indicates the user that the usage permission for the printer 4001 is granted.

For example, refer to FIG. 3H or FIG. 4E. The electronic device 1001 may display the user interface 37, and notify the user by using the communication message 323*a* or the communication message 323*d*.

In this case, user Lisa adds the server 3001 as the contact in the instant messaging application, and is bound with the printer 4001.

User Lisa adding the server 3001 as the contact in the instant messaging application means that instant messaging IDs of user Lisa and the server 3001 are stored and associated with each other by the server 2001, and that user Lisa may communicate with the server 3001 through an associated device.

Binding user Lisa with the printer 4001 means that user Lisa obtains the usage permission for the printer 4001, and the instant messaging ID of user Lisa and the device ID of the printer 4001 are stored and associated with each other by the server 3001. The printer 4001 stores the instant messaging ID of user Lisa.

It may be understood that FIG. 14 shows the process in which the usage permission for the printer is granted to the user through usage permission granting on the printer, and in other embodiments, device interaction processes required when the usage permission for the printer is granted to the user through sharing performed by the administrator or in other cases are slightly different from that in FIG. 14. Details are not described herein again.

A method process in which the administrator of the printer manages a binding relationship between each user and the printer is different from that in FIG. 14, but is generally similar to that in FIG. 14. There are changes of information stored in the server 3001 and the printer 4001 in both processes. Details are not described herein again.

The following describes in detail the data sharing method provided in embodiments of this disclosure by using an example in which an electronic device is used for printing.

Figure 15A:
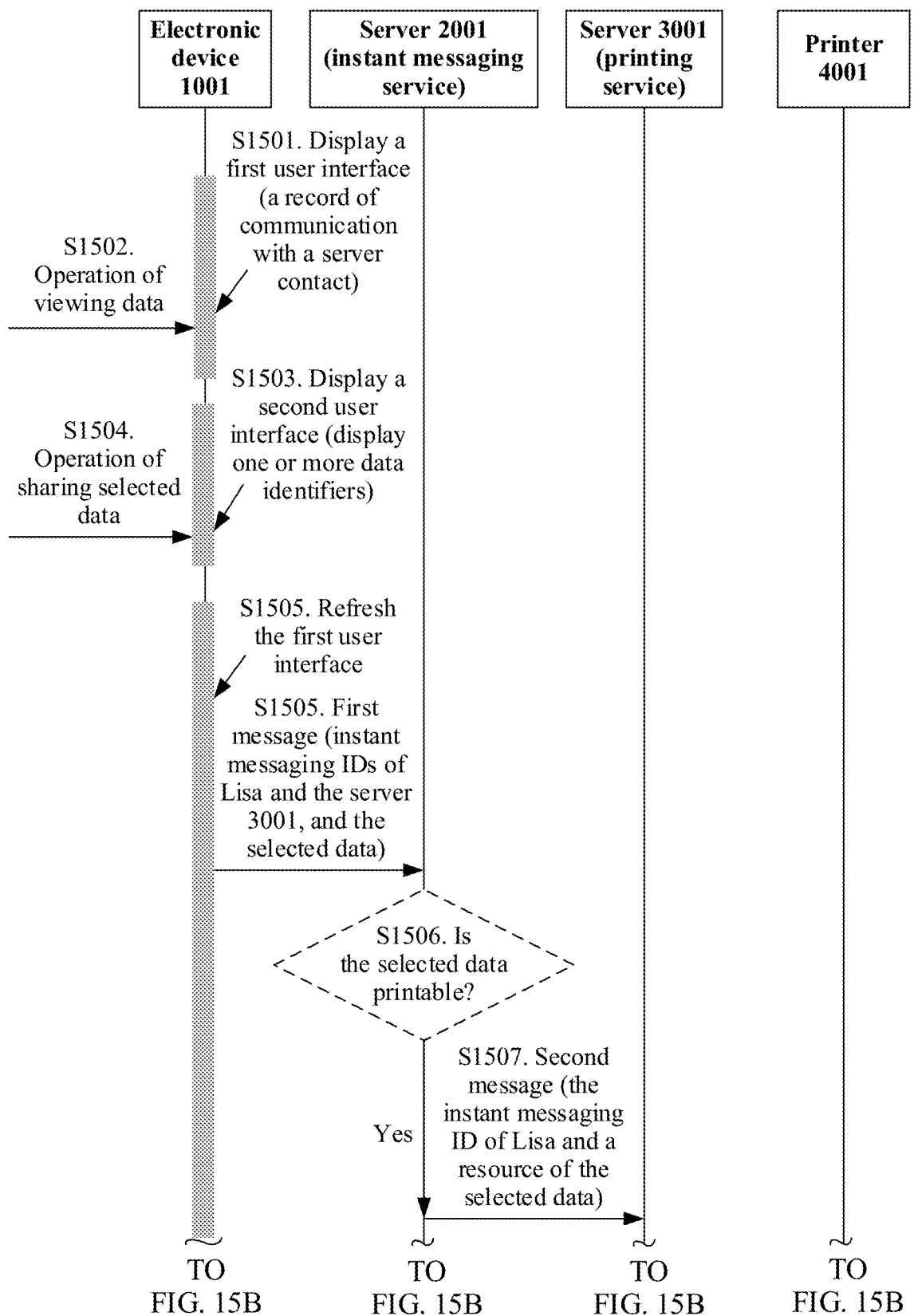
FIG. 15A, FIG. 15B, and FIG. 15C are a flowchart of a data sharing method according to an embodiment of this disclosure.
Figure 15B:
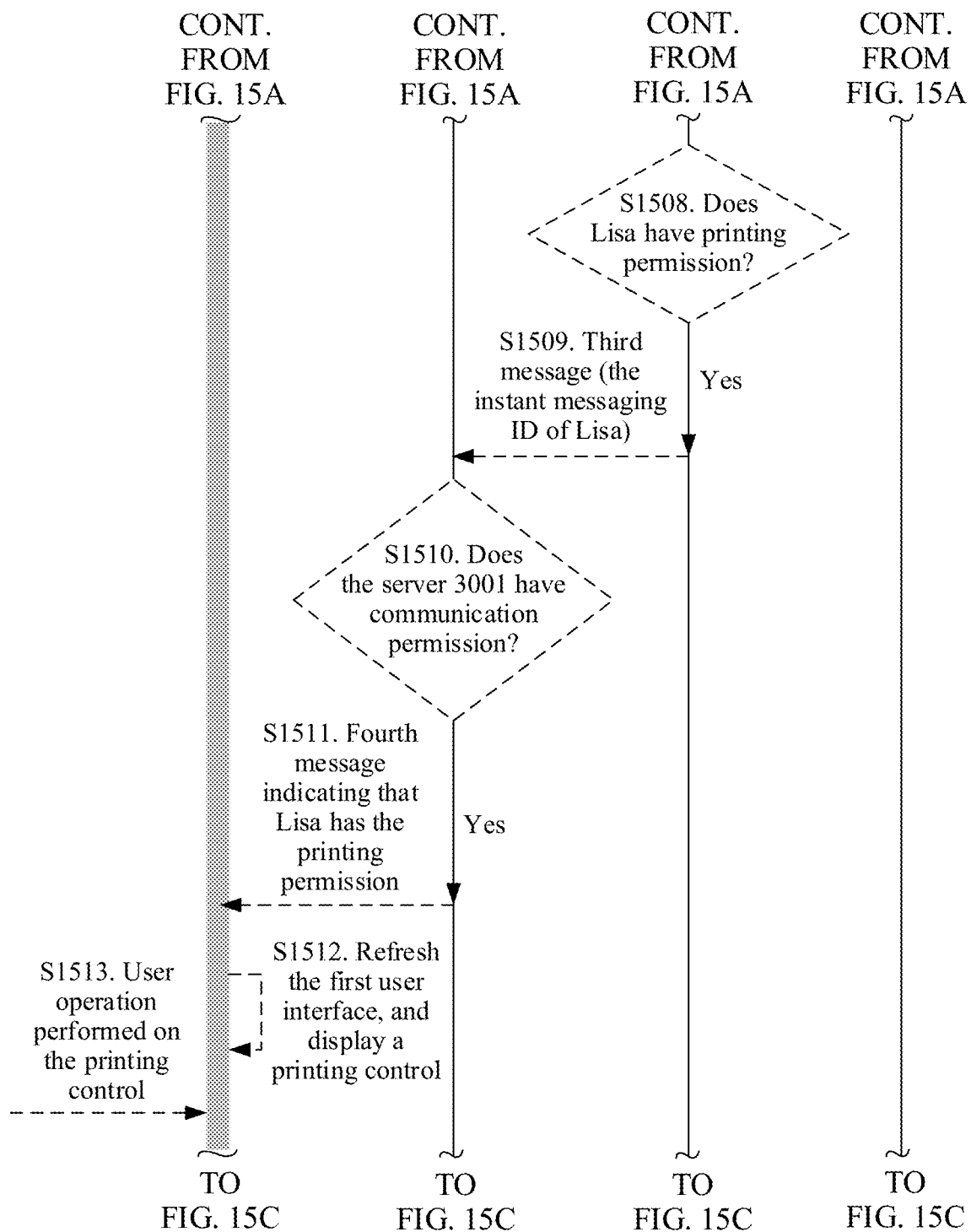
Figure 15C:
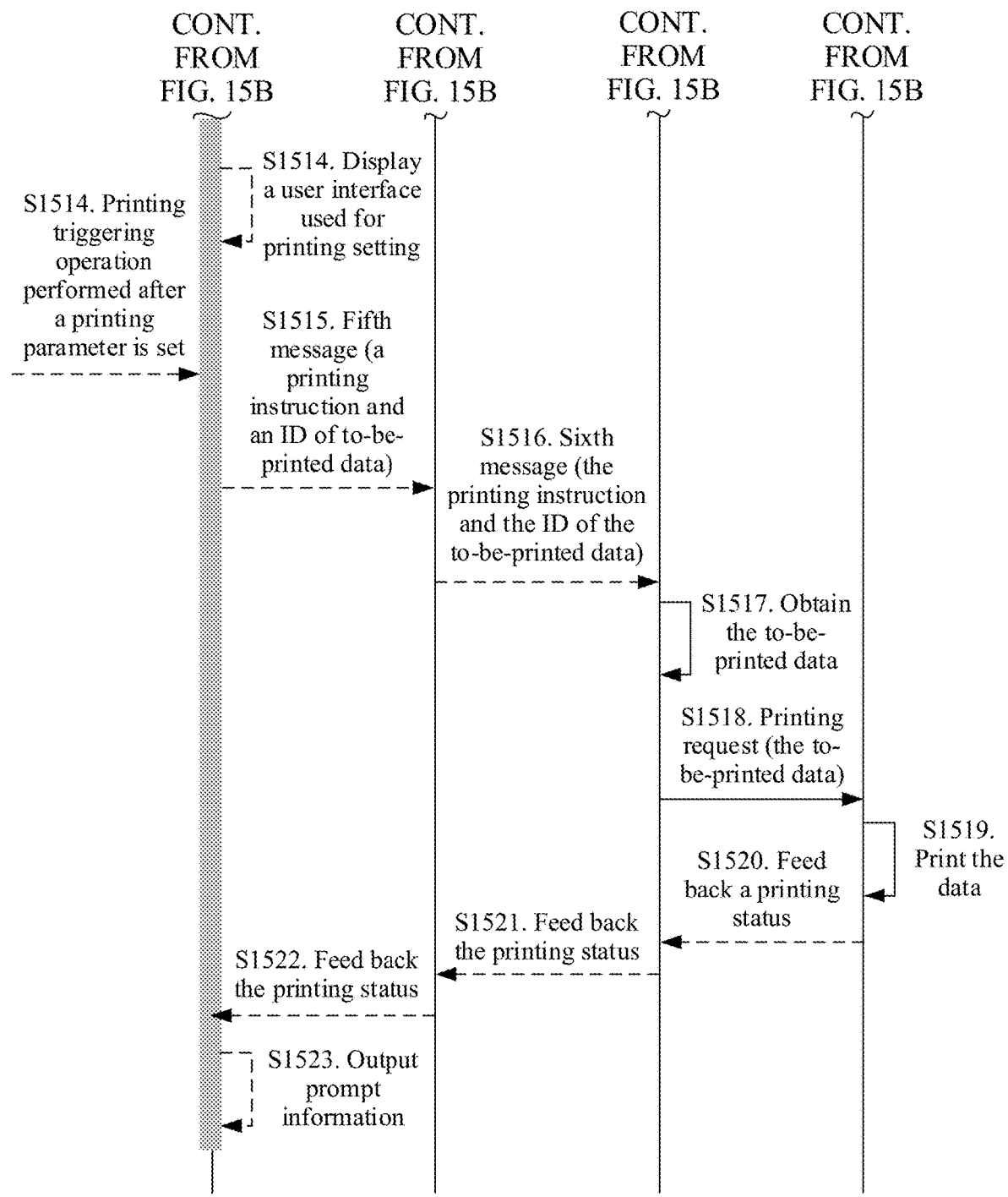
Figure 16A:
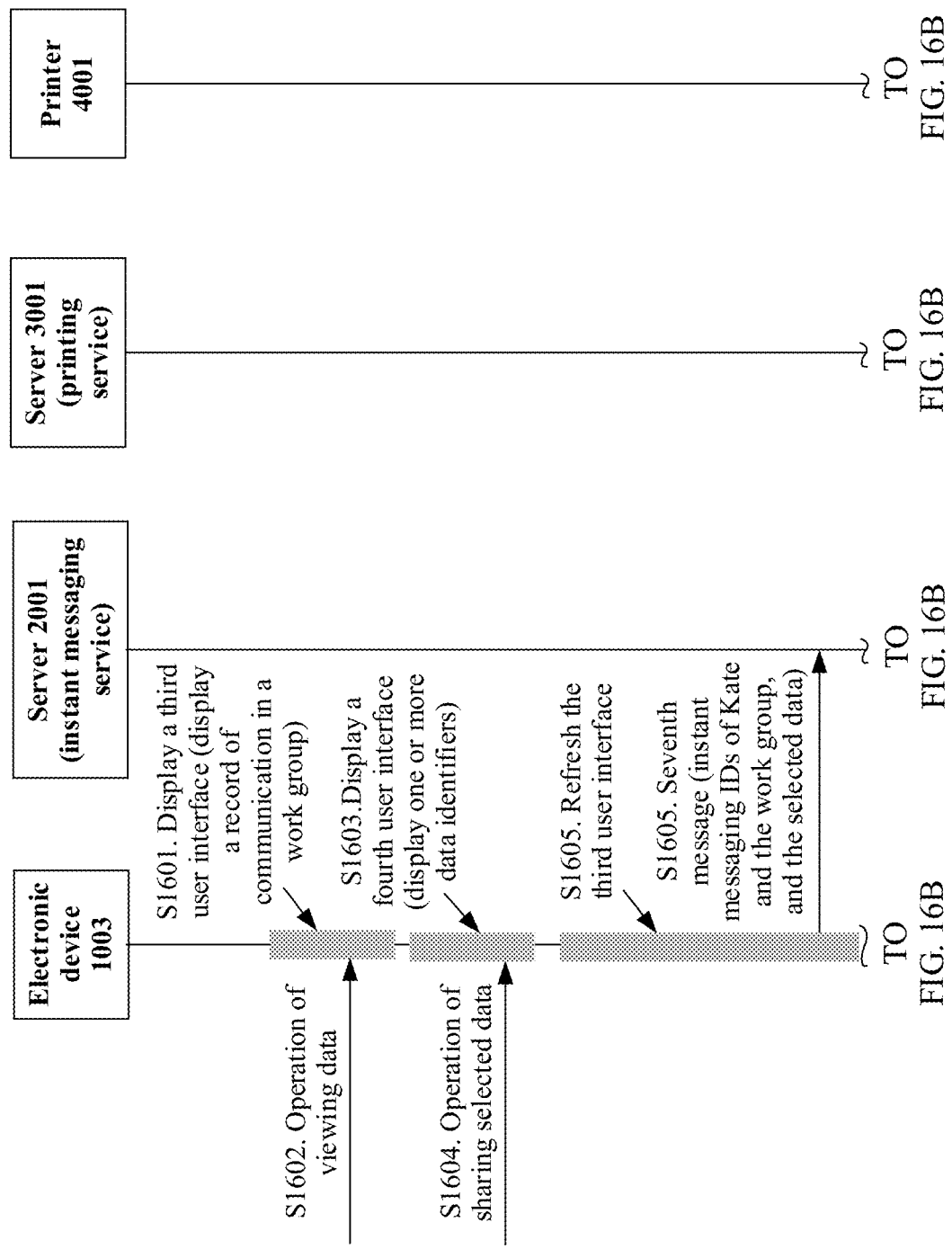
Figure 16C:
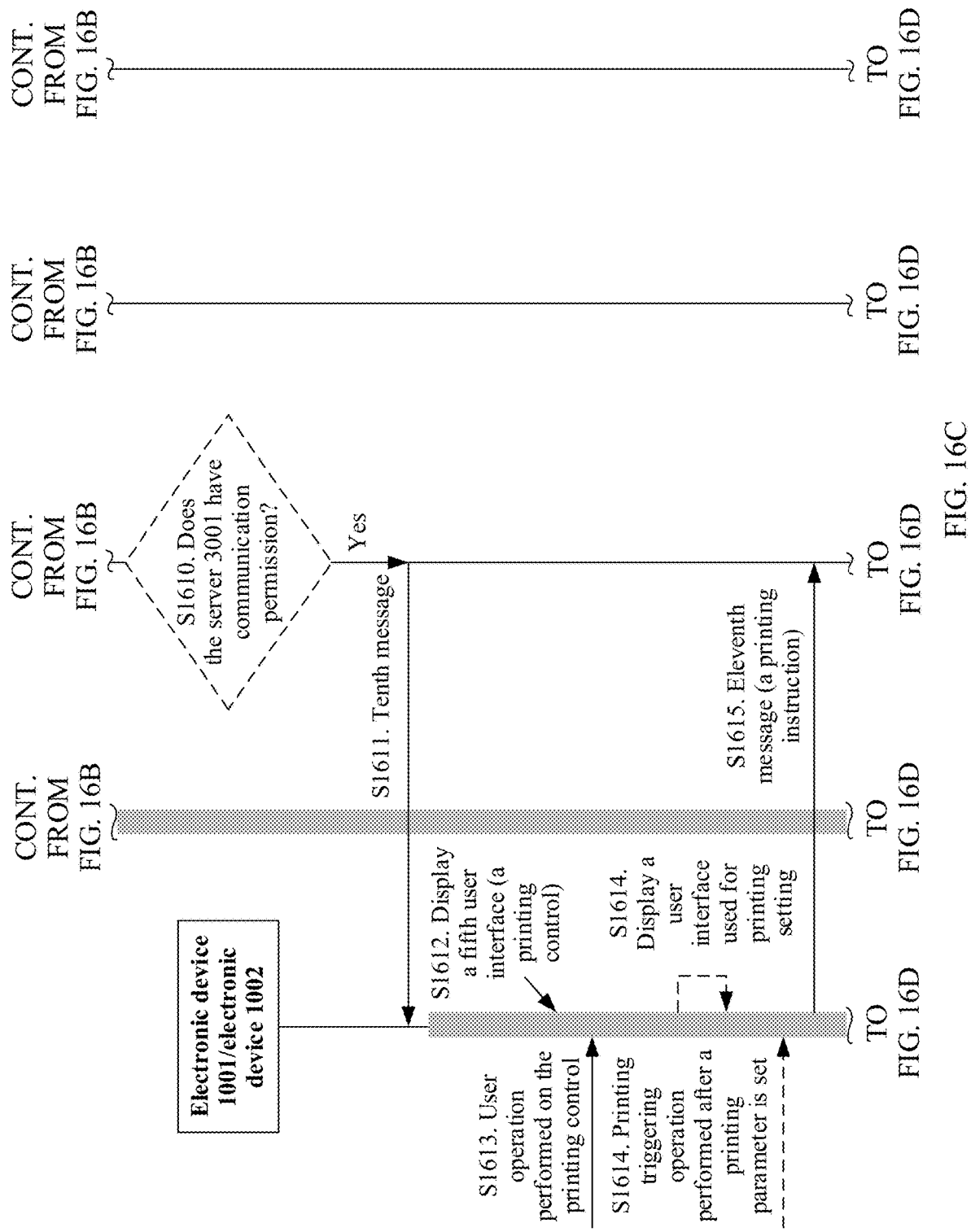
Figure 16D:
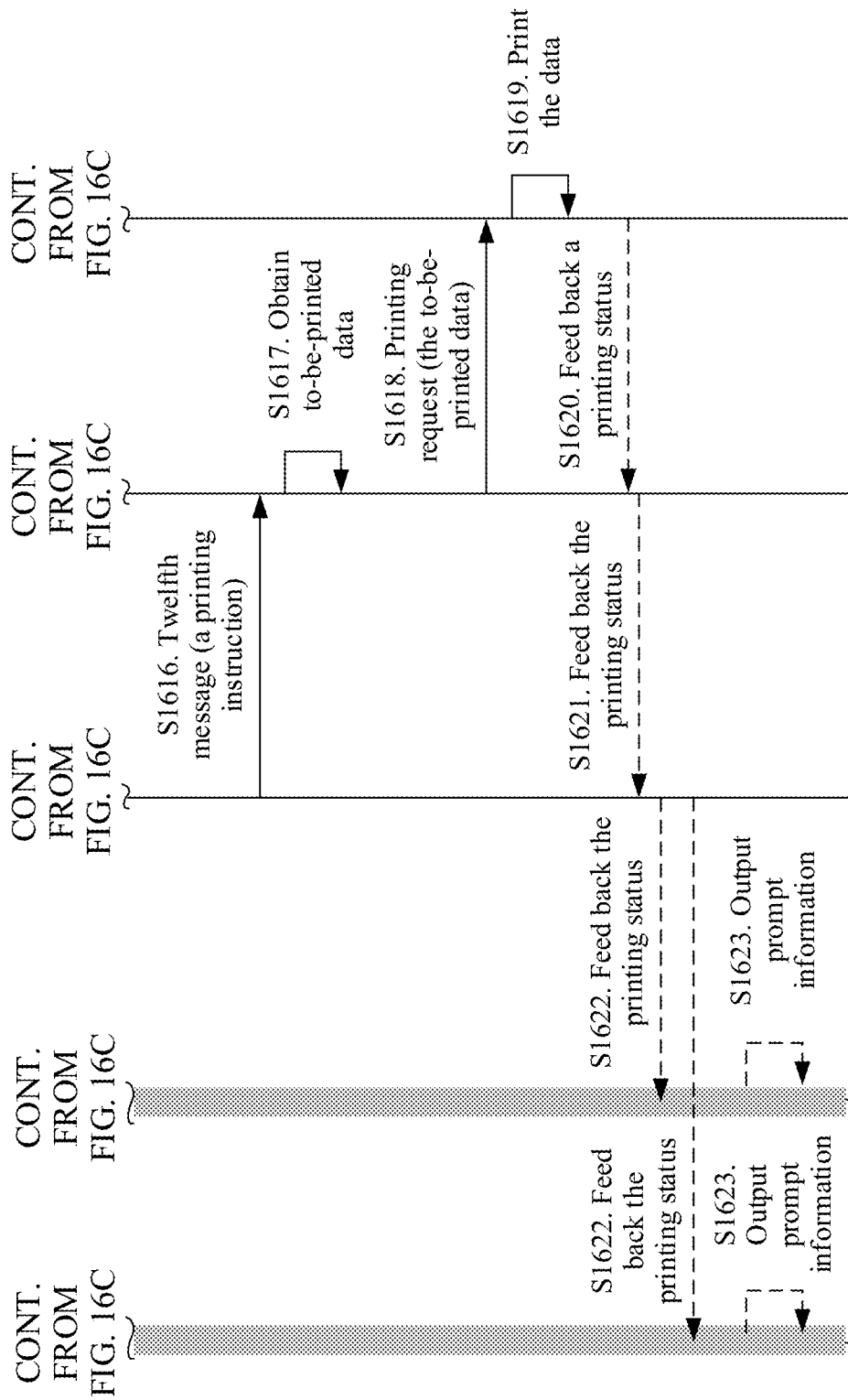

FIG. 15A, FIG. 15B, and FIG. 15C show a data sharing method according to an embodiment of this disclosure.

In the method shown in FIG. 15A, FIG. 15B, and FIG. 15C, the electronic device 1001 may send printable data such as a picture, a document, a link, a chat record, and a text to a server contact providing a printing service, share the data to a printer bound with a user, and trigger the printer to print the data.

In the method shown in FIG. 15A, FIG. 15B, and FIG. 15C, an example in which user Lisa logs in to the instant messaging application in the electronic device 1001 and shares data to the printer 4001 for printing is used for description.

As shown in FIG. 15A, FIG. 15B, and FIG. 15C, the data sharing method may include the following steps.

S1501 to S1505. Select data for printing.

S1501. The electronic device 1001 displays a first user interface, where the first user interface is provided by an instant messaging application, and is used to display a record of communication between the associated user of the electronic device 1001 and the server 3001 providing the printing service.

For example, the instant messaging application may be "MeeTime" provided by HUAWEI.

For example, the first user interface may be the user interface 37 implemented on the electronic device 1001 as shown in FIG. 3H, FIG. 4D, FIG. 4E, FIG. 5D to FIG. 5F, and FIG. 9B.

The first user interface may be displayed by the electronic device 1001 in response to an operation of tapping the server option 901 in FIG. 9B after the user taps the icon 301 of "MeeTime" in the user interface 31 shown in FIG. 3A. This is not limited thereto. The electronic device 1001 may display the first user interface in response to another operation. This is not limited in this embodiment of this disclosure.

The communication record in the first user interface may include a historical communication record, or the communication record may be empty. This is not limited in this embodiment of this disclosure.

In some embodiments, the electronic device 1001 can display the first user interface only when the associated user (namely, Lisa) adds the server 3001 as the contact and is bound with the printer managed by the server 3001, for example, display the user interface shown in FIG. 3H.

In some other embodiments, when the electronic device 1001 adds the server 3001 as the contact, but is not bound with the printer managed by the server 3001, the electronic device 1001 may also display the first user interface, for example, displays the user interface shown in FIG. 4D.

S1502. The electronic device 1001 detects, in the first user interface, an operation of viewing data.

For example, the operation of viewing data may be a user operation (for example, a tap operation or a touch operation) performed on the option 902a or the option 902c in FIG. 9C displayed by the electronic device 1001 after a user operation (for example, a tap operation or a touch operation) is performed on the control 324d in the user interface 37 shown in FIG. 9B. As shown in FIG. 9B and FIG. 9C, in response to the user operation performed on the control 324d in the user interface 37 shown in FIG. 9B, the electronic device 1001 displays more function service options in the user interface 37, for example, the option 902a used for image sharing and the option 902c used for file sharing.

This is not limited thereto. The operation of viewing data may alternatively be in another form, for example, may be a speech instruction. This is not limited in this embodiment of this disclosure.

In some embodiments, the associated user (namely, Lisa) of the electronic device 1001 can input the operation of viewing data only when the associated user adds the server 3001 as the contact and is bound with the printer managed by the server 3001. Refer to FIG. 4D. When user Lisa is not bound with the printer managed by the server 3001, the control 324d is not usable. Refer to FIG. 4E. After the user is bound with the printer 4001 associated with the server 3001, the control 324d is usable, and the user may tap the control 324d to input the operation of viewing data.

In some other embodiments, the associated user of the electronic device 1001 (namely, Lisa) can also input the operation of viewing data when the associated user adds only the server 3001 as the contact and is not bound with the printer managed by the server 3001.

S1503. The electronic device 1001 displays a second user interface in response to a detected operation of viewing data. The second user interface displays identifiers of one or more pieces of data.

In some embodiments, the data corresponding to the identifier displayed in the second user interface may be data of any type, for example, may include but is not limited to a picture, a document, a link, a chat record, a video, audio, a web page, a file, or the like.

In some other embodiments, the data corresponding to the identifier displayed in the second user interface includes only printable data, for example, a picture, a document, a web page, or a chat record. In this embodiment, the electronic device 1001 may obtain printable data in advance through filtering, and display an identifier of the printable data in the second user interface.

The data corresponding to the identifier in the second user interface may be stored in the electronic device 1001, or may be stored in the cloud server. The identifier of the data may be a thumbnail, a name, or the like of the data.

For example, the second user interface may be the user interface 91 shown in FIG. 9D. For the identifier of the data, refer to the thumbnail 905a and the thumbnail 905b in the picture area 905 shown in FIG. 9D.

S1504. The electronic device 1001 detects, in the second user interface, an operation of sharing selected data.

Herein, the selected data may include one or more of the following: a selected picture, a selected document, a selected web page, selected audio, a selected link, and the like. For example, refer to FIG. 9E. The selected data may be the original pictures corresponding to the picture thumbnails 905a and 905b.

For example, the operation of sharing the selected data may be a user operation performed on the control 904 after a user operation that is input in the picture area 905 shown in FIG. 9D and that is of selecting a to-be-shared picture is performed. This is not limited thereto. The operation of sharing the selected data may also be implemented in another form, for example, an operation of shaking the electronic device 1001 after the user selects a picture, or a speech control instruction input after the user selects a picture.

For the operation of sharing the selected data, refer to related descriptions in the UI embodiment shown in FIG. 9D to FIG. 9E. Details are not described herein again.

S1505. The electronic device 1001 refreshes the first user interface in response to the operation of sharing the selected data, and sends a first message to the server 2001. The first message carries the instant messaging ID of the associated user of the electronic device 1001 (namely, Lisa), the selected data, and the instant messaging ID of the server 3001. The first message indicates that user Lisa requests the printer managed by the server 3001 to print the selected file.

An identifier of the selected data is displayed in a refreshed first user interface, and is used to indicate content of communication between the electronic device 1001 and the server 3001. For example, the refreshed first user interface may be the user interface 37 shown in FIG. 9F.

The server 2001 is a server providing the instant messaging service.

In some embodiments, when the electronic device 1001 learns of a printer (for example, the printer 4001) that user Lisa wants to use, the first message may further carry a device ID of the printer (for example, the printer 4001). Herein, after user Lisa is bound with the printer, the electronic device 1001 may also locally store the device ID of the printer. The electronic device 1001 may determine, in the following manner, a printer that the user wants to use.

(1) If user Lisa is bound with only one printer, for example, the printer 4001, the printer 4001 is the printer that the user wants to use.

(2) If user Lisa is bound with a plurality of printers, a printer that is bound earlier or the printer that is used most recently by user Lisa is considered, by default, as the printer that the user wants to use.

(3) The printer selected by the user is the printer that the user wants to use. For example, refer to FIG. 6C. The user may first select the printer 4001 by tapping the control 604*d* in the user interface shown in FIG. 6C, and then trigger the electronic device 1001 to perform S1502 to S1505.

It may be understood that formats of messages used during communication between the electronic device 1001 and the server 2001 are the same, and the first message also uses the same format. The format is explained in detail in subsequent descriptions. Details are not described herein.

S1506 to S1516. A process of confirming the printing permission of user Lisa.

Optional step S1506. The server 2001 determines whether the selected data carried in the first message is printable.

If the data corresponding to the identifier displayed in the second user interface in S1503 may be data of any type, S1506 is mandatory.

If the data corresponding to the identifier displayed in the second user interface in S1503 only includes printable data, S1506 is optional.

In some embodiments, the first message sent by the electronic device 1001 may further carry a type of the selected data, and the server 2001 may determine, based on the type, whether the selected data is printable. Printable data can be referred to as data of a rich media type.

In some other embodiments, after receiving the first message, the server 2001 may directly identify the type of the selected data in the first message.

S1507. The server 2001 sends a second message to the server 3001, where the second message carries the instant messaging ID of user Lisa and a resource of the selected data. In some embodiments, the second message may further carry an ID of the selected data.

If the server 2001 performs S1506, the server 2001 may perform S1507 after determining that the selected data carried in the first message is printable in S1506. If the server 2001 does not perform S1506, the server 2001 may directly perform S1507 after S1505. For whether S1506 is performed, refer to the foregoing descriptions.

The server 2001 may determine a receiver of the second message, that is, determine the server 3001, in the following several manners.

(1) The server 2001 stores an instant messaging ID and a device ID of each server providing a printing/mirroring/projection service. Therefore, the device ID of the server 3001 can be found based on the instant messaging ID of the server 3001 carried in the first message that is received in S1506, in other words, the server 3001 is found.

(2) If the server 2001 stores a binding relationship between each server providing a printing/mirroring/projection service and a device managed by the server 2001, and the first message in S1505 further carries the device ID of the printer, the device ID of the server 3001 can be found in the binding relationship based on the device ID of the printer, in other words, the server 3001 is found.

Herein, for specific content stored by the server 2001, refer to Table 2.

The resource of the selected data may be a download address of the selected data generated by the server 2001, or may be the selected data. In some embodiments, after receiving the first message, the server 2001 may obtain the selected data, and generate the download address of the selected data.

In some embodiments, the ID of the selected data may be a message ID allocated by the server 2001 to the first message after the server 2001 receives the first message, and is used to indicate all selected data carried in the first message. For example, the ID of the selected data may be M1, indicating the picture 907 and the picture 908 that are carried in the first message.

In some other embodiments, the ID of the selected data may be a data ID allocated by the server 2001 to each piece of data carried in the first message after the server 2001 receives the first message, and is used to indicate a piece of data carried in the first message. For example, the ID of the selected data may include M1-1 and M1-2, where M1-1 indicates the picture 907 carried in the first message, and M1-2 indicates the picture 908 carried in the first message.

The ID of the selected data may be used by the server 3001 to subsequently find the corresponding data. When the server 3001 interacts with a plurality of electronic devices and provides a printing service, the data can be sent accurately to a printer based on the ID of the selected data, and no disorder occurs.

Optional step S1508. The server 3001 determines, based on the instant messaging ID of user Lisa in the second message, whether user Lisa has the usage permission for the printer managed by the server 3001.

Simply put, S1508 is used to verify whether user Lisa has the printing permission.

If the electronic device 1001 can display the first user interface only when the associated user (namely, Lisa) adds the server 3001 as the contact and is bound with the printer managed by the server 3001 in S1501, user Lisa must have the usage permission for the printer managed by the server 4001. In this case, S1508 is optional.

If the electronic device 1001 can display the first user interface when the electronic device 1001 adds the server 3001 as the contact, but is not bound with the printer managed by the server 3001 in S1501, S1508 is mandatory.

If the operation of viewing data can be input only when the associated user of the electronic device 1001 (namely, Lisa) adds the server 3001 as the contact and is bound with the printer managed by the server 3001 in S1502, user Lisa must have the usage permission for the printer managed by the server 4001. In this case, S1508 is optional.

If the operation of viewing data can also be input when the associated user of the electronic device 1001 (namely, Lisa) adds only the server 3001 as the contact and is not bound with the printer managed by the server 3001 in S1502, S1508 is mandatory.

Further, an instant messaging ID of a user having usage permission for each printer managed by the server 3001 may be associated and stored by the server 3001. In this way, the server 3001 can find, based on the instant messaging ID of user Lisa in the second message, whether user Lisa has the usage permission for the printer managed by the server 3001. Further, the server 3001 may further find a quantity of printers for which user Lisa has usage permission among the printers managed by the server 3001, and specific device IDs of the printers. Herein, user Lisa may have usage permission for one or more printers among the printers managed by the server 3001. This depends on the printer binding operation performed by user Lisa before. This is not limited in this embodiment of this disclosure. For specific content stored by the server 3001, refer to Table 3.

In this embodiment of this disclosure, each device performs the following steps S1509 to S1516 only when the server 3001 performs S1508. In other words, the following S1509 to S1516 are all optional steps.

Optional step S1509. The server 3001 sends a third message to the server 2001, where the third message carries the instant messaging ID of user Lisa. The third message indicates that user Lisa has the usage permission for the printer managed by the server 3001. In some embodiments, the third message may further carry one or more of the following: the ID of the selected data, an identity of the printer for which user Lisa has the usage permission among the printers managed by the server 3001, or an adjustable printing parameter of the printer for which user Lisa has the usage permission.

The identity of the printer may be a device ID, a name, a nickname, or the like of the printer.

The adjustable printing parameter refers to a printing parameter of the printer that can be adjusted by the user. The adjustable printing parameter depends on an actual condition of the printer, and may be periodically transmitted by the printer to the server 3001, or may be obtained by the server 3001 by performing query on the printer managed by the server 3001. For example, when a quantity of remaining papers in the printer is 10, an adjustable printing parameter of the maximum quantity of to-be-printed copies is 10. For another example, when there is only black ink in the printer, an adjustable printing parameter of a picture color is only black and white.

In the third message, the ID of the selected data may indicate data that the user currently wants to print, to distinguish between printing operations initiated by the user, and avoid disorder caused when the user initiates printing for a plurality of times.

Optional step S1510. The server 2001 receives the third message, and determines whether a sender of the third message (that is, the server 3001) has permission to communicate with the server 2001.

Servers that have the permission to communicate with the server 2001 and that is configured to provide printing/mirroring/projection are servers that obtain, through negotiation with the server 2001, an instant messaging service provided by the server 2001. These servers all have instant messaging IDs in the instant messaging application.

Further, the server 2001 learns, through query, whether the server 3001 has the communication permission. In some embodiments, the third message may carry an instant messaging ID or a device ID of the sender (to be specific, the server 3001). The server 2001 may query whether the instant messaging ID or the device ID is locally stored. If yes, the server 3001 has the communication permission. For content stored by the server 2001, refer to Table 2.

S1510 is an optional step in S1509 to S1516, and performing S1510 can prevent another server without permission from conveying an instruction through the server 2001.

Optional step S1511. The server 2001 sends, based on the instant messaging ID of user Lisa in the third message, a fourth message to the electronic device 1001 associated with user Lisa, where the fourth message indicates that user Lisa has the usage permission for the printer managed by the server 3001. In some embodiments, the fourth message may further carry one or more of the following: the ID of the selected data, the identity of the printer for which user Lisa has the usage permission among the printers managed by the server 3001, or an adjustable printing parameter of the printer for which user Lisa has the usage permission.

If the server 2001 performs S1510, S1511 is performed when a result of performing S1510 is "yes".

Further, the server 2001 stores an instant messaging ID of each registered user and a device ID of an associated electronic device of the user. Therefore, the server 2001 may find the device ID of the electronic device 1001 based on the instant messaging ID of user Lisa, that is, find the electronic device 1001. For specific content stored by the server 2001, refer to Table 1.

Optional step S1512. The electronic device 1001 receives the fourth message, refreshes the first user interface, and displays a printing control in the first user interface.

The printing control displays the selected data. In some embodiments, the electronic device 1001 determines the selected data based on the ID of the selected data in the fourth message sent by the server 2001 in S1509.

There may be printing controls displayed for pieces of selected data respectively. For example, the refreshed first user interface may be the user interface 37 shown in FIG. 9G, and for example, the printing controls may be the control 909 and the control 910.

Alternatively, the printing control may be displayed for all pieces of selected data. For example, the refreshed first user interface may be the user interface 37 shown in FIG. 10A, and for example, the printing control may be the control 101.

When user Lisa is bound with a plurality of printers among the printers managed by the server 3001, there may be printing controls displayed for the plurality of printers respectively. Information about the plurality of printers related to the printing controls, for example, identifiers of the plurality of printers, may be carried in the fourth message in S1511. For example, the refreshed first user interface may be the user interface 37 shown in FIG. 10C, and for example, the printing controls may be the controls 103 to 106.

Optional step S1513. The electronic device 1001 detects a user operation performed on the printing control.

The user operation may be, for example, a tap operation or a touch operation.

Optional step S1514. The electronic device 1001 displays a user interface used for printing setting, and receives, in the user interface, a triggering printing operation performed after the user set a printing parameter.

The user interface used for printing setting may be a user interface 37 that displays a printing setting window, for example, the user interface shown in FIG. 9H or FIG. 10B. Alternatively, the user interface used for printing setting may be a new user interface different from the user interface 37. This is not limited in this embodiment of this disclosure.

In some embodiments, an option of each printing parameter in the user interface used for printing setting is the adjustable printing parameter carried in the fourth message in S1511. In this way, it can be ensured that all printing settings determined by the user can be executed by the printer, thereby improving user experience.

The printing triggering operation performed after the user sets the printing parameter may be, for example, a user operation performed on the control 911e in FIG. 9H or 102e in FIG. 10B.

S1514 is an optional step in S1509 to S1516, and the user may autonomously set the printing parameter.

Optional step S1515. The electronic device 1001 sends a fifth message to the server 2001, where the fifth message carries a printing instruction and an ID of to-be-printed data. In some embodiments, the fifth message may further carry one or more of the following: the device ID of the printer and a printing parameter set by the user. The fifth message is used for indicating to print the selected data.

The device ID of the printer carried in the fifth message is the printer ID corresponding to the printing control in S1513. Refer to FIG. 10C. If the printing triggering operation is an operation performed on the control 103 or the control 105, a printer selected by the user is the printer 4001. If the printing triggering operation is an operation performed on the control 104 or the control 106, the printer selected by the user is the printer 4002.

The ID of the to-be-printed data is a data ID corresponding to the printing control in S1513.

For example, refer to the user interfaces in FIG. 9G and FIG. 10C, when the user taps the control 909, the control 103, or the control 104, the ID of the to-be-printed data is M1-1, which indicates that data that the user wants to print is the picture 907. When the user taps the control 910, the control 105, or the control 106, the ID of the to-be-printed data is M1-2, which indicates that data that the user wants to print is the picture 908.

For another example, refer to FIG. 10A. When the user taps the control 101, the ID of the to-be-printed data is M1, which indicates that the data that the user wants to print is the picture 907 and the picture 908 that are carried in the first message.

Optional step S1516. The server 2001 sends a sixth message to the server 3001, where the sixth message carries the printing instruction and the ID of the to-be-printed data. In some embodiments, the sixth message may further carry one or more of the following: the device ID of the printer and the printing parameter set by the user. The sixth message is used for indicating to print the data.

S1517 to S1519. Printing process.

S1517. The server 3001 obtains the to-be-printed data.

If S1516 is performed, the server 3001 may obtain, based on the ID of the to-be-printed data in the sixth message, the to-be-printed data from the resource of the selected data carried in the second message. In some embodiments, the resource of the selected data carried in the second message is the data itself, and the server 3001 may find corresponding data, that is, the to-be-printed data, from the resource based on the ID of the printed data. In some other embodiments, the resource that is of the selected data and that is carried in the second message is a download address, and the server 3001 may download the corresponding data from the download address, that is, obtain the to-be-printed data.

If S1516 is not performed, the server 3001 may obtain the selected data based on the resource that is of the selected data and that is carried in the second message sent by the server 2001 in S1507. The selected data is the to-be-printed data.

S1518. The server 3001 sends a printing request to a printer that performs a printing operation, where the printing request carries the to-be-printed data. In some embodiments, the printing request may further include a printing parameter.

Further, the server 3001 can determine, in the following several manners, the receiver, that is, the printer that performs the printing operation (for example, the printer 4001).

(1) If the first message in S1505 carries the ID of the printer, the printer that performs the printing operation is a printer corresponding to the ID of the printer.

(2) If S1515 is performed and the fifth message in S1515 carries the device ID of the printer, the printer that performs the printing operation is a printer corresponding to the ID of the printer.

(3) If the server 3001 records that user Lisa is bound with only one printer, for example, the printer 4001, the printer 4001 is the printer that performs the printing operation.

(4) If the server 3001 records that user Lisa is bound with a plurality of printers, the server 3001 may select any one of the plurality of printers as the printer that performs the printing operation.

The printing parameter may be obtained from the sixth message sent by the server 2001 in S1516, or may be a default printing parameter.

S1519. The printer prints the data.

In some embodiments, the printer may print the data based on the default printing parameter of the printer, or based on the printing parameter transferred by the server 3001 in S1518.

Optional steps S1520 to S1522. Feed back a printing status.

The printer may feed back the printing status of the data to the electronic device before printing the data, during data printing, or after printing the data. FIG. 15A, FIG. 15B, and FIG. 15C show only a process of feeding back the printing status of the data after printing the data. After receiving the printing status fed back by the printer, the electronic device may display prompt information to notify the user of the printing status.

In some embodiments, the printing status of the data may include but is not limited to a first printing state, which may indicate that a data printing task is in a printing task queue of the printer, and is queuing to be processed by the printer, a second printing state, which may indicate that the printer is printing data, a third printing state, which may indicate that data printing is complete, and a fourth printing state, which may indicate that the printer fails to print data.

Optional step S1523. The electronic device 1001 outputs the prompt information.

The prompt information 912 may be displayed in the first user interface. In some embodiments, for the prompt information displayed by the receiver 1002, refer to the prompt information 912 in the communication record shown in one or more examples in FIG. 9I to FIG. 9L.

The manner of notifying the user of the data transmission status is not limited to displaying the prompt information on the display, and there may be other manners for notifying the user of a file transmission status, for example, voice playing. This is not limited in this embodiment of this disclosure.

According to the method embodiment shown in FIG. 15A, FIG. 15B, and FIG. 15C, the user may trigger a printer to print the data by sending printable data such as a picture, a document, a link, and a chat record to a server contact. In this way, the printing process is intuitive, simple, and effective for the user.

FIG. 16A to FIG. 16D show another data sharing method according to an embodiment of this disclosure.

In the method shown in FIG. 16A to FIG. 16D, the electronic device 1001 may trigger a printer to print the data by sending selected printable data such as a picture, a document, a link, a chat record, and a text to a group and then sharing the data to the printer.

In the method shown in FIG. 16A to FIG. 16D, an example in which user Kate logs in to the instant messaging application in the electronic device 1003 and shares data to a work group is used for description. The work group includes users Lisa, Anna, Kate, and the server 3001 (namely, HUAWEI Cloud Printing). Lisa and Anna have the usage permission for the printer 4001, but Kate does not have the printing permission for the printer 4001.

As shown in FIG. 16A to FIG. 16D, the data sharing method may include the following steps.

S1601 to S1605. Select data for printing.

S1601. The electronic device 1003 displays a third user interface, where the third user interface is provided by an instant messaging application, and is used to display a record of communication between the associated user of the electronic device 1003 and the member in the work group.

S1602. The electronic device 1003 detects, in the third user interface, an operation of viewing data.

S1603. The electronic device 1003 displays a fourth user interface in response to the detected operation of viewing data. The fourth user interface displays identifiers of one or more pieces of data.

S1604. The electronic device 1003 detects, in the fourth user interface, an operation of sharing selected data.

S1605. The electronic device 1003 refreshes the third user interface in response to the operation of sharing the selected data, and sends a seventh message to the server 2001. The seventh message carries the instant messaging ID of the associated user of the electronic device 1003 (namely, Kate), the selected data, and the instant messaging ID of the work group. The first message indicates that user Kate requests the printer managed by the server 3001 in the work group to print the selected file.

For the refreshed third user interface, refer to the user interface 121 shown in FIG. 12A.

S1601 to S1605 are similar to S1501 to S1505 in FIG. 15A. Reference can be made to related descriptions.

S1606 to S1616. A process of confirming the printing permission of user Kate.

Optional step S1606. The server 2001 determines whether the selected data carried in the seventh message is printable.

S1607. The server 2001 sends an eighth message to the server 3001, where the eighth message carries instant messaging IDs of members in the work group and a resource of the selected data. In some embodiments, the eighth message may further carry an ID of the selected data.

Herein, the eighth message may carry the instant messaging IDs of other members in the work group except the server 3001 (for example, Lisa, Anna, and Kate).

S1608. The server 3001 determines, based on the instant messaging IDs of the members of the work group in the eighth message, whether each member has the usage permission for the printer managed by the server 3001.

S1609. The server 3001 sends a ninth message to the server 2001, where the ninth message carries an instant messaging ID of a user having the usage permission for the printer managed by the server 3001 in the work group, that is, the instant messaging IDs of user Lisa and user Anna. The ninth message indicates that user Lisa and user Anna have the usage permission for the printer managed by the server 3001. In some embodiments, the ninth message may further carry one or more of the following: the ID of the selected data, an identity of the printer for which user Lisa or user Anna has the usage permission among the printers managed by the server 3001, or an adjustable printing parameter of the printer for which user Lisa or user Anna has the usage permission.

Optional step S1610. The server 2001 receives the ninth message, and determines whether a sender of the ninth message (that is, the server 3001) has permission to communicate with the server 2001.

S1611. The server 2001 sends, based on the instant messaging ID of the user carried in the ninth message, a tenth message to an electronic device associated with the user. To be specific, the tenth message is sent to the electronic device 1001 and the electronic device 1002. In some embodiments, the tenth message sent to the electronic device 1001 or 1002 may carry one or more of the following: the identity of the printer for which user Lisa or user Anna has the usage permission among the printers managed by the server 3001, or an adjustable printing parameter of the printer for which user Lisa or user Anna has the usage permission.

S1612. The electronic device 1001 and the electronic device 1002 receive the tenth message, display a fifth user interface, and display a printing control in the fifth user interface. The fifth user interface is provided by an instant messaging application, and is used to display a record of communication between the associated user of the electronic device 1001 or 1002 and the member in the work group.

For an example of the fifth user interface, refer to the user interface 122 shown in FIG. 12C or the user interface 123 shown in FIG. 12F.

For example, the printing control may be the control 1204 in FIG. 12C or the control 1205 in FIG. 12F.

S1613. The electronic device 1001 detects a user operation performed on the printing control.

Optional step S1614. The electronic device 1001 displays a user interface used for printing setting, and receives, in the user interface, a triggering printing operation performed after the user set a printing parameter.

S1615. The electronic device 1001 sends an eleventh message to the server 2001, where the eleventh message carries a printing instruction. In some embodiments, the eleventh message may further carry one or more of the following: an ID of to-be-printed data, the device ID of the printer, and a printing parameter set by the user. The eleventh message is used for indicating to print the data.

For S1616 to S1619, refer to S1516 to S1519.

Optional steps S1620 to S1623. Feed back a printing status.

S1623. The electronic device 1001 to 1003 outputs prompt information.

For manners of outputting the prompt information by the electronic device 1001 to the electronic device 1002, refer to FIG. 12B, FIG. 12E, and FIG. 12G.

According to the method shown in FIG. 16A to FIG. 16D, a user without the usage permission for the printer may enter a group including a server contact and a contact having the usage permission for the printer, and may send a file to the group. After the contact having the usage permission for the printer in the group grants printing, the printer can be triggered to print the file. In this manner, the user does not need to add the server contact and become bound with the printer, and file printing can be convenient and fast by using a group. For the user, the process of file printing is simple.

An extension solution of the method embodiment shown in FIG. 16A to FIG. 16D is as follows.

In some embodiments, S1608 is optional. If the server 3001 can join any group, S1608 is mandatory. If the server 3001 can join only the group to which the user having the usage permission for the printer managed by the server 3001 belongs, S1608 is optional.

In some embodiments, S1609 to S1616 is optional. When S1609 to S1908 are not performed, the user can trigger printing by sending data to the group provided that the user joins the group to which the user having the usage permission for the printer managed by the server 3001 belongs. This is simple and convenient for the user.

Figure 17A:
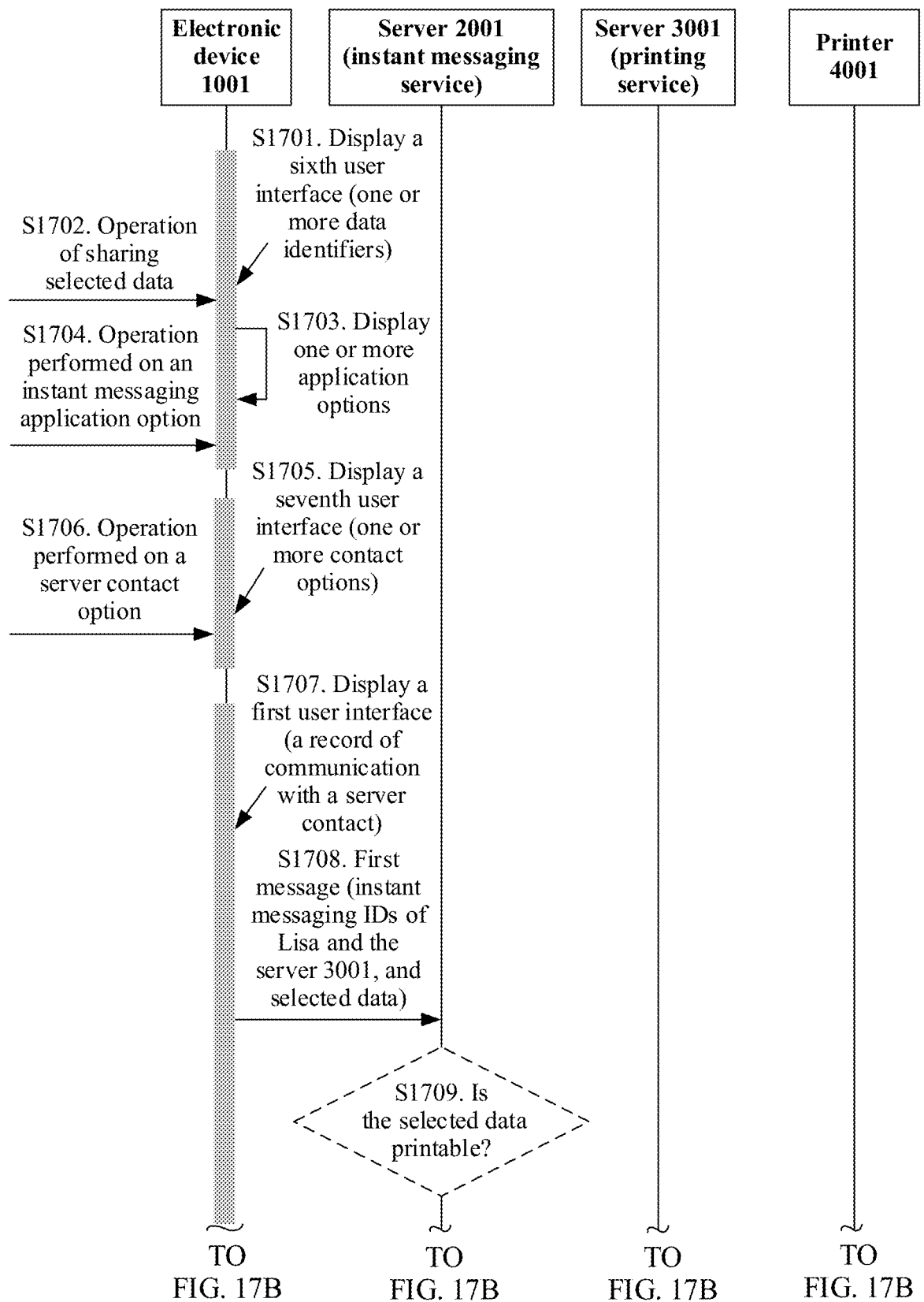
FIG. 17A, FIG. 17B, and FIG. 17C are a flowchart of still another data sharing method according to an embodiment of this disclosure.
Figure 17B:
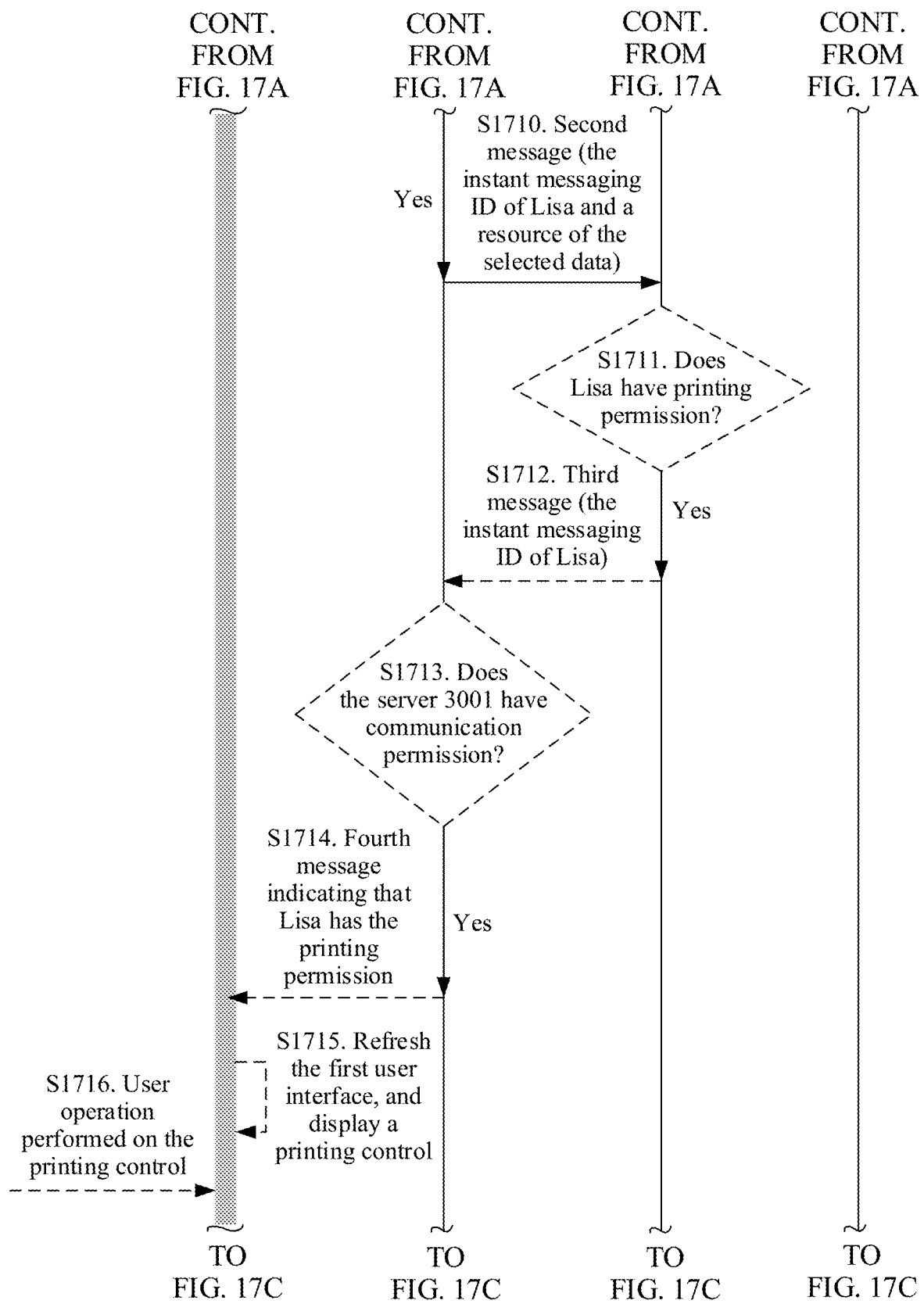
Figure 17C:
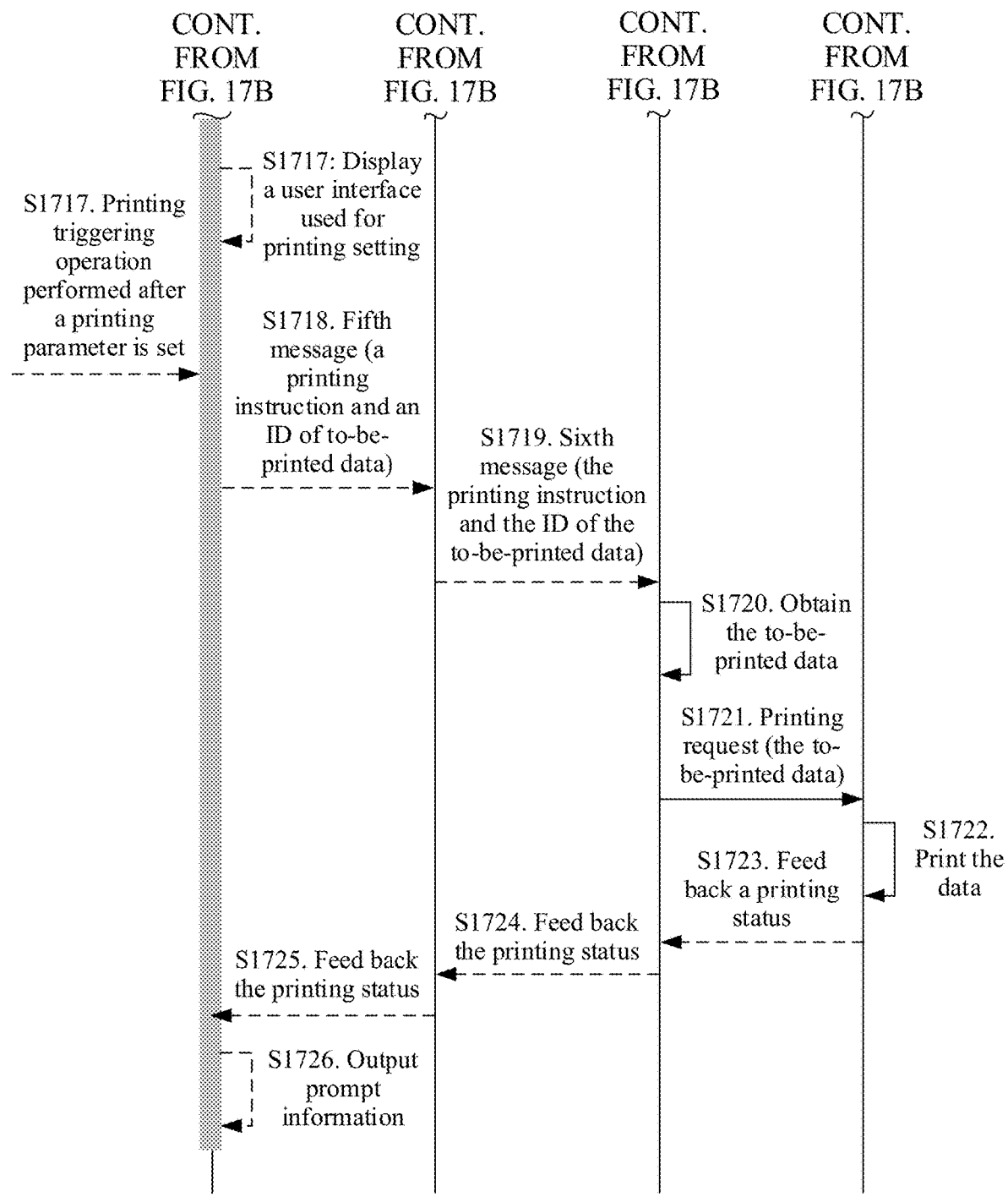

FIG. 17A to FIG. 17C show still another data sharing method according to an embodiment of this disclosure.

In the method shown in FIG. 17A to FIG. 17C, a user may first select printable data such as a picture, a document, a link, a chat record, and a text, and then select to share the data to a server contact in an instant messaging application, to share the data to a printer bound with the user and trigger the printer to print the data.

In the method shown in FIG. 17A to FIG. 17C, an example in which user Lisa logs in to the instant messaging application in the electronic device 1001 and shares data to the printer 4001 for printing is used for description.

As shown in FIG. 17A to FIG. 17C, the data sharing method may include the following steps.

S1701. The electronic device 1001 displays a sixth user interface, where the sixth user interface displays identifiers of one or more pieces of data.

The sixth user interface may be provided by an application used to manage data, for example, a gallery or a file browser. The sixth user interface is used to display one or more pieces of data. The sixth user interface displays identifiers of one or more pieces of data. The identifier of the data may be a thumbnail, a name, or the like of the data.

For an implementation of the sixth user interface, refer to the user interface 111 shown in FIG. 11A. For an implementation of the identifier of the data, refer to the thumbnail or the name 1103*a* of the file in the file area 1103 shown in FIG. 11A.

S1702. The electronic device 1001 detects, in the sixth user interface, an operation of sharing selected data.

An example implementation of the operation of sharing the selected data may include a user operation performed on the control 1104A in the user interface 111 shown in FIG. 11A. For a manner in which the electronic device 1001 determines the selected data, refer to related descriptions in the foregoing UI embodiments. Details are not described herein again.

S1703. The electronic device 1001 displays one or more application options in the sixth user interface in response to the detected operation of sharing the selected data.

Applications corresponding to the one or more application options displayed in the sixth user interface may be all applications that are installed on the electronic device 1001 and that can be used to share data. The one or more application options include an option of the instant messaging application.

For an example implementation of displaying the one or more application options in the sixth user interface, refer to the application option in the window 1105 shown in FIG. 11A.

S1704. The electronic device 1001 may detect an operation performed on the instant messaging application option.

S1705. The electronic device 1001 displays a seventh user interface, where the seventh user interface displays one or more of contact options.

The seventh user interface may be a user interface provided by the instant messaging application. For an example implementation of the seventh user interface, refer to the user interface 112 shown in FIG. 11C.

The one or more contact options in the seventh user interface may include a server contact option, for example, 1109 in FIG. 11C.

S1706. The electronic device 1001 may detect an operation performed on the server contact option in the seventh user interface.

For example, the electronic device 1001 may detect a tap operation, a touch operation, and the like that are performed on the option 1109 in the user interface shown in FIG. 11C.

S1707. The electronic device 1001 displays a first user interface.

S1708. The electronic device 1001 sends a first message to the server 2001.

For S1709 to S1726, refer to S1506 to S1523 in FIG. 15A to FIG. 15C.

It may be understood that, in this embodiment of this disclosure, the user may first select printable data such as a picture, a document, a link, a chat record, or a text, and then send the selected data to a group, so as to share the data to a printer and trigger the printer to print the data. For specific implementation of this manner, refer to a combination of the method embodiments shown in FIG. 16A to FIG. 16D and FIG. 17A to FIG. 17C. Details are not described in this embodiment of this disclosure.

In the foregoing embodiments provided in this disclosure, the electronic device 1001 may be referred to as a first electronic device, the server 2001 may be referred to as a first server, the server 3001 may be referred to as a second server, and the printer 4001 may be referred to as a first device.

The instant messaging ID of user Lisa may be referred to as a first ID. The instant messaging ID of user Kate may be referred to as a second ID. The instant messaging ID of the server 3001 may be referred to as a server ID.

In the method embodiment in FIG. 15A, FIG. 15B, and FIG. 15C provided in this disclosure, the operation of viewing data detected by the electronic device 1001 in S1502 may be referred to as a first operation.

The operation of sharing the selected data in S1504 may be referred to as a second operation. The data selected by the user in S1504 may be referred to as first data.

The resource of the selected data in S1507 may be referred to as a first resource.

The printing request in S1518 may be referred to as a processing request.

The printing control displayed in the refreshed first user interface in S1512 may be referred to as a first printing control.

The operation performed on the printing control in S1513 may be referred to as a third operation.

The control in the user interface used for printing setting in S1514, for example, the control 911e in FIG. 9H or the control 102e in FIG. 10B, may be referred to as a confirmation control.

In the method embodiment in FIG. 16A to FIG. 16D provided in this disclosure, the operation of viewing data in S1602 may be referred to as a fourth operation.

The operation of sharing the selected data in S1604 may be referred to as a fifth operation. The data selected by the user in S1604 may be referred to as second data.

The resource of the selected data in S1607 may be referred to as a second resource.

The printing request in S1618 may be referred to as a processing request.

The printing control displayed in the fifth user interface in S1612 may be referred to as a second printing control.

The operation performed on the printing control in S1613 may be referred to as a sixth operation.

The control in the user interface used for printing setting in S1614, for example, the control in FIG. 12D, may be referred to as a confirmation control.

In the method embodiment in FIG. 17A to FIG. 17C provided in this disclosure, the operation performed on the instant messaging application option in S1704 may be referred to as a seventh operation.

The operation performed on the server contact option in S1706 may be referred to as an eighth operation.

The following briefly describes message formats used when the electronic devices communicate with the server 2001.

A message format used during communication between an electronic device and the server 2001 is determined by an application developer. The format is not limited in this embodiment of this disclosure. The following describes a possible message format.

A message sent by the electronic device to the server 2001 may be encapsulated as MessageData, and the message may include the following several data fields.

A data field mRecipient is used to bear an instant messaging ID of a receiver (to be specific, a contact communicating with the electronic device). For example, an mRecipient data field in the first message sent by the electronic device 1001 in S1505 in FIG. 15A is used to carry the instant messaging ID of the server 3001.

A data field mFiles is a byte stream used to bear data sent by a user. For example, in S1505 in FIG. 15A, an mFiles data field in the first message sent by the electronic device 1001 is used to carry a byte stream converted from the data selected by the user.

A data field mFileSize is used to bear a size of to-be-printed data. The data may be used by the server 2001 to verify integrity of a received file.

A data field mText is used to bear text message content. When the electronic device sends a text to the server 2001, the text may be borne in the mText data field.

A data field mContentType is used to indicate a message type. The message type may include but is not limited to information of a rich media type, information of a text type, and the like carried in the message.

The data type used in printing is rich media, and corresponding data is stored in mFiles. The server 2001 may obtain information from a data field corresponding to a message based on a message type indicated by mContentType. For example, when mContentType indicates the rich media type, the server 2001 may obtain data from mFiles. For another example, when mContentType indicates the text type, the server 2001 may obtain a text from mText.

According to the foregoing method, the user may share data to a server contact or a group including a server contact in a manner of chatting in an instant messaging application, to trigger a printer to print data. This is simple and convenient for the user.

This disclosure is not limited to the foregoing mentioned manners. In some embodiments, the user may alternatively add a specific device such as a printer as a contact, to share data with the device by sending the data to the device contact. In other words, a specific device such as a printer, a projector, or a display is added as a contact of the user in an instant messaging application, so that the user can intuitively learn a device for printing data.

The implementations of this disclosure may be randomly combined to achieve different technical effects.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the processes or functions according to this disclosure are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DIGITAL VERSATILE DISC (DVD)), a semiconductor medium (for example, a solid-state disk (SSD)), or the like.

A person of ordinary skill in the art may understand that all or some of the processes of the methods in the embodiments may be implemented by a computer program instructing related hardware. The program may be stored in a computer-readable storage medium. When the program runs, the processes of the method embodiments are performed. The foregoing storage medium includes any medium that can store program code, such as a read-only memory (ROM), a RAM, a magnetic disk, or an optical disc.

In conclusion, the foregoing descriptions are merely embodiments of the technical solutions of the present disclosure, but are not intended to limit the protection scope of the present disclosure. Any modification, equivalent replacement, or improvement made according to the disclosure of the present disclosure shall fall within the protection scope of the present disclosure.

The invention claimed is:

1. A method implemented by a communication system, wherein the method comprises:
   displaying, by an electronic device of the communication system, in a first user interface, a record of communication between a first user and a second server of the communication system from an instant messaging application in the electronic device;
   detecting, in the first user interface, a first operation;
   displaying, by the electronic device and in response to the first operation, in a second user interface, one or more data identifiers, wherein the one or more data identifiers correspond to one or more pieces of data;
   detecting, by the electronic device, a second operation of sharing first data that is from the one or more pieces of data;
   sending, by the electronic device and to a first server, a first message carrying a first identity (ID) of the first user in the instant messaging application, the first data, and a server ID of the second server in the instant messaging application;
   sending, by the first server and to the second server, a second message carrying the first ID and a first resource, wherein the first resource is the first data or a download link of the first data;
   when the first user has a usage permission for the one or more devices, sending, by the second server, to the first server, a third message carrying the first ID, wherein the third message indicates that the first user has the usage permission;
   sending, by the first server, to the electronic device, and based on the first ID in the third message, a fourth message indicating that the first user has the usage permission;
   refreshing, by the electronic device and in response to the fourth message, the first user interface to obtain a refreshed first user interface that displays a first printing control;
   detecting, by the electronic device, a third operation on the first printing control;
   sending, by the electronic device and to the first server, a fifth message instructing to process the first data;
   sending, by the first server, in response to the fifth message, to the second server, a sixth message instructing to process the first data;
   obtaining, by the second server and based on the first resource, the first data;
   sending, by the second server and based on binding relationships between the first user and the one or more devices, a processing request to a first device in the one or more devices, wherein the processing request carries the first data; and
   processing, by the first device and in response to the processing request, the first data.

2. The method of claim 1, further comprising:
   printing, by the first device, the first data when the one or more devices comprises a printer;
   projecting, by the first device, the first data when the one or more devices comprises a projector; and
   displaying, by the first device, the first data when the one or more devices comprises a display.

3. The method of claim 1, wherein the one or more pieces of data is configured for processing by the one or more devices.

4. The method of claim 1, wherein after sending the first message and before sending the second message, the method further comprises determining, by the first server, that the first data is configured for processing by the one or more devices.

5. The method of claim 4, wherein the first message further carries a type of the first data, and wherein the method further comprises further determining, by the server and based on the type, that the first data is configured for processing by the one or more devices.

6. The method of claim 1, further comprising:
   identifying, by the electronic device, that the one or more devices comprises a printer;
   displaying, by the electronic device and in response to the third operation and identifying that the one or more devices are the printers, a third user interface print setting;
   displaying, by the electronic device and in the third user interface, a confirmation control; and
   further sending, by the electronic device, to the first server, and in response to a user operation on the confirmation control, the fifth message.

7. A method implemented by an electronic device, wherein the method comprises:
   displaying, in a first user interface, a record of communication between a first user and a second server from an instant messaging application, wherein the second server is configured to manage one or more devices and further configured to store binding relationships between the first user and the one or more devices;
   detecting, in the first user interface, a first operation;
   displaying, in response to the first operation, in a second user interface, one or more data identifiers, wherein the one or more data identifiers correspond to one or more pieces of data;
   detecting a second operation of sharing first data that is from the one or more pieces of data;
   receiving, from a first server, a third message indicating that the first user has a usage permission for the one or more devices;
   refreshing, in response to the third message, the first user interface to obtain a refreshed first user interface displaying a first printing control;
   detecting, on the first printing control, a third operation; and
   triggering a first device in the one or more devices to process the first data by printing, projecting, or displaying the first data.

8. The method of claim 7, further comprising sending, to a first server, a first message carrying a first identity (ID) of the first user in the instant messaging application, the first data, and a server ID of the second server in the instant messaging application.

9. The method of claim 7, further comprising:
   triggering the first device to print the first data when the one or more devices comprises a printer;
   triggering the first device to project the first data when the one or more devices comprises a projector; and
   triggering the first device to display the first data when the one or more devices comprises a display.

10. The method of claim 7, wherein the one or more pieces of data is configured for processing by the one or more devices.

11. The method of claim 8, wherein the first message further carries a type of the first data, and wherein the is configured for processing by the one or more devices.

12. The method of claim 7, further comprising:
   identifying that the one or more devices comprises a printer;

displaying, in response to the third operation and identifying that the one or more devices comprises a printer, a third user interface for print setting;
displaying a confirmation control in the third user interface; and
triggering, in response to a user operation on the confirmation control, the first device to process the first data.

13. The method of claim 7, wherein the first device is:
a second device when the first user is bound with the second device;
a third device that is first bound with the first user in the one or more devices; or
a fourth device that is most recently used in the one or more devices.

14. An electronic device, comprising:
a memory configured to store instructions; and
one or more processors coupled to the memory and configured to execute the instructions to cause the electronic device to:
 display, in a first user interface, a record of communication between a first user and a second server from an instant messaging application, wherein the second server is configured to manage one or more devices and further configured to store binding relationships between the first user and the one or more devices;
 detect, in the first user interface, a first operation;
 display, in response to the first operation, in a second user interface, one or more data identifiers, wherein the one or more data identifiers correspond to one or more pieces of data;
 detect a second operation of sharing first data that is from the one or more pieces of data;
 receive, from a first server, a third message indicating that the first user has a usage permission for the one or more devices;
 refresh, in response to the third message, the first user interface to obtain a refreshed first user interface displaying a first printing control;
 detect, on the first printing control, a third operation; and
 trigger a first device in the one or more devices to process the first data by printing, projecting, or displaying the first data.

15. The electronic device of claim 14, wherein the one or more processors is further configured to execute the instructions to cause the electronic device to send, to a first server, a first message carrying a first identity (ID) of the first user in the messaging application, the first data, and a server ID of the second server in the instant messaging application.

16. The electronic device of claim 14, wherein the one or more processors is further configured to execute the program instruction to cause the electronic device to:
trigger the first device to print the first data when the one or more devices comprises a printer;
trigger the first device to project the first data when the one or more devices comprise a projector; and
trigger the first device to display the first data when the one or more devices comprises a display.

17. The electronic device of claim 14, wherein the one or more pieces of data is configured for processing by the one or more devices.

* * * * *

UNITED STATES PATENT AND TRADEMARK OFFICE
CERTIFICATE OF CORRECTION

PATENT NO. : 11,921,995 B2
APPLICATION NO. : 18/175953
DATED : March 5, 2024
INVENTOR(S) : Qiang Tao, Guangyuan Gao and Shoujie Zhang It is certified that error appears in the above-identified patent and that said Letters Patent is hereby corrected as shown below:

In the Claims

Claim 11, Column 72, Line 63: "wherein the is" should read "wherein the first data is"

Signed and Sealed this
Thirtieth Day of April, 2024

Katherine Kelly Vidal
*Director of the United States Patent and Trademark Office*